(12) United States Patent
Mizukoshi et al.

(10) Patent No.: US 8,397,999 B2
(45) Date of Patent: Mar. 19, 2013

(54) TWO-DIMENSIONAL CODE HAVING RECTANGULAR REGION PROVIDED WITH SPECIFIC PATTERNS TO SPECIFY CELL POSITIONS AND DISTINCTION FROM BACKGROUND

(75) Inventors: Hiroaki Mizukoshi, Kitanagoya (JP); Masami Tanaka, Handa (JP); Yuichi Ito, Toyohashi (JP); Hayato Kita, Takahama (JP); Takao Ushijima, Okazaki (JP); Masahiro Hara, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 0 days.

(21) Appl. No.: 13/368,591

(22) Filed: Feb. 8, 2012

(65) Prior Publication Data

US 2012/0138694 A1 Jun. 7, 2012

Related U.S. Application Data

(63) Continuation of application No. 12/382,872, filed on Mar. 26, 2009.

(30) Foreign Application Priority Data

Mar. 27, 2008 (JP) ................................ 2008-083486
Sep. 3, 2008 (JP) ................................ 2008-226472

(51) Int. Cl.
*G06K 19/06* (2006.01)
(52) U.S. Cl. .......................... 235/494; 235/375; 235/454
(58) Field of Classification Search .................. 235/494, 235/454, 375, 462.09, 462.1
See application file for complete search history.

(56) References Cited

U.S. PATENT DOCUMENTS

| | | | |
|---|---|---|---|
| 5,726,435 | A | 3/1998 | Hara et al. |
| 6,279,830 | B1 | 8/2001 | Ishibashi |
| 2004/0020989 | A1 | 2/2004 | Muramatsu |
| 2006/0163357 | A1 | 7/2006 | Kim et al. |
| 2007/0295814 | A1 | 12/2007 | Tanaka et al. |
| 2008/0101702 | A1 | 5/2008 | Sonoda et al. |

FOREIGN PATENT DOCUMENTS

CN 1622114 A 6/2005

(Continued)

OTHER PUBLICATIONS

U.S. Appl. No. 13/368,602, filed Feb. 8, 2012, Mizukoshi et al.

(Continued)

*Primary Examiner* — Edwyn Labaze
(74) *Attorney, Agent, or Firm* — Posz Law Group, PLC

(57) ABSTRACT

A two-dimensional code having a rectangular region is provided. In the rectangular region, there are code blocks composed of a plurality of cells, a first specific pattern specifying the positions of the cells, and a second specific pattern separating the code blocks from a background of the code. The first specific pattern is located at a specified corner of the rectangular region. The second specific pattern is located along one or more of first borders along which the first specific pattern is located, the first borders being part of the borders of the rectangular region. The code blocks include error-correction code blocks, which are located along second borders which are different from a border of the borders along which the second specific pattern is located. The second borders are part of the borders. Compressed data code blocks are also arranged in the same way as the error-correction code blocks.

36 Claims, 67 Drawing Sheets

FOREIGN PATENT DOCUMENTS

| | | |
|---|---|---|
| EP | 1 443 452 A2 | 8/2004 |
| JP | A-S64-086289 | 3/1989 |
| JP | A-07-254037 | 10/1995 |
| JP | A-2000-148922 | 5/2000 |
| JP | A-2002-007979 | 1/2002 |
| JP | A-2004-234318 | 8/2004 |
| JP | A-2005-301656 | 10/2005 |
| JP | A-2005-332112 | 12/2005 |
| JP | A-2008-152334 | 7/2008 |

OTHER PUBLICATIONS

U.S. Appl. No. 13/368,614, filed Feb. 8, 2012, Mizukoshi et al.
Office Action dated Jan. 31, 2012 in corresponding CN Application No. 200910130165.X (and English translation).
Office Action mailed Jul. 31, 2012 in corresponding JP Application No. 2008-226472 (and English translation).
Extended European Search Report including the European Search Opinion dated.Nov. 12, 2012 in the corresponding European patent application No. 09004397.7-1248.

FIG. 2A
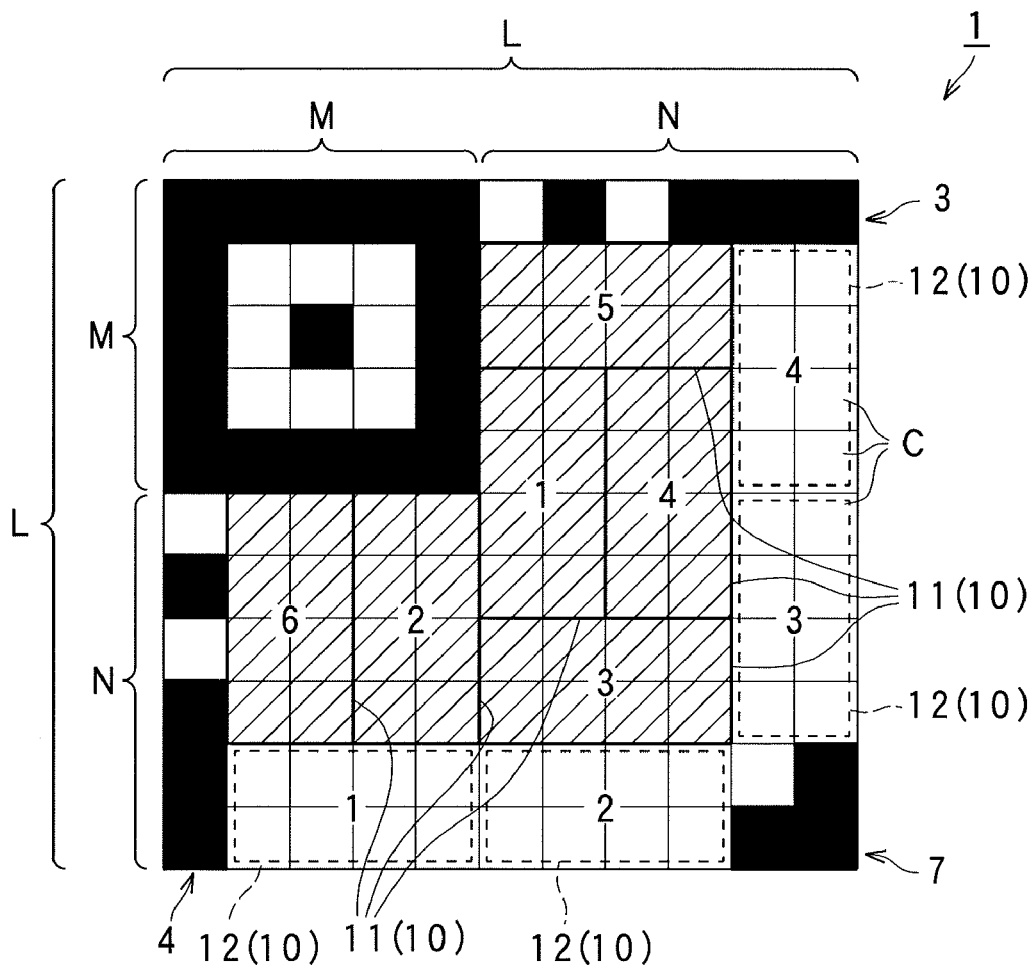
FIG. 2B
FIG. 2C
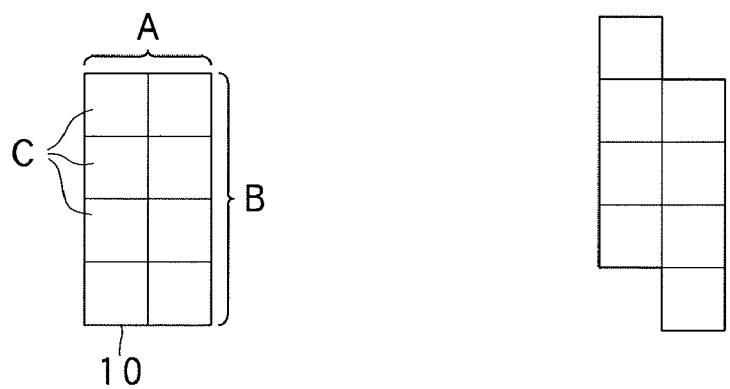

FIG. 8
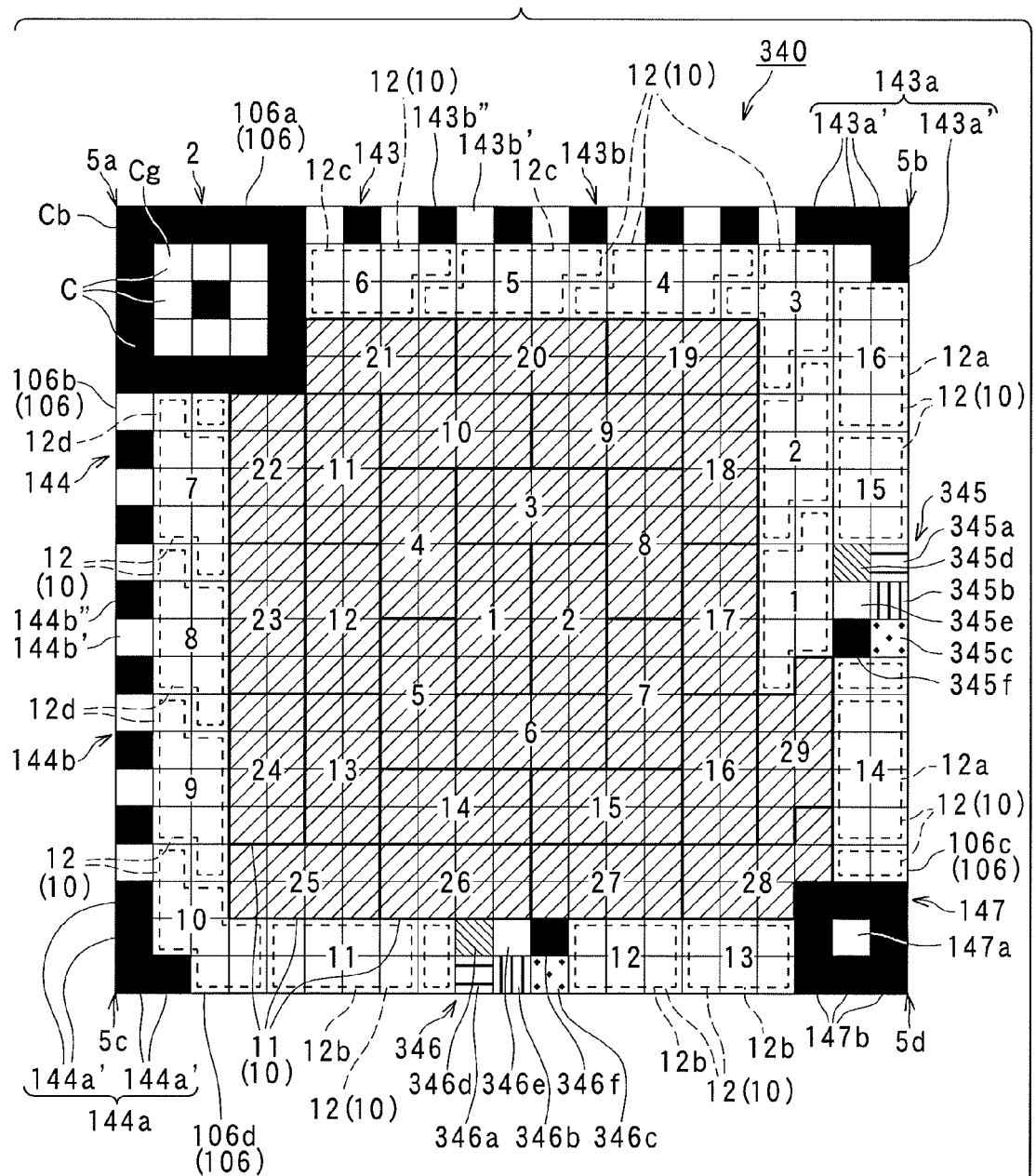
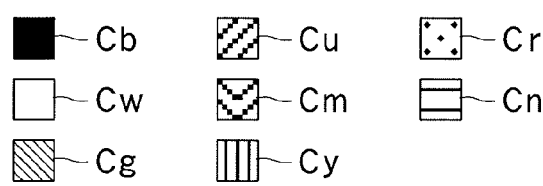

FIG.13
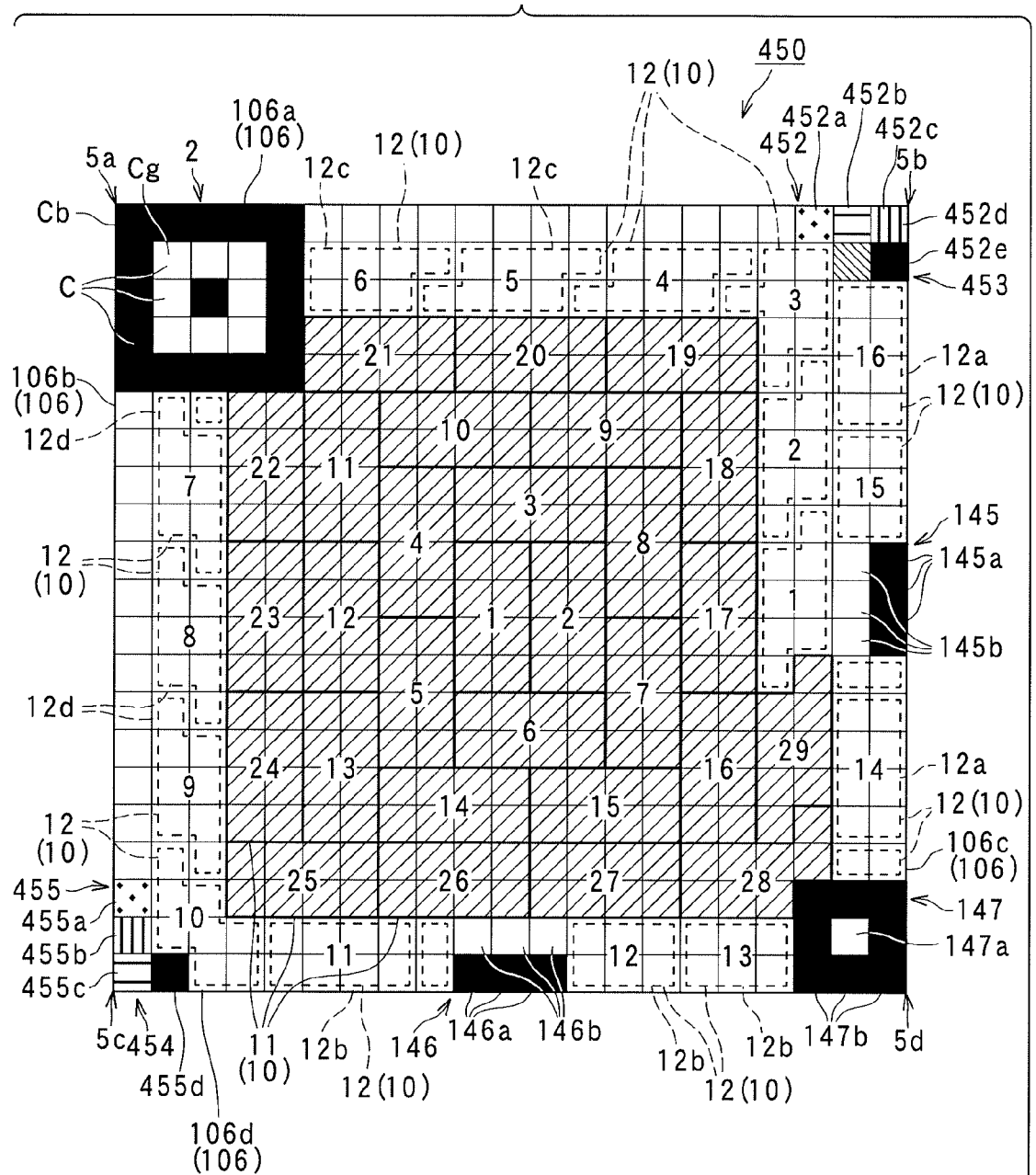
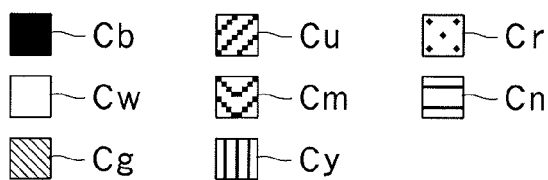

FIG. 34A

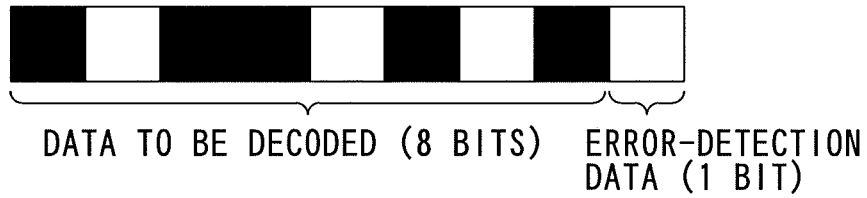

DATA TO BE DECODED (8 BITS)   ERROR-DETECTION DATA (1 BIT)

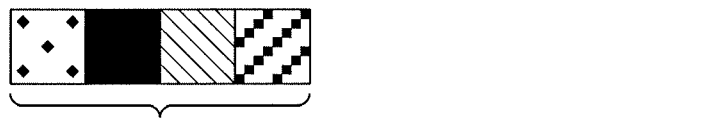

COMPOSITE DATA EXPRESSED BY FOUR CELLS
OUT OF FIVE DIFFERENTLY COLORED CELLS

■ — Cb  BLACK       ⬚ — Cr  RED
□ — Cw  WHITE       ▨ — Cg  GREEN
                    ▨ — Cu  BLUE

FIG. 34B

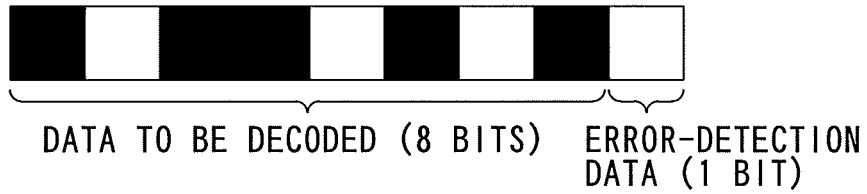

DATA TO BE DECODED (8 BITS)   ERROR-DETECTION DATA (1 BIT)

COMPOSITE DATA EXPRESSED BY THREE CELLS
OUT OF EIGHT DIFFERENTLY COLORED CELLS

■ — Cb  BLACK       ⬚ — Cr  RED        ∥ — Cy  YELLOW
□ — Cw  WHITE       ▨ — Cg  GREEN      ▨ — Cm  MAGENTA
                    ▨ — Cu  BLUE       ≡ — Cn  CYAN

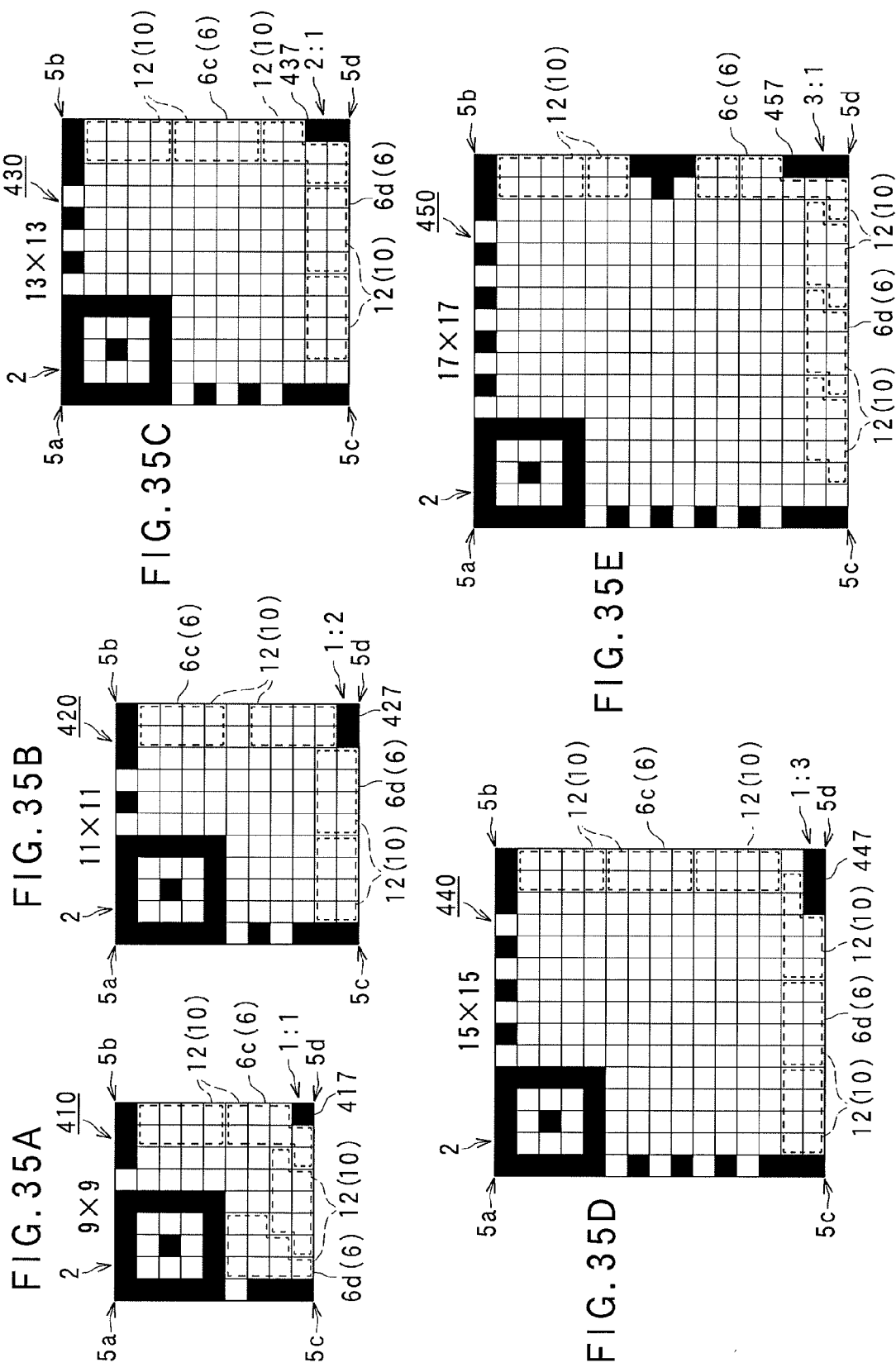

FIG. 36
| SIZE OF CODE | 19×19 | 21×21 | 23×23 | 25×25 | 27×27 |
|---|---|---|---|---|---|
| SHAPE OF END PATTERN |  |  |  |  | |
| RATIO | 1:4 | 4:1 | 2:3 | 3:2 | 1:5 |
| RATIO SUM | 5 | 5 | 5 | 5 | 6 |

FIG.37

| SIZE OF 2D CODE | RATIO OF END PATTERN | RATIO SUM |
| --- | --- | --- |
| 9 × 9 | 1 : 1 | 2 |
| 11 × 11 | 1 : 2 | 3 |
| 13 × 13 | 2 : 1 | 3 |
| 15 × 15 | 1 : 3 | 4 |
| 17 × 17 | 3 : 1 | 4 |
| 19 × 19 | 1 : 4 | 5 |
| 21 × 21 | 4 : 1 | 5 |
| 23 × 23 | 2 : 3 | 5 |
| 25 × 25 | 3 : 2 | 5 |
| 27 × 27 | 1 : 5 | 6 |

FIG.38A

CONVERSION EFFICIENCY WITH 10 TYPES OF NUMERICAL CHARACTERS (0 TO 9)

1 DIGIT : $10 < 2^4 = 16 \rightarrow 4/1 = 4$ bit /CHARACTERS

2 DIGITS : $10^2 < 2^7 = 128 \rightarrow 7/2 = 3.5$ bit /CHARACTERS

3 DIGITS : $10^3 < 2^{10} = 1024 \rightarrow 10/3 = 3.3$ bit /CHARACTERS

4 DIGITS : $10^4 < 2^{14} = 16384 \rightarrow 14/4 = 3.5$ bit /CHARACTERS

5 DIGITS : $10^5 < 2^{17} = 131072 \rightarrow 17/5 = 3.4$ bit /CHARACTERS

6 DIGITS : $10^6 < 2^{20} = 1048576 \rightarrow 20/6 = 3.3$ bit /CHARACTERS

7 DIGITS : $10^7 < 2^{24} = 16777216 \rightarrow 24/7 = 3.4$ bit /CHARACTERS

FIG.38B

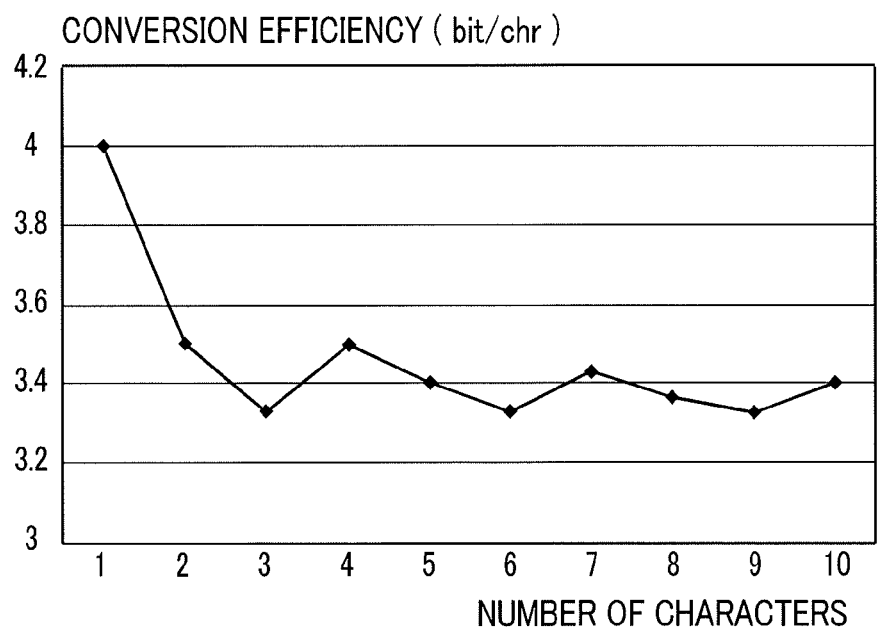

FIG.39

EXAMPLE OF BINARY CONVERSION

CONVERSION OF CHARACTER STRING "34567890" IN NUMERICAL MODE (10 TYPES)

(1) SEPARATE INTO 3-CHARACTER UNITS 345  678  90

(2) BINARY-CONVERT (10 BITS) THE CHARACTER STRING OF 3-CHARACTER UNITS

345 = 01 0101 1001    678 = 10 1010 0110

(3) BINARY-CONVERT (7 BITS) THE REMAINING TWO CHARACTERS

90 = 101 1010

(4) CONNECT THE BINARY-CONVERTED DATA 01010110 01101010 01101011 010

(5) ADD CHARACTER SET DESIGNATOR (E.G., 0001) AND THE NUMBER OF CHARACTERS OF THE STRING, WHICH IS 8 (00001000), TO THE TOP OF THE BINARY-CONVERTED DATA 0001 00001000 01010110 01101010 01101011 010

FIG.40A

CONVERSION EFFICIENCY WITH 26 TYPES OF ALPHAMERIC CHARACTERS (A TO Z)

1 DIGIT : $26 < 2^5 = 32 \rightarrow 5/1 = 5$ bit /CHARACTERS
2 DIGITS : $26^2 = 676 < 2^{10} = 1024 \rightarrow 10/2 = 5$ bit /CHARACTERS
3 DIGITS : $26^3 = 17576 < 2^{15} = 32768 \rightarrow 15/3 = 5$ bit /CHARACTERS
4 DIGITS : $26^4 = 456976 < 2^{19} = 524288 \rightarrow 19/4 = 4.75$ bit /CHARACTERS
5 DIGITS : $26^5 = 11881376 < 2^{24} = 16777216 \rightarrow 24/5 = 4.8$ bit /CHARACTERS
6 DIGITS : $26^6 = 308915776 < 2^{29} = 536870912 \rightarrow 20/6 = 4.83$ bit /CHARACTERS
7 DIGITS : $26^7 = 8031810176 < 2^{33} = 8589934592 \rightarrow 33/7 = 4.71$ bit /CHARACTERS
8 DIGITS : $26^8 = 208827064576 < 2^{38} = 274888906944 \rightarrow 38/8 = 4.75$ bit /CHARACTERS

FIG.40B

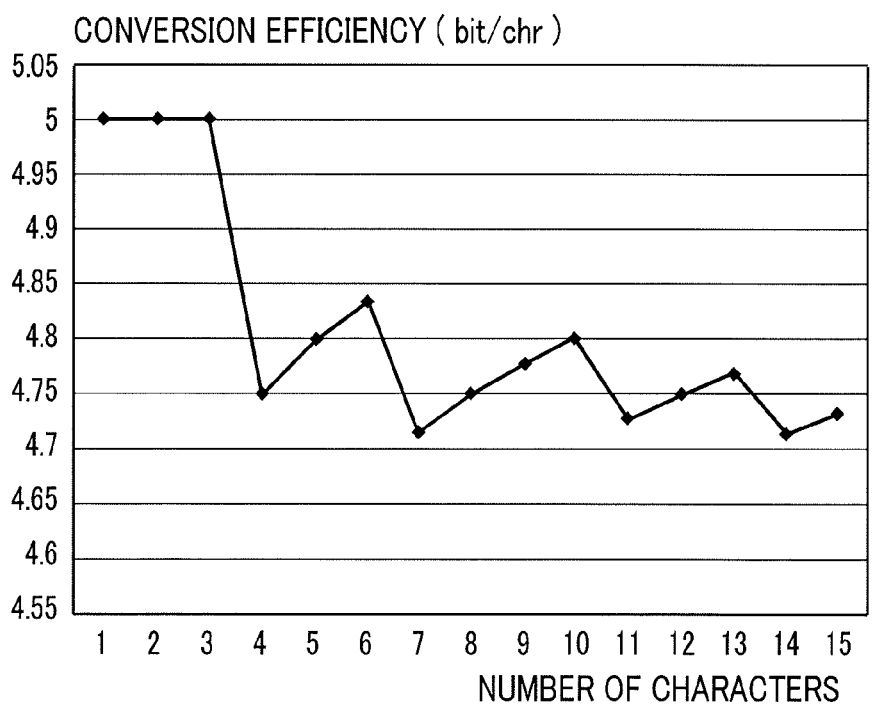

FIG. 41

CONVERSION OF CHARACTER STRING "ABCRSTUVWXYZ" IN ALPHAMERIC MODE (26 TYPES)

(1) INDIVIDUAL CHARACTERS ARE CONVERTED INTO NUMERALS REFERRING TO THE FOLLOWING TABLE

| CHARACTER | NUMERAL | CHARACTER | NUMERAL | CHARACTER | NUMERAL | CHARACTER | NUMERAL | CHARACTER | NUMERAL |
|---|---|---|---|---|---|---|---|---|---|
| A | 0 | G | 6 | M | 12 | S | 18 | Y | 24 |
| B | 1 | H | 7 | N | 13 | T | 19 | Z | 25 |
| C | 2 | I | 8 | O | 14 | U | 20 | | |
| D | 3 | J | 9 | P | 15 | V | 21 | | |
| E | 4 | K | 10 | Q | 16 | W | 22 | | |
| F | 5 | L | 11 | R | 17 | X | 23 | | |

ABCRSTUVWXYZ → 0, 1, 2, 17, 18, 19, 20, 21, 22, 23, 24, 25

(2) SEPARATE INTO 7-NUMERAL UNITS 0, 1, 2, 17, 18, 19, 20    21, 22, 23, 24, 25

(3) FIRST SEVEN NUMERALS ARE CONVERTED INTO 26TH'S, FOLLOWED BY BINARY CONVERSION (33 BITS)

$0 \times 26^6 + 1 \times 26^5 + 2 \times 26^4 \times 17 \times 26^3 + 18 \times 26^2 + 19 \times 26 + 20 \times 26^0$ = 13106802 ( 000C7FE72 Hex )

= 0 0000 0000 1100 0111 1111 1110 0111 0010

(4) REMAINING FIVE NUMERALS ARE SEPARATED INTO 4-NUMERAL UNITS 21, 22, 23, 24    25

(5) FOUR NUMERALS ARE CONVERTED INTO 26TH'S, FOLLOWED BY BINARY CONVERSION (19 BITS)

$21 \times 26^3 + 22 \times 26^2 + 23 \times 26 + 24 \times 26^0$

= 384590 ( 5DE4E Hex )

= 101 1101 1110 0100 1110

(6) REMAINING ONE NUMERAL IS BINARY-CONVERTED (5 BITS)

25 = 1 1001

(7) BINARY-CONVERTED DATA ARE CONNECTED 000000000110001111111110011100101011101111001001110 11001

(8) ADD CHARACTER SET DESIGNATOR (E.G., 0010) AND THE NUMBER OF CHARACTERS OF THE STRING, WHICH IS 12 (00001100), TO THE TOP OF THE BINARY-CONVERTED DATA 0010 00001100 0000000001100011111111100111001010111011110010011 1011001

FIG. 45
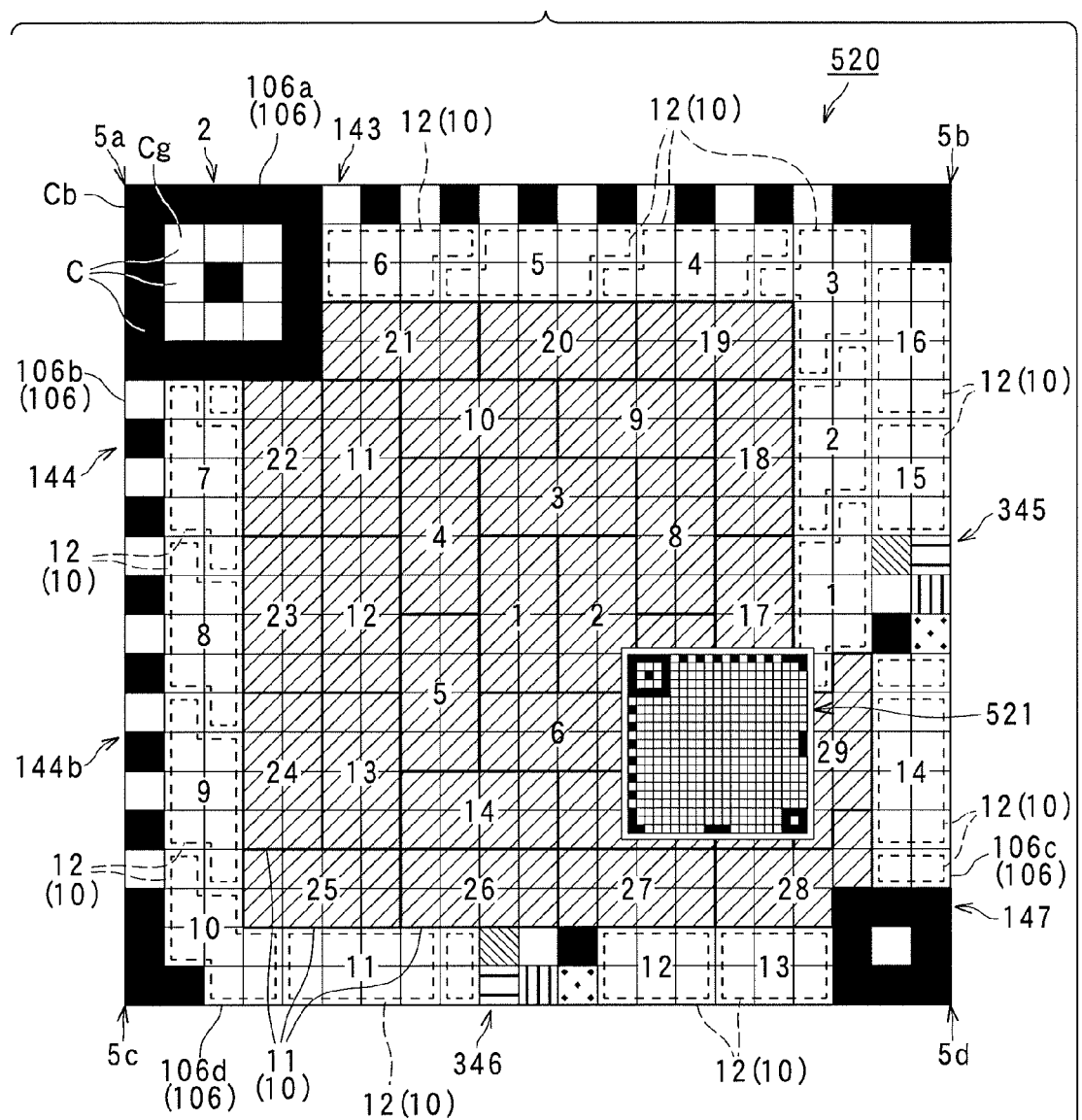
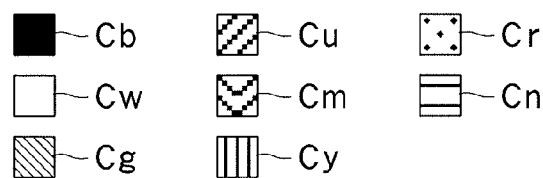

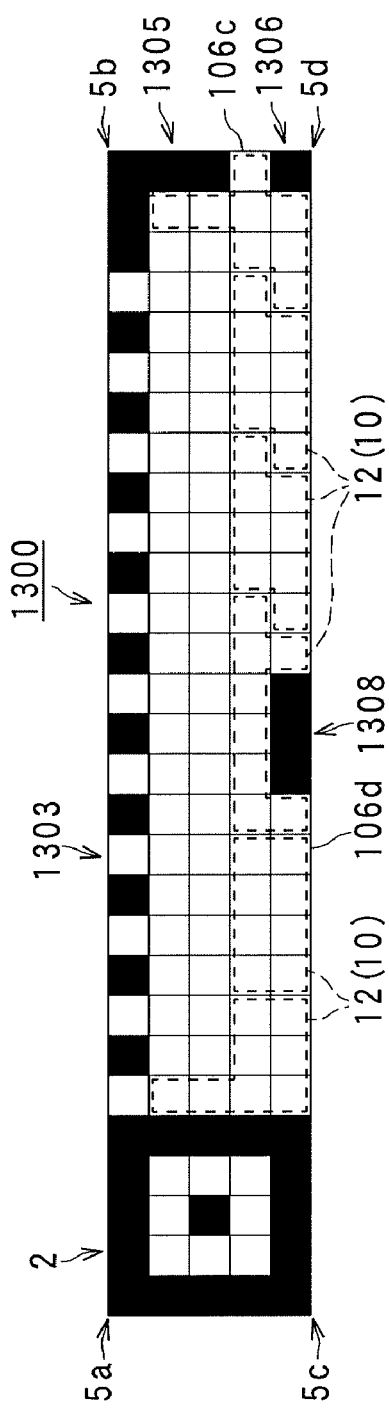
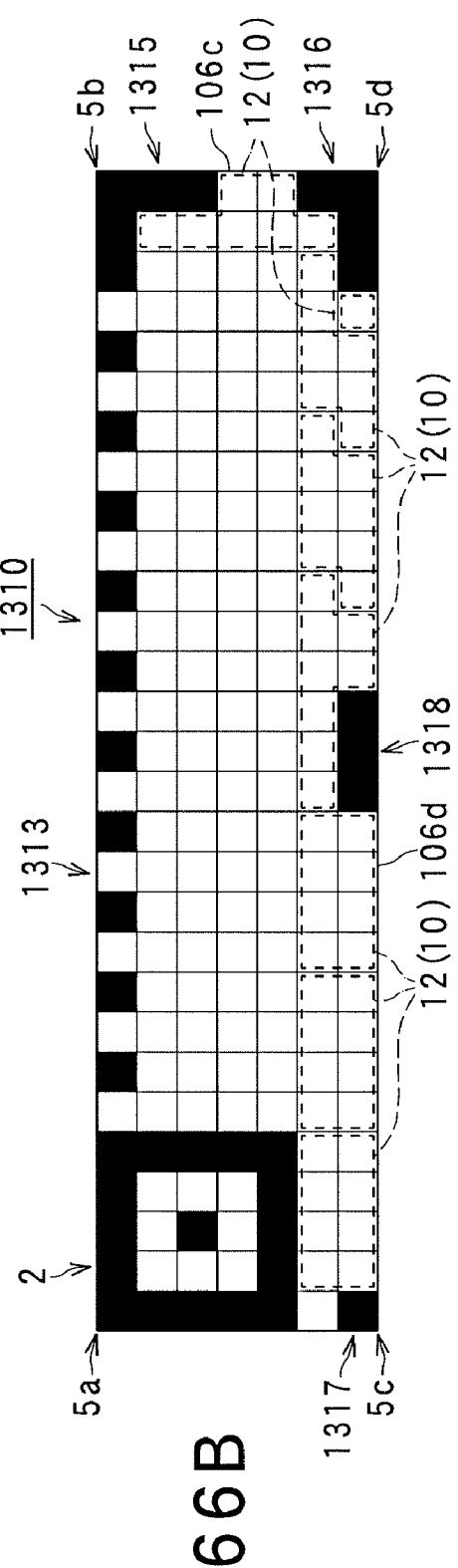
FIG. 66A
FIG. 66B

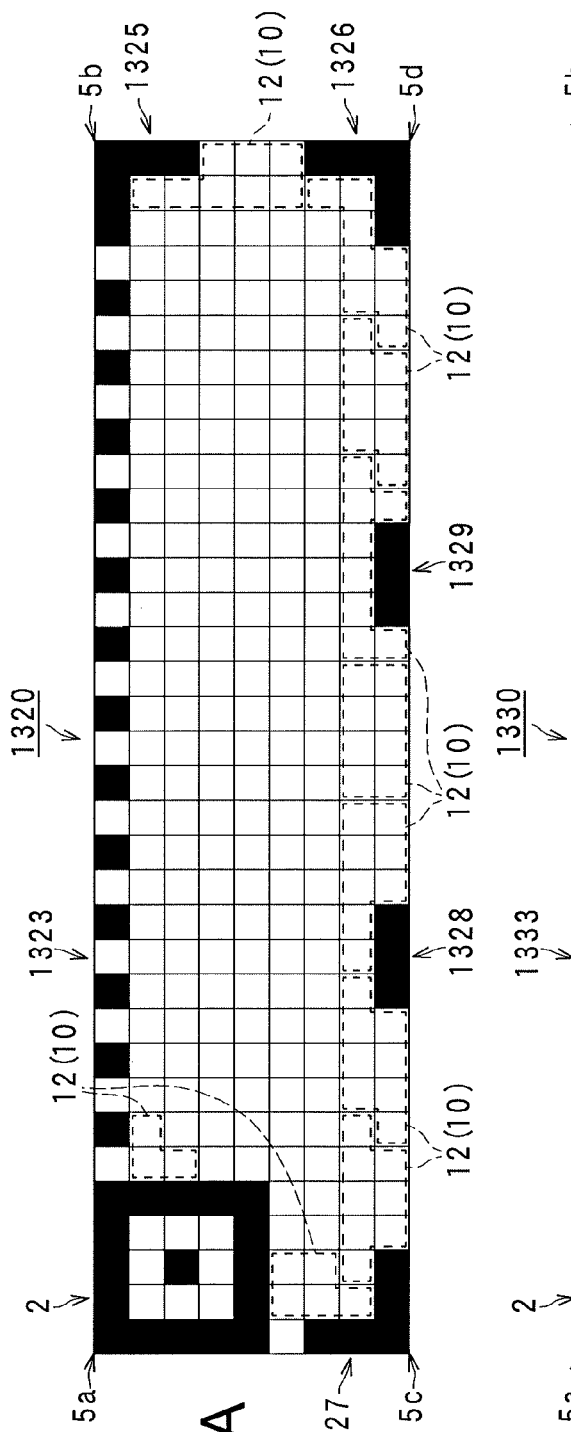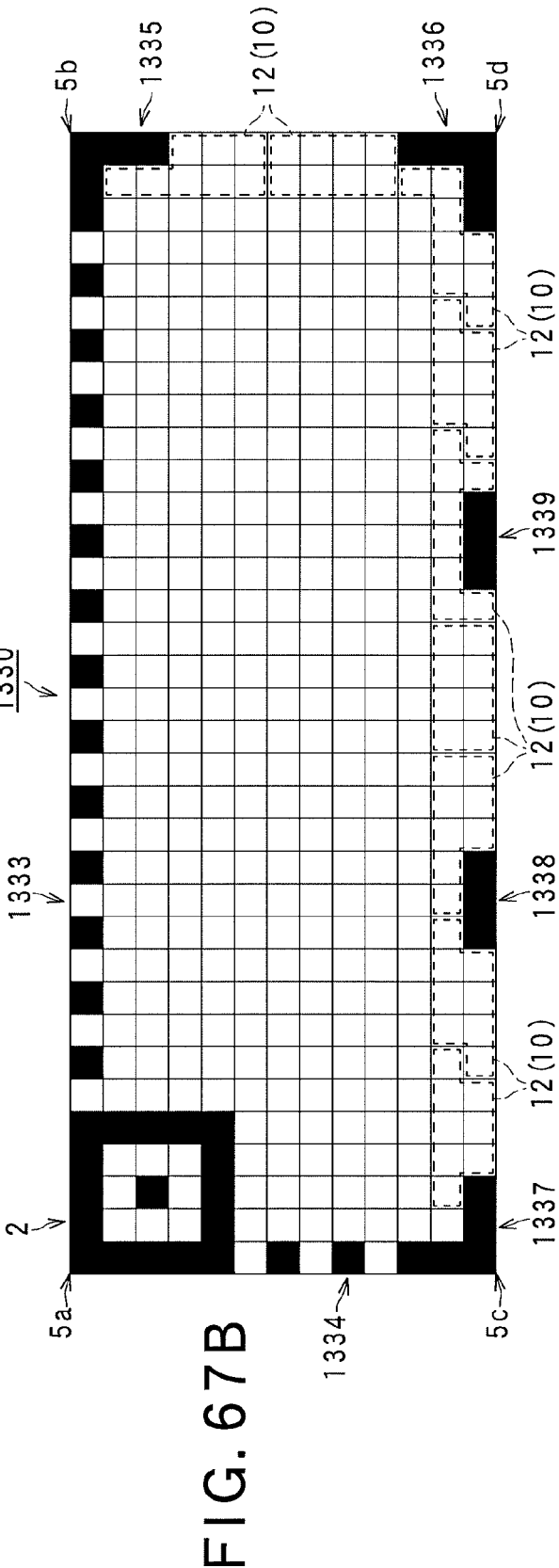

TWO-DIMENSIONAL CODE HAVING RECTANGULAR REGION PROVIDED WITH SPECIFIC PATTERNS TO SPECIFY CELL POSITIONS AND DISTINCTION FROM BACKGROUND

CROSS-REFERENCE TO RELATED APPLICATION

This application is a continuation of U.S. application Ser. No. 12/382,872, which was filed Mar. 26, 2009, now allowed on Nov. 8, 2011. This application is based on and claims the benefit of priorities from earlier Japanese Patent Application Nos. 2008-083486 and 2008-226472 filed Mar. 27 and Sep. 3, 2008, respectively, the descriptions of which are incorporated herein by reference.

BACKGROUND OF THE INVENTION

1. Technical Field of the Invention

The present invention relates to a two-dimensional code, and in particular, to a two-dimensional code having a rectangular region delineated by a plurality of cells and formed to have specific patterns for specifying the positions of cells in the rectangular region and distinguishing the code from the background.

2. Related Art

Various types of two-dimensional codes (hereinafter also referred to as "2D code(s)") have been supplied, in which a plurality of cells are arranged in a matrix. A typical reader (2D code reader) for reading such 2D codes is disclosed, for example, in Japanese Patent No. 2938338. The 2D code reader disclosed in this reference is configured to acquire image data that includes a type of such a 2D code, carry out an analyzing process for defining a region (code region) of the 2D code from the image data, and carry out a decoding process based on image contents of the defined code region.

As mentioned above, in reading a 2D code, a 2D code region is required to be specifically defined from the acquired image data. Therefore, a 2D code is required to have a structure that enables prompt and correct definition of the code region in carrying out reading.

As a method for defining a code region, dark cells (dark squares) may be consecutively arranged in an L-shaped specific pattern along two sides of a rectangular code region, and different specific patterns (e.g. patterns in each of which dark cells and bright cells are alternated) are arranged along the remaining two sides. Thus, enclosing all of the four sides of a rectangular region with specific patterns may facilitate distinction between a background and a code region (rectangular region), in carrying out reading. However, such a method needs a large number of cells that have to be allocated to the specific patterns which do not include data (data to be decoded, or data for correcting errors). Therefore, the number of cells that are to be allocated to data has to be reduced.

On the other hand, in the method disclosed in the above reference, bright cells (white cells) and dark cells (black cells) are alternately arranged first in a data area, and then the characteristics of the cells are changed according to a given rule. Specifically, plural types of mask patterns (matrix patterns for changing cell characteristics) are prepared in advance. Then, after arranging data, the mask patterns are superposed over the data when a 2D code is produced. After the superposition, a pattern containing less consecutive white cells and black cells is employed as an optimal arrangement pattern.

In this method as well, the bright cells (white cells) and dark cells (black cells) can be suppressed from being consecutively provided in portions next to the background to thereby make a good distinction between the background and a code region (rectangular region). However, the method disclosed in the above reference necessitates allocation of information in a code in advance, which information is indicative of the type of the mask pattern in use (mask pattern information). Accordingly, in this method as well, the number of cells allocated for data (data to be decoded, or data for correcting errors) has to be decreased.

SUMMARY OF THE INVENTION

The present invention has been made in light of the issues described above, and has as its objects to provide a two-dimensional code which is able to make a good distinction between a background and a code region, suppress as much as possible the number of cells to be allocated to areas other than data, and thus effectively increase the number of cells to be allocated to data, and to provide a method associated with the two-dimensional code, or to provide a computer-readable program for displaying the two-dimensional code.

In the present invention, the two-dimensional code may be either a two-dimensional code having two types of cells consisting of bright cells and dark cells or a two-dimensional code having cells whose saturation, hue, and/or lightness differ from each other. The term "rectangular region" conceptually includes a square region and an oblong region.

In order to achieve the above object, as one aspect, there is provided a two-dimensional code having a rectangular region with borders, comprising: code blocks each composed of a plurality of cells which are aggregated; a first specific pattern used to specify the positions of the cells; and a second specific pattern that is used to distinguish the code blocks from a background of the code, wherein the code blocks, the first specific pattern and the second specific pattern are arranged in the rectangular region, the first specific pattern is located at a specified corner of the rectangular region, the second specific pattern is located along one or more of first borders along which the first specific pattern is located, the first borders being part of the borders of the rectangular region, the code blocks include error-correction code blocks for correcting an error, and the error-correction code blocks are located along second borders which are different from a border of the borders along which the second specific pattern is located, the second borders being part of the borders of the rectangular region.

As another aspect, the present invention provides a two-dimensional code having a rectangular region with borders, comprising: code blocks each composed of a plurality of cells which are aggregated; a first specific pattern used to specify the positions of the cells; and a second specific pattern used to distinguish the code blocks from a background of the code, wherein the code blocks, the first specific pattern and the second specific pattern are arranged in the rectangular region, the first specific pattern is located at a specified corner of the rectangular region, the second specific pattern is located along one or more of first borders along which the first specific pattern is located, the first borders being part of the borders of the rectangular region, the code blocks include compressed data code blocks in which compressed data are stored, and the compressed data code blocks are arranged along second borders which are different from a border of the borders along which the second specific pattern is located, the second borders being part of the borders of the rectangular region.

These configurations are able to provide various advantages including the following. In reading the two-dimensional code, part the edges of the rectangular region, which is adjacent to the second specific pattern, can be distinguished reliably using the first and second specific patterns.

It is preferred that one or more of the error-correction code blocks are arranged along each of the second borders.

It is also preferred that the compressed data code blocks are arranged along each of the second borders by one or more.

It is also preferred that wherein the code blocks include a first border block arranged along between the first specific pattern and the second specific pattern along the first borders, and the first border block include the error-correction code blocks.

It is also preferred that the code blocks include first border block arranged along between the first specific pattern and the second specific pattern along the first borders, and the first border block include the compressed data code blocks.

Other features and advantages of the present invention will be clarified from the descriptions of the embodiments, which will be described together with the accompanying drawings.

BRIEF DESCRIPTION OF THE DRAWINGS

In the accompanying drawings:

FIG. 2A is an explanatory view illustrating a matrix structure of the two-dimensional code illustrated in FIG. 1;

FIG. 2B is an explanatory view illustrating a matrix structure of a code block of the two-dimensional code illustrated in FIG. 1;

FIG. 2C is an explanatory view illustrating an example of a structure of a code block which is different from the one illustrated in FIG. 2B;

FIG. 8 is an explanatory view illustrating a modification of the fourth embodiment;

FIG. 13 is an explanatory view illustrating a third modification of the fifth embodiment;

FIG. 34A is an explanatory view illustrating a code block configuration of a two-dimensional code, according to a twelfth embodiment of the present invention;

FIG. 34B is an explanatory view illustrating another example of a code block configuration of the two-dimensional code, according to the twelfth embodiment of the present invention;

FIGS. 35A to 35E are schematic explanatory views illustrating examples of two-dimensional codes, according to a thirteenth embodiment of the present invention;

FIG. 36 is an explanatory view illustrating examples of end patterns;

FIG. 37 is an explanatory view illustrating a relationship between size, proper ratio and ratio sum;

FIG. 38A is an explanatory view illustrating a relationship between the number of digits and conversion efficiency, according to a fourteenth embodiment of the present invention;

FIG. 38B is a graph illustrating the relationship illustrated in FIG. 38A;

FIG. 39 is an explanatory view illustrating a flow of binary conversion, according to the fourteenth embodiment;

FIG. 40A is an explanatory view illustrating a relationship between the number of digits and conversion efficiency, according to a modification of the fourteenth embodiment;

FIG. 40B is a graph illustrating the relationship illustrated in FIG. 40A;

FIG. 41 is an explanatory view illustrating a flow of binary conversion conducted in the example illustrated in FIGS. 40A and 40B;

FIG. 45 is a schematic explanatory view illustrating a two-dimensional code, according to a seventeenth embodiment of the present invention;

FIG. 66A is a schematic explanatory view illustrating a fourth example of a two-dimensional code, according to a modification of the present invention;

FIG. 66B is a schematic explanatory view illustrating a fifth example of a two-dimensional code, according to a modification of the present invention;

FIG. 67A is a schematic explanatory view illustrating a sixth example of a two-dimensional code, according to a modification of the present invention; and FIG. 67B is a schematic explanatory view illustrating a seventh example of a two-dimensional code, according to a modification of the present invention.

DETAILED DESCRIPTION OF THE PREFERRED EMBODIMENTS

Referring to the accompanying drawings, a variety of embodiments of the present invention focusing a two-dimensional code (hereinafter also referred to as "2D code(s)") will now be described.

It should be appreciated that, throughout the present specification, when a term "rectangular shape, outline or region" is used, the term implies a shape, outline or region of a four-sided polygon having four right angles, with opposite sides having the same length or with all of the sides having the same length. Also, throughout the present specification, when a term "square shape, outline or region" is used, the term implies a shape, outline or region of four-sided polygon having four right angles, with all of the sides having the same length. Further, throughout the present specification, when a term "oblong shape, outline or region" is used, the term particularly implies only a "rectangular shape, outline or region" where one pair of opposite sides has a length different from that of the other pair of opposite sides.

First Embodiment

With reference to FIGS. 1-4, hereinafter is described a first embodiment implementing a two-dimensional code of the present invention.

Figure 1:
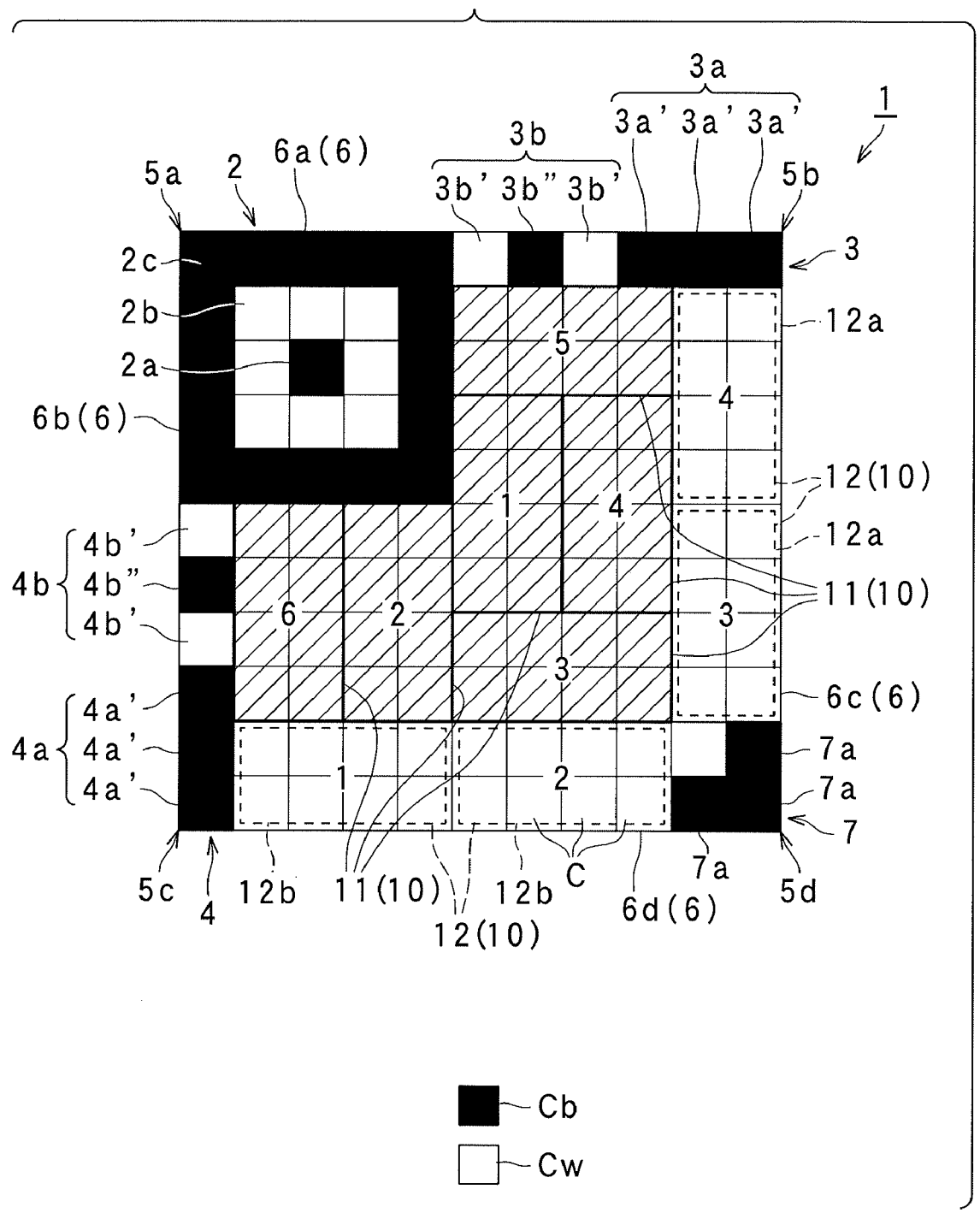
FIG. 1 is a schematic explanatory view illustrating a two-dimensional code, according to a first embodiment of the present invention.
Figure 3:
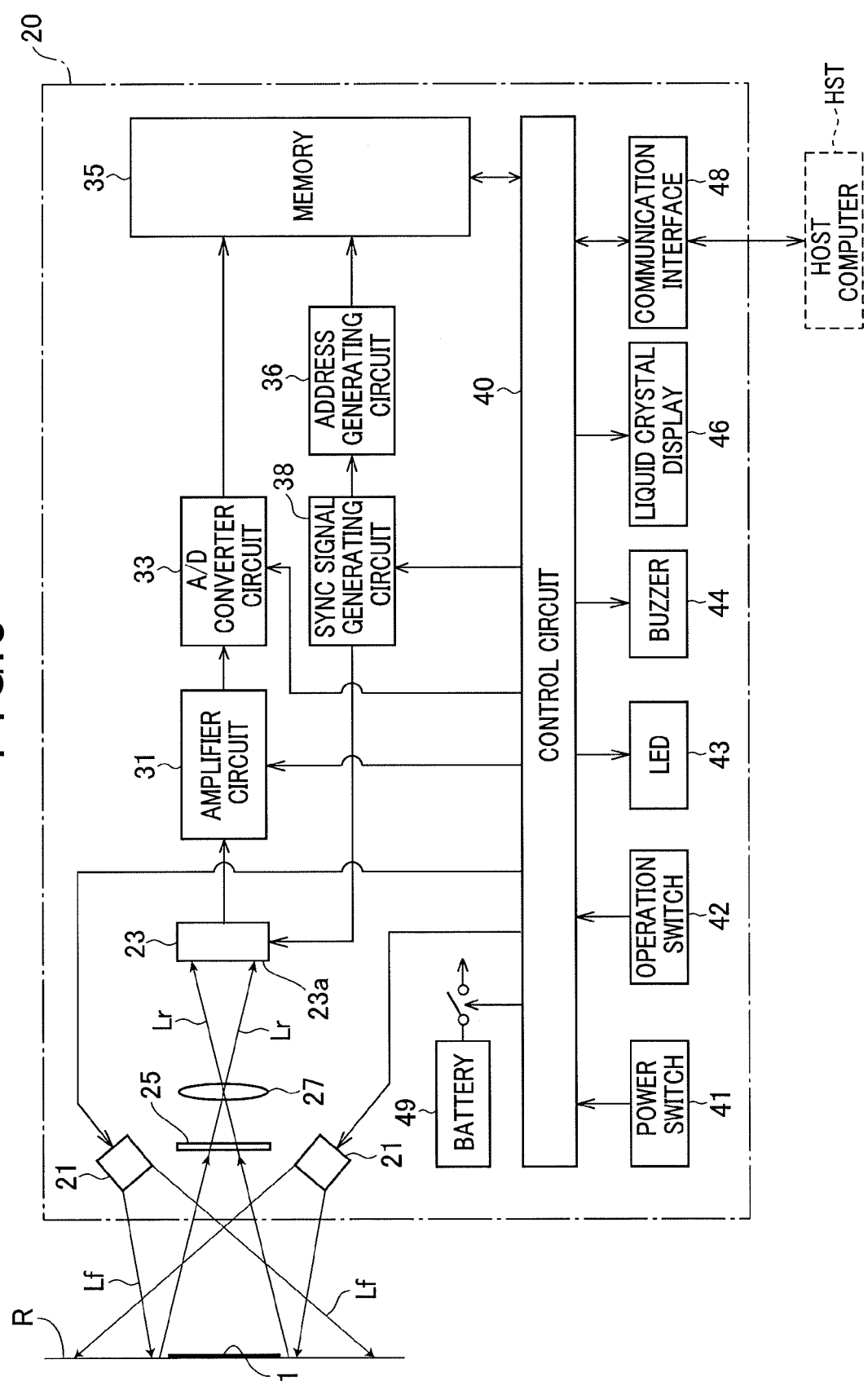
FIG. 3 is a schematic block diagram illustrating an optical information reader for reading the two-dimensional code illustrated in FIG. 1.
Figure 4:
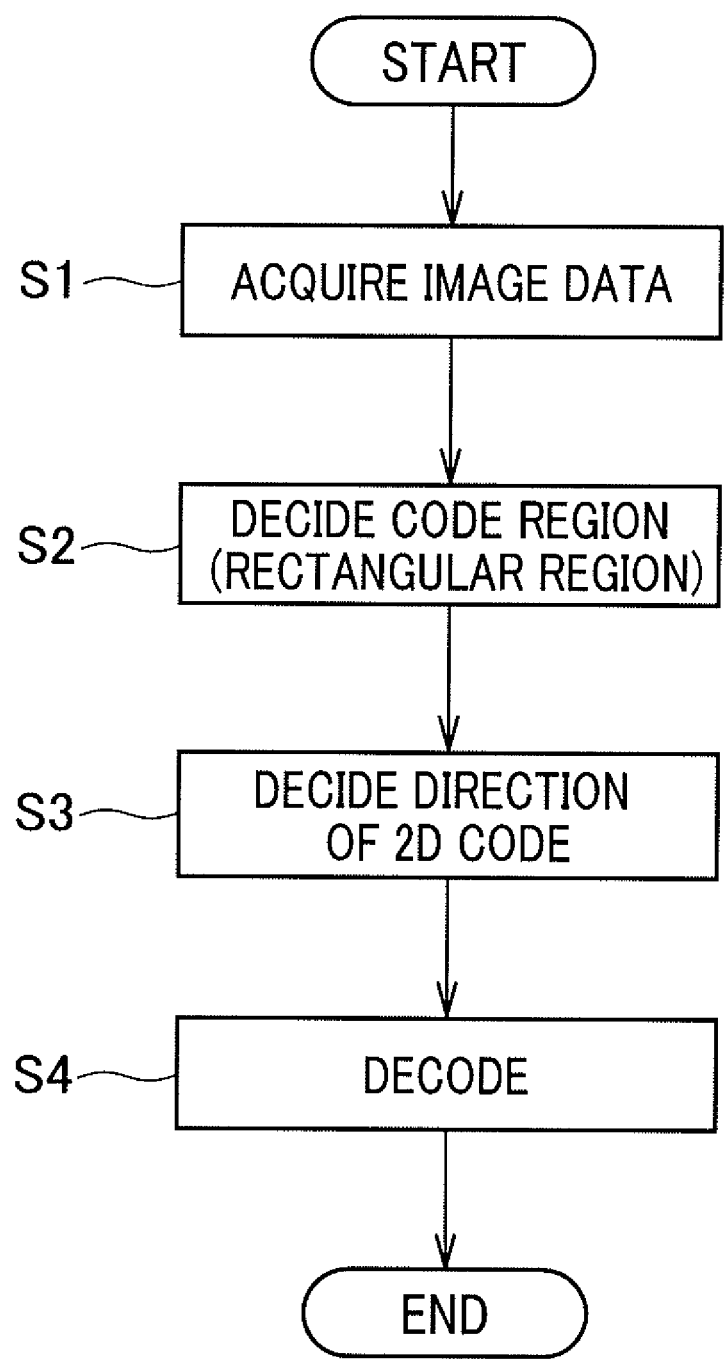
FIG. 4 is a flow diagram illustrating a procedure for reading the two-dimensional code illustrated in FIG. 1.

FIG. 1 is a schematic explanatory view illustrating a 2D code according to the first embodiment. FIG. 2A is an explanatory view illustrating a matrix structure of the 2D code illustrated in FIG. 1. FIG. 2B is an explanatory view illustrating a matrix structure of a code block of the 2D code illustrated in FIG. 1. FIG. 2C is an explanatory view illustrating an example of a structure of a code block which is different from the one illustrated in FIG. 2B. FIG. 3 is a schematic block diagram illustrating an optical information reader for reading the 2D code illustrated in FIG. 1. FIG. 4 is a flow diagram illustrating a procedure of reading the 2D code illustrated in FIG. 1. FIG. 1 shows, by broken lines, the positions of error-correction code blocks 12, and also shows, by solid lines with hatching, the positions of data code blocks 11. FIG. 1 omits a specific cell structure of each code block 10.

As shown in FIG. 1, a 2D code 1 according to the present embodiment has a plurality of cells "C" arranged (mapped, drawn, represented, depicted, or present) in a matrix, and includes a first specific pattern 2 as well as second specific patterns 3 and 4. The 2D code 1 is configured as a group of cells, each having a square outline, which are arranged in a matrix. In the example of FIG. 1, the number of cells in each column is equal to that in each row (11 cells×11 cells). A code region (a region where the cells "C" are arranged) configuring the 2D code 1 is a rectangular region having a rectangular outline. A code region of the 2D code shown in FIG. 1 is a square region having a square outline. In FIG. 1, a reference symbol "C" is designated to only a portion of the cells and designation of the reference symbol is omitted for other cells.

The arranged cells produce the borders (boundaries or peripheries) of the 2D code 1 by their outer edges, so that the code 1 can be distinguished from the background using the borders. How to arrange the cells depends on design, which means that, in effect, the borders are positionally decided on how to arrange the respective cells. The following description is given under the condition that the positions of the borders are previously decided by design.

Also, plural types of cells having different saturation, hue, or lightness are used for the 2D code 1. The following description is provided, taking as an example, the configuration shown in FIG. 1, that is, the 2D code 1 configured by using two types of cells with different saturation, hue, or lightness (e.g. black and white cells). Throughout the present embodiment and other embodiments, black cells are designated with a reference symbol "Cb" and white cells are designated with a reference symbol "Cw".

Each code block 10 is a group of a plurality of cells "C". The 2D code 1 shown in FIG. 1 has a division of data code blocks 11 and a division of error-correction code blocks 12. In the present embodiment, being horizontally or vertically directed, all of the code blocks 10 have a matrix structure and an identical shape. Alternatively, a portion of the code blocks may have a different shape (the shape as shown in FIG. 2C, for example). The data code blocks 11 and the error-correction code blocks 12 of the present embodiment are not masked, that is, are non-masked blocks and thus can be decoded without the necessity of de-masking or the like.

Each data code block 11 uses a plurality of cells to express encoded data (data codeword) which corresponds to data that have been encoded and are subjected to decoding. In the example shown in FIG. 1, a plurality (eight in FIG. 1) of cells configure a matrix group. The cells configuring each data code block 11 include some types of cells (two types, i.e. white and black, in the example of FIG. 1) selected from a predetermined plurality of types.

Each data code block 11 is configured, in its entirety, to have a cell arrangement corresponding to encoded data to be decoded (data codeword). In the present embodiment, colors of the cells are correlated to numerical values. For example, a data value "0" is correlated to white cells and a data value "1" is correlated with black cells.

The 2D code 1 of the present embodiment is configured by arranging the data code blocks 11 near the center portion thereof, with the error-correction code blocks 12 (described later) enclosing the data code blocks 11. In the example shown in FIG. 6, six data code blocks are arranged near the center portion of the 2D code 1, and four error-correction code blocks 12 partially enclose the data code blocks 11.

Each error-correction code block 12 is made up of a correction codeword for correcting errors. The error-correction codeword configuring each error-correction code block 12 is produced based on the encoded data (data codeword) configuring each data code block 11. A known Reed-Solomon error-correction process may be used as the method for producing an error-correction codeword based on a data codeword.

As the method for producing an error-correction codeword based on a data codeword, the present embodiment uses the method of producing an error-correction codeword based on JIS×0510:2004 (JIS×0510:2004, 8.5 error correction). According to the method, the data codeword for the data code block 11 is expressed in terms of a binary number. Then, the codeword is divided by the polynomial g(x) used in error correction detection and correction (JIS×0510:2004 annex A). The remainder resulting from the division is used as an error-correction codeword. Each error-correction code block 12 is a block which is configured to express an error-correction codeword produced in this way, in terms of a plurality of cells. Although the method based on JIS×0510 is used here for producing an error-correction codeword, the method for producing error-correction codewords is not limited to this, but other known methods may be used.

The rectangular region of the 2D code 1 has four corners 5a-5d. Of the corners 5a-5d, the corner 5a, which is specified, (hereinafter referred to as "specified corner 5a") is arranged with the first specific pattern 2. In the example of FIG. 1, the first specific pattern 2 has a square outline. Two sides forming an outer edge of the first specific pattern 2 determine the corner position of the specified corner 5a in the rectangular region. The first specific pattern 2 functions as an element for defining the positions of the individual cells "C" in the rectangular region. Specifically, the first specific pattern 2 is used for defining the position of the specified corner 5a in image data obtained by an optical information reader (described later). At the same time, the first specific pattern 2 is used for defining the direction of the 2D code 1 in the image data. It should be appreciated that, throughout the present specification, the "specific pattern" is configured as a predetermined pattern irrespective of the data (data to be decoded) contained in the 2D code.

The first specific pattern 2 shown in FIG. 2 has one first color cell (black cell 2a) located at the center, and second color cells (white cells 2b) enclosing the first color cell (black cell 2a), forming a rectangular shape. Further, the annular-shaped group of cells (the group of white cells 2b) is enclosed by the first color cells (black cells 2c), configuring an outermost peripheral group of cells. The outermost peripheral group of cells is configured to have a square outline, providing a rectangular outline to the first specific pattern 2 as a whole.

Of four sides (four borders 6) forming the edges (or borders) of the code region (rectangular region), the second specific patterns 3, 4 are arranged along borders (first borders 6a, 6b) with which the first specific pattern 2 is in contact. The second specific patterns 3, 4 are used for distinguishing the code region of the 2D code 1 from the background. As will be described later, with reference to the second specific patterns 3, 4, the rectangular region will be distinct from the background, and accordingly, the code blocks 10 will each be distinct from the background, when reading is performed.

The second specific pattern 3 is located at the corner 5b (the corner 5b corresponds to an example of a "second corner") which is different from the specified corner 5a (the corner where the first specific pattern 2 is located) in the rectangular region, with an end pattern 3a being provided to define the corner 5b. The end pattern 3a is formed into a linear shape in which a plurality of cells of the same type with identical saturation, hue, or lightness are consecutively arranged. In particular, the end pattern 3a has a linear shape in which three black cells 3a' of the same type with identical saturation, hue, or lightness are consecutively arranged. The black cell 3a' at the end (the cell 3a' farthest from the first specific pattern 2) of the end pattern 3a has two sides forming the outer edge, which determine the corner position of the corner 5b in the code region.

The second specific pattern 3 is arranged with an intermediate specific pattern 3b which is located between the first specific pattern 2 and the end pattern 3a. The intermediate specific pattern 3b is made up of a plurality of differently colored cells, which are juxtaposed in a predetermined manner. In the present embodiment, the pattern 3b is configured as a pattern in which specific color cells (white cells 3b' in FIG. 1) and cells having a color different from the specific color (black cell 3b" in FIG. 1) are alternately juxtaposed.

The same applies to the second specific pattern 4. Specifically, second specific pattern 4 is located at the corner 5c (the corner 5c corresponds to an example of the "second corner") which is different from the specified corner 5a, with an end pattern 4a being provided to define the corner 5c. The end pattern 4a is also formed into a linear shape in which a plurality of cells of the same type with identical saturation, hue, or lightness are consecutively arranged. In particular, the end pattern 4a has a linear shape in which three black cells 4a' of the same type with identical saturation, hue, or lightness are consecutively arranged. The black cell 4a' at the end (the cell 4a' farthest from the first specific pattern 2) of the end pattern 4a has two sides forming the outer edge, which determine the corner position of the corner 5c in the rectangular region. In the present embodiment, the end patterns 3a, 4a correspond to examples of "first end patterns".

The second specific pattern 4 is arranged with an intermediate specific pattern 4b which is located between the first specific pattern 2 and the end pattern 4a. The intermediate specific pattern 4b is also made up of a plurality of differently colored cells, which are juxtaposed in a predetermined manner. In the present embodiment, the pattern 4b is configured as a pattern in which specific color cells (white cells 4b' in FIG. 1) and cells having a color different from the specific color (black cell 4b" in FIG. 1) are alternately juxtaposed.

In the code region of the 2D code 1, an end pattern 7 defining the corner 5d of the code region is arranged at a diagonal position of the first specific pattern 2. The end pattern 7 is configured to have an "L" shape in which a plurality of cells of the same type with identical saturation, hue, or lightness are consecutively provided (specifically, an "L" shape in which three black cells 7a with identical saturation, hue, or lightness are consecutively provided). In FIG. 1, an outer edge of the end pattern 7 has a right angle. The right angled outer edge determines the corner position of the corner 5d in the rectangular region. In the present embodiment, the end pattern 7 corresponds to an example of a "second end pattern".

In the example of FIG. 1, no particular use is indicated as to the cell adjacent to the end pattern 7 (the blank cell enclosed by the end pattern 7, error-correction code blocks 12 and the data code blocks 11). For example, the arrangement of the data code blocks 11 or the error-correction code blocks 12 may be changed so that the blank cell may be used as an area for arranging the blocks. Alternatively, the blank cell may be configured as a residual block of data neither for the data code blocks 11 nor for the error-correction code blocks 12.

In the 2D code 1 of the present embodiment, the first specific pattern 2 is arranged at the specified corner 5a of the code region, while a part of the code blocks 10 is arranged on the side of the borders (i.e. on the side of the second borders 6c, 6d) other than the side where the second specific patterns 3, 4 are arranged. In the present embodiment, of the plurality of code blocks 10, the code blocks arranged along the second borders 6c, 6d are referred to as the "second border blocks". In the example of FIG. 1, the error-correction code blocks 12 are arranged along the second borders 6c, 6d, and thus these error-correction code blocks 12 are referred to as the "second border blocks".

Each second border blocks 12a (error-correction code blocks) on the side of the second border 6c is configured to have at least one cell (black cell in FIG. 1) which is located at the second border 6c, the one cell having saturation, hue, or lightness different from the background. In particular, it is known that, by their design, the error-correction code blocks 12 have a very low probability of having consecutively juxtaposed cells with a color identical with the background. The present embodiment makes use of such a functional nature of the error-correction code blocks 12 to ensure an arrangement of at least one cell having saturation, hue, or lightness different from the background, at a position of the second border 6c.

The same applies to second border blocks 12b (error-correction code blocks) on the side of the other second border 6d. That is, each second border block 12b is configured so that at least one cell (black cell) is arranged at a position on the second border 6d, the cell having saturation, hue, or lightness different from the background. The example shown in FIG. 1 is configured to have a white background, and the second border blocks 12a, 12b are located, with at least one black cell having a color different from the background being arranged at the second borders 6c, 6d, respectively. Therefore, using the black cells as marks, the second borders 6c, 6d are ensured to be defined with high accuracy. A specific method for definition will be described later.

The example shown in FIG. 1 is provided with a plurality of (two in FIG. 1) error-correction code blocks 12 at each of the second borders. This however is not intended to make a limitation, but it will be satisfactory if at least one error-correction block 12 is provided along each of the second borders 6c, 6d. Thus, the number of the blocks may be one or three or more.

As shown in FIG. 2A, the code region of the 2D code 1 is configured as a square region having an L×L matrix in which an "L" odd number of cells are arranged on one side. In the example shown in FIG. 2A, L=11, that is, the code region is configured to have a squared shape of 11×11 matrix. Also, the first specific pattern 2 is configured to have a square outline with M×M matrix in which an "M" odd number of cells, where L>M, are arranged on each side. In the example of FIG. 2A, M=5, that is, the first specific pattern 2 is configured to have a square shape of 5×5 matrix.

The second specific patterns 3, 4 are both configured to have a linear shape in which an "N" even number of cells (N=6 in FIG. 2A), where N=L−M, are juxtaposed, the linear shape having a length corresponding to the number of cells. The patterns 3, 4 are arranged so that the longitudinal outer edges thereof extend along the second borders 6c, 6d, respectively. As shown in FIGS. 2A and 2B, each code block 10 has an "A" even number of cells on one side and a "B" even number of cells on the other side to provide a rectangular configuration with A×B matrix. Specifically, the individual data code blocks 11 and the error-correction code blocks 12 are each configured to have a rectangular shape of a 2×4 or 4×2 matrix.

Hereinafter will be described a method for producing the 2D code 1 of the present embodiment.

The 2D code 1 of the present embodiment may be produced by using an information processor (e.g. computer) including a CPU and a memory. In producing the 2D code 1, data values of the 2D code 1 to be produced (data to be decoded) are acquired first. Further, error-correction codes corresponding to the respective data values are produced by calculation. Then, data code blocks corresponding to the data values are produced, and also, error-correction code blocks corresponding to the error-correction codes are produced. The produced data code blocks and the error-correction code blocks are sequentially arranged. In arranging the blocks, the error-correction code blocks are sequentially arranged from the last one (the fourth error-correction code block 12 in FIG. 1) in a retrograde order. When the top error-correction code block 12 has been arranged, the data code blocks 11 are then sequentially arranged in a retrograde order.

Specifically, as shown in FIG. 1, with the position at each border 6 as a starting position, the error-correction code blocks 12 are sequentially arranged starting from the last one, in a retrograde order, along each border 6. For example, the last error-correction code block 12 (the fourth error-correction code block 12 in FIG. 1) is arranged along the second border 6c so as to be located at a position near the corner 5b. Then, the third, second and first error-correction code blocks 12 are sequentially arranged along the second borders 6c, 6d. When the top (first) error-correction code block 12 has been arranged, the data code blocks 11 are then sequentially arranged starting from the last one (the sixth data code block 11 in FIG. 1). With this arranging method, the error-correction code blocks 12 can be evenly arranged, as shown in FIG. 1, along the second borders 6c, 6d.

Hereinafter is described an outline of an example of how the 2D code 1 of the present embodiment is read.

The 2D code 1 of the present embodiment may be read out using, for example, an optical information reader 20 as shown in FIG. 3. The optical information reader 20 shown in FIG. 3 includes an optical system, a microcomputer system and a power source system. The optical system includes an illumination light source 21, a light-receiving sensor 23, a filter 25 and an imaging lens 27. The microcomputer system includes a memory 35, a control circuit 40, an operation switch 42 and a liquid crystal display 46. The power source system includes a power switch 41 and a battery 49.

The optical system includes the illumination light source 21, the light-receiving sensor 23, the filter 25 and the imaging lens 27. The illumination light source 21 functions as an illumination light source that can emit illumination light "Lf", and includes an LED, and diffusion and condenser lenses provided on an emission side of the LED. In the present embodiment, the illumination light source 21 is provided on both sides sandwiching the light-receiving sensor 23. The light source 21 is ensured to enable emission of the illumination light "Lf" toward an object "R" to be read through a reading port of a housing (not shown in FIG. 3). The object "R" corresponds, for example, to a display media, such as a packaging container and packaging paper, or a label. The 2D code 1 of the present embodiment is formed on such an object "R" to be read, by printing or direct marking, for example.

The light-receiving sensor 23 is ensured to enable reception of reflected light "Lr" which corresponds to the light emitted to and reflected from the object "R" or the 2D code 1. For example, the light-receiving sensor 23 corresponds to an area sensor in which light-receiving elements, i.e. solid-state imaging devices, such as C-MOSs or CCDs, are two-dimensionally arranged. The light-receiving sensor 23 is mounted on a printed circuit board (not shown) in such a way that a light-receiving surface 23a can receive the light incident through the imaging lens 27.

Also, the filter 25 is a lowpass filter that can pass light having a wavelength equal to or less than that of the reflected light "Lr" and can block light having a wavelength exceeding that of the reflected light "Lr". Thus, the filter 25 suppresses incidence of unnecessary light on the light-receiving sensor 23, the unnecessary light having a wavelength exceeding that of the reflected light "Lr". The imaging lens 27 functions as an imaging optical system that can collect light incident from outside through the reading port and form an image on the light-receiving surface 23a of the light-receiving sensor 23. For example, the imaging lens 27 includes a lens tube and a plurality of condenser lenses accommodated in the lens tube.

Hereinafter is described an outline of the configuration of the microcomputer system. The microcomputer system includes an amplifier circuit 31, an A/D converter circuit 33, a memory 35, an address generating circuit 36, a sync signal generating circuit 38, a control circuit 40, an operation switch 42, an LED 43, a buzzer 44, a liquid crystal display 46 and a communication interface 48. As is apparent from the name, the microcomputer system can function as a microcomputer (information processor) and is mainly configured by the control circuit 40 and the memory 35. Thus, the microcomputer system is able to process signals, i.e. image signals of the 2D code 1, which have been picked up by the optical system mentioned above, in hardware and software manners. The control circuit 40 also controls the entire system of the optical information reader.

An image signal (analog signal) outputted from the light-receiving sensor 23 of the optical system is amplified at a predetermined gain by being inputted to the amplifier circuit 31. The amplified signal is then inputted to the A/D converter circuit 33 for conversion into a digital signal from an analog signal. Then, the digitized image signal, i.e. image data (image information), is inputted to the memory 35 for storage in an image data storage area. The sync signal generating circuit 38 is configured so that a sync signal can be generated for the light-receiving sensor 23 and the address generating circuit 36. The address generating circuit is configured so that a storage address for the image data to be stored in the memory 35 can be generated, based on the sync signal supplied from the sync signal generating circuit 38.

The memory 35 is a semiconductor memory device. For example an RAM (DRAM, SRAM, etc.) and an ROM (EPROM, EEPROM, etc.) correspond to the memory 35. The RAM in the memory 35 is configured in such a way that the image data storage area mentioned above can be secured and that an operation area and a reading condition table can also be secured. The operation area and the reading condition table are used by the control circuit 4 in executing processes, such as calculation operation and logic operation. The ROM is stored in advance with a predetermined program which is able to execute, for example, a reading process and an analysis process that will be described later, and other programs, such as a system program, which is able to control various pieces of hardware, such as the illumination light source 21 and the light-receiving sensor 23.

The control circuit 40 is a microcomputer which is able to control the entire optical information reader 20, and includes a CPU, a system bus and an input/output interface. The control circuit 40 can constitute the information processor together with the memory 35 and thus can exert a function of information processing. The control circuit 40 is configured so that connection can be established with various input/output devices (peripheral devices) through the input/output interface incorporated in the control circuit. In the present embodiment, the control circuit 40 is connected, for example, to the power switch 41, the operation switch 42, the LED 43, the buzzer 44, the liquid crystal display 46 and the communication interface 48. The communication interface 48 is connected to a host computer HST, for example, corresponding to a high order system of the optical information reader 20. The power source system includes the power switch 41 and the battery 49. Drive voltage for supply to the various devices and circuits mentioned above from the battery 49 is adapted to be applied or not to be applied by the on-off control of the control circuit 40 through the power switch 41.

The optical information reader 20 configured as described above performs a reading procedure as described below. First, an operator may perform a predetermined operation (e.g. switch-on operation of the operation switch 42) for the start of the reading procedure shown in FIG. 4 to perform an image data acquiring process (step S1). In the image data acquiring process, the control circuit 40 outputs, first, an emission signal to the illumination power source 21 with reference to a sync signal. The illumination power source 21 receives the emission signal and emits the illumination light "Lf" by permitting the LED to emit light. Then, the illumination light "Lf" emitted to the 2D code 1 is reflected, and the reflected light "Lr" enters the imaging lens 27 through the reading port and the filter 25. Then, an image of the 2D code 1, i.e. a code image, is formed on the light-receiving surface 23a of the light-receiving sensor 23 by the imaging lens 27. Thus, the light-receiving elements configuring the light-receiving sensor 23 are exposed, whereby light-receiving signals corresponding to the 2D code 1 are outputted from the respective exposed light-receiving elements. The light-receiving signals constitute the image data of the 2D code 1, and the image data are temporarily stored in the memory 35.

After that, for the image data acquired at step S1, a process is performed for defining the code region of the 2D code 1 (step S2). In the definition process (step S2), the borders 6 are defined from the image data of the 2D code 1. The method used for defining the borders 6 may be the one disclosed in Japanese Patent Unexamined Publication No. 10-198754. Alternatively, the method disclosed in Japanese Patent Unexamined Publication No. 2000-353210 may preferably used, in which bright-dark change points are counted to extract a code region. In the technique disclosed in Japanese Patent Unexamined Publication No. 2000-353210, the bright-dark changes are detected for a two-color 2D code. Thus, this technique can be similarly applied to the two-color 2D code as shown in FIG. 1.

In the case of configuring a 2D code using three or more types of cells (e.g., a multi-color code obtained by modifying the configuration of FIG. 1, or configurations other than the present embodiment, which will be described later) as well, the method for defining borders is essentially the same. In particular, the employed method may just be ensured to include counting changes of a value indicating any one of colors at the time of performing scanning along a scan line, into a value indicating other color. Various types of techniques are suggested for making a distinction between regions of different colors in the art of image processing. Therefore, area definition may be carried out using other known methods. In short, if cells having colors different from the color of the background are arranged along the borders 6a-6b of the rectangular region, as in the present embodiment, the different-color cells may be defined using various image processing methods. Then, by connecting the outer edges of the different-color cells, the borders of the rectangular region can be accurately extracted.

In the 2D code 1 of the present embodiment, in particular, the corners 5a, 5b, 5c and 5d are provided with the first specific pattern 2, the end pattern 3, the end pattern 4 and the end pattern 7, respectively, each being arranged with a cell defining an outer edge and having a color different from that of the background. Therefore, any image processing technique may reliably define the corners 5a, 5b, 5c and 5d. Further, the intermediate specific pattern 3b, which is configured by cells having a color different from the background color, is provided between the corners 5a and 5b so as to extend along the first border 6a. Also, the intermediate specific pattern 4b, which is configured by cells having a color different from the background color, is provided between the corners 5a and 5c so as to extend along the first border 6b. Therefore, the first borders 6a, 6b may also be reliably defined using any image processing technique.

Furthermore, the error-correction code blocks 12 (the second border blocks 12a) are arranged between the corners 5b, 5d, with cells having a color different form the background color being arranged along the second border 6c. Also, the error-correction code blocks 12 (the second border blocks 12b) are arranged between the corners 5c, 5d, with cells having a color different form the background color being arranged along the second border 6d. Therefore, the second borders 6c, 6d may also be reliably defined using any image processing technique.

Thus, in the second border blocks 12a, 12b, the outer long sides are ensured to extend along the second borders 6c, 6d, respectively. Also, in each of the second border blocks 12a, 12b, a larger number of cells are ensured to be arranged at the second borders 6c, 6d, respectively. In this way, in each of the second border blocks 12a, 12b, the probability may considerably be approximated to zero, the probability being of having an identical color in all of the portions located at the borders 6 (second borders 6c, 6d), with the background color.

Referring again to FIG. 4, after defining the code region at step S2, a process is carried out for defining the direction of the 2D code based on the defined code region and the first specific pattern (step S3). Specifically, it is detected in which of the corners of the defined rectangular region the first specific pattern 2 is present. Once the position of the first specific pattern 2 is detected, it means that the direction (posture) of the 2D code in the image data has been defined.

Subsequently, a decoding process is performed based on the code region whose position and direction have been defined (step S4). In the present embodiment, code types are stored in advance in the optical information reader 20. Thus, a code type is defined based on the size of the code region and the configuration of each of the specific patterns (the first specific pattern 2, the second specific patterns 3, 4 and the end pattern 7). Then, decoding is performed for the individual data code blocks, while errors are corrected based on the error-correction code blocks 12.

The present embodiment described above can enjoy the advantages provided below.

In the 2D code 1 of the present embodiment, the first specific pattern 2 is arranged at the specified corner 5a of the code region, and the second specific patterns 3, 4 are arranged along the first borders 6a, 6b with which the first specific pattern 2 is in contact. Thus, in the image data for reading out the 2D code 1, portions of sides (the sides at which the second specific patterns 3, 4 are arranged) of the code region can be easily defined with high accuracy, based on the first specific pattern 2 and the second specific patterns 3, 4.

Also, each of the second borders 6c, 6d with no arrangement of the second specific pattern 3 or 4 is arranged with at least one code block 10 in which at least one cell having saturation, hue, or lightness different from that of the background (different-color cell) being arranged at the second border 6c or 6d. Thus, the sides (the second borders 6c, 6d) other than the borders where the second specific patterns 3, 4 are arranged can also be easily defined with high accuracy, based on the different-color cells of these code blocks 10 concerned.

Further, it is so configured that the code blocks 10 are arranged so as to extend along the borders (i.e. second borders 6c, 6d) other than the borders on the sides of the second specific patterns 3, 4, and that the second borders 6c, 6d can be defined by the code blocks 10. Thus, comparing with a configuration in which all of the borders 6 are to be defined by specific patterns, the number of cells allocated to non-data can be reduced as much as possible. In other words, the number of cells that can be allocated to data can be effectively increased.

Further, at least one error-correction code block 12 is arranged at each of the second borders 6c, 6d. By functional nature, the error-correction code blocks 12 have a very low probability of having a long series of cells with a saturation, hue, or lightness, which is identical with the background. Use of such error-correction code blocks 12 for defining the borders 6 may enable high-accuracy definition of the borders 6 utilizing the data essential for correcting errors. Thus, a preferred example can be provided, by which the number of cells allocated to non-data can be reduced as much as possible.

Also, the code region is a square region which is configured to have an L×L matrix where an odd number "L" of cells are arranged along one side. In the square region, the first specific pattern 2 has a square outline with M×M matrix where the odd number "M" of cells satisfying L>M are arranged along one side. Accordingly, the portion along each of the sides (first borders 6a, 6b) of the code region excepting the portion of the first specific pattern 2 can be ensured to remain as an area having an even number (L−M) of cells. Thus, the second specific patterns 3, 4 are arranged throughout the respective remaining areas along the first borders 6a, 6b. In this way, each of the specific sides (first borders 6a, 6b) of the rectangular region is fully arranged with the first specific pattern 2 and the second specific patterns 3 or 4, enabling reliable distinction from the background.

In addition to the above configuration, the code blocks 10, each having a rectangular shape with a matrix of cells arranged in ""A" even number×"B" even number", are ensured to be arranged. This may facilitate efficient arrangement of the code blocks 10 in each of the areas other than the first specific pattern, i.e. each of the areas in the vicinities of the sides where the second specific patterns 3 and 4 are arranged. Thus, it is not necessary to arrange a large number of code blocks, each having a specific shape (e.g. an elongated shape with a shorter side having a length corresponding to only one cell).

Further, the code region is configured to have the specified corner 5a (the corner included in the first specific pattern 2) and to have other second corners 5b, 5c at which the end patterns 3a, 4a (first end patterns) indicative of the corners 5b, 5c are arranged, respectively. With this configuration, good distinction from the background can be made by the first specific pattern 2 at the specified corner 5a, and good distinction from the background can also be made by the end patterns 3a, 4a (first end patterns) at the second corners 5b, 5c, respectively. In other words, in reading the 2D code 1, the sides (first borders 6a, 6b) of the code region, where the second specific patterns 3, 4 are arranged, can be reliably defined by the first specific pattern 2 and the second specific patterns 3, 4. Also, both end portions of each of the sides (first borders 6a, 6b) can be reliably defined. The definition of the both end portions of each of the sides may contribute to the definition of the adjacently extending two sides (i.e. the second borders 6c, 6d). As a result, the definition accuracy of the entire rectangular region can be effectively enhanced.

The end patterns 3a, 4a (first end patterns) are each configured to have a linear shape in which a plurality of cells having the same saturation, hue, or lightness are consecutively arranged. This may easily realize a configuration that can facilitate definition of the second corners 5b, 5c. Also, since each of the first end patterns has a linear shape, the shape of each block adjacent to the first end patterns will not be required to have a complicated shape. Thus, the vicinities of the first end patterns can be efficiently utilized.

Further, the code region has the end pattern 7 (second end pattern) defining the corner 5d of the rectangular region, which end pattern 7 is arranged at a diagonal position of the first specific pattern 2. Thus, as to the specified corner 5a, good distinction can be made from the background by the first specific pattern 2, and as to the diagonally arranged corner 5d, good distinction can also be made from the background by the end pattern 7. Also, the second borders can be defined not only by the code blocks 10, but also by the end pattern 7. As a result, the definition accuracy of the entire rectangular region can be effectively enhanced.

Further, the end pattern 7 (second end pattern) is configured to have an "L" shape in which a plurality of cells having the same saturation, hue, or lightness are consecutively arranged. The end pattern 7 having such a shape may easily realize a configuration which can facilitate definition of the corner 5d arranged at the diagonal position of the first specific pattern 2. In particular, the outline of the L-shaped end pattern 7 may also contribute to the recognition of the two sides (i.e. second borders 6c, 6d) extending from the diagonally located corner 5d. In this way, using the end pattern 7 and the code blocks 10, the second borders 6c, 6d can further be well defined.

Second Embodiment

Hereinafter will be described a second embodiment. In the second embodiment as well as the subsequent embodiments and modifications, the identical or similar components to those in the first embodiment are given the same reference numerals for the sake of omitting explanation.

Figure 5:
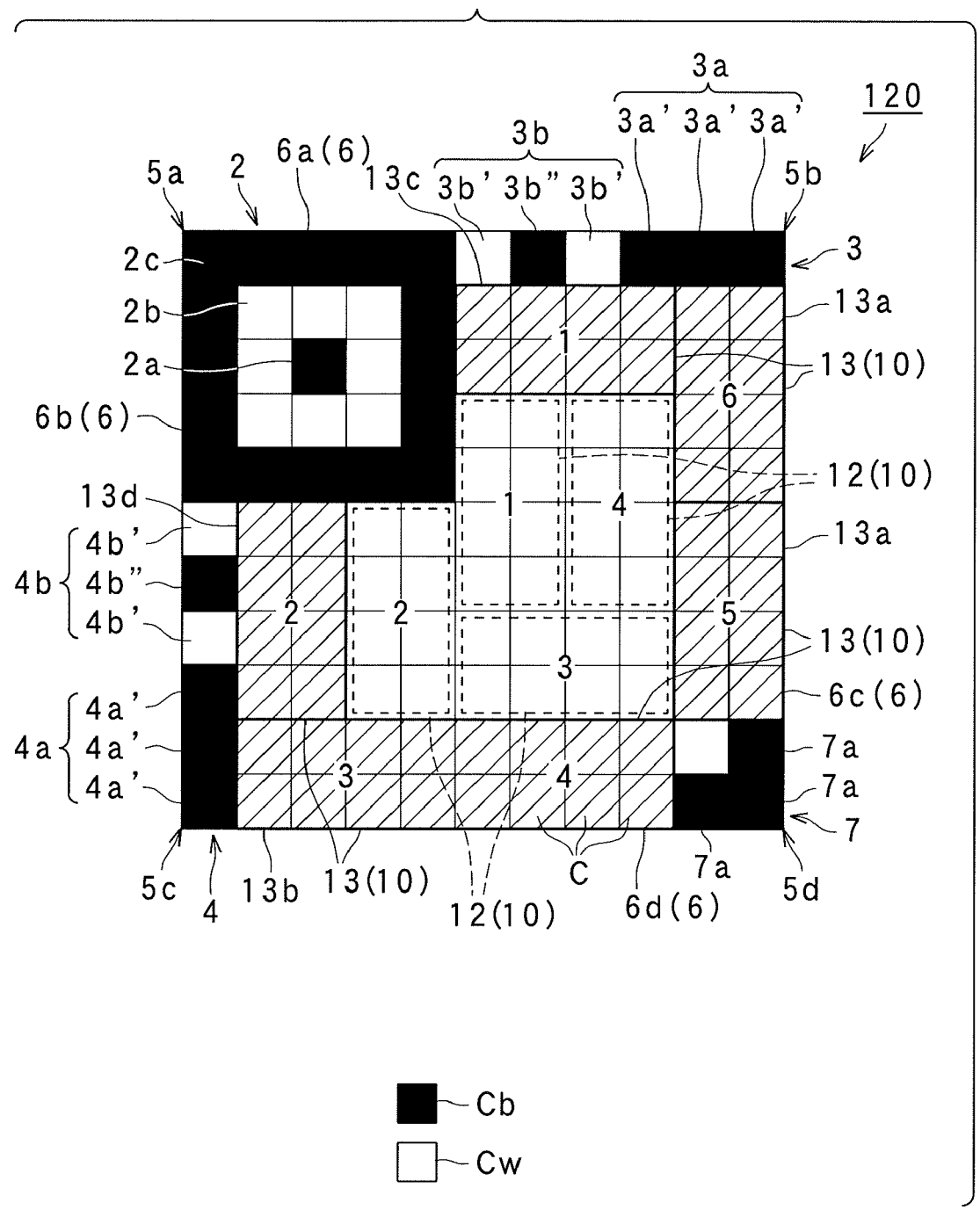
FIG. 5 is a schematic explanatory view illustrating a two-dimensional code, according to a second embodiment of the present invention.

FIG. 5 is a schematic explanatory view illustrating a 2D code 120, according to the second embodiment. FIG. 5 shows, by broken lines, the positions of error-correction code blocks 12, and also shows, by solid lines with hatching, the positions of compressed data code blocks 13. FIG. 5 omits a specific cell structure of each code block 10. In the present embodiment, the only difference from the first embodiment is the structure and arrangement of the code blocks 10 and the remaining portions are the same with those in the first embodiment. Therefore, the following description is focused on the difference.

The 2D code 120 of the present embodiment is also configured to have a code region of a square shape in which an odd number "L" of cells are arranged along one side to provide an L×L matrix. Specifically, as shown in FIG. 5, the code region has a square shape of an 11×11 matrix. The borders 6 of the 2D code 120 are configured in the same manner as in the first embodiment. In particular, the configurations of the first specific pattern 2, the second specific patterns 3, 4 and the end pattern 7 are identical with those in the first embodiment. In the example shown in FIG. 5 as well, each code block 10 is configured to have a rectangular shape in which the "A" even number of cells are arranged along one side and the "B" even number of cells are arranged along the other side to thereby provide an A×B matrix. Specifically, each of the compressed data code blocks 13 and the error-correction code blocks 12 is formed into a rectangular shape of 2×4 or 4×2 matrix.

The code blocks 10 of the present embodiment include the compressed data code blocks 13 in which compressed data are stored. A portion of a plurality of compressed data code blocks 13 (second border blocks 13a, 13b) are arranged on the side of the borders 6 (i.e. the second borders 6c, 6d not extending from the first specific pattern 2) other than the first borders 6a, 6b where the second specific patterns 3, 4 are arranged. Each of the compressed data code blocks 13 (second border blocks 13a, 13b) are configured in such a way that at least one cell (black cell in FIG. 5) with saturation, hue, or lightness different from the background is arranged at a position on the second border 6c or 6d. At least one compressed data code block 13 may be arranged at each of the second borders 6c, 6d. In the example of FIG. 5, two compressed data code blocks 13 are arranged along each of the second borders 6c, 6d.

Each compressed data code block 13 is obtained by compressing data to be coded using a known compression method, followed by forming the compressed data into blocks. The algorithm of compression may be any known compression algorithm, such as the run-length coding process or the Huffman coding process. For example, let us assume a case of decoding information expressed by "0000000000001111" using the run-length coding. The information containing twelve consecutive 0's (which is "1100" in binary number) and four consecutive 1's (which is "0100" in binary number) may be expressed by arranging "0", "1100", "1" and "0100", i.e. may be expressed by "0110010100", thereby requiring fewer digits. As a result, each compressed data code block 13 can be prevented from having a long series of cells having a color identical with the background color.

In the example of FIG. 5, a long side of each compressed data code block 13 is ensured to be located along the second border 6c or 6d. Thus, when a certain compressed data code block 13 has any information, a portion of the compressed data code block 13 (i.e. the whole four cells), which portion lies along the second border 6c or 6d, may entirely have a very low probability of having a color identical with the background color.

In the present embodiment, a portion of the plurality of compressed data code blocks 13 is arranged at the inner side of the second specific pattern 3 at one first border 6a. Such compressed data code blocks 13 are referred to "inner blocks 13c". Also, a portion of the plurality of compressed data code blocks 13 is arranged at the inner side of the second specific pattern 3 at the other first border 6b. Such compressed data code blocks 13 are referred to "inner blocks 13d". Further, a portion of the second border blocks 13a mentioned above is also provided along the inner side of the second specific pattern 3. Also, a portion of the second border blocks 13b mentioned above is provided along the inner side of the second specific pattern 4.

The present embodiment configured as described above can enjoy the advantages similar to the ones in the first embodiment. Specifically, the background can be well distinguished from the code region. In addition, the number of cells to be allocated to non-data can be reduced as much as possible. In other words, the number of cells to be allocated to data can be effectively increased.

In particular, the present embodiment uses the compressed data code blocks 13 as the code blocks to be provided at the second borders 6c, 6d. By functional nature, the probability that the compressed data code blocks 13 have a long series of cells identical in saturation, hue, and/or lightness with the background is very low. Use of such compression data code blocks 13 for defining the borders 6 may reduce the data size and may enable high-accuracy definition of the borders 6 utilizing the data to be decoded. Thus, a preferred example can be provided, by which the number of cells allocated to non-data can be reduced as much as possible.

Further, the compressed data code blocks 13 (inner blocks 13c, 13d, etc.) are arranged along the inner side of the second specific patterns 3, 4, which are provided at the first borders 6a, 6b, respectively. With this configuration, the code region can be distinguished from the background not only by the second specific patterns 3, 4, but also by the compressed data code blocks 13, as required. In this way, the first borders 6a, 6b can be effectively prevented from being erroneously recognized. For example, even when the second specific patterns 3, 4 are partially lacked by dirt or the like, the positions of the compressed data code blocks 13 that are present on the inner side of the patterns can be accurately defined. Accordingly, the true borders 6 can be well estimated, based on the positions of the compressed data code blocks 13.

Third Embodiment

Figure 6:
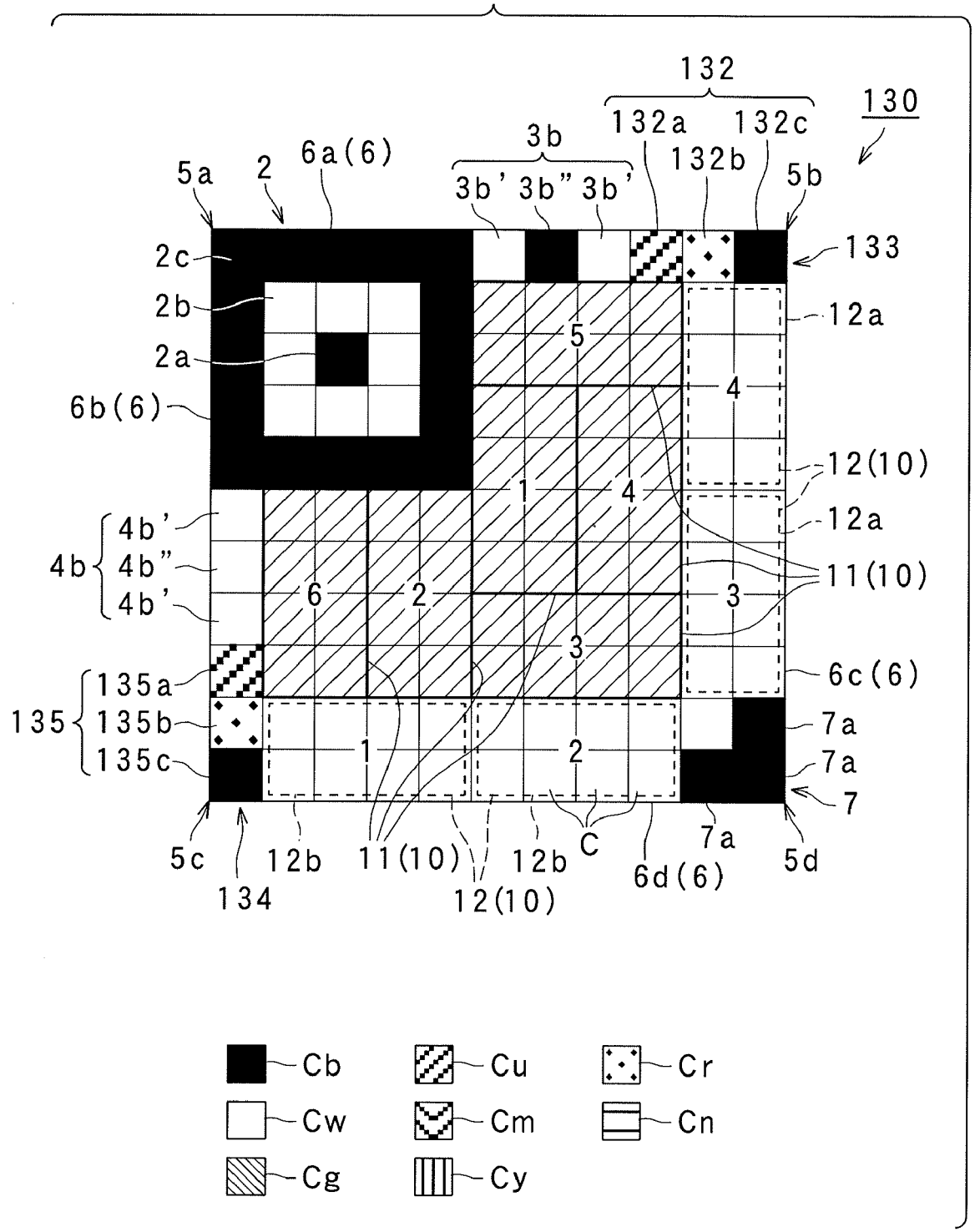
FIG. 6 is a schematic explanatory view illustrating a two-dimensional code, according to a third embodiment of the present invention.

Hereinafter is described a third embodiment. FIG. 6 is a schematic explanatory view illustrating a 2D code 130, according to the third embodiment. FIG. 6 also omits a specific cell structure of each code block 10.

The third embodiment is different from the first embodiment in that each of second specific patterns 133, 134 has a structure different from that in the first embodiment, and that mufti-color cells are used. Other portions of the configuration of the present embodiment are identical with those in the first embodiment. Accordingly, the following description will be mainly focused on the differences, and explanation will be omitted as to the identical portions of the configuration. In the example shown in FIG. 6, the configurations of the first specific pattern 2, the end pattern 7, the first borders 6a, 6b, and the second borders 6c, 6d are identical with those in the first embodiment. Also, the plurality of data code blocks 11 and the plurality of the error-correction code blocks 12 each have the same matrix as in the first embodiment, but are configured by mufti-color cells, unlike the first embodiment.

While the first embodiment has exemplified the 2D code 1 using two types of cells, the 2D code 130 of the present embodiment is configured as a so-called "color code" using three or more types of cells. In the example of FIG. 6, the 2D code 130 is configured by eight differently colored cells, including black cells, white cells, red cells, green cells, blue cells, cyan cells, magenta cells and yellow cells. It should be appreciated that, throughout the present and other embodiments of the present invention, the black cells are represented by "Cb" and white cells are represented by "Cw". Also, the green cells are represented by "Cg", the red cells, by "Cr", the blue cells, by "Cu", the yellow cells, by "Cy", the cyan cells, by "Cn" and the magenta cells, by "Cm".

For example, if eight predetermined colors are used, the data code blocks 11 and the error-correction code blocks 12 may be structured using colors out of the eight differently colored cells. Specifically, each cell color is correlated to a numerical value. For example, a data value "0" is correlated to a first color "white", a data value "1", to a second color "red", a data value "2", to a third color "green", a data value "3", to a fourth color "blue", a data value "4", to a fifth color "magenta", a data value "5", to a sixth color "yellow", a data value "6", to a seventh color "cyan", and a data value "7", to an eighth color "black".

In the present embodiment as well, of the borders 6 of the code region, the borders other than the ones where the second specific patterns 3, 4 are arranged (i.e. the borders 6c, 6d not extending from the first specific pattern 2), are arranged with a portion of the code blocks 10 so as to extend therealong. Specifically, each of the error-correction code blocks 12 (second border blocks 12a) is arranged along one second border 6c, with at least one cell having saturation, hue, or lightness different from that of the background (cell having a color out of the eight colors but white) being arranged at a position on the second border 6c.

Also, the error-correction code blocks 12 (second border blocks 12b) are arranged along the other second border 6d, with at least one cell having saturation, hue, or lightness different from that of the background (cell having a color out of the eight colors but white) being arranged at a position on the second border 6d. The method for producing the error-correction code blocks 12 is basically the same as the one used in the first embodiment. Specifically, an error-correction codeword may be produced using the same method as in the first embodiment, based on a data codeword for each data code block 11. Then, the produced error-correction codeword may be expressed by each error-correction code block 12. The first embodiment has expressed the error-correction codeword with a block structured by two-color cells, whereas the present embodiment expresses an error-correction codeword with a block structured by mufti-color cells.

In the present embodiment as well, of the four sides (four borders 6) forming the borders of the code region, the borders (first borders 6a, 6b) with which the first specific pattern 2 is in contact are arranged with the second specific patterns 133, 134. Each of the second specific patterns 133, 134 is also configured as a pattern including a plurality of cells having different saturation, hue, or lightness. Similar to the second specific patterns 3, 4 in the first embodiment, each of the second specific patterns 133, 134 functions as a mark, in performing the reading process, for making the code region of the 2D code 1 distinct from the background.

The second specific pattern 133 includes the corner 5b (corresponding to an example of the "second corner") which is different from the specified corner 5a (the corner at which the first specific pattern 2 is arranged) in the rectangular region. The specific pattern 133 is configured by arranging, at the corner 5b, an end pattern 132 defining the corner 5b. In the second specific pattern 133 of the present embodiment, only the structure of the end pattern 132 is different from the structure of the end pattern 3a in the first embodiment. The end pattern 132 is configured to have a linear shape in which plural types of cells having different saturation, hue, or lightness are arranged in a predetermined order.

Specifically, the end pattern 132 is configured by three types of cells, i.e. a blue cell 132a, a red cell 132b and a black cell 132c arranged in this order. The corner position of the corner 5b in the rectangular region is determined by two sides forming the outer edge of the black cell 132c. Similar to the first embodiment, the second specific pattern 133 includes the intermediate specific pattern 3b which is arranged between the first specific pattern 2 and the end pattern 132.

The same applies to the second specific pattern 134. In particular, the second specific pattern 134 includes the corner 5c (corresponding to an example of the "second corner") which is different from the specified corner 5a in the rectangular region. The specific pattern 134 is configured by arranging, at the corner 5c, an end pattern 135 defining the corner 5c. In the second specific pattern 134 of the present embodiment, only the structure of the end pattern 135 is different from the structure of the end pattern 4a in the first embodiment. The end pattern 135 is also configured to have a linear shape in which plural types of cells having different saturation, hue, or lightness are arranged in a predetermined order. Specifically, similar to another end pattern 132, the end pattern 135 is configured by three types of cells, i.e. a blue cell 135a, a red cell 135b and a black cell 135c arranged in this order. The corner position of the corner 5c in the rectangular region is determined by two sides forming the outer edge of the black cell 135c. Similar to the first embodiment, the second specific pattern 134 includes the intermediate specific pattern 4b which is arranged between the first specific pattern 2 and the end pattern 134. In the present embodiment, each of the end patterns 132, 135 corresponds to an example of each of the "first end patterns".

In the 2D code 130 of the present embodiment, each of the second specific patterns 133, 134 is configured as a pattern including a plurality of cells having different saturation, hue, or lightness. In this way, by arranging a plurality of cells of different types next to the background, a good distinction can be made between the background and the rectangular region.

Each of the end patterns 132, 135 (first end patterns) is configured to have a linear shape in which a plurality of cells having different saturation, hue, or lightness are arranged in a predetermined order. Such an arrangement of plural cells of different types may facilitate recognition of the arrangement and the shape of each of the cells, in reading the 2D code 130. Also, by confirming whether or not the cells are arranged in the predetermined order, a correct determination can be made as to the appropriateness as the second corner. Accordingly, definition of each second corner can be made in terms of the shape and the details of the pattern, thereby further enhancing the accuracy of definition. In addition, since each of the end patterns 132, 135 (first end patterns) has a linear shape, each of the blocks adjacent to the end patterns 132, 135 may not be necessitated to have a so complicated shape. Thus, the vicinities of the end patterns 132, 135 may be more efficiently used.

Fourth Embodiment

Figure 7:
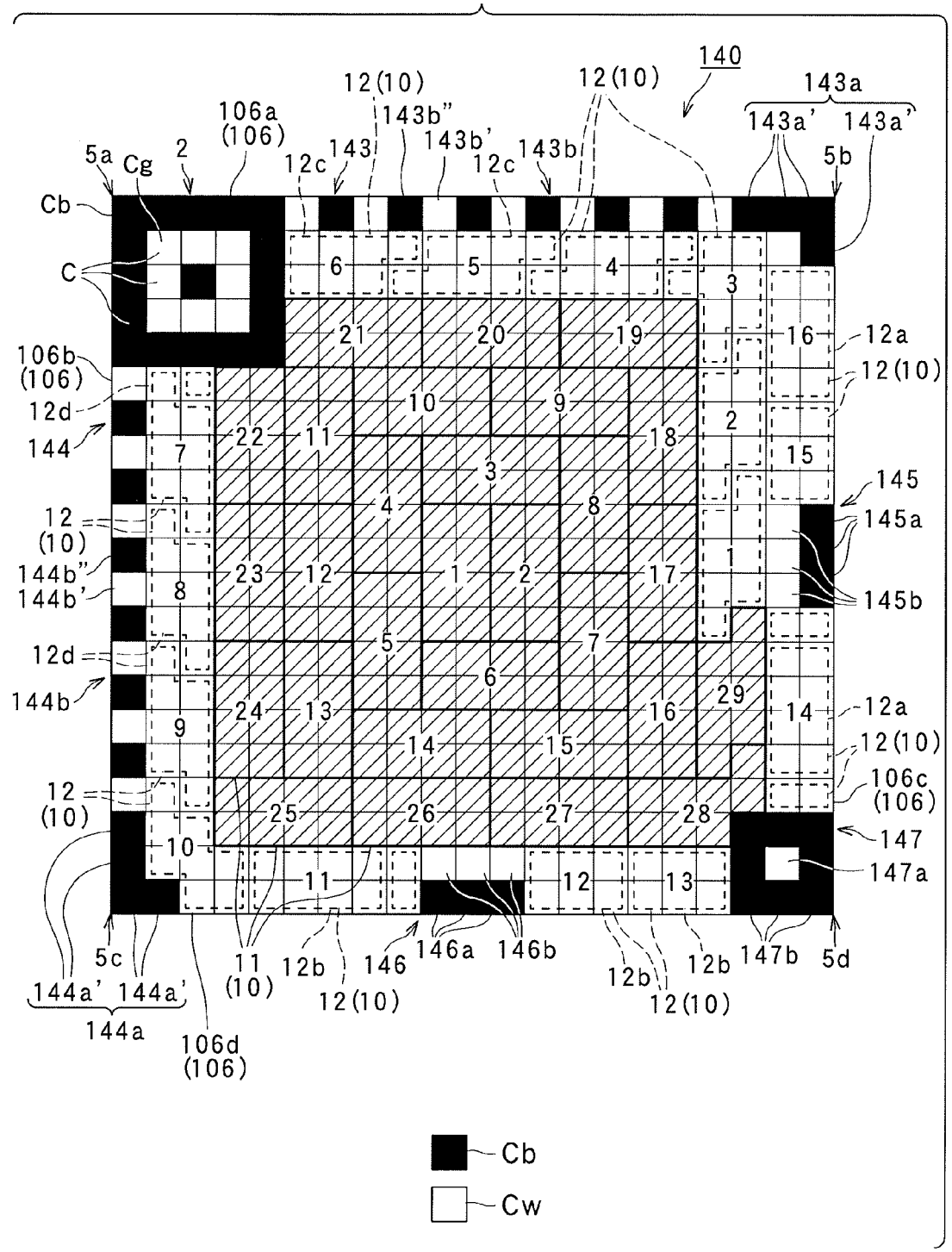
FIG. 7 is a schematic explanatory view illustrating a two-dimensional code, according to a fourth embodiment of the present invention.

Hereinafter will be described a fourth embodiment. FIG. 7 is a schematic explanatory view illustrating a 2D code 140, according to the fourth embodiment. FIG. 7 shows, by broken lines, the positions of error-correction code blocks 12, and also shows, by solid lines with hatching, the positions of the data code blocks 11. FIG. 7 omits a specific cell structure of each code block 10.

Similar to the first embodiment, the 2D code 140 of the present embodiment has a plurality of cells "C" (the reference symbol "C" is designated to only a portion of the cells in FIG. 7 and designation of the reference symbol to other cells is omitted) arranged in matrix. The 2D code 140 includes a plurality of code blocks 10, the first specific pattern 2 (having the same structure and functions as in the first embodiment), and second specific patterns 143, 144. The 2D code 140 of the present embodiment is configured to have a shape with square outline in which a plurality of cells "C" are arranged in matrix to form a group of cells. Particularly, the same number of cells are vertically and horizontally arranged (21 cells×21 cells) in the 2D code 140.

The 2D code 140 is configured to have a rectangular code region having four linear borders 106 defining the code region. Each of the borders (first borders 106a, 106b) extending from the first specific pattern 2 is configured to have a larger length than each border 6 of the first embodiment. The second specific patterns 143, 144 are arranged along the first borders 106a, 106b, respectively. Other borders 106 (i.e. second borders 106c, 106d not extending from the first specific pattern 2) than the borders 106 (first borders 106a, 106b) along which the second specific patterns 143, 144 are arranged, are also configured to have a larger length than the borders 6 of the first embodiment.

The code region (region configured by a plurality of cells "C") of the 2D code 140 also has a rectangular outline to provide a rectangular region. Specifically, as shown in FIG. 7, the code region is formed into a square region with a square outline.

The cells "C" structuring the 2D code 140 are the ones selected from plural types of cells having different saturation, hue, or lightness. Similar to the first embodiment, the 2D code 140 shown in FIG. 7 is also configured by two types of cells of different colors (black cells and white cells).

Similar to the first embodiment, each of the code blocks 10 used for the 2D code 140 is a group of eight cells "C". The code blocks 10 include a division of the data code blocks 11 and a division of the error-correction code blocks 12. In the present embodiment, a portion of the code blocks 10 are configured to have a 2×4 or 4×2 matrix, and other code blocks 10 have different shapes. Also, there are some code blocks 10 each of which is divided into two or more areas. Similar to the first embodiment, neither the data code blocks 11 nor the error-correction code blocks 12 of the 2D code 140 are masked. In other words, the data code blocks 11 and the error-correction code blocks 12 are configured as non-masked blocks, and thus can be decoded without requiring de-masking or the like.

Each data code block 11 is configured in a manner similar to the first embodiment. In particular, each data code block 11 is configured as a block which expresses encoded data (data codeword) with a plurality of cells, the encoded data having been obtained by encoding data to be decoded. The cells structuring each data code block 11 are selected from either of the two types of cells (black cells or white cells). The method for expressing the data codewords with the two types of cells is the same as the one in the first embodiment.

In the 2D code 140 of the present embodiment as well, the data code blocks 11 are arranged at the center portion of the 2D code 140, which are surrounded by the error-correction code blocks 12. In the example shown in FIG. 7, twenty-nine data code blocks 11 are arranged at the center portion of the 2D code 140. The code blocks 11 are surrounded by sixteen error-correction code blocks 12.

The individual error-correction code blocks 12 are configured by an error-correction codeword for correcting the error of the data code blocks 11. The method for producing error-correction codewords based on the data code blocks 11, and the method for expressing the error-correction codewords with two types of cells are the same as those used in the first embodiment.

Of the four sides (four borders 106) forming the borders of the code region, the borders (first borders 106a, 106b) with which the first specific pattern 2 is in contact are provided with the second specific patterns 143, 144 so as to extend along the respective borders. Similar to the second specific patterns 3, 4 of the first embodiment, the second specific patterns 143, 144 are adapted to function as marks for making the code region of the 2D code 140 distinct from the background. Thus, it is so configured that, in performing reading, the rectangular region can be distinct from the background, with reference to the second specific patterns 143, 144.

The second specific pattern 143 is arranged at the corner 5b (second corner) which is different from the specified corner 5a (the corner at which the second specific pattern 2 is arranged), being provided with an end pattern 143a defining the corner 5b. The end pattern 143a is configured to have an "L" shape in which a plurality of cells of the same type, i.e. of the same saturation, hue, or lightness, are consecutively arranged (in FIG. 7, the "L" shape in which four black cells 143a' are consecutively arranged). Specifically, three black cells 143a' are linearly arranged, and another black cell 143a' is arranged being projected from the end of the three black cells 143a' in the direction perpendicular (i.e. the direction along the second border 106c) to the direction along which the three black cells 143a' are juxtaposed (i.e. the direction along the first border 106a). In other words, the outer edge of the end pattern 143a is configured to have a right angle. Thus, the position of the corner 5b in the rectangular region is determined by the two sides forming the outer edge of the end pattern 143a.

In the second specific pattern 143, an intermediate specific pattern 143b is arranged between the first specific pattern 2 and the end pattern 143a. The intermediate specific pattern 143b is configured by juxtaposing cells with plurality of colors in a predetermined manner. In particular, cells with a specific color (white cells 143b' in FIG. 7) and cells with another specific color (black cells 143b" in FIG. 7) are alternately arranged to configure the pattern.

The same applies to the second specific pattern 144. Specifically, the second specific pattern 144 is arranged at the corner 5c (second corner) which is different from the specified corner 5a, being provided with an end pattern 144a defining the corner 5c. The end pattern 144a is also configured to have a shape of "L" in which a plurality of cells of the same type, i.e. of the same saturation, hue, or lightness, are consecutively arranged (in FIG. 7, the shape of "L" in which four black cells 144a' are consecutively arranged). Specifically, three black cells 144a' are linearly arranged, and another black cell 144a' is arranged being projected from the end of the three black cells 144a' in the direction perpendicular (i.e. the direction along the second border 106d) to the direction along which the three black cells 144a' are juxtaposed (i.e. the direction along the first border 106b). In other words, the outer edge of the end pattern 144a is configured to have a right angle. Thus, the position of the corner 5c in the rectangular region is determined by the two sides forming the outer edge of the end pattern 144a. In the present embodiment, the end patterns 143a, 144a correspond to examples of the "first end patterns".

In the second specific pattern 144 as well, an intermediate specific pattern 144b is arranged between the first specific pattern 2 and the end pattern 144a. The intermediate specific pattern 144b is configured by juxtaposing cells with plurality of colors in a predetermined manner. In particular, white cells 144b' and black cells 144b" are alternately arranged to configure the pattern.

In the code region (rectangular region) of the 2D code 140, an end pattern 147 defining the corner 5d of the code region is arranged at a diagonal position of the first specific pattern 2. The end pattern 147 includes a first cell (white cell 147a) having a predetermined saturation, hue, or lightness and second cells (black cells 147b) whose saturation, hue, or lightness is different from that of the first cell (white cell 147a). In particular, the end pattern 147 is configured to have a rectangular shape in which one white cell 147a is arranged at the center being enclosed by eight black cells 147b. In FIG. 7, the outer edge of the end pattern 147 is configured to have right angles. The position of the corner 5d in the rectangular region is determined by the right angled outer edge. In the present embodiment, the end pattern 147 corresponds to an example of a "second end pattern".

In the 2D code 140 of FIG. 7 as well, of the borders 106 of the code region, the borders (i.e. second borders 106c, 106d) other than the borders (i.e. first borders 106a, 106b) arranged with the second specific patterns 143, 144, are ensured to be arranged with a portion of the code blocks 10. In the present embodiment, of the plurality of code blocks 10, those which are arranged on the side of the second borders 106c, 106d are referred to "second border blocks". In the example shown in FIG. 7, the error-correction code blocks 12 are arranged along the second borders 106, 106d, and these error-correction code blocks 12 constitute the second border blocks.

Each of second border blocks 12a (error-correction code blocks) on the side of one second border 106c is configured so that at least one cell having saturation, hue, or lightness different from the background is arranged at a position on the second border 106c. The same applies to second border blocks 12b (error-correction code blocks) on the side of the other second border 106d. That is, each of the second border blocks 12b on the side of the other second border 106d is configured so that at least one cell having saturation, hue, or lightness different from the background is arranged at a position on the second border 106d. In the present embodiment, the background has a white color, and each of the second border blocks 12a, 12b is arranged so that at least one cell whose color (black) is different from that of the background is arranged at the second border 106 or 106d.

In FIG. 7, a plurality of error-correction code blocks 12 are arranged along the second borders 106c, 106d except for those areas in which the second specific patterns 143, 144 and the end pattern 147 are arranged along the second borders 106c, 106d. However, it will be satisfactory if at least one error-correction code block 12 is arranged along the second border 106c or 106d. Alternatively, other blocks (e.g. the data code blocks 11 or the compressed data code blocks 13 of the second embodiment) may be arranged together with the error-correction code blocks 12, so as to extend along the second borders 106c, 106d. In FIG. 7, each error-correction code block 12 configured to have a 2×4 or 4×2 matrix is arranged along the second border 106c or 106d so that the long side of the error-correction code block 12 will be extended along the second border 106c or 106d. Thus, in each error-correction code block 12 of such a matrix, half of the cells are ensured to be located at the secondary border 106c or 106d.

The code region of the 2D code 140 of the present embodiment is also formed into a square region in which an "L" odd number of cells are arranged along one side to provide an L×L matrix (L=21 in FIG. 7 to provide 21×21 matrix). The outline of the first specific pattern 2 is formed into a square shape in which an "M" odd number of cells, where L>M, are arranged to provide an M×M matrix (M=5 in FIG. 7 to provide 5×5 matrix). Each of the second specific patterns 143, 144 is formed into a linear shape in which an "N" odd number (N=16 in FIG. 7), where N=L−M, of cells are juxtaposed with the length corresponding to the number of juxtaposed cells. Most of the code blocks 10 are configured to have a rectangular shape in which an even number "A" of cells are arranged along one side and an even number "B" of cells are arranged on the other side to provide an A×B matrix (2×4 or 4×2 matrix in FIG. 7).

In the present embodiment, a portion of the plurality of error-correction code blocks 12 are arranged along the inner side of the second specific pattern 143 at one first border 106a. Such error-correction code blocks 12 are referred to "inner blocks 12c". Also, a portion of the plurality of error-correction code blocks 12 are arranged along the inner side of the second specific pattern 144 at the other first border 106b. Such error-correction code blocks 12 are referred to "inner blocks 12d".

In the present embodiment, third specific patterns 145, 146 are arranged along a part of the second borders 106c, 106d, respectively, so that the code blocks 10 can be distinct from the background. The third specific pattern 145 is located intermediate of the second border 106c, being distanced from the end patterns 143a, 147. The specific pattern 145 has a linear portion where a plurality of cells of the same type, i.e. of the same saturation, hue, or lightness, are consecutively arranged (in particular, a linear portion where three black cells 145a are consecutively arranged). The linear portion is arranged along the second border 106c. Also, another linear portion where three white cells 145b are consecutively arranged is located on the inner side of the linear portion where the black cells 145a are arranged, so as to be adjacent to each other. The error-correction code blocks 12 at the second border 106c (second border blocks 12a) are arranged along the second border 106c, avoiding the third specific pattern 145.

In the 2D code 140 of the present embodiment, half or more of the cells (four or more cells) of the code blocks 10 are ensured to be located between the third specific pattern 145 and the end pattern 143a. Thus, it is so configured that the error-correction code blocks 12 of 2×4 or 4×2 matrix can be arranged between the third specific pattern 145 and the end pattern 143a, with each long side extending along the second border 106c. Also, half or more of the cells (four or more cells) of the code blocks 10 are ensured to be located between the third specific pattern 145 and the end pattern 147. Thus, it is so configured that the error-correction code blocks 12 of 2×4 or 4×2 matrix can be arranged between the third specific pattern 145 and the end pattern 147, with each long side extending along the second border 106c. Thus, the error-correction code blocks 12 are ensured to be arranged on the respective lateral sides of the third specific pattern 145, with each of the code blocks 12 being located at the second border 106c.

The third specific pattern 146 has a shape identical with the third specific pattern 145. The specific pattern 146 has a linear portion where a plurality of cells of the same type, i.e. of the same saturation, hue, or lightness, are consecutively arranged (in particular, a linear portion where three black cells 146a are consecutively arranged). The linear portion is arranged along the second border 106d. Also, another linear portion where three white cells 146b are consecutively arranged is located on the inner side of the linear portion where the black cells 146a are arranged, so as to be adjacent to each other. The error-correction code blocks 12 at the second border 106d (second border blocks 12b) are arranged along the second border 106d, avoiding the third specific pattern 146.

As to the third specific pattern 146 as well, half or more of the cells (four or more cells) of the code blocks 10 are ensured to be located between the third specific pattern 146 and the end pattern 144a. Thus, it is so configured that the error-correction code blocks 12 of 2×4 or 4×2 matrix can be arranged between the third specific pattern 146 and the end pattern 144a, with each long side extending along the second border 106d. Also, half or more of the cells (four or more cells) of the code blocks 10 are ensured to be located between the third specific pattern 146 and the end pattern 147. Thus, it is so configured that the error-correction code blocks 12 of 2×4 or 4×2 matrix can be arranged between the third specific pattern 146 and the end pattern 147, with each long side extending along the second border 106d. Thus, the error-correction code blocks 12 are also ensured to be arranged on the respective lateral sides of the third specific pattern 146, with each of the code blocks 12 being located at the second border 106d.

The present embodiment configured as described above can enjoy the advantages provided below.

In the present embodiment, the third specific patterns 145, 146 for making the code blocks distinct from the background are arranged along portions of the second borders 106c, 106d, respectively. The code blocks 10 (error-correction code blocks 12) arranged along the second borders 106c, 106d are arranged avoiding the third specific patterns 145, 146, respectively. With this configuration, in performing reading, the portions of the second borders 106c, 106d can be reliably defined by the third specific patterns 145, 146, respectively. The remnant portions of the second borders 106c, 106d with no arrangement of the third specific patterns 145, 146, respectively, can be well defined using the code blocks 10 (error-correction code blocks 12). Accordingly, data areas can be effectively retained, while the second borders 106c, 106d can be defined with high accuracy.

The end patterns 143a, 144a (first end patterns) are each configured to have an "L" shape in which a plurality of cells having the same saturation, hue, or lightness are consecutively arranged. Thus, a configuration that can facilitate definition of the corners 5b, 5c (second corners) may be easily realized. In particular, the L-shaped end patterns 143a, 144a (first end patterns) may also contribute to the recognition of two sides extending from the corners 5b, 5c (second corners), respectively. Thus, the second corners and the two sides extending from the respective corners may be well defined.

Further, the error-correction code blocks 12 (inner blocks 12c, 12d, etc.) are arranged along the inner sides of the second specific patterns 143, 144, which are arranged along the first borders 106a, 106b, respectively. In this way, distinction between the code region and the background can be made not only by the second specific patterns 143, 144, but also by the error-correction code blocks 12, as required. Thus, the first borders 106a, 106b can be effectively prevented from being erroneously recognized. For example, even when the second specific patterns 143, 144 are partially obscured by dirt or the like, the positions of the error-correction code blocks 12 that are present on the inner side of the patterns can be accurately defined. Accordingly, the true borders can be well estimated, based on the positions of the error-correction code blocks 12.

Further, the end pattern 147 (second end pattern) includes the first cell (white cell 147a) having predetermined saturation, hue, or lightness and the second cells (black cells 147b) having saturation, hue, or lightness which is different from that of the first cell. Specifically, the end pattern 147 is configured to have a rectangular shape in which the first cell (one white cell 147a) is located at the center, being enclosed by the second cells (eight black cells 147b). Thus, a configuration can be easily realized, which enables easier definition of the corner 5d diagonal to the specified corner 5a (the corner where the first specific pattern is arranged). Also, the outline of the end pattern 147 (second end pattern), which has a rectangular shape, may also contribute to recognizing the two sides (second borders 106c, 106d) extending from the diagonal corner 5d. Thus, the second borders 106c, 106d can be defined much better, using the end pattern 147 and the code blocks 10 (error-correction code blocks 12).

Figure 9:
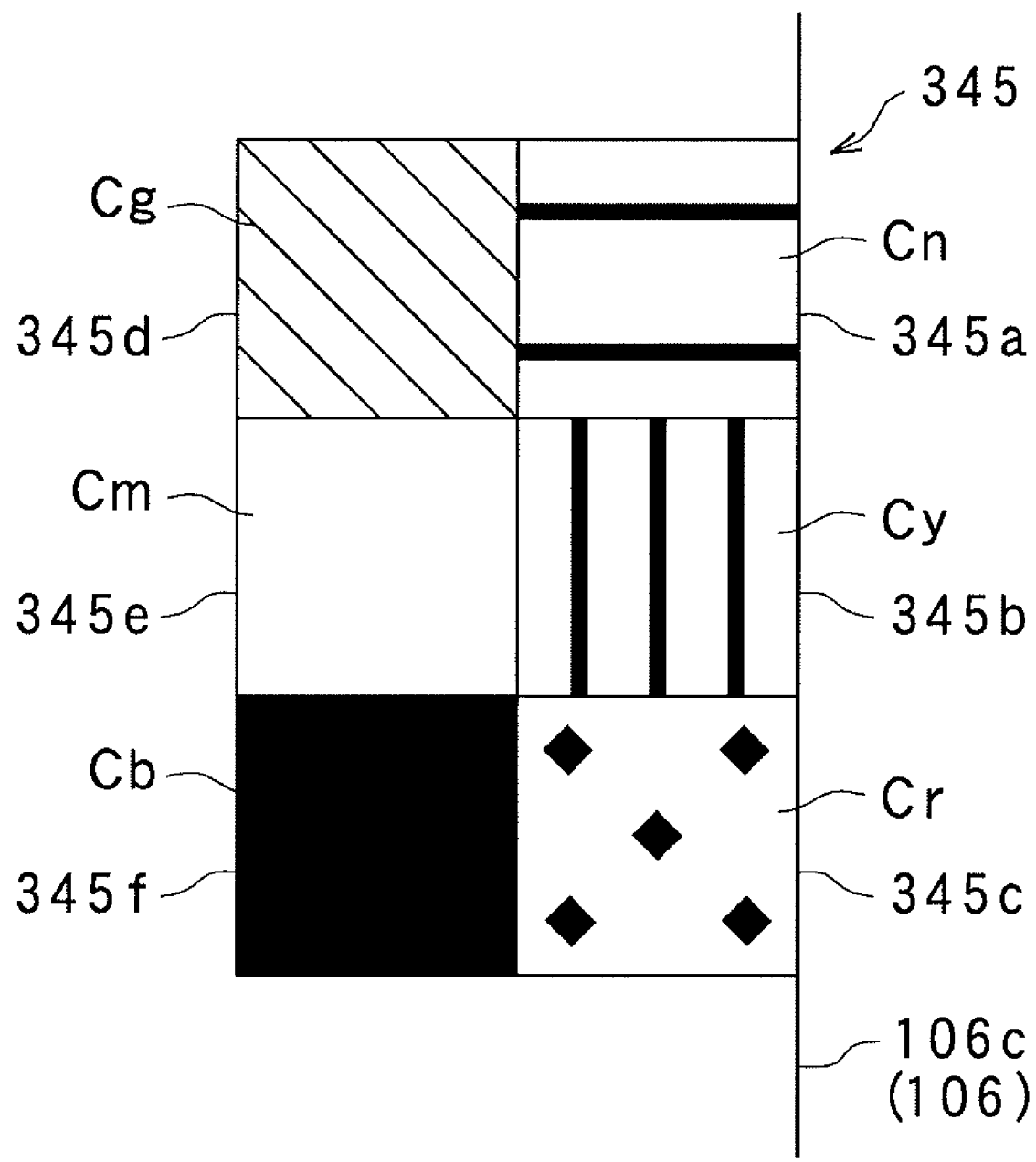
FIG. 9 is an enlarged explanatory view illustrating a third specific pattern in the two-dimensional code illustrated in FIG. 8.

The configuration shown in FIG. 7 may be modified as shown in FIG. 8. FIG. 8 is an explanatory view illustrating a modification of the fourth embodiment shown in FIG. 7. FIG. 9 is a partial enlarged view of FIG. 8. A 2D code 340 shown in FIG. 8 is different from the one shown in FIG. 7 in that third specific patterns 345, 346 have a different configuration and that three or more types of cells (e.g. eight differently colored cells as in the third embodiment) are used to form a color code. The remaining portions are configured as in the 2D code shown in FIG. 7. Accordingly, detailed description will be omitted as to the portions having the same configuration.

As shown in FIGS. 8 and 9, the third definition pattern 345 is configured by plural types of cells of different saturation, hue, or lightness (in FIG. 9, six types, i.e. a cyan cell 345a, a yellow cell 345b, a red cell 345c, a green cell 345d, a white cell 345e and a black cell 345f). Of these cells, three types of cells are linearly arranged along the second border 106c in a predetermined color order. In FIGS. 8 and 9, the cells are juxtaposed in the predetermined order, from the side of the corner 5b, of the cyan cell 345a, the yellow cell 345b and the red cell 345c along the second border 106c. Other cells are also juxtaposed in a predetermined order, from the side of the corner 5b, of the green cell 345d, the white cell 345e and the black cell 345f, along the inner side of the three cells (the cyan cell 345a, the yellow cell 345b and the red cell 345c at the second border 106c).

The same applies to the third specific pattern 346. Specifically, the third definition pattern 346 is configured by plural types of cells of different saturation, hue, or lightness (in FIG. 8, six types, i.e. a cyan cell 346a, a yellow cell 346b, a red cell 346c, a green cell 346d, a white cell 346e and a black cell 346f). Of these cells, three types of cells are linearly arranged along the second border 106d in a predetermined color order. In FIGS. 8 and 9, the cells are juxtaposed in a predetermined order, from the side of the corner 5c, of the cyan cell 346a, the yellow cell 346b and the red cell 346c along the second border 106d. Other cells are also juxtaposed in a predetermined order, from the side of the corner 5c, of the green cell 346d, the white cell 346e and the black cell 346f, along the inner side of the three cells (the cyan cell 346a, the yellow cell 346b and the red cell 346c at the second border 106d).

As shown in FIGS. 8 and 9, configuring the third specific patterns 345, 346 by arranging a plurality of cells of different types in a predetermined order, may contribute to easier recognition of the arrangement and shape of the 2D code 340, when reading is performed. Further, confirmation on whether or not the cells are arranged in the predetermined order may also necessitate the recognition as to the appropriateness of the third specific patterns 345, 346. Accordingly, portions of the second borders 106c, 106d can be defined in terms of the shape and the details of the pattern, thereby further enhancing the accuracy in the definition of the second borders 106c, 106d.

Fifth Embodiment

Figure 10:
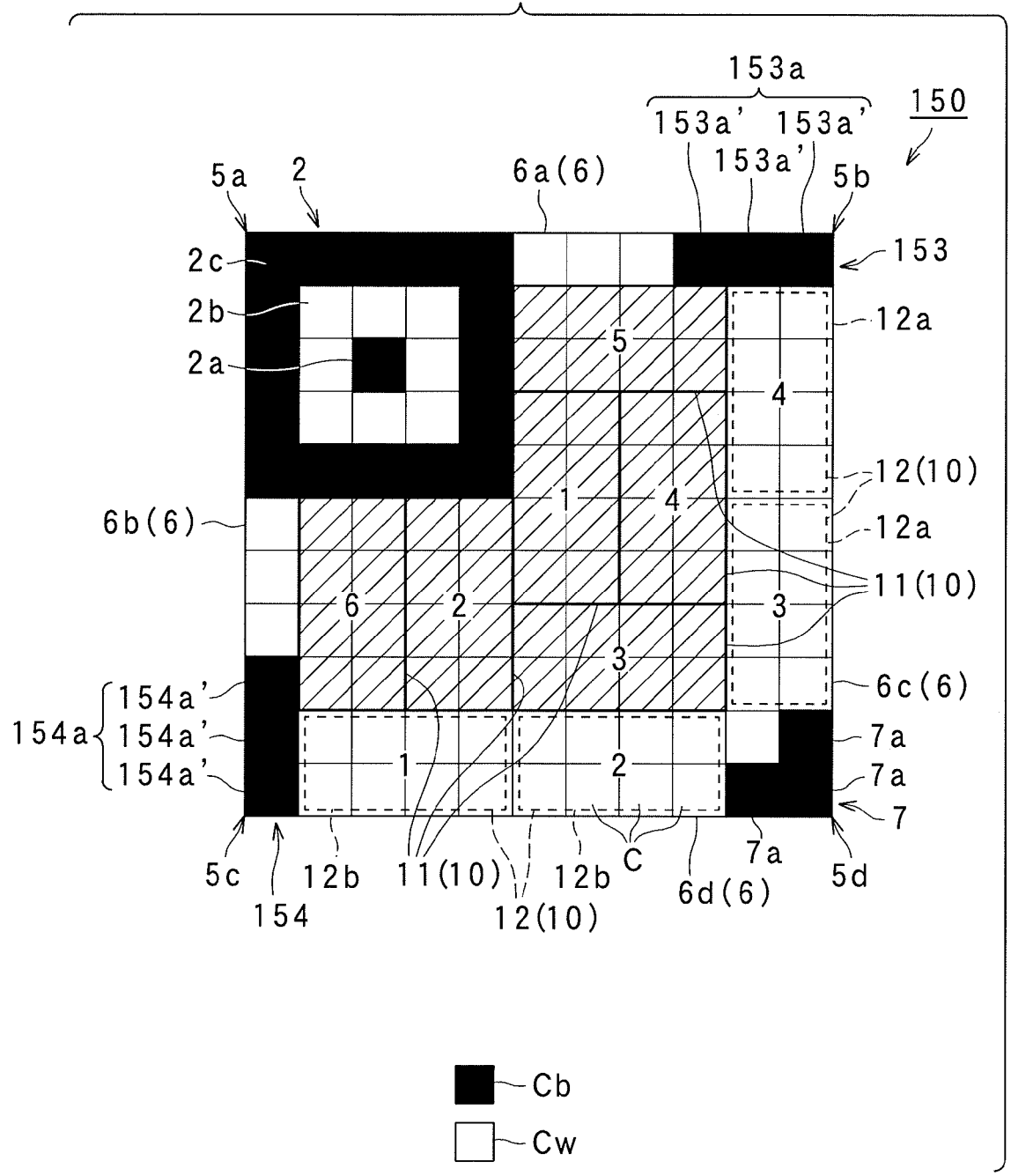
FIG. 10 is a schematic explanatory view illustrating a two-dimensional code, according to a fifth embodiment of the present invention.

Hereinafter will be described a fifth embodiment. FIG. 10 is a schematic explanatory view illustrating a 2D code 150, according to the fifth embodiment. FIG. 10 also shows, by broken lines, the positions of error-correction code blocks 12, and also shows, by solid lines with hatching, the positions of the data code blocks 11. FIG. 10 also omits a specific cell structure of each code block 10.

As shown in FIG. 10, the fifth embodiment is different from the first embodiment (shown in FIG. 1) in that the second specific patterns 3, 4 have been changed to second specific patterns 153, 154, and that blank cells (the cells between the first specific pattern 2 and the second specific pattern 153, and the cells between the first specific pattern 2 and the second specific pattern 154) are ensured to be used for other purposes. Other portions of the 2D code 150 are configured in the same manner as in the first embodiment. Accordingly, the following description will be focused on the differences, and detailed description will be omitted for the same configuration portions. In FIG. 10, the same configuration and arrangement as in the first embodiment are applied to the first specific pattern 2, the end pattern 7, the plurality of data code blocks 11, the plurality of error-correction code blocks 12, the first borders 6a, 6b and the second borders 6c, 6d. Accordingly, it is regarded that the same advantages can be enjoyed.

In FIG. 10, the second specific patterns 153, 154 are provided along the first borders 6a, 6b, respectively. Of these patterns, one second specific pattern 153 is structured by an end pattern 153a alone, and the other second specific pattern 154 is structured by an end pattern 154a alone. In the present embodiment, the end patterns 153a, 154a correspond to examples of the "first end patterns", and thus have a function of defining the corners (corners 5b, 5c) of the rectangular region, which corners are different from the specified corner 5a.

The end pattern 153a is configured to have a linear shape where a plurality of cells of the same type, i.e. of the same saturation, hue, or lightness, are consecutively arranged (in particular, a linear shape where three black cells 153a' having the same saturation, hue, or lightness are consecutively arranged). The end pattern 153a has an end portion (the end far from the first specific pattern 2) including the black cell 153a' whose two sides forming the outer edge define the position of the corner 5d in the code region.

The same applies to the end pattern 154a. Specifically, the end pattern 154a is configured to have a linear shape where a plurality of cells of the same type, i.e. of the same saturation, hue, or lightness, are consecutively arranged (in particular, a linear shape where three black cells 154a' having the same saturation, hue, or lightness are consecutively arranged). The end pattern 154a has an end portion (the end far from the first specific pattern 2) including the black cell 154a' whose two sides forming the outer edge define the position of the corner 5c in the code region.

In FIG. 10, no specific pattern is provided between the first specific pattern 2 and the end pattern 153a, or between the first specific pattern 2 and the end pattern 154a, so that the data code blocks 11 or the error-correction code blocks 12 can be arranged instead.

As shown in FIG. 10, the second specific pattern 153 is structured by the end pattern 153a alone and the second specific pattern 154 is structured by the end pattern 154a alone. Accordingly, the areas required for the second specific patterns are reduced as much as possible to readily enlarge data areas.

Figure 11:
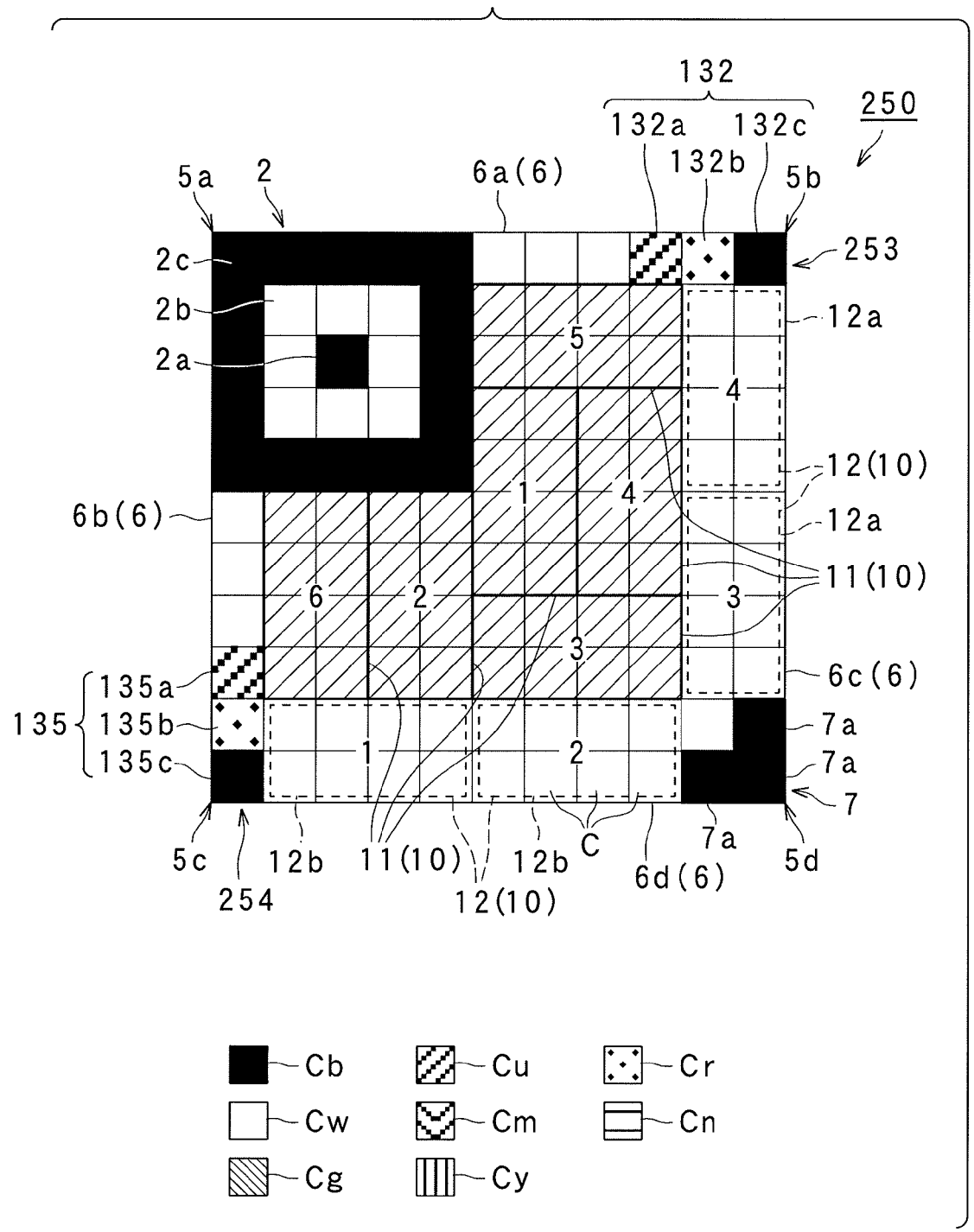
FIG. 11 is an explanatory view illustrating a first modification of the fifth embodiment.

The configuration may be modified as shown in FIG. 11. The configuration shown in FIG. 11 is different from that of the third embodiment (shown in FIG. 6) in that the second specific patterns 133, 134 have been changed to second specific patterns 253, 254, and that blank cells (the cells between the first specific pattern 2 and the second specific pattern 253, and the cells between the first specific pattern 2 and the second definition patter 254) are ensured to be used for other purposes. Other portions are configured in the same manner as in the third embodiment. Accordingly, the following description will be focused on the differences, and detailed description will be omitted for the same configuration portions.

In FIG. 11, the second specific pattern 253 is structured by the end pattern 132 alone shown in FIG. 6, and the second specific pattern 254 is structured by the end pattern 135 alone shown in FIG. 6. Each of the end patterns 132, 135 (first end patterns) is configured to have a linear shape in which plural types of cells having different saturation, hue, or lightness are arranged in a predetermined color order (of a blue cell, a red cell and a black cell from the side of the first specific pattern 2).

Figure 12:
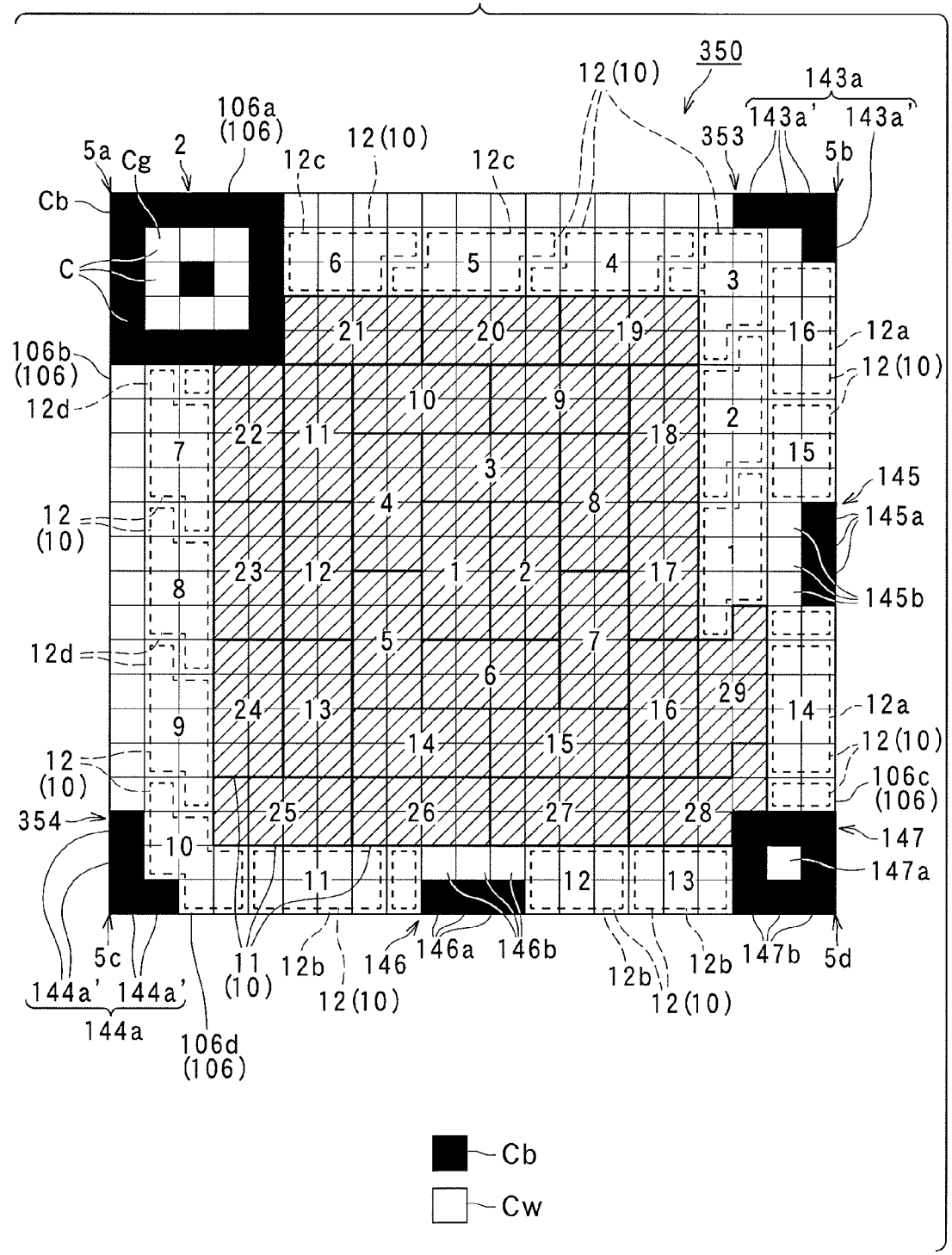
FIG. 12 is an explanatory view illustrating a second modification of the fifth embodiment.

The configuration may be changed as shown in FIG. 12. FIG. 12 shows a 2D code 350 which is a modification of the configuration shown in FIG. 7. The configuration shown in FIG. 12 is different from the one shown in FIG. 7 in that the second specific patterns 143, 144 have been changed to second specific patterns 353, 354, and that blank cells (the cells between the first specific pattern 2 and the second specific pattern 353, and the cells between the first specific pattern 2 and the second definition patter 354) are ensured to be used for other purposes. Other portions are configured in the same manner as in FIG. 7. In the 2D code 350 shown in FIG. 12, the second specific pattern 353 is structured by the end pattern 143a (first end pattern) alone identical with that in FIG. 7, and the second specific pattern 354 is structured by the end pattern 144a (first end pattern) alone identical with that in FIG. 7.

The configuration may be modified as shown in FIG. 13. A 2D code 450 shown in FIG. 13 is different from the 2D code shown in FIG. 12 in that second specific patterns 453, 454 have a different configuration, and that three or more types of cells are used to form a color code. Other portions are configured in the same manner as shown in FIG. 12. Accordingly, detailed description is omitted for the same configuration portions.

In the 2D code 450 shown in FIG. 13, the second specific pattern 453 is structured by an end pattern 452 (first end pattern) alone, and the second specific pattern 454 is structured by an end pattern 455 (first end pattern) alone. Each of the end patterns 452, 455 is configured to have an "L" shape in which plural types of cells having different saturation, hue, or lightness are arranged in a predetermined order.

The end pattern 452 is linearly provided along the first border 106a, with cells being juxtaposed in the order of a red cell 452a, a yellow cell 452b and a cyan cell 452c, from the side of the first specific pattern 2. Also, a black cell 452d is arranged being perpendicular to the cyan cell 452c located at the end. The cyan cell 452c and the black cell 452d are linearly arranged along the second border 106c. Thus, the direction along which the red cell 452a, the yellow cell 452b and the cyan cell 452c are arranged is ensured to be perpendicular to the direction along which the cyan cell 452c and the black cell 452d are arranged. The end pattern 452 is configured to have an "L" shape as a whole. In the end pattern 452, the corner position on the outer edge defines the position of the corner 5b (second corner) in the entire rectangular region.

The end pattern 455 is linearly provided along the first border 106b, with cells being juxtaposed in the order of a red cell 455a, a yellow cell 455b and a cyan cell 455c, from the side of the first specific pattern 2. Also, a black cell 455d is arranged being perpendicular to the cyan cell 455c located at the end. The cyan cell 455c and the black cell 455d are linearly arranged along the second border 106d. Thus, the direction along which the red cell 455a, the yellow cell 455b and the cyan cell 455c are arranged is ensured to be perpendicular to the direction along which the cyan cell 455c and the black cell 455d are arranged. The end pattern 455 is configured to have an "L" shape as a whole. In the end pattern 455, the corner position on the outer edge defines the position of the corner 5c (second corner) in the entire rectangular region. In each of the end patterns 452, 455, the cells are arranged in the color order of red, yellow, cyan and black from the first specific pattern 2, with the last black cell being perpendicular to other cells. It should be appreciated that this color order corresponds to the "predetermined order".

As in the 2D code 450 shown in FIG. 13, arranging a plurality of cells of different types in the predetermined order, may contribute to easier recognition of the arrangement and shape of the 2D code 450, when the 2D code 450 is read. Further, confirmation on whether or not the cells are arranged in the predetermined order may also necessitate the recognition as to the appropriateness of the second corners. Accordingly, definition of the second corners can be made in terms of the shape and the details of the pattern, thereby further enhancing the accuracy of definition of the second corners.

Further, the L-shaped end patterns 452, 455 (first end patterns) may contribute to the recognition of the two sides extending from the respective second corners to thereby enable much better definition of the two sides extending from the respective second corners. In other words, the end pattern 452 may contribute to the definition of the directions of the first border 106a and the second border 106c, and the end pattern 455 may contribute to the definition of the directions of the first border 106b and the second border 106d. Thus, the end patterns 452 and 455 have functions not only of defining the positions and directions of the corners 5b, 5c, respectively, but also of defining the positions and directions of the first borders 106a, 106b and the second border 106c and 106d, respectively.

Figure 14:
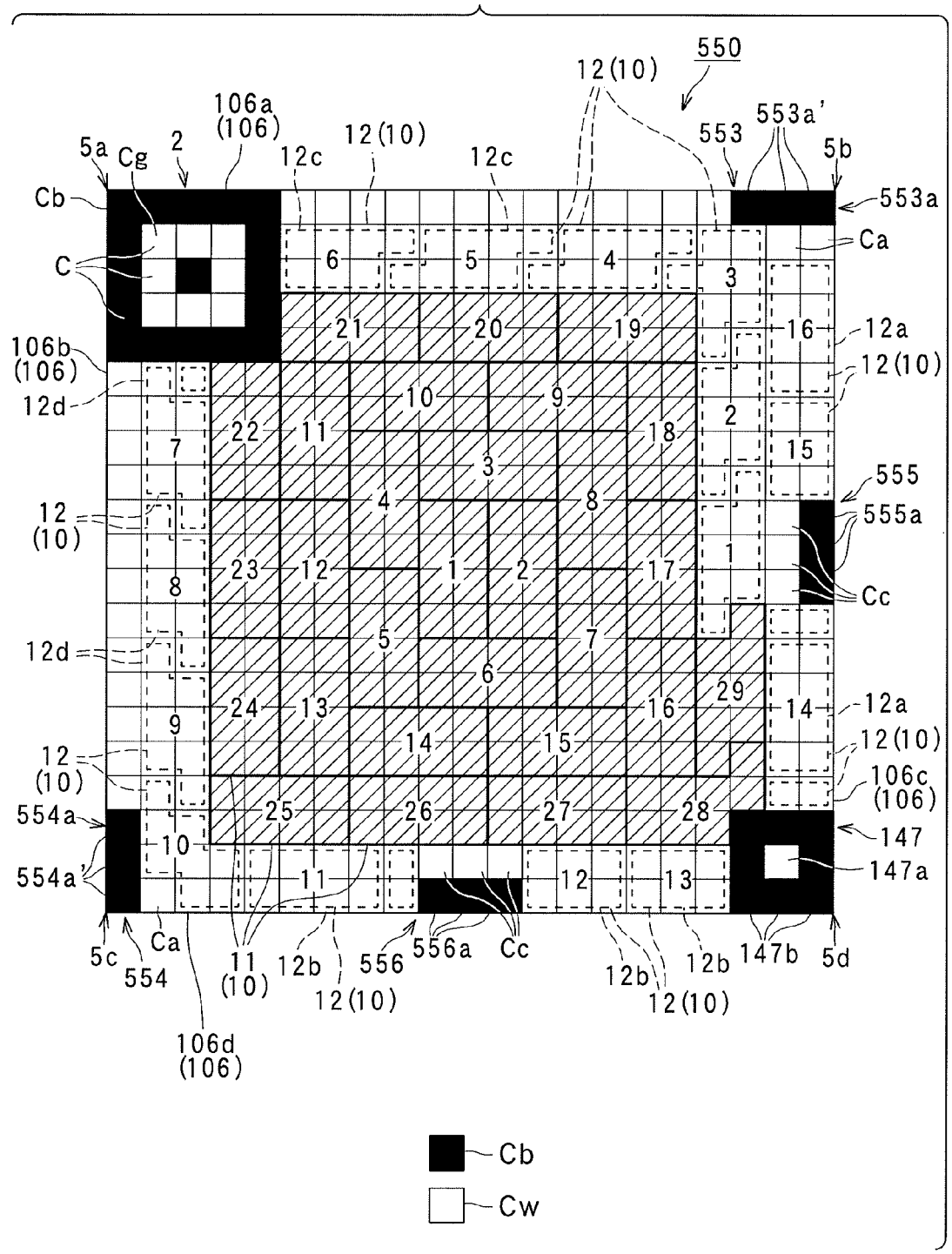
FIG. 14 is an explanatory view illustrating a fourth modification of the fifth embodiment.

The configuration may be modified as shown in FIG. 14. FIG. 14 shows a 2D code 550 which is a modification of the 2D code shown in FIG. 7. The 2D code 550 is different from the 2D code shown in FIG. 7 in that the second specific patterns 143, 144 have been changed to second specific patterns 553, 554, and that blank cells (the cells between the specific pattern 2 and the second specific pattern 553, the cells between the first specific pattern 2 and the second specific pattern 554, cells "Ca" adjacent to the end patterns 553, 554, and cells "Cc" adjacent to third specific patterns 555, 556) are ensured to be used for other purposes. Other portions are configured in the same manner as in FIG. 7.

In the configuration of the present embodiment, an identical shape is used for the third specific patterns 555, 556 and the second specific patterns 553, 554 (each of the patterns has three linearly arranged black cells). Specifically, the second specific pattern 553 is configured by an end pattern 553a alone having linearly juxtaposed three black cells 553a', with the corner 5b being defined by the outer edge of the black cell 553a' at the end. The second specific pattern 554 is configured by an end pattern 554a alone having linearly juxtaposed three black cells 554a', with the corner 5c being defined by the outer edge of the black cell 554a' at the end. The third specific pattern 555 is configured to have a linear shape in which three black cells 555a are juxtaposed, and is arranged along the second border 106c. Similarly, the third specific pattern 556 is configured to have a linear shape in which three black cells 556a are juxtaposed, and is arranged along the second border 106d. Forming both of the second specific patterns 553, 554 and the third specific patterns 555, 556 into an identical shape can simplify the configuration of the code.

Any of the configurations shown in FIGS. 10 to 14 may include compressed data blocks (the compressed data code blocks 13 of the second embodiment). That is, the compressed data blocks may be arranged between the second specific pattern (the second specific pattern in each of the figures) and the first specific pattern 2 so as to be located along each of the first borders (the first borders 6a, 6b in FIGS. 10 and 11, or the first borders 106a, 106b in FIGS. 12 to 14). Alternatively, a portion of the error-correction code blocks 12 may be arranged between the second specific pattern and the first specific pattern so as to be located along each of the first borders. In this case, the compressed data code blocks or the error-correction code blocks correspond to the "first border blocks". In the first border blocks, at least one cell having saturation, hue, or lightness different from that of the background is located at each first border so that the cell may have a function of making a distinction from the background.

With this configuration, in reading the 2D code, both end portions and the vicinities thereof in each of the first borders (the first borders 6a, 6b in FIGS. 10 and 11, or the first borders 106a, 106b in FIGS. 12 to 14) can be reliably defined by the first specific pattern 2 and the second specific pattern (the second specific pattern in each of the figures). Also, each of the remaining portions (the portion of each first border other than the portions of the border along which the first specific pattern 2 and the second specific pattern are arranged) can be defined using the code blocks (first border blocks). In this way, the configuration for reliably defining the first borders can be realized, while data areas can be increased using the areas on the side of the first borders.

Sixth Embodiment

Figure 15:
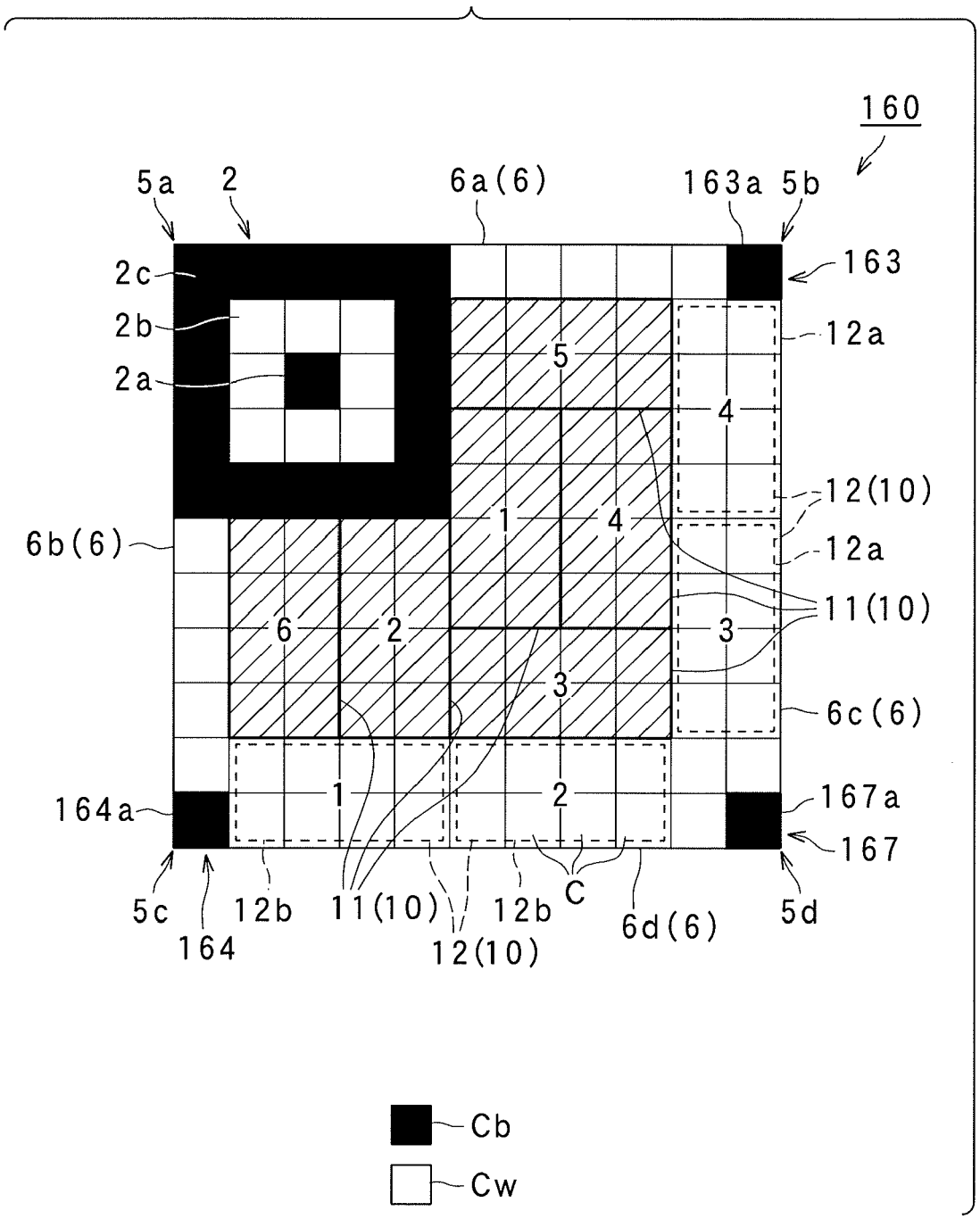
FIG. 15 is a schematic explanatory view illustrating a two-dimensional code, according to a sixth embodiment of the present invention.

Hereinafter will be described a sixth embodiment. FIG. 15 is a schematic explanatory view illustrating a 2D code 160 according to the sixth embodiment. FIG. 15 also shows, by broken lines, the positions of error-correction code blocks 12, and also shows, by solid lines with hatching, the positions of the data code blocks 11. FIG. 15 also omits a specific cell structure of each code block 10.

The configuration shown in FIG. 15 is different from the first embodiment in that: the second specific patterns 3, 4 (FIG. 1) have been replaced by second specific patterns 163, 164 so that blank cells (the cells between the first specific pattern 2 and the second specific pattern 163, and the cells between the first specific pattern 2 and the second specific pattern 164) can be used for other purposes; and the end pattern 7 (FIG. 1) has been replaced by an end pattern 167, so that blank cells (the cells adjacent to the end pattern 167) can be used for other purposes. Other portions are configured in the same manner as in the first embodiment. Therefore, the following description will be focused on the differences, and as to the portions of the same configuration, detailed explanation will be omitted.

Similar to the fifth embodiment, in the 2D code 160 of the present embodiment, the second specific pattern 163 is made up of only an end pattern 163*a* (first end pattern). In the present embodiment, however, the end pattern 163*a* is made up of a single cell (specifically, a black cell), as shown in FIG. 15, having saturation, hue, or lightness different from that of the background. In performing reading, the corner 5*b* (second corner) of the code region is adapted to be defined by the outer edge of the single cell (end pattern 163*a*). The second specific pattern 164 is also made up of only an end pattern 164*a* (first end pattern). The end pattern 164*a* is also made up of a single cell (specifically, a black cell) having saturation, hue, or lightness different from that of the background. In performing reading, the corner 5*c* (second corner) of the code region is adapted to be defined by the outer edge of the single cell (end pattern 164*a*).

Such a configuration of the 2D code 160 can ensure reduction of the areas, as much as possible, required for the end patterns 163*a*, 164*a* (first end patterns), and further can ensure increase of the data areas. Although not shown, compressed data code blocks (similar to the data code blocks 13 of the second embodiment) or the error-correction code blocks 12 may be arranged along the first border 6*a* so as to be located between the second specific pattern 163 and the first specific pattern, or along the first border 6*b* so as to be located between the second specific pattern 164 and the first specific pattern. In this case, large data areas can be ensured between the first specific pattern and each of the second specific patterns, while the first borders can be well defined.

To explain in detail, for example, the location and the shape of the data code blocks 11 or the error-correction code blocks 12 in FIG. 15 may be slightly changed, so that the error-correction code blocks 12 can be arranged between the first specific pattern 2 and the second specific pattern 163 or 164. That is, in FIG. 15, the error-correction code blocks 12, the compressed data code blocks or the like may be arranged at the blank cells.

The example shown in FIG. 15 uses an end pattern 167 which is different from the end pattern 7 (FIG. 1) of the first embodiment. The end pattern 167 corresponds to an example of the "second end pattern". In the present embodiment, the end pattern 167 is made up of a single cell (black cell 167*a*) having saturation, hue, or lightness different from that of the background. The outer edge of the end pattern 167 can define the position of the corner 5*d* in the rectangular region. In this way, the corner 5*d* diagonal to the specified corner 5*a* can be defined by a lesser number of cells, which in turn can facilitate the enlargement of the data areas. The cells adjacent to the end pattern 167 may be used for the cells of the data code block 11 or the error-correction code block 12, while a portion of the cells may be used for other purposes (e.g., for residual blocks that will be described later).

Seventh Embodiment

Figure 16:
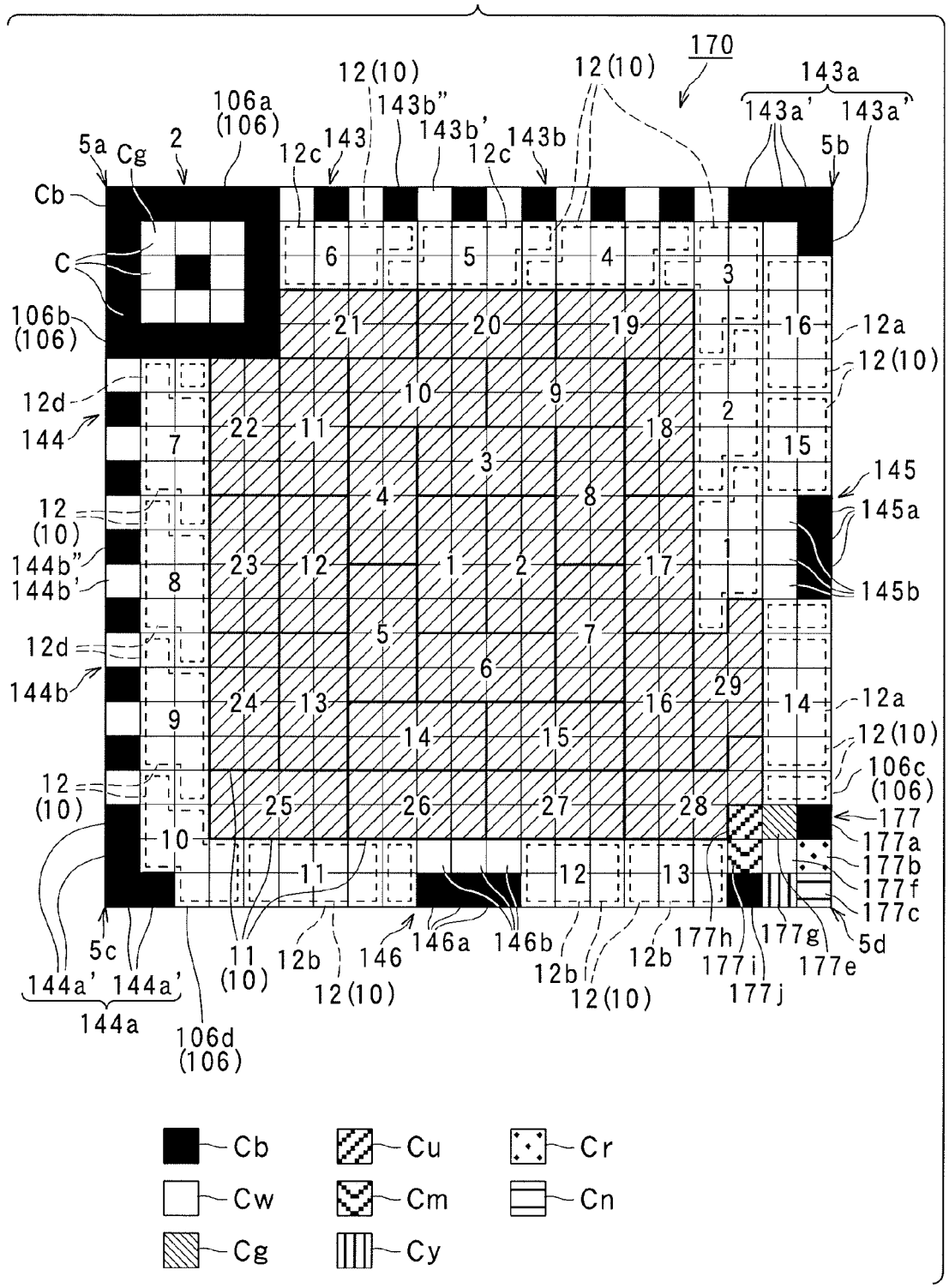
FIG. 16 is a schematic explanatory view illustrating a two-dimensional code, according to a seventh embodiment of the present invention.

Hereinafter will be described a seventh embodiment. FIG. 16 is a schematic explanatory view illustrating a 2D code 170 according to the seventh embodiment. FIG. 16 also shows, by broken lines, the positions of error-correction code blocks 12, and also shows, by solid lines with hatching, the positions of the data code blocks 11. FIG. 16 also omits a specific cell structure of each code block 10.

The 2D code 170 shown in FIG. 16 is a partial modification of the fourth embodiment shown in FIG. 7. The 2D code 170 is different from the fourth embodiment in that the end pattern 147 (FIG. 7) has been replaced by an end pattern 177, and that three or more types of cells are used for the end pattern 177 to form a color code. Other portions are configured in the same manner as those shown in FIG. 7. Accordingly, the following description is focused on the differences and omits detailed explanation on the same configuration portions.

The 2D code 170 shown in FIG. 16 is configured by arranging, in the code region, plural types of cells having different saturation, hue, or lightness. The present embodiment is adapted to use cells of eight colors, for example, as in the third embodiment. The 2D code 170 has a second end pattern 177 in which cells of plural colors are arranged being combined in a predetermined manner. The end pattern 177 is adapted to serve as a reference area as well, for making reference to colors of the code region.

Figure 17:
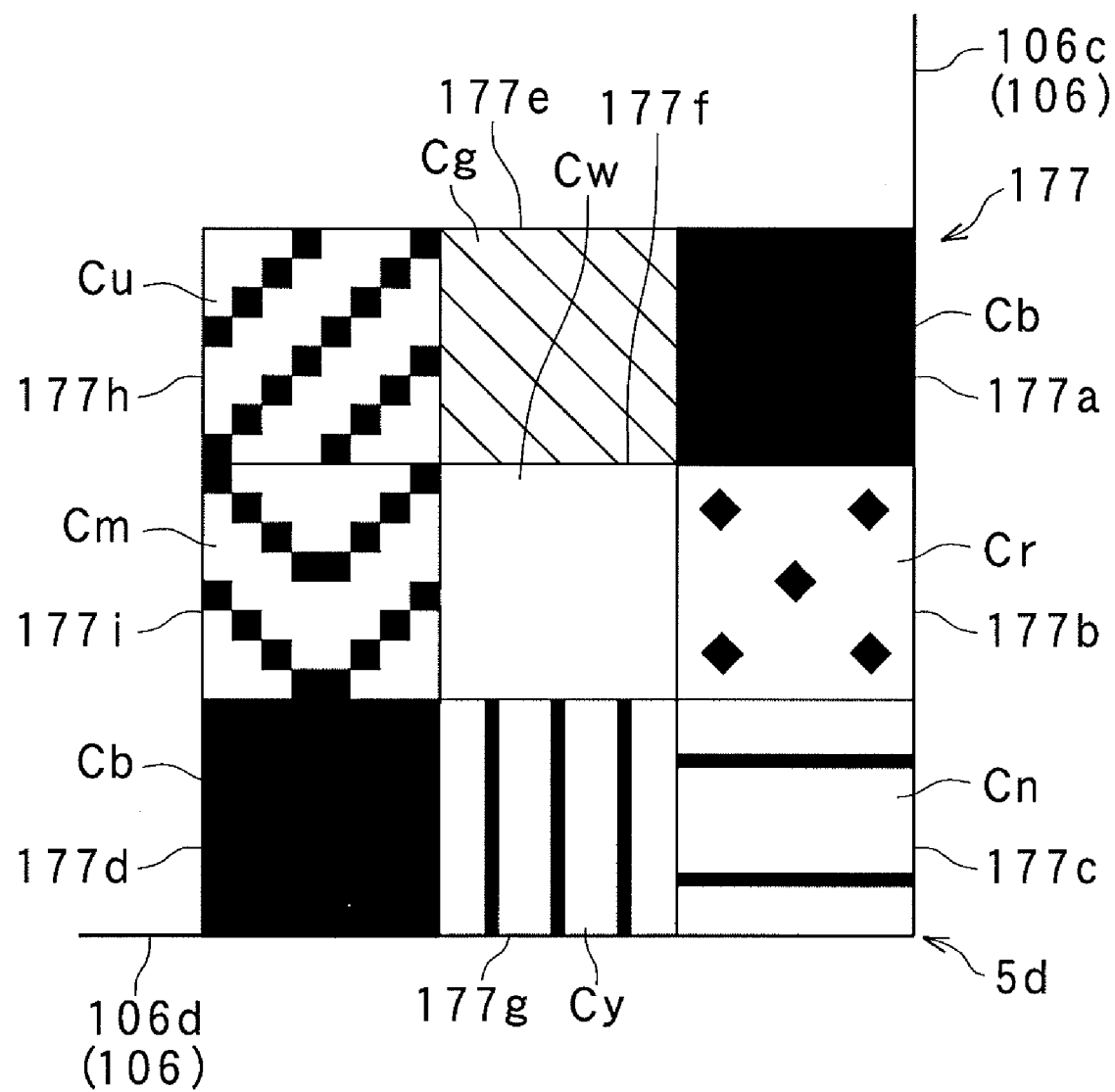
FIG. 17 is an enlarged explanatory view illustrating a second end pattern in the two-dimensional code illustrated in FIG. 16.

Specifically, as shown in FIG. 17, a black cell 177*a*, a red cell 177*b* and a cyan cell 177*c* are linearly arranged in this order from the side of the corner 5*b* along one second border 106*c*, with the outer edge of the cyan cell 177*c* being ensured to define the position of the corner 5*d*. Also, from the corner 5*d*, the cyan cell 177*c*, a yellow cell 177*g* and a black cell 177*j* are linearly arranged in this order so as to be perpendicular to the linear arrangement of the black, red and cyan cells 177*a*, 177*b* and 177*c*. The cyan, yellow and black cells 177*c*, 177*g* and 177*j* are linearly arranged along the other second border 106*d*. This color order, when seen from the corner 5*c*, will be black, yellow and cyan. In the example shown in FIG. 17, the outer edge of the linearly arranged black, red and cyan cells 177*a*, 177*b* and 177*c* defines the second border 106*c*. Similarly, the outer edge of the linearly arranged cyan, yellow and black cells 177*c*, 177*g* and 177*j* defines the second border 106*d*.

Also, a magenta cell 177*i* and a blue cell 177*h* are juxtaposed in this order adjacent to the black cell 177*j* to form a linear arrangement perpendicular to the linear arrangement of the cyan, yellow and black cells 177*c*, 177*g* and 177*j*. Further, a green cell 177*e* and the black cell 177*a* are juxtaposed in this order adjacent to the blue cell 177*h* to form a linear arrangement perpendicular to the linear arrangement of the black, magenta and blue cells 177*j*, 177*i* and 177*h*. It is so configured that, when the 2D code 170 is arranged so that the first specific pattern 2 is positioned upper left of the end pattern 177, the cells of the end pattern 177 are positioned, in the chronological order from the upper right, of the black cell 177*a*, the red cell 177*b*, the cyan cell 177*c*, the yellow cell 177*g*, the black cell 177*j*, the magenta cell 177*i*, the blue cell 177*h* and the green cell 177*e*. In this case, the end pattern 177 will have an annular form, with the outer edge forming a rectangular shape. Also, a white cell 177*f*, the color being identical with the background, is ensured to be arranged at the center position.

The end pattern 177 has cells of all colors that may probably be arranged in the code region. In FIG. 16, the end pattern 177 includes all the colors (eight colors) that may probably be used for the data code blocks 11 and the error-correction code blocks 12 in the 2D code 170. In performing reading, the end pattern 177 is adapted to serve as a reference area for determining the colors of the cells arranged in the rectangular region. For example, in performing reading, it is possible to determine which of the candidate plural colors (eight colors in FIG. 16) the individual cells in the rectangular region correspond to, based on the colors of the cells in the end pattern 177. Alternatively, when a cell has been recognized as having a certain color, it is possible to determine the correctness of the recognition based on the colors of the cells in the end pattern 177.

In this way, in the 2D code 170 shown in FIG. 17, plural types of cells having different saturation, hue, or lightness are arranged being combined in a predetermined manner to form the end pattern 177 (second end pattern) which also serves as a reference area for making reference to colors of the rectangular region. Thus, use of the pattern not only for defining the diagonal corner 5d but also for making reference to colors, may eliminate the necessity of separately providing a special pattern for serving as a reference area. As a result, data areas may be increased or the entire code can be downsized.

Figure 18:
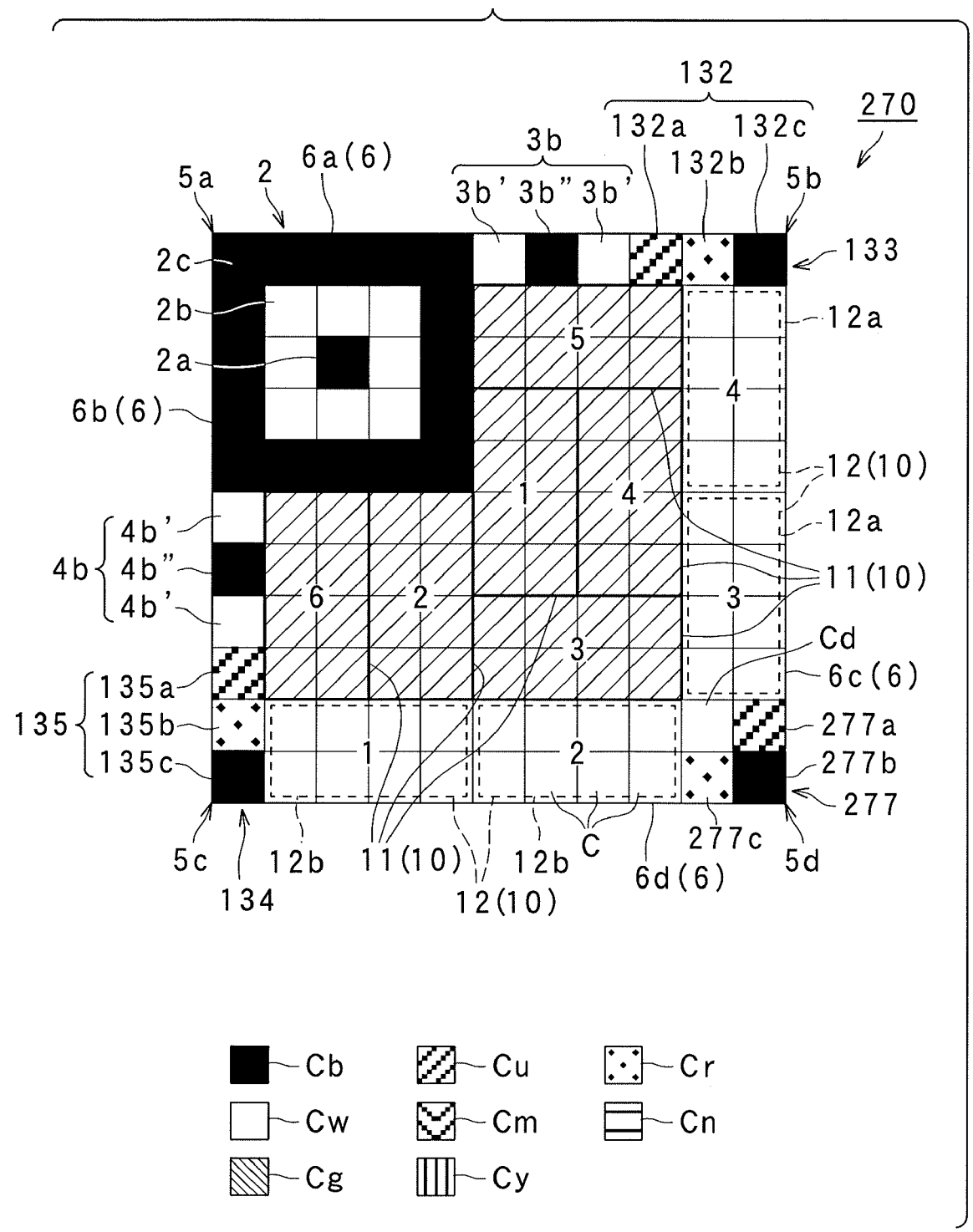
FIG. 18 is an explanatory view illustrating a modification of the seventh embodiment.

A 2D code may also be configured as shown in FIG. 18. FIG. 18 shows a 2D code 270 which has been obtained by partially modifying the 2D code 130 of the third embodiment shown in FIG. 6. The only difference is that, in the 2D code 270, the end pattern 7 (FIG. 6) has been replaced by an end pattern 277. Other portions are configured in the similar manner as shown in FIG. 6. Accordingly, the following description omits detailed explanation on the same configuration portions.

The end pattern 277 shown in FIG. 18 is configured to have an "L" shape in which plural types of cells having different saturation, hue, or lightness are arranged in a predetermined order. Specifically, a blue cell 277a and a black cell 277b are linearly arranged in this order from the side of the corner 5b so as to extend along the second border 6c. A red cell 277c is arranged adjacent to the black cell 277b to form altogether a linear arrangement perpendicular to the linear arrangement of the blue and black cells 277a and 277b. The black and red cells 277b and 277c are arranged in this order from the side of the corner 5d along the second border 6d. Thus, the end pattern 277 as a whole is formed into a shape of "L". In particular, the outer edge of the L-shaped end pattern 277, where the blue, black and red cells 277a, 277b and 277c are arranged sequentially in this order, is ensured to define the position of the corner 5d.

As shown in FIG. 18, arrangement of a plurality of cells of different types in a predetermined order may facilitate the recognition of the cells when the 2D code 270 is read. Also, confirmation as to whether or not the cell order is the predetermined order may contribute to the confirmation as to the appropriateness of the end pattern 277 (second end pattern). Accordingly, the diagonal corner 5d can be defined in terms of the shape and the details of the pattern to there by further enhance the definition accuracy.

Further, since the end pattern 277 (second end pattern) has a shape of "L", the outline of the end pattern 277 may also contribute to the recognition of the two sides extending from the corner 5d (i.e. the second borders 6c, 6d). Thus, use of the end pattern 277 and the code blocks 10 (particularly, the error-correction code blocks 12) may enable much better definition of the second borders 6c, 6d. In addition, similar to the end pattern shown in FIG. 16, the end pattern 277 shown in FIG. 18 may also be used as a reference area for making reference to colors of the code region of the 2D code 270. Thus, the advantages similar to those obtained from the end pattern shown in FIG. 16 can be enjoyed.

The example shown in FIG. 18 does not particularly indicate as to the use of a cell "Cd" adjacent to the end pattern 277, but the cell "Cd" may be used, for example, as an area for arranging the data code block 11 or the error-correction code block 12. Alternatively, the cell "Cd" may be used for a residual block that serves neither as the data code block 11 nor as the error-correction code block 12.

Eighth Embodiment

Figure 19:
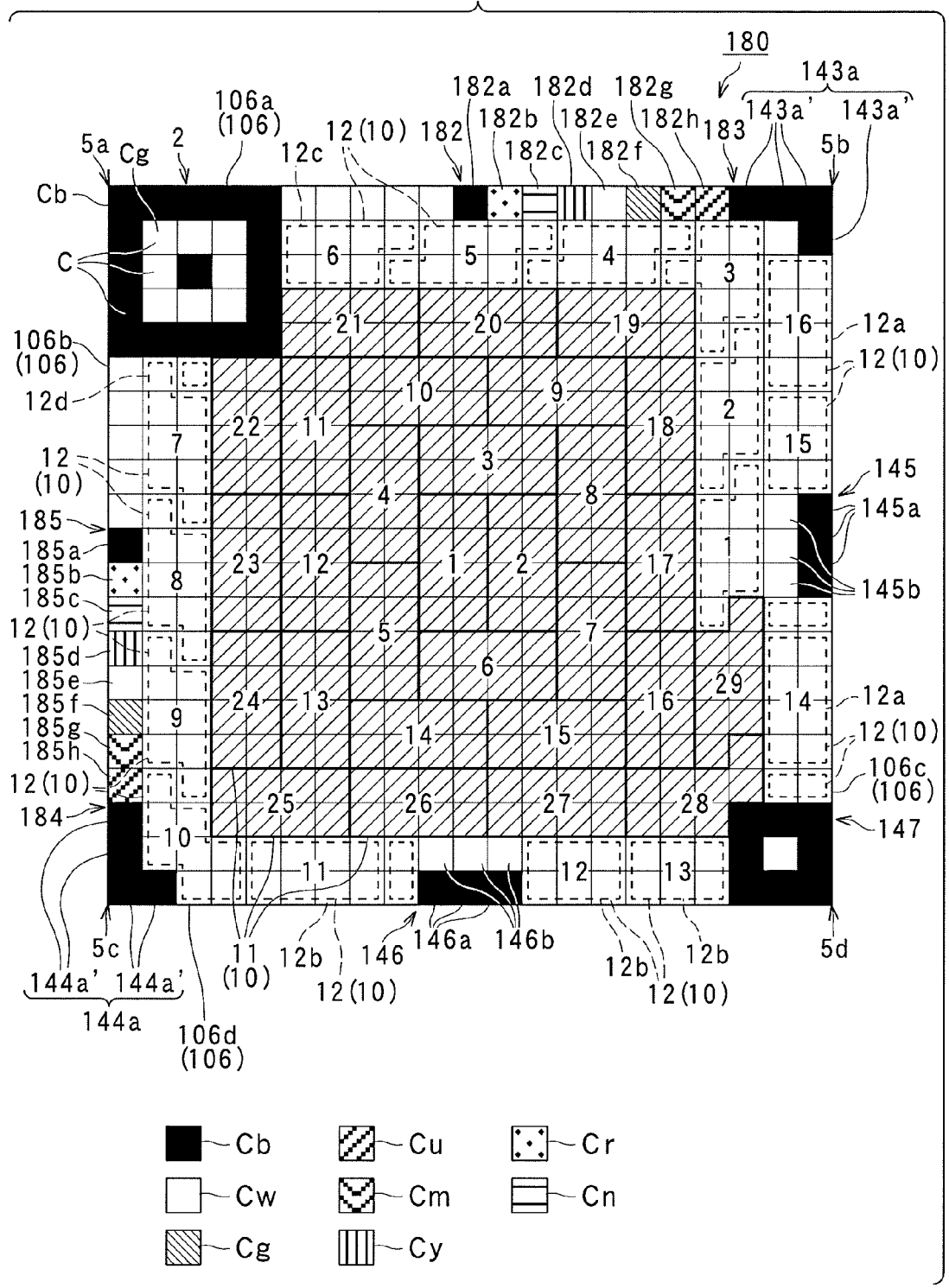
FIG. 19 is a schematic explanatory view illustrating a two-dimensional code, according to an eighth embodiment.

Hereinafter is described an eighth embodiment. FIG. 19 shows a partial modification of the fourth embodiment shown in FIG. 7. The configuration shown in FIG. 19 is different from the fourth embodiment in that the area of each of the intermediate patterns 143b, 144b shown in FIG. 7 has a different configuration, and that three or more types of cells are used for each of the intermediate patterns to form a color code. Other portions are configured in the same manner as those shown in FIG. 7. Accordingly, the following description is focused on the differences and omits detailed explanation on the same configuration portions.

In a 2D code 180 shown in FIG. 19, second specific patterns 183, 184 have portions that include reference patterns 182, 185, respectively. In each of the reference patterns 182, 185, plural types of cells having different saturation, hue, or lightness are juxtaposed being combined in a predetermined manner.

The reference pattern 182 also serves as a reference area for making reference to colors of the code region, and thus, in FIG. 19, is configured to include all the colors used in the rectangular region. In particular, from the side of the first specific pattern 2, cells are adjacently and linearly arranged along the first border 106a in the order of a black cell 182a, a red cell 182b, a cyan cell 182c, a yellow cell 182d, a white cell 182e, a green cell 182f, a magenta cell 182g and a blue cell 182h.

Similarly, the reference pattern 185 also serves as a reference area for making reference to colors of the code region, and thus is configured to include all the colors used in the rectangular region. In particular, from the side of the first specific pattern 2, cells are adjacently and linearly arranged along the first border 106b in the order of a black cell 185a, a red cell 185b, a cyan cell 185c, a yellow cell 185d, a white cell 185e, a green cell 185f, a magenta cell 185g and a blue cell 185h.

A specific pattern (e.g. pattern of linearly arranged cells of identical color, or pattern of alternation of two differently colored cells) may be provided between the reference pattern 182 and the first specific pattern 2, or between the reference pattern 185 and the first specific pattern 2. Alternative to the specific pattern, a portion of the code block 10 (e.g. a portion of the error-correction code block 12) may be arranged.

Each of the reference patterns 182, 185 includes all of the colors that may probably be arranged in the code region. In FIG. 19, each of the reference patterns 182, 185 includes all the colors (eight colors) that may probably be used for the data code blocks 11 and the error-correction code blocks 12 in the 2D code 180.

In performing reading, the reference patterns 182, 185 are ensured to be used for determining the individual colors of the cells arranged in the rectangular region. For example, in performing reading, it is possible to determine which of the candidate plural colors (eight colors in FIG. 19) the individual cells in the rectangular region correspond to, based on the colors of the cells in the reference patterns 182,185.

Alternatively, when a cell has been recognized as having a certain color, it is possible to determine the correctness of the recognition based on the colors of the cells in the reference patterns 182,185. In this way, use of the patterns for defining the first borders 106a, 106b as reference areas may eliminate the necessity of separately providing a special pattern for serving as a reference area. As a result, data areas may be increased or the entire code can be downsized.

Figure 20:
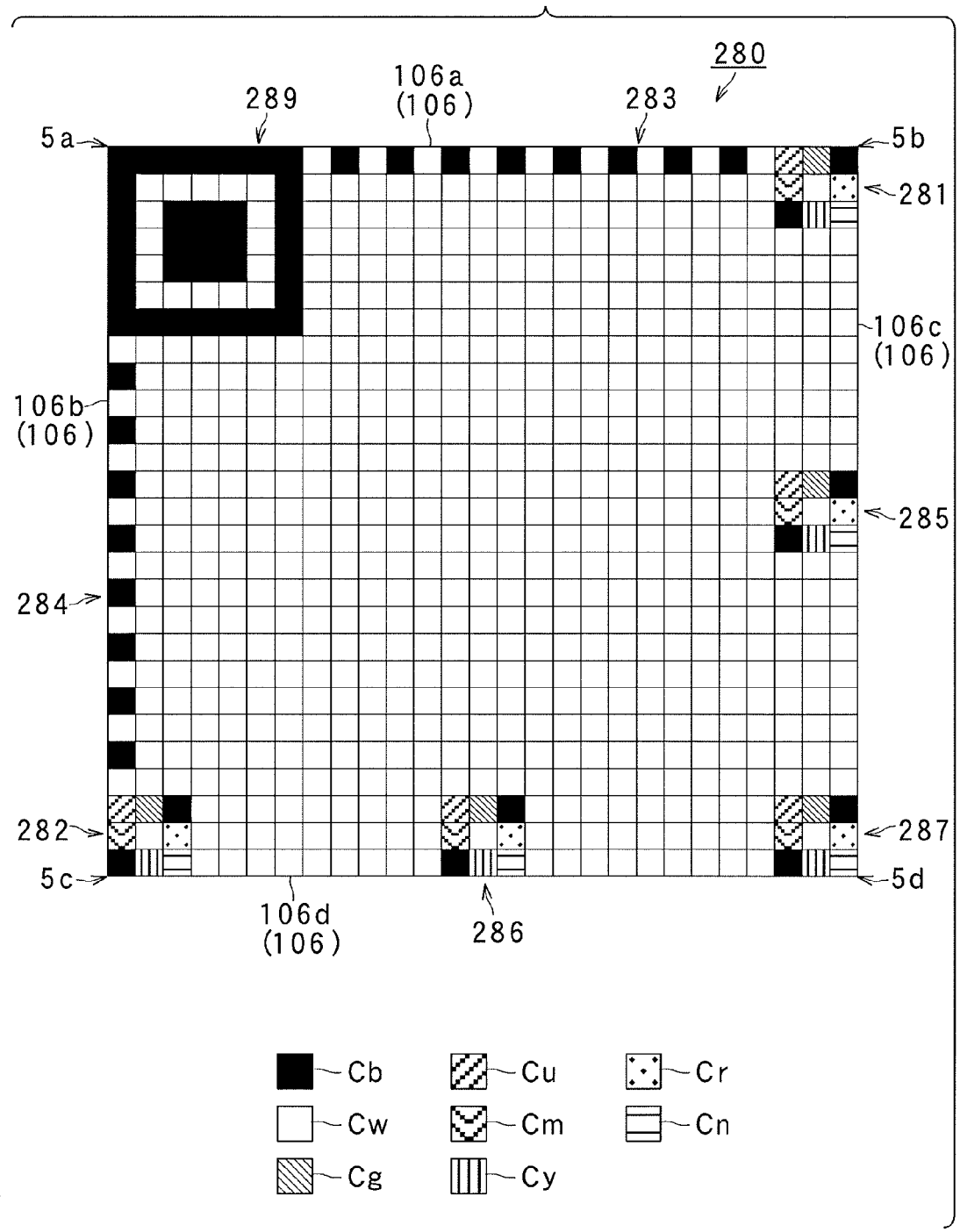
FIG. 20 is an explanatory view illustrating a modification of the eighth embodiment.

The 2D code may be configured as shown in FIG. 20. In a 2D code 280 shown in FIG. 20, an identical pattern is used for all of end patterns 281, 282 (first end patterns) at the corners 5b, 5c, respectively, an end pattern 287 (second end pattern) at the corner 5d diagonal to the specified corner 5a (corner where the first end pattern 2 is arranged), and third specific patterns 285, 286 which are located at the second borders 106c, 106d, respectively, each being distanced from the first end pattern and the second end pattern.

In each of the patterns, plural types of cells having different saturation, hue, or lightness are arranged being combined in a predetermined manner. Specifically, all the patterns are each identical with the end pattern 177 shown in FIG. 17. Each of the end patterns 281, 282 (first end patterns), the end pattern 287 (second end pattern) and the third specific patterns 285, 286 is configured so as to serve as a reference area as well, for making reference to the color of the cells in the code region of the 2D code 280.

Although FIG. 20 omits the indication of the portions other than a first specific pattern 289, second specific patterns 283, 284, the third specific patterns 285, 286 and the end pattern 287, error-correction code blocks or compressed data code blocks are arranged in a manner similar to those in the above embodiments. Also, a first specific pattern 289 shown in FIG. 20, which has a different configuration from that of the first specific pattern 2 used in the above embodiments, may also be ensured to function in the same manner as the specific pattern 2.

Ninth Embodiment

Hereinafter is described a ninth embodiment. A 2D code according to the present embodiment is obtained by providing additional features to the 2D code described in the above embodiments. The following description is provided based on the 2D code shown in FIG. 6 with an addition of some features according to the present embodiment. Thus, since the 2D code of the present embodiment includes all the features shown in FIG. 6, the following description is provided referring to FIG. 6.

As shown in FIG. 6, a 2D code 130 of the present embodiment also includes the error-correction code blocks 12 as the code blocks 10. The error-correction code blocks 12 are arranged along each of the second borders 6c, 6d of the rectangular region, other than the borders along which the second specific patterns 133, 134 are arranged.

The present embodiment is configured in such a way that the combination of display colors for indicating the individual cells of each of the error-correction code blocks 12 is different from the combination of display colors for indicating the individual cells of each of the data code blocks 11 which are corrected by the error-correction code blocks 12.

The display colors may be variably combined. For example, the cells configuring each error-correction code block 12 may be expressed with a combination of half of all the colors (eight in FIG. 6) used in the 2D code 130, and the cells configuring each data code block 11 may be expressed with a combination of the remaining half of the colors.

As an example of the color combination, each error-correction code block 12 may be expressed using cells whose colors are determined as being dark when an image having predetermined-color components has been acquired. For example, cells of black, red, magenta and blue colors are determined as being dark in an image having green-color components. Thus, each error-correction code block 12 may be expressed using the four differently colored cells, and each data code block 11 may be expressed using the remaining four differently colored cells (white, green, cyan and yellow cells).

In this way, an image of green-color components may be acquired as needed to make the borders clearer. In other words, all of the black, red, magenta and blue cells configuring each error-correction code block 12 appear dark in an image of green-color components. Accordingly, the areas occupied by the error-correction code blocks 12 all appear as dark areas, whereby a clear distinction can be made, in case the background is white or the like, between the dark areas and the background. In the case where the image of the 2D code 130 is picked up using an ordinary color sensor provided with red, green and blue pixels, the image using only the green pixels corresponds to the image of the green-color components mentioned above.

The color combinations described above are given by way of examples only, and thus other combinations may also be used. Alternatively, some colors may be commonly used in both of the combinations. For example, each error-correction code block 12 may be expressed with black, white, red, green and blue cells, and each data code block 11 may be expressed by black, white, cyan, magenta and yellow cells. In this case, black and white cells are used in both of the combinations.

As in the present embodiment, it is convenient to differentiate the display color combination for indicating the individual cells of each error-correction code block 12 from the display color combination for indicating the individual cells of each data code block 11. This is because the display colors of each of the error-correction code blocks 12 used for making a distinction from the background can be set irrespective of the display colors of each of the data code blocks 11, thereby enhancing the degree of freedom of color arrangement for each error-correction code block 12. For example, the error-correction code blocks 12 may have a color arrangement which is advantageous for defining the borders.

Also, similar features may be added to a configuration in which the compressed data code blocks 13 are arranged along the borders. For example, four error-correction code blocks 12 arranged along the second borders 6c, 6d may be replaced by the compressed data code blocks 13 (FIG. 5) which are the same as the ones in the second embodiment, and the data code blocks 11 in the center may be replaced by the error-correction code blocks 12. In such a configuration, the combination of the display colors for expressing the individual cells in each compressed data code block 13 may be differentiated from the combination of the display colors for expressing the individual cells in each error-correction code block 12.

In this case as well, each compressed data code block 13 may be expressed using cells whose colors are determined as being dark when an image having predetermined-color components has been acquired. For example, the cells configuring each compressed data code block 13 may be expressed using black, green, cyan and blue cells, and each error-correction code block 12 may be expressed using the remaining differently colored four cells (white, red, magenta and yellow cells). In this case, an image of red-color components may be acquired as needed to make the borders clearer. In other words, all of the black, green, cyan and blue cells configuring each compressed data code block 13 appear dark in an image of red-color components.

Accordingly, the areas occupied by the compressed data code blocks 13 all appear as dark areas, whereby a clear distinction can be made, in case the background is white or the like, between the dark areas and the background. In the case where the image of the 2D code is picked up using an ordinary color sensor provided with red, green and blue pixels, the image using only the red pixels corresponds to the image of the red-color components mentioned above.

With this configuration, the display colors of each of the compressed data code blocks 13 used for making a distinction from the background can be set irrespective of the display colors of each of the error-correction code blocks 12, thereby enhancing the degree of freedom of color arrangement for each compressed data code block 13. For example, the compressed data code blocks 13 may have a color arrangement which is advantageous for defining the borders.

The above description has exemplified that the features of the present embodiment have been added to the configuration shown in FIG. 6. However, the features of the present embodiment can be added to any of the configurations of the embodiments (e.g., FIG. 8) described above.

Tenth Embodiment

Figure 24A:
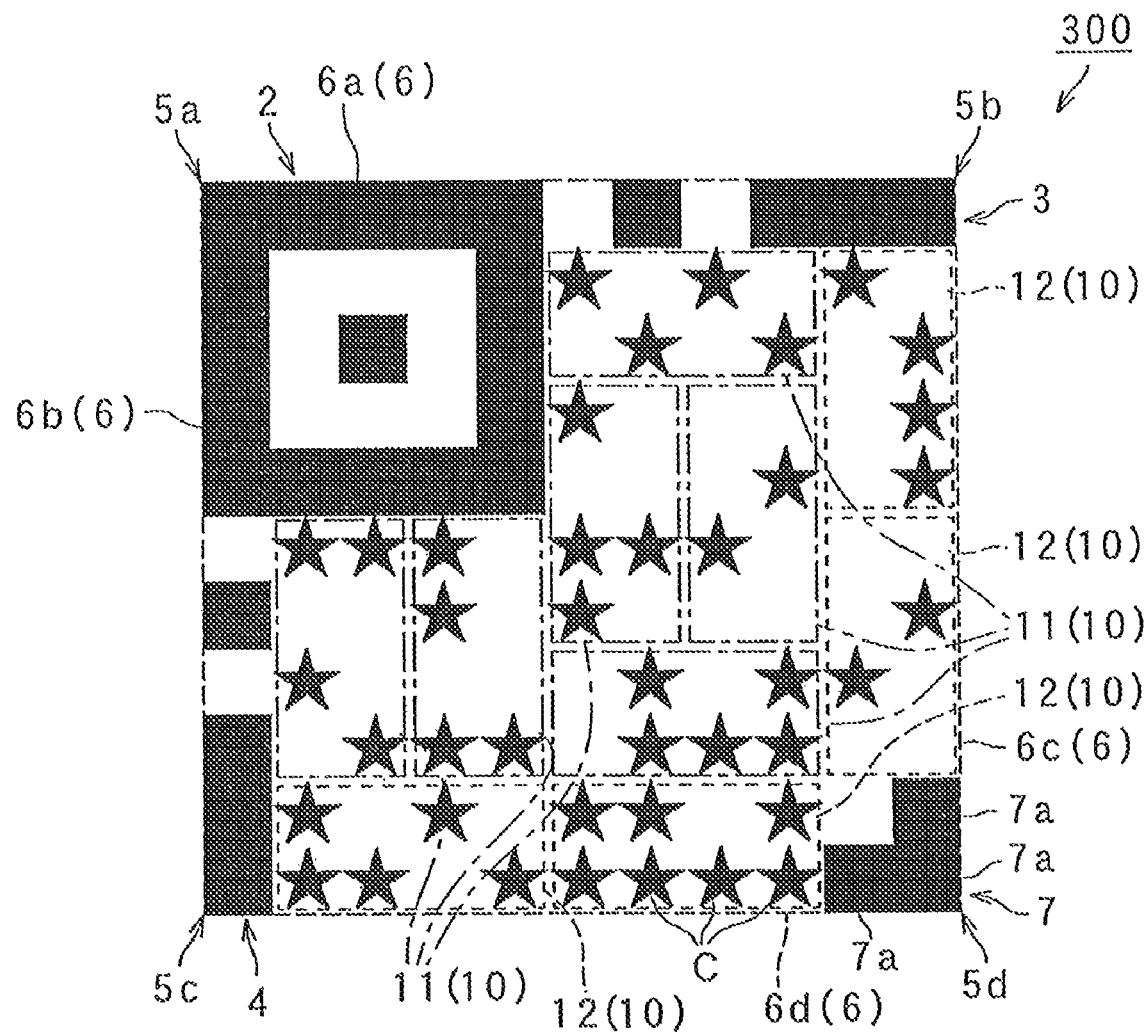
FIG. 24A is a schematic explanatory view illustrating a two-dimensional code, according to a tenth embodiment of the present invention.
Figure 24B:
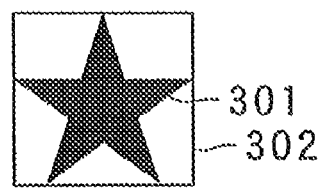
FIG. 24B is an explanatory view illustrating a dark cell of a code block in the two-dimensional code illustrated in FIG. 24A.

Hereinafter is described a tenth embodiment. FIG. 24A is a schematic explanatory view illustrating a 2D code 300, according to a tenth embodiment. FIG. 24B is an explanatory view illustrating a dark cell of a code block in the 2D code 300 illustrated in FIG. 24A.

In the 2D code 300 shown in FIG. 24A, since the first specific pattern 2, the second specific patterns 3, 4 and the end pattern 7 are identical with those explained in the first embodiment shown in FIG. 1, detailed explanation is omitted. In FIG. 24A, portions of the borders 6 occupied by white cells are indicated by broken lines.

The 2D code 300 of the present embodiment is configured including all of the features shown in FIG. 1 and including further additional features. The 2D code 300 of the present embodiment also includes the error-correction code blocks 12 as the code blocks 10 to correct errors. The error-correction code blocks 12 are arranged along each of the second borders 6c, 6d of the rectangular region, other than the borders along which the second specific patterns 3, 4 are arranged.

FIG. 24A specifically shows the structure of cells in each of the code blocks 12. In the present embodiment, each of specific type cells structuring each code block 12 has a pattern shape different from a square shape. In particular, black cells correspond to the "specific type cells". The black cells (specific type cells) in the first specific pattern 2 and the second specific patterns 3, 4 each have a square shape, while the black cells (specific type cells) in the code blocks 10 each have a star shape.

As shown in FIG. 24B, each of the specific type cells (i.e. black cells) in each code block 10 is configured to have a pattern area 301, i.e. a pattern shape, having color, configuration or brightness different from that of the background (in particular, each cell is configured to have white background, for example, and the pattern area 301 filled in with black color). Further, the pattern area 301 is arranged in each cell area of the specific type cell (the black cell) so as to be located at edge positions of the cell area. In FIG. 24B, the edge positions of the specific type cell (the black cell) having the pattern area 301 are provided on a rectangular outline 302, and the pattern area 301 is provided in the cell area, with the ends of the pattern area 301 reaching these edge positions. However, the ends of the pattern area 301 may be located in the vicinities of the edge positions. For example, the sharp ends of the star-shaped pattern area 301 of FIG. 24B may not necessarily reach the edge positions, but may be located in the vicinities of the edge positions, being slightly apart therefrom.

In the above example, a star shape has been exemplified as "a pattern shape different from a squared shape". This however is not intended to impose a limitation, but the pattern area may have various shapes, including triangle, crescent and rhombic shapes.

Figure 25:
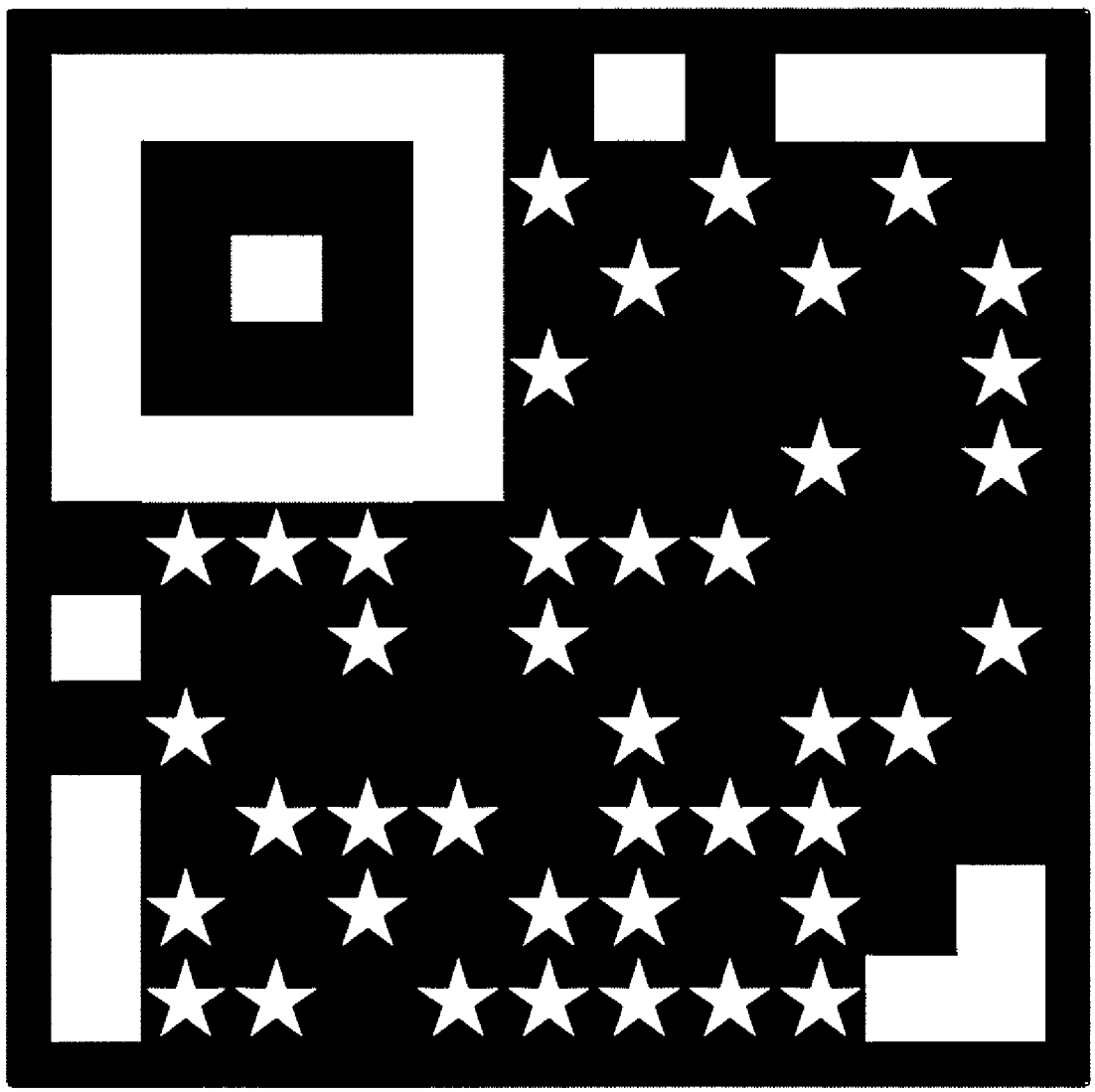
FIG. 25 is an explanatory view illustrating another example of a two-dimensional code, according to the tenth embodiment.

Also, black cells have been exemplified as the specific type cells. However, as shown in FIG. 25, white cells may be used as the "specific type cells". The configuration shown in FIG. 25 is an inversion of the configuration shown in FIG. 24A, and thus has a black background.

In the configuration, as well, where the compressed data code blocks 13 are arranged along the second borders 6c, 6d, as shown in FIG. 5, specific type cells (e.g., black cells) in the code blocks 10 may each have a shape different from a squared shape (e.g., star or triangle shape).

According to the present embodiment, the following advantages, for example, may be enjoyed.

Specifically, being given a pattern shape different from a square shape, the specific type cells in the rectangular region can have an innovative shape different from a square shape, whereby design flexibility may be effectively enhanced.

Also, the black cells (specific type cells) in the first specific pattern 2 and the second specific patterns 3, 4 have a square shape, while the black cells (specific type cells) in the code blocks 10 have a pattern shape different from the square shape. With this configuration, as to the first specific pattern 2 and the second specific patterns 3, 4, correct definition of the shapes may be facilitated owing to the square cells. Also, these square specific patterns may advantageously serve as references of the rectangular region and the cell positions. As to the code blocks 10, design flexibility may be enhanced by the pattern shape imparted to the specific type cells.

Further, a pattern shape, which can be more highlighted, is used for each of the cells whose saturation, hue, or lightness is different from that of the background (white background in FIG. 24, black background in FIG. 25). In addition, as shown in FIG. 24B, in each specific type cell in each code block 10, the pattern area 301 that is a pattern shape is ensured to have saturation, hue, or lightness different from that of the background. Further, the pattern area 301 is arranged at the edge positions (positions at the rectangular outline 302) of each specific type cell area. With this configuration, the borders 6 can be defined using the pattern areas 301 provided in the error-correction code blocks 12 which are arranged along the borders 6. Also, since each pattern area 301 is located occupying the edge positions of each cell area, portions whose saturation, hue, or lightness is different from that of the background can be appropriately arranged along the borders 6. The same advantages may be obtained when the pattern area 301 is located in the vicinities of the edge positions of each cell area.

Eleventh Embodiment

Hereinafter is described an eleventh embodiment.

Figure 26:
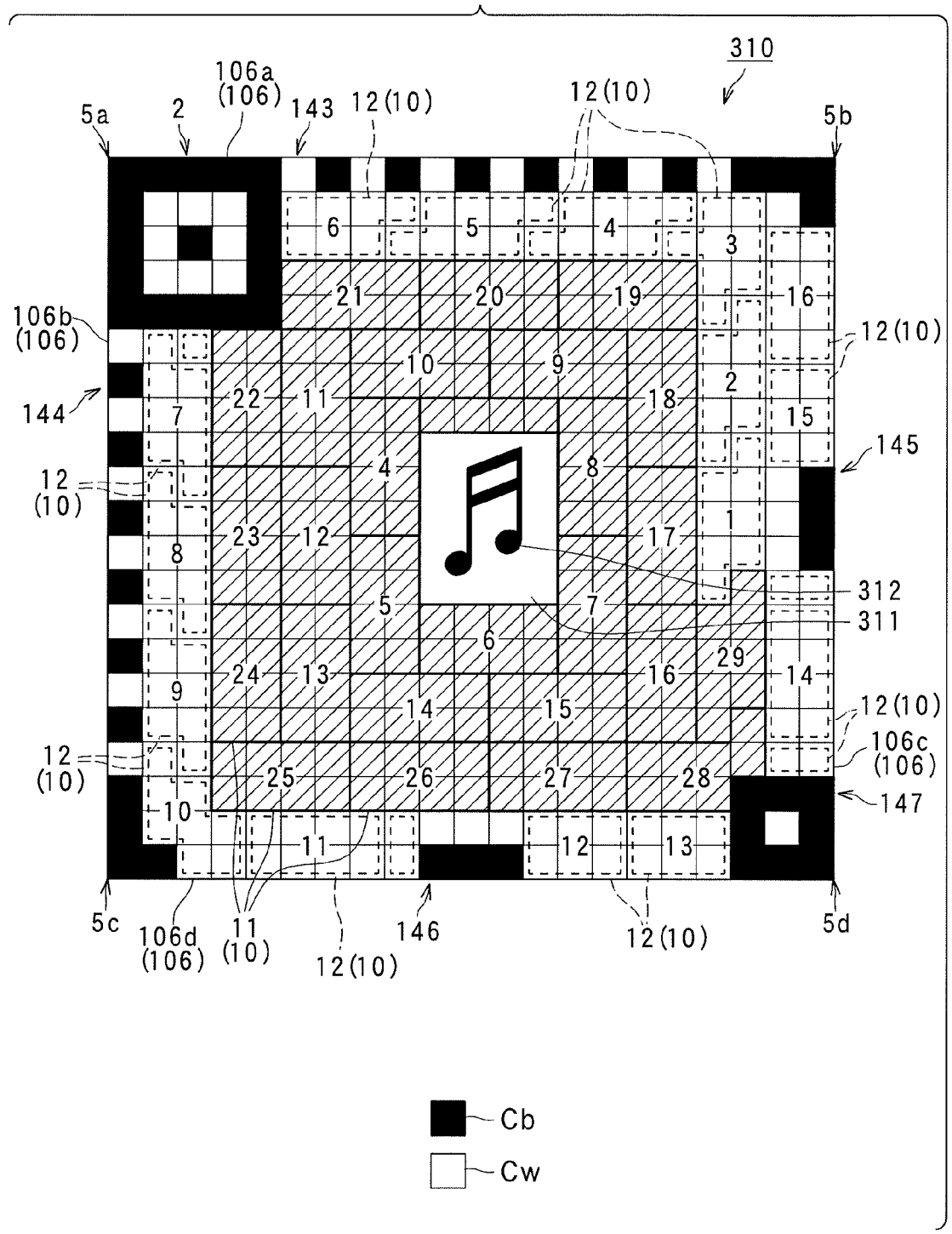
FIG. 26 is a schematic explanatory view illustrating an example of use of a two-dimensional code, according to an eleventh embodiment of the present invention.

FIG. 26 is a schematic explanatory view illustrating a 2D code 310 according to the eleventh embodiment. The 2D code 310 shown in FIG. 26 is configured including all the features of the 2D code 140 shown in FIG. 7, with the addition of further features in the center portion of the code region of the 2D code shown in FIG. 7. In FIG. 26, detailed explanation is omitted as to the portions configured in the same manner as in the 2D code shown in FIG. 7.

The 2D code 310 of the present embodiment also includes, as the code blocks 10, the error-correction code blocks 12 for correcting errors. Of the borders 106 of the rectangular region, the second borders 106c, 106d other than the borders where the second specific patterns 143, 144 are arranged, are provided with the error-correction code blocks 12 so as to extend along the borders 106c, 106d.

Figure 27A:
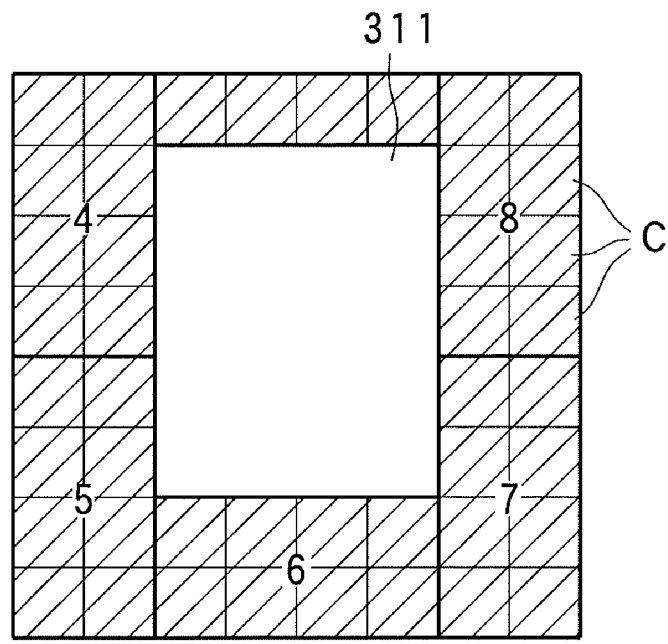
FIG. 27A is an explanatory view illustrating a vicinity of a pattern insertion area of the two-dimensional code illustrated in FIG. 26.

Further, in the 2D code 310 shown in FIG. 26, a pattern insertion area 311 is provided in the code region, for inserting a pattern different from that of the cells "C". The pattern insertion area 311 is configured as shown in FIG. 27A. The 2D code 310 is configured for use with the insertion of various patterns, such as the one shown in FIG. 27B (musical note pattern 312) or characters or symbols, into the pattern insertion area 311.

Figure 27B:
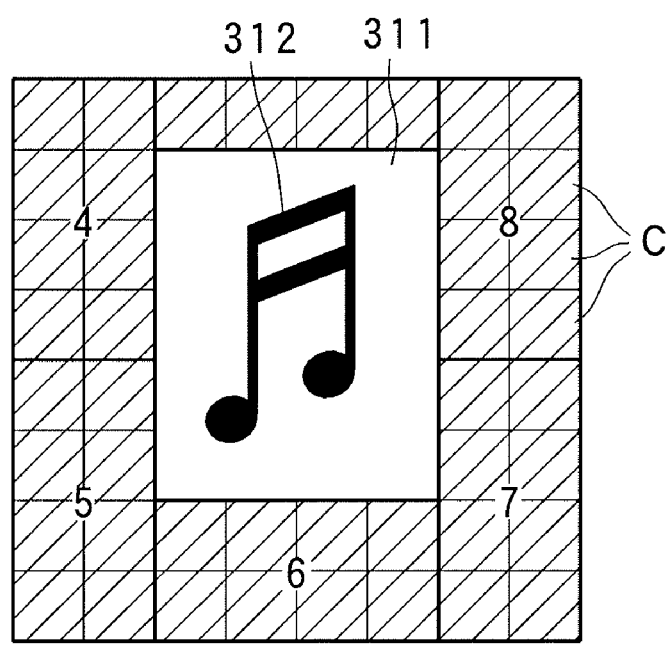
FIG. 27B is an explanatory view illustrating a state where a pattern has been inserted into the two-dimensional code illustrated in FIG. 27A.

As shown in FIG. 27A, the pattern insertion area 311 is configured to have an area which is larger than each cell "C", and to be arranged over a plurality of cells in the code blocks 10. In FIG. 27A, the pattern insertion area 311 is configured being filled in with white color. FIG. 27B shows an example in which the musical note pattern 312 is recorded on the white pattern insertion area 311.

As in the configuration of the present embodiment, providing the pattern insertion area 311 in the rectangular region may enable insertion of a pattern other than patterns of the cells into the rectangular region, whereby design flexibility can be effectively enhanced. In particular, the pattern insertion area 311 is configured to have an area larger than each cell size and to be provided over a plurality of cells in the code blocks 10. Accordingly, a large pattern insertion area can be ensured, so that the code user can be more impressed.

The example shown in FIG. 27A exemplifies the pattern insertion area 311 which is filled in with white color. Alternative to this, it may be so configured that the entire pattern insertion area 311 including the edges is different from the adjacent cells "C" at least in any of saturation, hue, or lightness. For example, the entire color of the pattern insertion area 311 of FIG. 27B may be differentiated from the colors used for the code blocks 10 of the 2D code 310 shown in FIG. 26. Thus, when the cells in the code blocks 10 are expressed by black, white, red, green, blue, yellow, cyan and magenta colors, the pattern insertion area 311 may be ensured to have a single color (e.g. orange) different from these colors.

In this way, the pattern insertion area 311 may be configured with its entirety, including the edges, being differentiated from the adjacent cells at least in saturation, hue, or lightness. With this configuration, the pattern insertion area 311 can be clearly distinguished from the adjacent cells, whereby the pattern insertion area 311 may be more highlighted.

Figure 28:
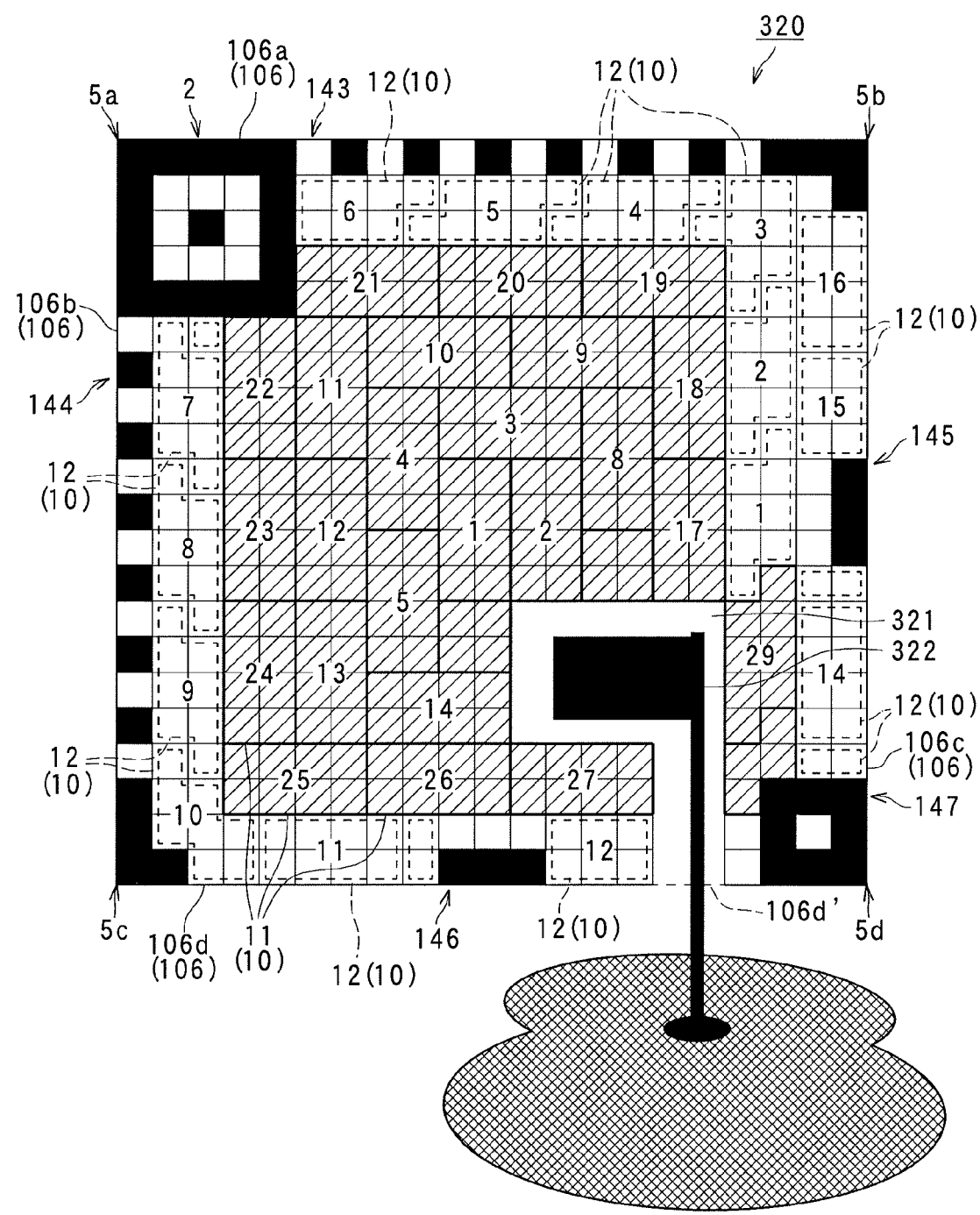
FIG. 28 is an explanatory view illustrating an example of use of a first modification of the two-dimensional code, according to the eleventh embodiment.
Figure 29:
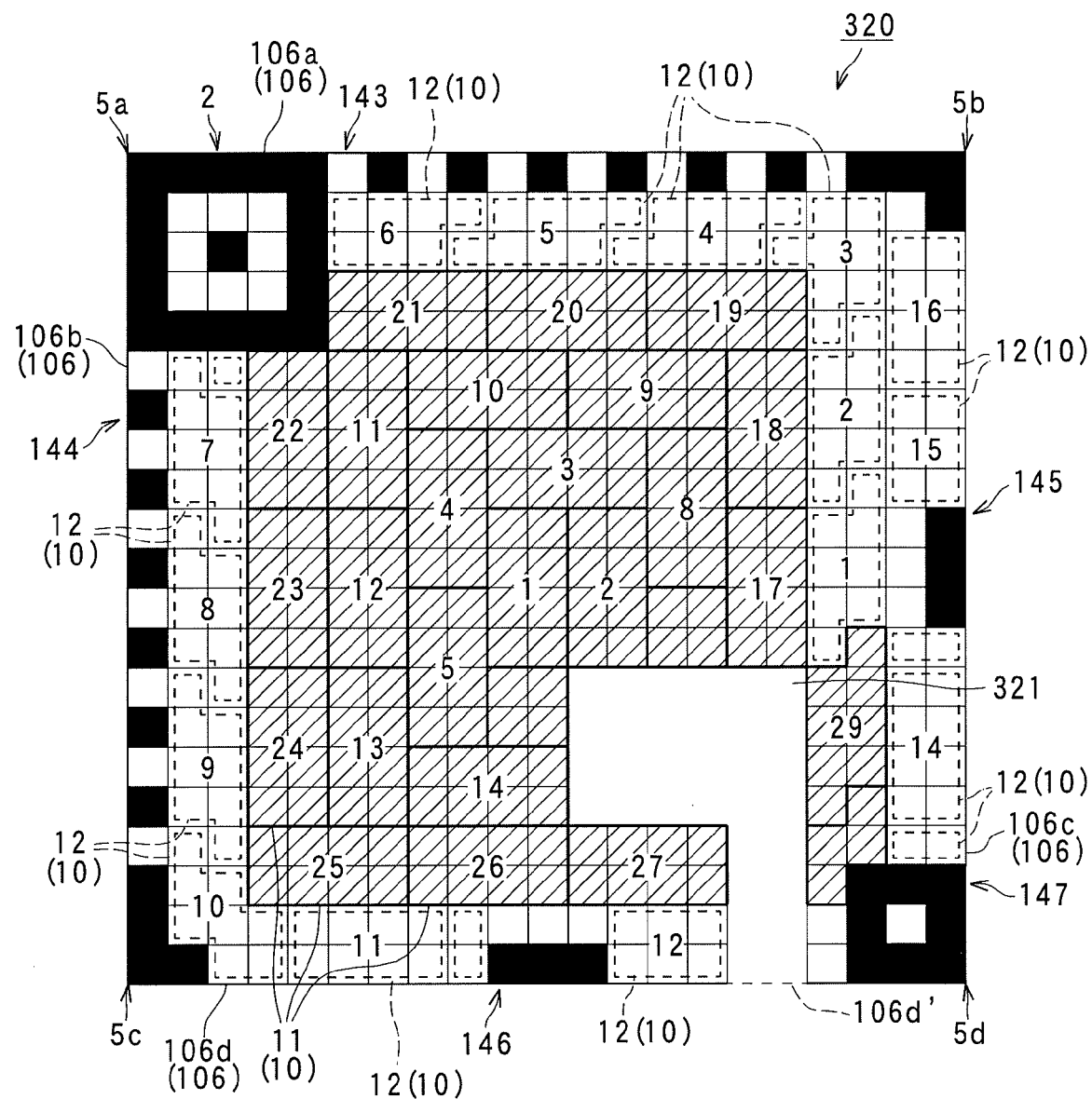
FIG. 29 is a schematic explanatory view illustrating the first modification of the two-dimensional code, according to the eleventh embodiment.

As shown in FIGS. 28 and 29, a part of the pattern insertion area may constitute a portion of a border of the rectangular region. A 2D code 320 shown in FIGS. 28 and 29 is different from the 2D code shown in FIG. 26 in that the pattern insertion area is differently positioned and shaped. Other portions are configured in the same manner as in FIG. 26.

As shown in FIG. 29, the 2D code 320 is configured to have a white colored pattern insertion area 321, with a portion of the pattern insertion area 321 extending along a portion of a border (second border 106d) of the rectangular region. FIG. 28 shows an example of usage of such 2D code 320. Particularly, in FIG. 28, a portion of a pattern 322 extending from the inner side to the outer side of the code region is drawn in the pattern insertion area 321.

In the example shown in FIG. 29, the line connecting the outer edge of the end pattern 144a and the outer edge of the end pattern 147 is defined as the second border 106d. Meanwhile, a portion of the pattern insertion area 321 is ensured to extend along a portion of the second border 106d. In FIGS. 28 and 29, a reference symbol 106d' indicates the portion of the edge of the pattern insertion area 321, which extends along the portion of the second border 106d.

Thus, as shown in FIG. 29, the pattern insertion area 321 may be configured so that a portion thereof may extend along a portion of the borders of the rectangular region. With this configuration, a pattern extending from the inner side to the outer side of the rectangular region may be readily inserted into the rectangular region, thereby enhancing the degree of freedom of design.

Figure 30A:
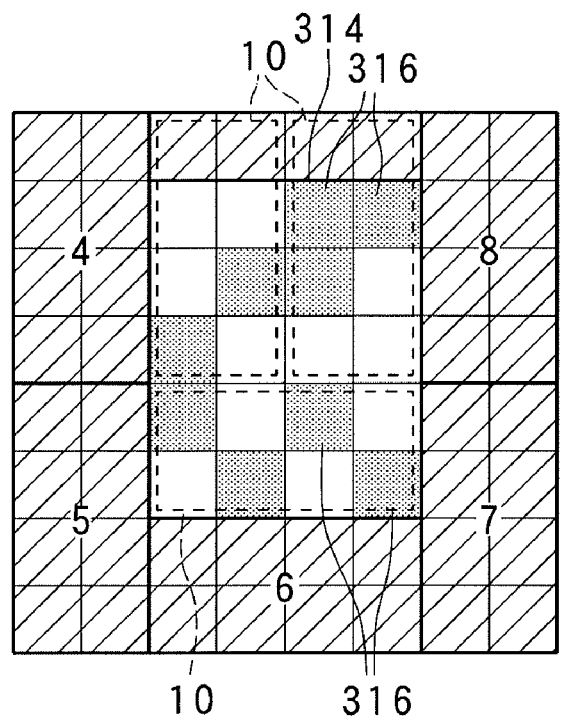
FIG. 30A is an explanatory view illustrating a vicinity of a pattern insertion area of a second modification of the two-dimensional code, according to the eleventh embodiment.
Figure 30B:
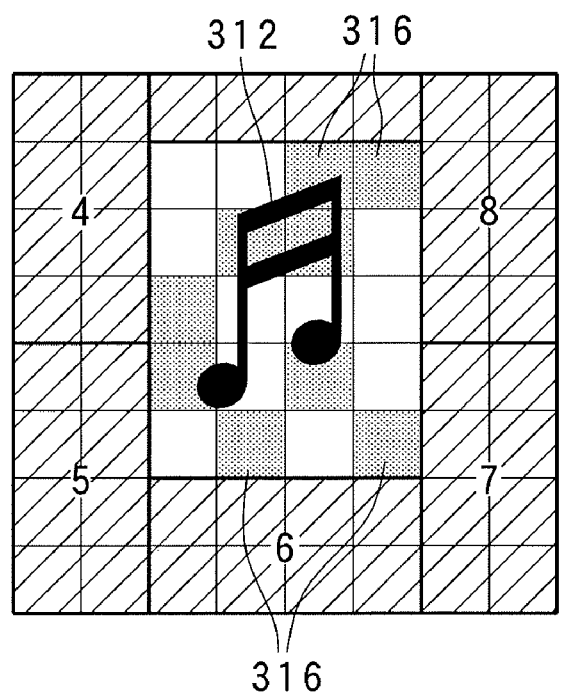
FIG. 30B is an explanatory view illustrating a state where a pattern has been inserted into the two-dimensional code illustrated in FIG. 30A.

The insertion area may be configured as shown in FIGS. 30A and 30B. FIG. 30A shows a modification of the pattern insertion area and FIG. 30B shows an example of usage of such a pattern insertion area. In this example, a pattern insertion area 314 is provided overlapping the code blocks 10. In addition, at least in a portion of the pattern insertion area 314, definition may be ensured for the cell areas of the code blocks 10 overlapped by the pattern insertion area 314. It should be appreciated that FIGS. 30A and 30B specifically show the configuration of the cells only within the pattern insertion area 314, and the specific configuration of the cells outside the pattern insertion area 314 is omitted.

In FIG. 30A, the code blocks 10 overlapped by the pattern insertion area 314 are indicated by broken lines, and a portion of the cells structuring the code blocks 10 are arranged so as to be defined in the pattern insertion area 314 as well. In other words, the pattern insertion area 314 configures a portion of the code blocks 10, and thus is divided into cell areas 316 corresponding to the respective cells in the code blocks 10. The cell areas 316 are configured in a mode corresponding to data to be displayed by the code blocks 10, whereby at least a portion of the cell areas 316 are adapted to be defined.

In the example shown in FIGS. 30A and 30B, the code blocks 10 are expressed by dark cells and bright cells. Of the plurality of cell areas 316 in the pattern insertion area 314, those areas which are to be indicated as dark cells are ensured to have slightly lower saturation than the saturation of dark cells outside the pattern insertion area 314 (e.g., than the saturation of the black cells in the first specific pattern 2). On the other hand, of the plurality of cell areas 316, those areas which are to be indicated as bright cells are indicated with white color similar to the cells outside the pattern insertion area 314. As a result, the portion of the pattern insertion area 314 can also serve as a data display area. Thus, while design flexibility is enhanced, the data display area can be effectively retained.

The above examples have exemplified a musical note pattern and the like as the pattern to be inserted into the pattern insertion area. However, these patterns are not intended to impose a limitation, but various other patterns, such as figures, characters or symbols, as well as combinations of the foregoing, may be inserted. Also, the shape of the pattern insertion area may not be limited to a square shape or the like, but may take various other shapes, such as circular shapes, star shapes or heart shapes. In any of the pattern insertion areas, the edges of the pattern insertion area may be indicated by a thick solid line or a color line other than black, in order to clearly define the pattern insertion area.

Each of the pattern insertion areas 311, 321 and 314 described above is configured as an area where errors are corrected by the error-correction code blocks 12. For example, the pattern insertion area 314 is an area configuring a portion of the code blocks 10. Thus, the cell areas 316 are configured in a mode corresponding to data to be displayed by the code blocks 10. Accordingly, as shown in FIG. 30A, in the state where no pattern is recorded, the area will be read out as a portion of the code blocks 10. On the other hand, as shown in FIG. 10B, in the state where a pattern is recorded, a portion of the cell areas in the pattern insertion area 314 turns to a mode different from the mode corresponding to data (i.e. error state). Thus, when this portion of the cell areas is read out, error correction is carried out.

Figure 31:
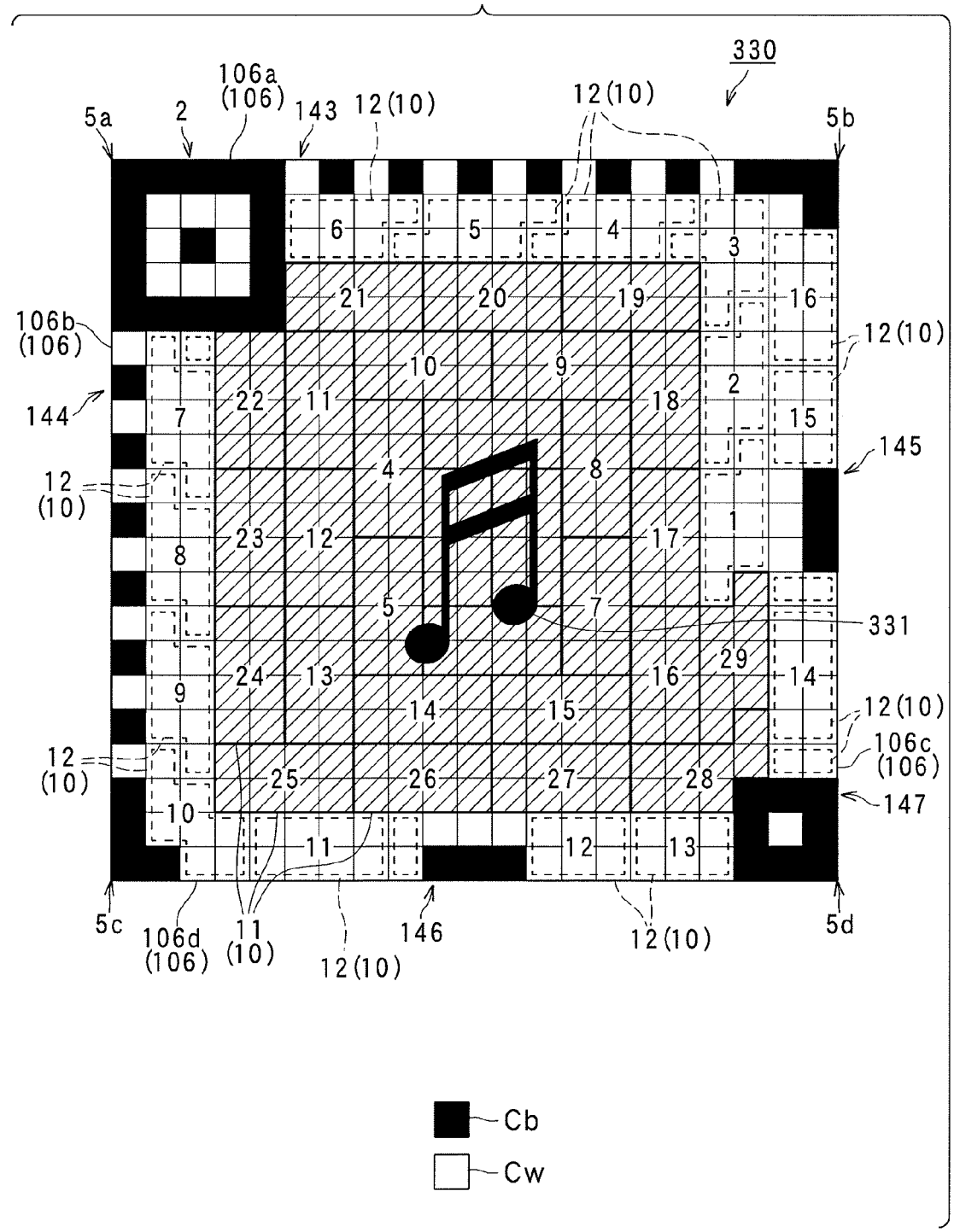
FIG. 31 is a schematic explanatory view illustrating a third modification of the two-dimensional code, according to the eleventh embodiment.

The 2D code may also be configured as shown in FIG. 31. A 2D code 330 shown in FIG. 31 is also configured including all the features of the 2D code 140 shown in FIG. 7, with the addition of further features in the center portion of the code region of the 2D code shown in FIG. 7. The 2D code 330 shown in FIG. 31 is different from the one shown in FIG. 7 in that a pattern portion 331 designed differently from the patterns of the cells is provided in the rectangular region. Other portions are configured in the same manner as in the 2D code shown in FIG. 7, and thus detailed explanation will be omitted.

The pattern portion 331 shown in FIG. 31 has a musical note pattern and is arranged over a plurality of cells of the code blocks 10. With this configuration, design flexibility within the rectangular area can be effectively enhanced.

In the example shown in FIG. 31, the pattern portion 331 is configured by a musical note pattern. Alternative to this, the entire pattern portion 331 including the edges may be ensured to be different from the adjacent cells at least in any of saturation, hue, or lightness. For example, the entire color of the pattern portion 331 of FIG. 31 may be ensured to be different from the colors used for the code blocks 10. Thus, when the cells in the code blocks 10 are expressed by black, white, red, green, blue, yellow, cyan and magenta colors, the pattern portion 331 may be ensured to have a single color (e.g. orange) different from these colors. In this way, the pattern portion 331 can be clearly distinguished from the cells adjacent thereto, whereby the pattern portion 331 can be more highlighted.

Figure 32:
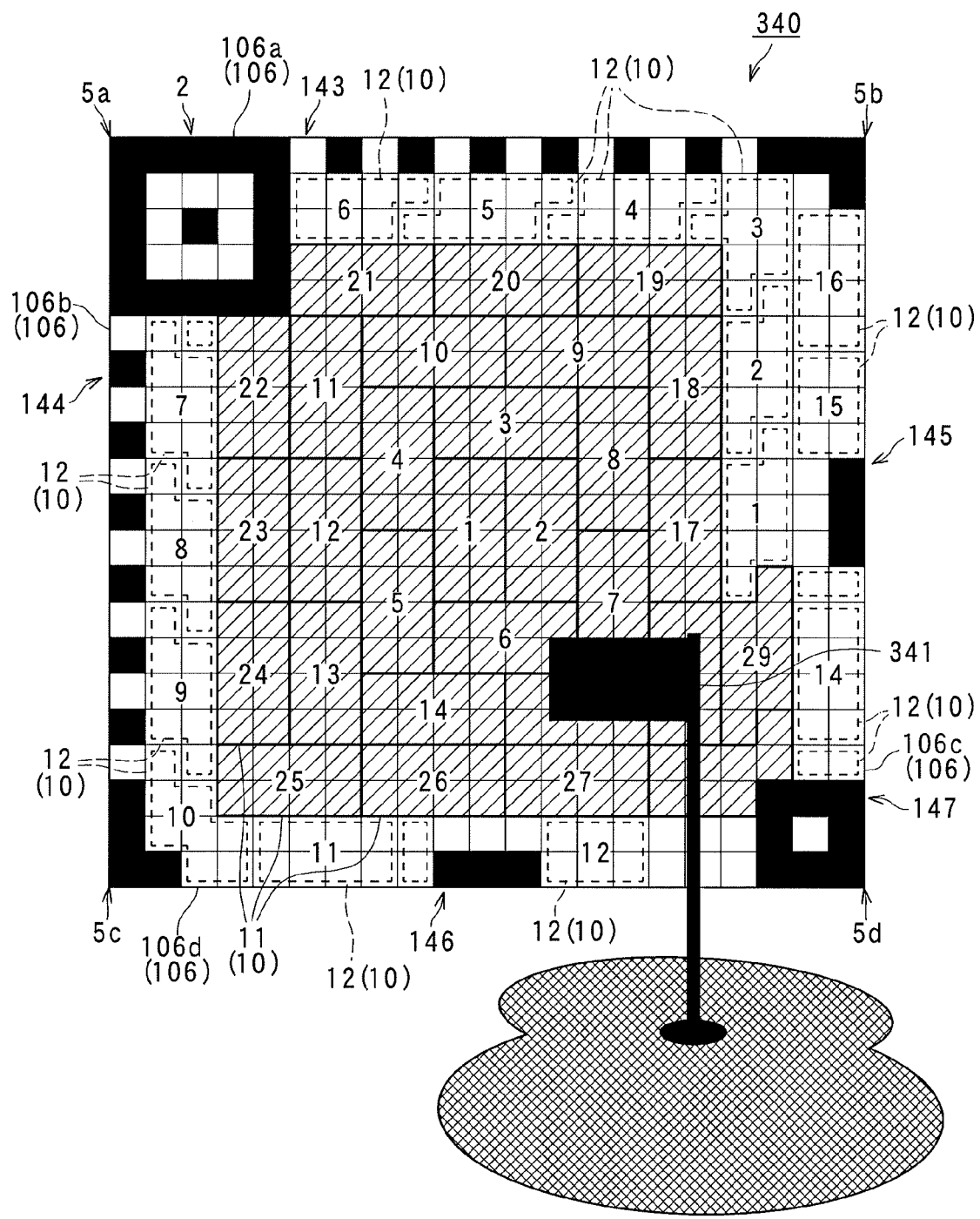
FIG. 32 is a schematic explanatory view illustrating a fourth modification of the two-dimensional code, according to the eleventh embodiment.

As shown in FIG. 32, a pattern portion 341 may be provided so as to extend from the inner side to the outer side of the rectangular region. With this configuration, design flexibility may be enhanced using not only the inside but also the outside of the rectangular region. A 2D code 340 shown in FIG. 32 is also different from the 2D code shown in FIG. 7 in that the pattern portion 341 is provided. Other portions are configured in the same manner as in FIG. 7, and thus detailed explanation will be omitted.

Figure 33:
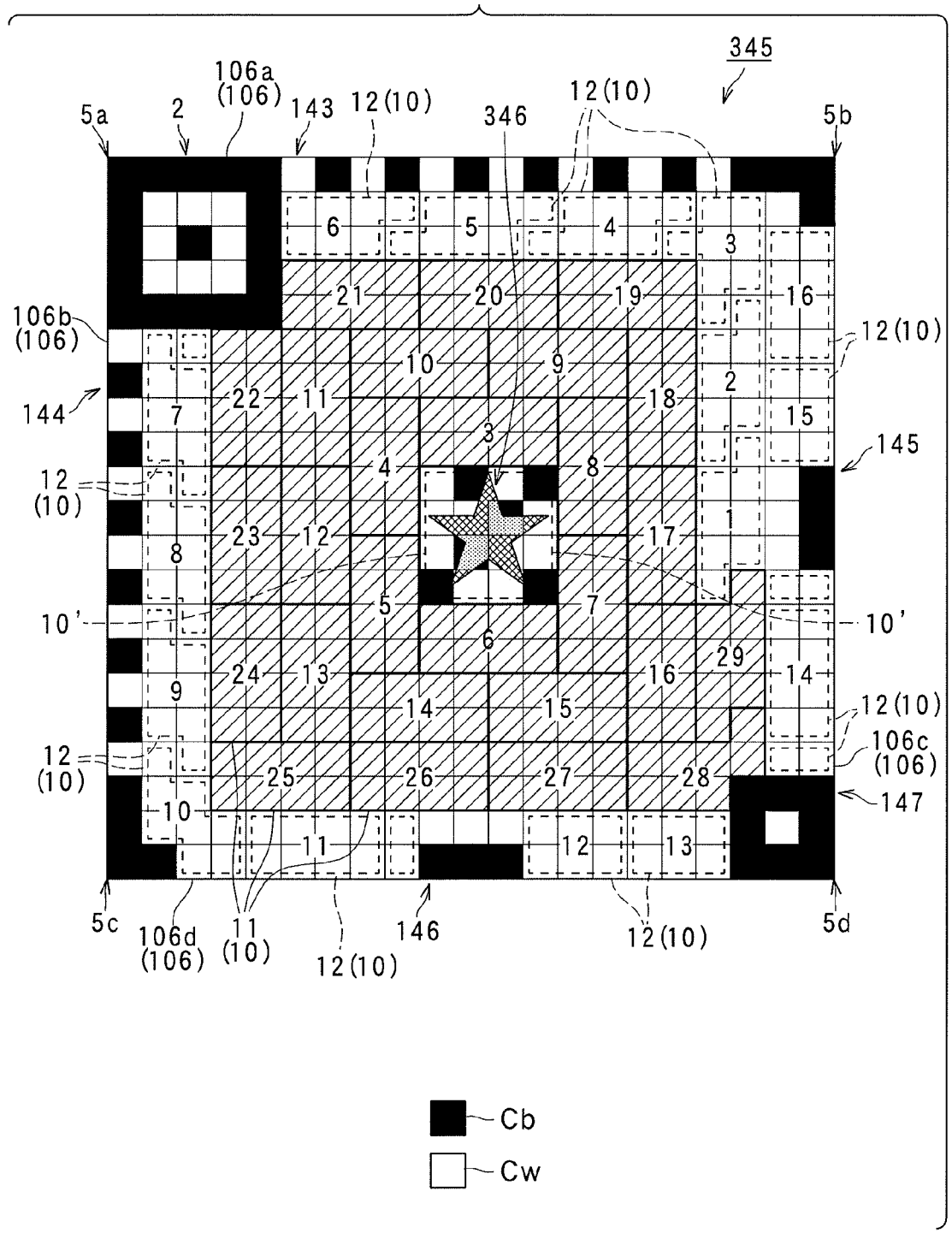
FIG. 33 is a schematic explanatory view illustrating a fifth modification of the two-dimensional code, according to the eleventh embodiment.

As in a 2D code 345 shown in FIG. 33, a pattern portion 346 may be arranged overlapping the code blocks 10. In addition, it may be so configured that, at least in a portion of the pattern portion 346, definition may be made for the cell areas of the code blocks 10 overlapped by the pattern portion 346. In FIG. 33, the code blocks overlapped by the pattern portion 346 are indicated by broken lines 10'. Also, in FIG. 33, a portion of the cells structuring the code blocks 10 are arranged so as to be defined in the pattern portion 346 as well.

Specifically, the pattern portion 346 is provided as an area constituting a portion of the code blocks 10, and the area within the pattern portion 346 is divided into cell areas corresponding to the cells structuring the code blocks 10. Further, at least a portion of the cell areas in the pattern portion 346 is configured in a mode corresponding to data to be indicated by the code blocks 10. Thus, at least a portion of the cell areas are ensured to be defined.

In the example shown in FIG. 33, the code blocks 10 are expressed by dark cells and bright cells. Of the cell areas in the pattern portion 346, those areas which are to be indicated as dark cells are ensured to have slightly lower saturation than the saturation of dark cells outside the pattern portion 346 (e.g., than the saturation of the black cells in the first specific pattern 2). On the other hand, of the cell areas in the pattern portion 346, those areas which are to be indicated as bright cells are set to have saturation considerably lower than that of the above areas to be indicated as dark cells. As a result, the areas to be indicated as dark cells can be clearly distinguished from the areas to be indicated as bright cells. Thus, the cell areas in the pattern portion 346 are ensured to be defined.

In this way, the cell area (area for displaying cells) in the pattern portion 346 may be configured in a mode corresponding to data. Thus, a part of the pattern portion 346 can also serve as a data display area. Accordingly, while ease of design is enhanced, the data display area can be effectively retained.

Each of the examples shown in FIGS. 31 to 33 has exemplified a pattern portion having a musical note pattern or the like. However, these examples are not intended to impose a limitation, but the pattern portion may include various other patterns, such as figures, characters or symbols, as well as combinations of the foregoing.

Twelfth Embodiment

Hereinafter will be described a twelfth embodiment. A 2D code of the present invention has further features in addition to the ones explained in the above embodiments. The following description is given, taking as an example the 2D code shown in FIG. 1, with an addition of features related to the present embodiment. The 2D code of the present embodiment is different from the 2D code shown in FIG. 1 only in the configuration of the code blocks. Other portions are configured in the same manner as in FIG. 1.

The 2D code of the present embodiment has composite data including: data to be decoded (hereinafter referred to "to-be-decoded data") with an information volume corresponding to "N" bits in terms of binary number; and error-detection data with an information volume corresponding to "M" bits in terms of binary number. The composite data are expressed by "Y" number of cells of "X" number of types, satisfying a relation expressed by a formula $X^{Y-1} < 2^N \times 2^M < X^Y$.

The bit number of the to-be-decoded data may be variably set. For example, in the case where a data code block is produced per every eight bits, as is often the case, information that can be expressed by data code block units is $2^8=256$ at the most in white-black binary expression.

The binary data as mentioned above can reduce the number of cells to be needed, with the use of multiple colors for the expression of the data. In this regard, let us assume a case where the above 8-bit information (i.e. the information of $2^8=256$) is to be expressed by five differently colored cells. Since the information that can be expressed by three cells, for example, corresponds to $5^3=125$, the 256 information (i.e. the 8-bit binary data) cannot be expressed by three cells. On the other hand, the information that can be expressed using four cells out of five differently colored cells corresponds to $5^4=625$. Therefore, when 8-bit binary data is to be expressed by five differently colored cells, four cells will suffice the purpose.

On the other hand, since the information volume that can be expressed by four cells out of five differently colored cells is 625, 9-bit binary data shown in FIG. 34A, resulting from addition of one bit, may also be expressed by four cells out of five differently colored cells (i.e. $2^9(=512) < 5^4(=625)$). Thus, the present embodiment expresses the composite data with the use of five types of cells, the composite data including to-be-decoded data of 8-bit information volume in binary number and error-detection data of 1-bit information volume in binary number.

To apply this relation to the above formula, since N=8, M=1 and X=5, the composite data may be expressed by "Y" number of cells that satisfy $5^{Y-1} < 2^8 \times 2^1 < 5^Y$. Since "Y" that satisfies this relation is "4", the relation proves the above explanation. In this way, the data that may detect errors can be efficiently expressed by less number of cells, thereby enabling error detection in particular for every code block.

FIG. 34B shows a case where eight differently colored cells are used. In this case as well, the number of cells to be needed can be calculated in the similar manner. In FIG. 34B, to-be-decoded data corresponds to eight bits in binary number, while error-detection data corresponds to one bit in binary number. Specifically, FIG. 34B shows a case where the composite data, i.e. 9-bit composite data, is expressed by eight differently colored cells. To apply this case to the above formula, since N=8, M=1 and X=8, the value of "Y" (i.e. "3") that satisfies $8^{Y-1}<2^8\times 2^1<8^Y$ is set as the number of cells to be needed. Thus, as shown in FIG. 34B, the composite data can be expressed by three cells.

The error-detection data may have two or more bits, and the number of bits in to-be-decoded data may also be different from the above number of bits (e.g. sixteen bits).

Also, the 2D code may be produced using the following method. The producing processes of the method may be executed using information processors, such as a personal computer. In the producing processes, to-be-decoded data to be encoded is acquired first. This acquiring process corresponds to an example of an "acquiring step". For example, the user may input to-be-decoded data into the information processor, or to-be-decoded data may be inputted from an external unit, for example, so that the information processor can acquire the to-be-decoded data.

Then, the structure and arrangement of cells for a first specific pattern and a second specific pattern are determined. This determining process corresponds to an example of a "specific pattern producing step". For example, the user may optionally select a model number for each of the first and second specific patterns (e.g., the first specific pattern 2 and the second specific patterns 3, 4 as shown in FIG. 1) and the patterns as selected may be produced. Alternatively, the first and second specific patterns may be produced using automatic processing according to the acquired amount of data or the like.

Then, the structure and arrangement of cells in each code block are determined based on the to-be-decoded data acquired at the "acquiring step". This determining process corresponds to an example of a "code block producing step". In particular, as has been described referring to FIGS. 34A, 34B, the acquired to-be-decoded data is divided into data sets each having a size corresponding to an N-bit (e.g., 8-bit) information volume in binary number. At the same time, error-detection data, i.e. M-bit (e.g., 1-bit) information volume in binary number is added to each of the divided sets of the to-be-decoded data to thereby produce composite data sets. Then, the structure and arrangement of cells in each code block are determined so that each of the composite data sets can be expressed by "Y" number of cells of "X" number of types, which satisfy the relation $X^{Y-1}<2^N\times 2^M<X^Y$. The number of types of the cells for expressing each composite data set may be ensured to be optionally inputted by the user, or may be a predetermined number. Alternatively, the number of types may be set for every model number, so that when a model number is selected, the number of types according to the selected model can be used.

A plurality of code blocks produced in this way are arranged in the code region according to a predetermined order and arrangement (e.g., according to the order and arrangement determined by the selected model number).

Thirteenth Embodiment

Hereinafter is described a thirteenth embodiment. FIGS. 35A to 35E are schematic explanatory views illustrating examples of a 2D code according to the thirteenth embodiment. FIG. 36 is an explanatory view illustrating a relationship between a ratio sum and a code size. FIG. 37 is an explanatory view illustrating a relationship between the size of a 2D code and a proper ratio of an end pattern.

In each of 2D codes 410, 420, 430, 440 and 450 of the present embodiment, the error-correction code blocks 12 for performing correction are included as the code blocks 10. In each 2D code, of the borders in the rectangular region, the second borders 6c, 6d other than the borders along which the second specific patterns 3, 4 are arranged, are provided with the error-correction code blocks 12, being extended thereal-ong.

On the other hand, in the 2D codes 410, 420, 430, 440 and 450 of the present embodiment, end patterns 417, 427, 437, 447 and 457 are arranged, respectively, at the corner 5d diagonal to the specified corner 5a so that the corner 5d can be defined. Each of the end patterns 417, 427, 437, 447 and 457 is arranged along both the second borders 6c, 6d. Thus, the outer edge of each of the end patterns can define the position of the corner in the rectangular region.

Further, the proper ratios of the end patterns 417, 427, 437, 447 and 457 are specified in advance for the 2D codes 410, 420, 430, 440 and 450, respectively, of variety of sizes. FIG. 37 shows examples of such specification. For example, 9×9 size is correlated to ratio 1:1, 11×11 size, to 1:2, 13×13 size, to 2:2, and 15×15 size, to 1:3. In other words, when the ratio of the end pattern is 1:1, its size can be specified to 9×9. Similarly, when the ratio of the end pattern is 1:2, its size can be specified to 11×11, and when the ratio of the end pattern is 2:2, its size can be specified to 13×13.

Each proper ratio indicates the ratio between the vertical and horizontal lengths of the end pattern (in other words, the ratio between the number of cells in the vertical and horizontal directions). For example, the 9×9 size 2D code 410 shown in FIG. 35A has the end pattern 417 formed by a single black cell. Therefore, both of the vertical and horizontal lengths of this cell correspond to the vertical and horizontal lengths of one cell. Accordingly, the ratio between the vertical and horizontal directions is 1:1.

In the present embodiment, the direction along one vertical border at which an end pattern is located is referred to as a vertical direction, and the direction along the other horizontal border at which the same end pattern is also located is referred to as a horizontal direction.

Also, the 11×11 size 2D code 420 shown in FIG. 35B has the end pattern 427 structured by two horizontally juxtaposed black cells. Therefore, the vertical length corresponds to one cell and the horizontal length corresponds to two cells. Accordingly, the ratio between the vertical and horizontal lengths is 1:2. The ratio is set in the same manner as to other end patterns 437, 447 and 457.

When the proper ratio of an end pattern for each code size is expressed by C1:C2 (C1 and C2 are variables of natural numbers) which can be varied for every code size, sum of C1 and C2, i.e. C1+C2, is ensured to become larger as the code size is increased. For example, the proper ratio of the end pattern 417 in the 2D code 410 shown in FIG. 35A is 1:1, and thus C1=1 and C2=1. Accordingly, the sum of C1 and C2, i.e. C1+C2, (hereinafter also referred to as "ratio sum") is "2". Also, the proper ratio of the end pattern 427 in the 2D code 420 shown in FIG. 35B is 1:2, and thus C1=1 and C2=2. Accordingly, the sum of C1 and C2, i.e. C1+C2, is "3".

The ratio sums C1+C2 similarly obtained for the end patterns 437, 447 and 457 in the 2D codes 430, 440 and 450, respectively, are "3", "4" and "4". Thus, as the code size is increased, the ratio sum C1+C2 is ensured to become larger.

End patterns for code sides 19×19, 21×21, 23×23, 25×25 and 27×27 can be structured, for example, as shown in FIG. 36. For these end patterns as well, the ratio sum C1+C2 is ensured to become larger as the code size is increased.

In the examples shown in FIG. 36, each of the end patterns in the 23×23 and 25×25 size codes has an "L" shape in which the cells are arranged along the borders forming the corner in the rectangular region. Forming the end patterns in this way can facilitate recognition of the proper ratio, and can also facilitate definition of the borders forming the corner in the rectangular region.

With the configuration of the present embodiment, the end pattern can be used not only for detecting the end position of the rectangular region but also for detecting the size of the code. Also, since the ratio sum C1+C2 is ensured to become larger with the increase of the size of the code, the proper ratio may be indicated with an end pattern whose size is appropriate for the code size. Thus, a small-size code, for example, may be prevented from being allocated with an excessively large end pattern that will reduce the data areas. In this way, data areas may be readily retained in an appropriate manner.

In the invention, the end pattern is arranged along the borders forming a corner in the rectangular region to have an "L" shape.

Fourteenth Embodiment

Hereinafter is described a fourteenth embodiment. A 2D code of the present embodiment has further features in addition to the ones explained in the above embodiments. The following description is given, taking as an example the 2D code shown in FIG. 1, with an addition of features related to the present embodiment. Since the 2D code of the present embodiment includes all the features of the 2D code shown in FIG. 1, the following description will be given referring to FIG. 1 as required.

As shown in FIG. 1, the 2D code of the present embodiment also includes the error-correction code blocks 12, as the code blocks 10, for performing correction. Of the borders in the rectangular region, the second borders 6c, 6d other than the borders along which the second specific patterns 3, 4 are arranged, are provided with the error-correction code blocks 12, being extended therealong.

In each of the data code blocks 11 of the present embodiment, data expressed by a plurality of digits of symbols composed of a plurality of types of symbols is encoded. Specifically, with the number of types of the symbols being "D", the data is encoded by being converted into a binary number per every "E" number of digits with which a relation $2^{F-1} < D^E < 2^F$ (where "E" and "F" are natural numbers) is satisfied, and with which a value of F/E expressing a bit conversion rate becomes a predetermined low value. Each data code block 11 expresses a bit string resulting from the conversion into a binary number (hereinafter also referred to as "binary conversion").

For example, the "plural types of symbols" may be ten numerical characters. Data expressed by the ten numerical characters juxtaposed in terms of plural digits is converted into a binary number per every "E" number of digits with which a relation $2^{F-1} < 10^E < 2^F$ is satisfied, and with which a value of F/E expressing a bit conversion rate becomes the smallest.

FIG. 38A shows conversion efficiency with the ten types of numerical characters. FIG. 38B is a graph showing the correspondence between the number of characters and conversion efficiency. In this case, the conversion efficiency is the lowest when the number of digits is 3, 6 and 9. Thus, in the case where there are a plurality of candidates as the numbers of digits that will make the value F/E the smallest, binary conversion is performed for every smallest number of digits of the candidates (every three digits in the example of FIG. 38A).

FIG. 39 is an explanatory view illustrating binary conversion in the case where data to be encoded is a character string "34567890" out of ten types of numerical characters. In this example, the data "34567890" is separated, first, per every "E" number of digits (i.e. three digits) calculated as described above. Each of the character strings after separation per every three digits is subjected to binary conversion (hereinafter also referred to as "binary-converted"). Then, the character string that has been left being short of three characters is subjected to binary conversion. Then, the data after binary conversion are connected to each other. A character set designator and the number of characters of the string, are added to the top of the connected binary-converted data. In the present embodiment, the bit strings produced in this way through binary conversion are expressed by the data code blocks 11.

The bit strings may be configured as shown in FIGS. 40A, 40B and 41. In this example, the number of digits "E" with which the bit conversion rate F/E becomes the smallest is indicated by "E1", and the number of digits "E" with which the bit conversion rate F/E becomes the secondly smallest, next to E=E1, is indicated by "E2" (where 0<E2<E1). In this case, the data is binary-converted per every E1 number of digits, and the digits that have been left being less than the digits E1 are binary-converted per every E2 number of digits. The bit strings after binary conversion are expressed by the data code blocks 11.

For example, the "plural types of symbols" may be twenty-six alphabetical characters. Data expressed by the twenty-six alphabetical characters juxtaposed in terms of plural digits is converted into a binary number per every "E" number of digits with which a relation $2^{F-1} < 26^E < 2^F$ is satisfied, and with which a value of F/E expressing a bit conversion rate becomes the smallest.

FIG. 40A shows conversion efficiency with twenty-six alphanumeric characters, and FIG. 40B is a graph showing dependency between the number of characters and the conversion efficiency. In this case, the conversion efficiency is the lowest when the number of digits is "7". As to the numbers of digits smaller than "7", "4" indicates the secondly smallest conversion efficiency. In such a case, the data is binary-converted every seven digits, and the digits that have been left being less than seven are binary-converted every four digits.

FIG. 41 is an explanatory view illustrating binary conversion in the case where a character string "ABCRSTUVWXYZ" consisting of characters out of twenty-six types of characters is the data to be encoded. In this case, since the individual characters are correlated to numerals, each of the characters "ABCRSTUVWXYZ" is converted, first, into the corresponding numerals. Then, the resultant character string is separated per every E1 number of numerals (i.e. seven numerals) that have been calculated as described above. Then, each separated character string having seven numerals is binary-converted.

Further, the character string that has been left as being short of seven numerals is separated per every E2 number of numerals (i.e. four numerals), followed by binary conversion. The characters that have still been left are binary-converted as they are.

The data after binary conversion are connected to each other. A character set designator and the number of characters of the string, are added to the top of the connected binary-converted data. In the present embodiment, the bit strings produced in this way through binary conversion are expressed by the data code blocks 11.

According to the present embodiment, plural types of symbols are efficiently binary-converted to configure the data blocks 11, whereby more data can be recorded in the rectangular region. In particular, binary conversion for every "E" number of digits that make the bit conversion rate F/E the smallest, may contribute to more efficiently expressing the "D" number of types of symbols with bit strings.

In the example shown in FIGS. 40A, 40B and 41, efficient binary conversion can be conducted for every "E" (=E1) number of digits (numerals) that will make the bit conversion F/E the smallest. Further, the digits (numerals) that have been left as being short of the "E1" number of digits (numerals) are also efficiently binary-converted per every "E2" number of digits (numerals). Thus, conversion efficiency is further enhanced to enable further efficient data recording.

Fifteenth Embodiment

Figure 42A:
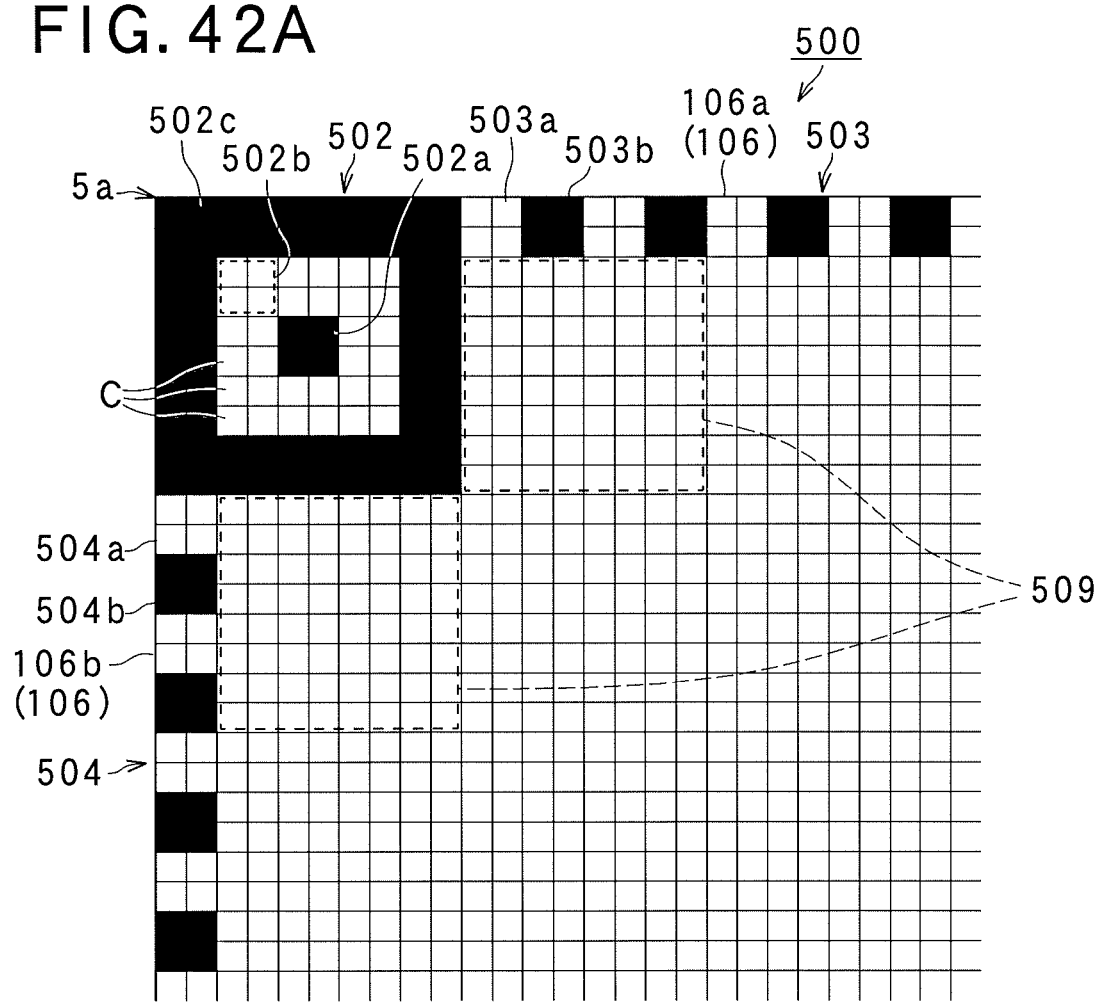
FIGS. 42A to 42D are schematic explanatory views illustrating a principal part of a two-dimensional code, according to a fifteenth embodiment.
Figure 42B:
Figure 42C:
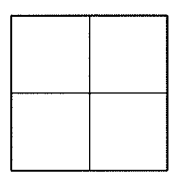
Figure 42D:
Figure 43:
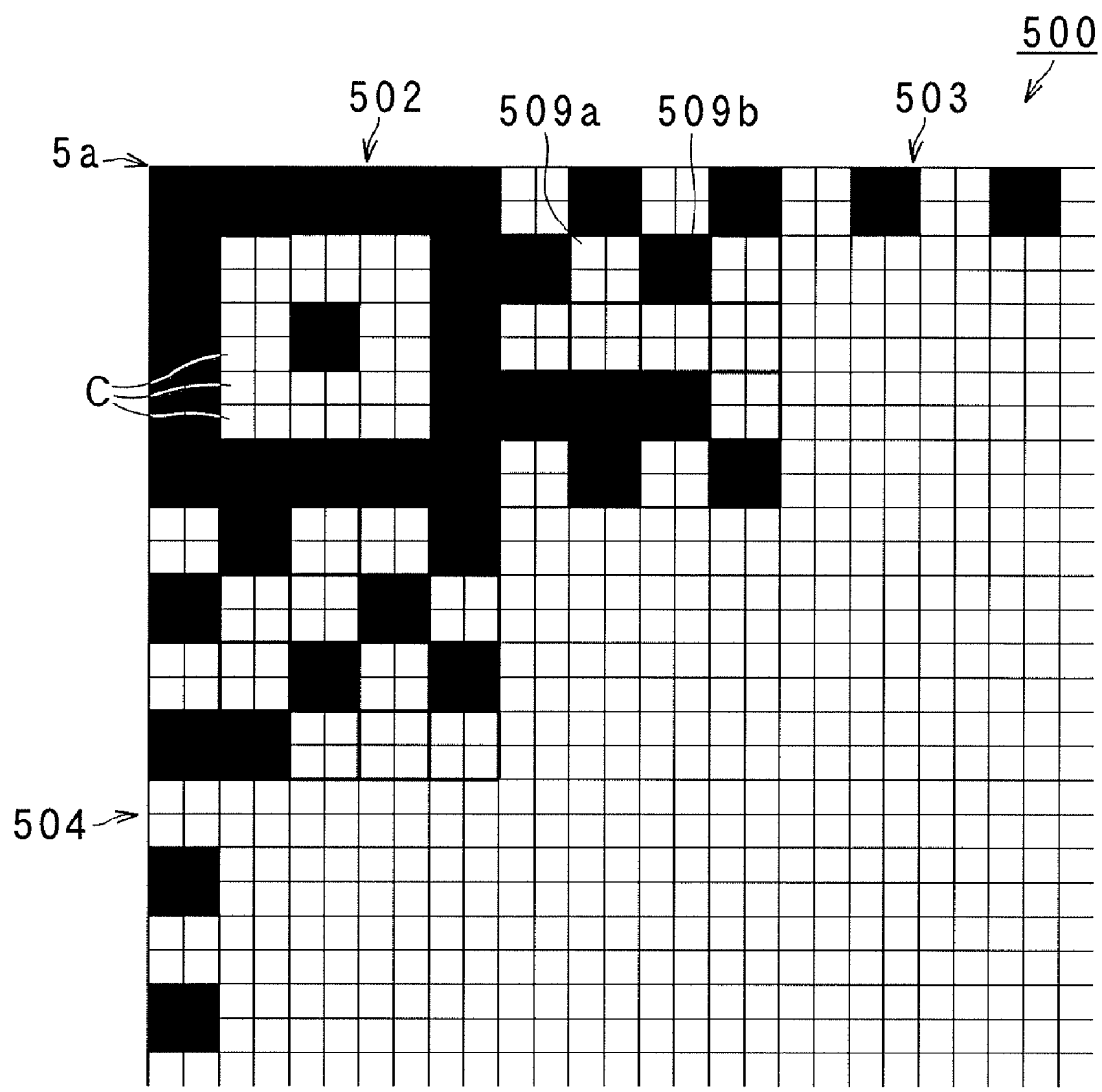
FIG. 43 is an explanatory view illustrating an example of specific arrangement of format information code blocks.

Hereinafter is described a fifteenth embodiment. FIGS. 42A to 42D are schematic explanatory views illustrating a principal part of a 2D code according to the fifteenth embodiment. FIG. 43 is an explanatory view illustrating an example of specific arrangement of format information code blocks. Each of FIGS. 42A and 43 shows a 2D code according to the fifteenth embodiment, enlarging only a part of the area on the side of the specified corner 5a, and other areas are omitted.

A 2D code 500 of the present embodiment also includes error-correction code blocks (which are similar to those in the first embodiment) as code blocks, for performing correction. Of the borders in the rectangular region, the second borders (not shown) other than the borders along which second specific patterns 503, 504 are arranged, are provided with the error-correction code blocks, being extended therealong. FIGS. 42A and 43 omit specific illustration of the data code blocks and the error-correction code blocks.

The 2D code 500 of the present embodiment is configured including a large-size basic unit (hereinafter also referred to as "large basic cell unit") corresponding to an enlarged cell similar to the cell "C". In each of the large basic cell units, or the enlarged cells, a plurality of cells "C" of the same type are arranged to form a rectangular shape. Specifically, white cells "Cw" and black cells "Cb" as shown in FIG. 42B are arranged in the 2D code 500. The white cells "Cw" are arranged in two rows and two columns to configure a large white basic unit shown in FIG. 42C. The black cells "Cb" are arranged in two rows and two columns to configure a large black basic unit shown in FIG. 42D. Each large basic cell unit and each cell are in analogous relations in their chaps. In particular, each white cell "Cw" and the large white basic unit shown in FIG. 42C are in analogous relations (specifically, the vertical and horizontal lengths of the latter are made twice as large as the former). Also, each black cell "Cb" and the large black basic unit shown in FIG. 42D are in analogous relations (specifically, the vertical and horizontal lengths of the latter are made twice as large as the former).

Such large basic cell units are used for a first specific pattern 502 and the second specific patterns 503, 504. In other words, in the 2D code 500 of the present embodiment, each of the first and second specific patterns 502, 503, 504 is configured by combining a plurality of large basic cell units.

In the first specific pattern 502, a black large basic cell unit 502a is arranged at the center thereof, with eight white large basic cell units annularly and rectangularly enclosing the black large basic cell unit 502a. In FIG. 42A, one of the eight white large basic cell units is shown by a broken line 502b. Further, the black large basic cell units annularly and rectangularly enclose the outer side of the eight white large basic cell units, defining outermost edges.

In the second specific pattern 503, a white large basic cell unit 503a is arranged adjacent to the first specific pattern 502, and then a black large basic cell unit 503b is arranged adjacent to the white large basic cell unit 503a. Thus, in the second specific pattern 503, white large basic cell units 503a and black large basic cell units 503b are alternately arranged along the first border 106a. In the second specific pattern 504, a white large basic cell unit 504a is arranged adjacent to the first specific pattern 502, and then a black large basic cell unit 504b is arranged adjacent to the white large basic cell unit 504a. Thus, in the second specific pattern 504, white large basic cell units 504a and black large basic cell units 504b are alternately arranged along the first border 106b.

In the 2D code 500, a format information block 509 is arranged so as to be adjacent to the first and second specific patterns 502, 503. Also, another format information block 509 is arranged so as to be adjacent to the first and second specific patterns 502, 504. The format information blocks indicate format information, such as the model number information or the level of error correction, associated with the 2D code 500.

In the present embodiment, each of the format information blocks 509 is configured by a plurality of large basic cell units. FIG. 43 shows an example of specific configurations of the format information blocks. In particular, each format information block 509 is configured by a plurality of white large basic cell units 509a and a plurality of black large basic cell units 509b to thereby indicate the format information.

As described above, in the example shown in FIG. 42A, each of the first specific pattern 502 and the second specific patterns 503, 504 is configured by combining the large basic cell units. All of the large basic cell units structuring the first specific pattern 502, the second specific patterns 503, 504 and the format information blocks 509 are ensured to have the same size.

In FIGS. 42A to 42D, for example, each large basic cell unit is made up of two-row two-column white cells "Cw" or black cells "Cb". This is not intended to impose a limitation in the configuration of the large basic cell unit. For example, the large basic cell unit may be made up of three-row three-column white cells "Cw" or black cells "Cb".

In the present embodiment, a plurality of cells of the same type are rectangularly arranged to form an enlarged cell, i.e. the large basic cell unit, and the first definition patter 502 is configured by combining a plurality of such large basic cell units. With this configuration, the first specific pattern 502 may be more easily recognized.

For example, as the number of cells arranged in the rectangular region is increased, the size of each cell will become smaller relative to the rectangular region. If the first specific pattern is configured by such relatively small cells, there is a concern that the first specific pattern may be erroneously recognized. In this regard, the first specific pattern 502 configured by combining the large basic cell units as described above may contribute to better recognition of the first specific pattern, and further may contribute to the enhancement of reading accuracy of the 2D code 500.

Also, each of the second specific patterns 503, 504 is configured by combining the large basic cell units. With this configuration, not only the first specific pattern 502, but also the second specific patterns 503, 504 may be easily recognized.

Further, there is an analogous relation between the large basic cell unit and each cell. Formation of the large basic cell unit into a simple shape similar to each cell may eliminate the necessity of providing a complicated reading system, whereby the configuration associated with reading can be simplified.

The 2D code 500 of the present embodiment is also provided with the format information blocks 509 for indicating format information, with each of the format information blocks 509 being made up of a plurality of large basic cell units. In this way, each unit of format information block 509 can be indicated with a large size. Thus, each of the formality blocks 509 may be well recognized and may be resistant to dirt or the like, ensuring good reading of the format information having high importance.

Also, each format information block 509 is arranged adjacent to at least one of the first specific pattern 502 and the second specific pattern 503 or 504 (both in FIG. 42A). In this way, after recognizing the first specific pattern 502 or the second specific pattern 503 or 504, the format information block 509 adjacent to the specific pattern concerned can be promptly detected, whereby promptness of reading can be ensured.

Further, the first specific pattern 502 and the second specific patterns 503, 504 are all configured by combining the large basic cell units. Meanwhile, all of the first specific pattern 502, the second specific patterns 503, 504 and the formality blocks 509 are formed of the large basic cell units of the same size. In this way, all of the first specific pattern 502, the second specific patterns 503, 504 and the formality blocks 509 can be read out as combinations of the large basic cell units of the same size. This will enhance the accuracy of recognition for all the patterns and blocks, and, in most cases, requires no complicated reading system.

Sixteenth Embodiment

Figure 44:
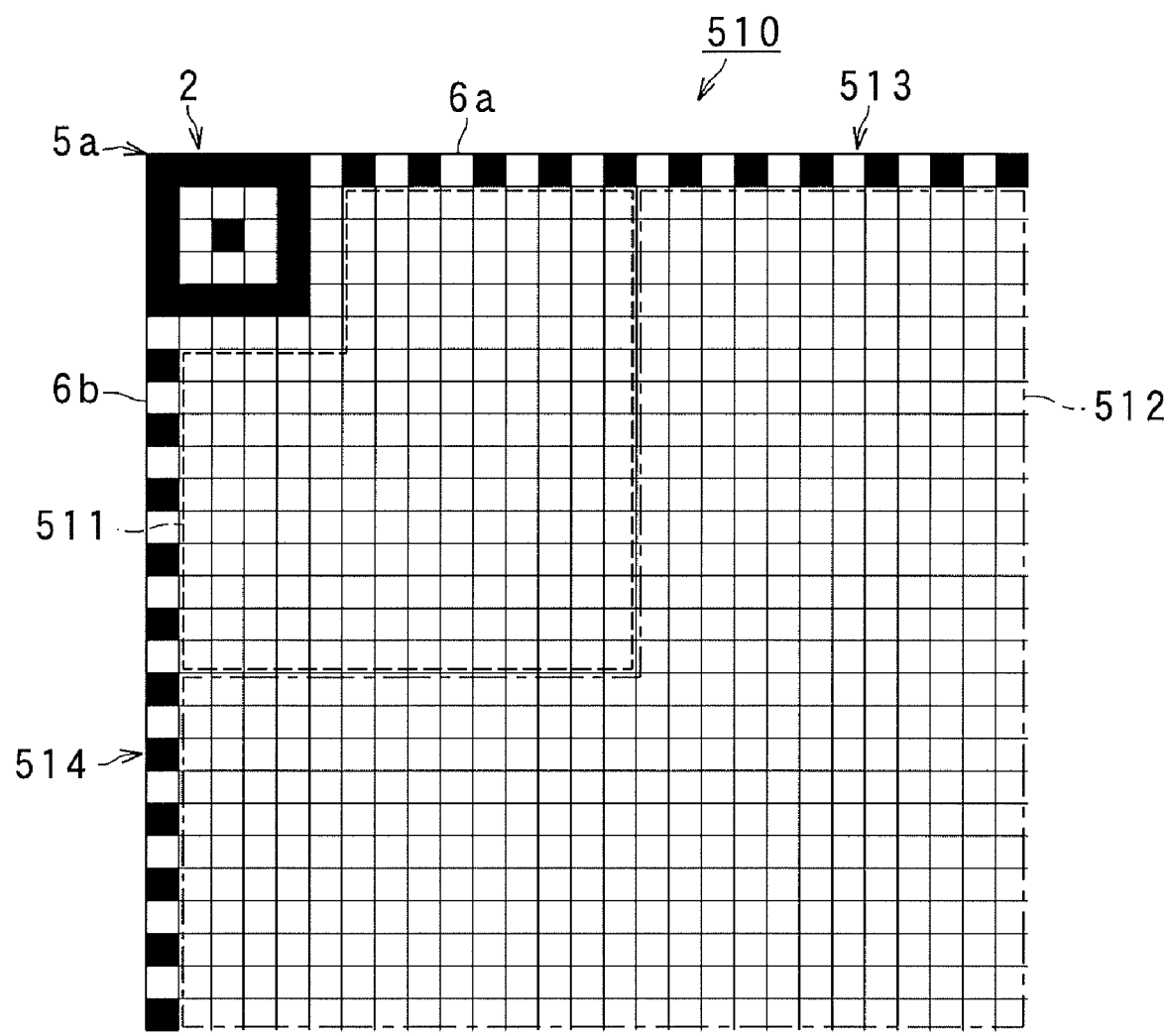
FIG. 44 is a schematic explanatory view illustrating a principal part of a two-dimensional code, according to a sixteenth embodiment of the present invention.

Hereinafter is described a sixteenth embodiment. FIG. 44 is a schematic explanatory view illustrating a principal part of a 2D code 510 according to the sixteenth embodiment. FIG. 44 shows the 2D code 510 according to the sixteenth embodiment, enlarging only a part of the area on the side of the specified corner 5a, and other areas are omitted.

The 2D code 510 of the present embodiment also includes error-correction code blocks (which are similar to those in the first embodiment) as code blocks, for performing correction. Of the borders in the rectangular region, the second borders (not shown) other than the borders along which second specific patterns 513, 514 are arranged, are provided with the error-correction code blocks, being extended therealong. FIG. 44 omits specific illustration of the data code blocks and the error-correction code blocks.

The 2D code 510 of the present embodiment includes, as code blocks, first data code blocks for expressing a predetermined type of first data, and second data code blocks for expressing second data of a type different from that of the first data. A first area 511 for arranging the first data code blocks is provided near the first specific pattern 2. A second area 512 for arranging the second data code blocks is provided farther from the second specific pattern 2 than the first area 511 is far therefrom.

The first data and the second data may be variously combined. For example, the first data may be format information including model numbers and error correction levels, and the second data may be the data other than the format information. In this case, format information data blocks are arranged in the first area 511, and code blocks expressing other data (e.g., data code blocks expressing data to be decoded and error-correction code blocks) are arranged in the second area 512.

Alternatively, both of the first and second data may include data to be decoded, with error correction level being set higher for the first data than for the second data. In this case, data code blocks expressing data whose error correction level has been set high are arranged in the first area 511, and data code blocks expressing the second data whose error correction level has been set lower than the first data are arranged in the second area 512.

In the present embodiment, the first area 511 for arranging the first data code blocks is provided near the first specific pattern 2, and the second area 512 for arranging the second data code blocks is provided farther from the first specific pattern 2 than the first area 511 is far therefrom. As a result, reading accuracy may be more enhanced for the first data code blocks arranged near the first specific pattern 2 that serves as a reference, than the reading accuracy for the second data code blocks arranged farther from the first specific pattern 2.

Such a configuration is advantageous in the case where, for example, the first data code blocks include important data. For example, when the error correction level is set higher for the first data than for the second data, the reading accuracy for the important data with high correction level can be effectively enhanced. Alternatively, in the case where the first data is the data expressing format information and the second data is configured by data other than the format information, the format information required for enhancing accuracy and speed of reading can be highly reliably read out.

Seventeenth Embodiment

Hereinafter is described a seventeenth embodiment. FIG. 45 is a schematic explanatory view illustrating a 2D code 520 according to the seventeenth embodiment. The 2D code 520 shown in FIG. 45 includes all the features of the 2D code shown in FIG. 8 and includes further features in addition to the ones shown in FIG. 8. As to the portions configured in the same manner as the configuration shown in FIG. 8, detailed explanation will be omitted.

The 2D code 520 of the present embodiment also includes the error-correction code blocks 12 as code blocks 10, for performing correction. Of the borders in the rectangular region, the second borders 106c, 106d other than the borders along which second specific patterns 143, 144 are arranged, are provided with the error-correction code blocks 12, being extended therealong.

As have been described referring to FIG. 8, the code blocks 10 provided in the 2D code 520 express information using a plurality of display colors (specifically, eight colors) including chromatic colors.

On the other hand, a second 2D code 521 which is smaller than the rectangular region is arranged within the rectangular region of the 2D code 520. The second 2D code 521 has a configuration identical with the 2D code 140 shown in FIG. 7 and expresses information using plural types of achromatic colors (specifically, black and white). The area where the second 2D code 521 is located is configured as an area for which error is corrected by the error-correction code blocks 12.

With the configuration of the present embodiment, the code blocks 10 in the rectangular region or both of the code blocks 10 and the second 2D code 521 can be read out when an optical information reader (e.g., a code reader loaded with a color sensor) that can read chromatic colors is used. Even when an optical information reader for reading achromatic colors is used, the second 2D code 521 can be read out. That is, any types of optical information reader may obtain information from the 2D code 520, which information is appropriate for the reader.

As mentioned above, the area where the second 2D code 521 is located in the rectangular region is configured as an area for which error is corrected by the error-correction code blocks 12. Thus, while the second 2D code 521 is provided within the rectangular region, the 2D code 520 is ensured to well perform data reading within the rectangular region.

Figure 46:
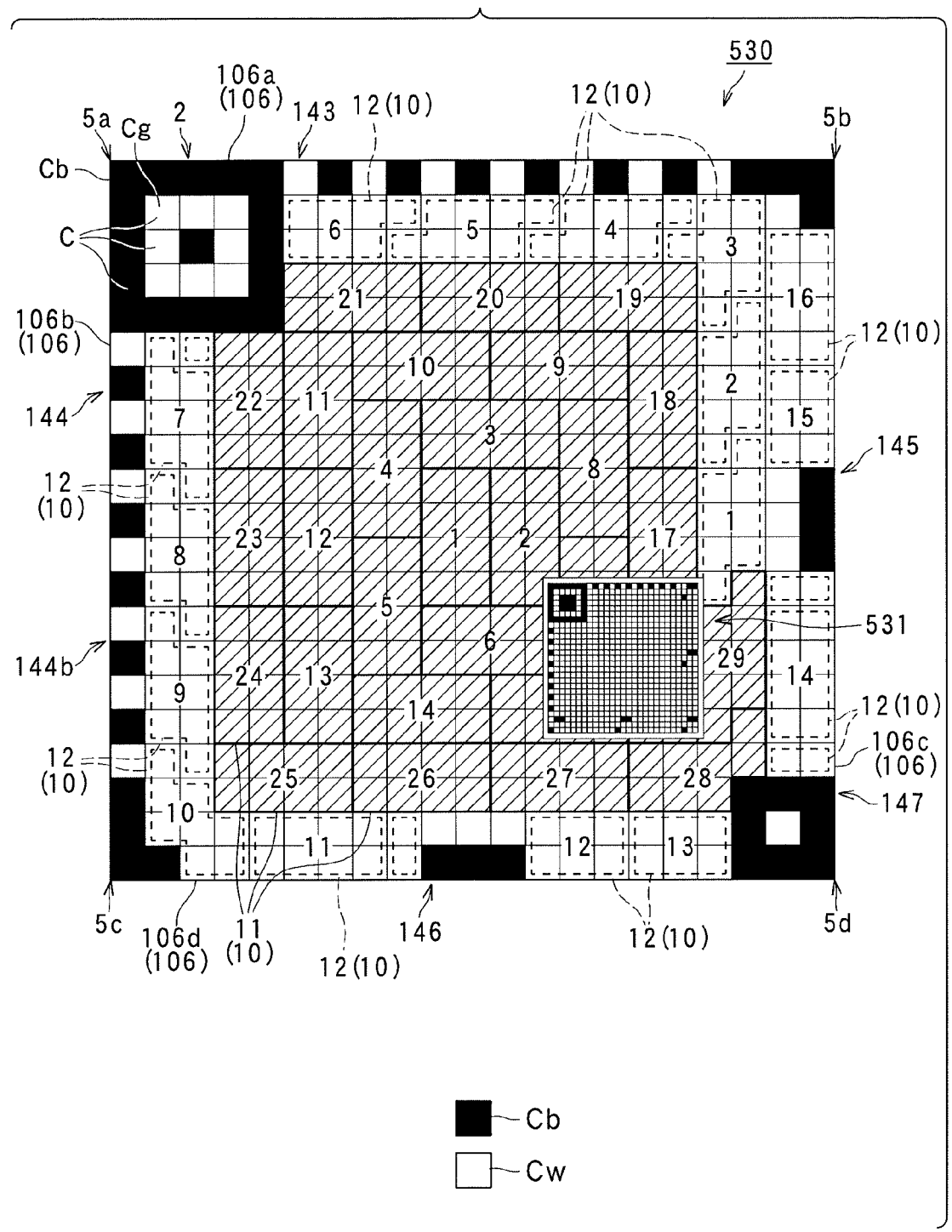
FIG. 46 is a schematic explanatory view illustrating another example of the two-dimensional code, according to the seventeenth embodiment.

The configuration as shown in FIG. 46 may also be usable. A 2D code 530 shown in FIG. 46 includes all the features of the 2D code shown in FIG. 7 and includes further features in addition to the ones shown in FIG. 7. For the portions configured in the same manner as in FIG. 7, detailed explanation is omitted.

The 2D code 530 of the present embodiment also includes the error-correction code blocks 12 as code blocks 10, for performing correction. Of the borders in the rectangular region, the second borders 106c, 106d other than the borders along which second specific patterns 143, 144 are arranged, are provided with the error-correction code blocks 12, being extended therealong.

As have been explained referring to FIG. 7, the code blocks 10 of the 2D code 530 express information using plural types of achromatic colors (specifically, two colors, white and black).

On the other hand, a second 2D code 531 which is smaller than the rectangular region is arranged within the rectangular region of the 2D code 530. The second 2D code 531 has a configuration identical with the 2D code 280 shown in FIG. 20 and expresses information using a plurality of chromatic colors (specifically, eight colors).

With this configuration, the second 2D code 531, or both of the second 2D code 531 and the code blocks 10 in the rectangular region can be read out when an optical information reader (e.g., a code reader loaded with a color sensor) that can read chromatic colors is used. Even when an optical information reader for reading achromatic colors is used, the code blocks 10 in the rectangular region can be read out. That is, any types of optical information reader may obtain information from the 2D code 530, the information being appropriate for the reader. In FIG. 45 as well, the area where the second 2D code 531 is located is configured as an area for which error is corrected by the error-correction code blocks 12.

Eighteenth Embodiment

Figure 47A:
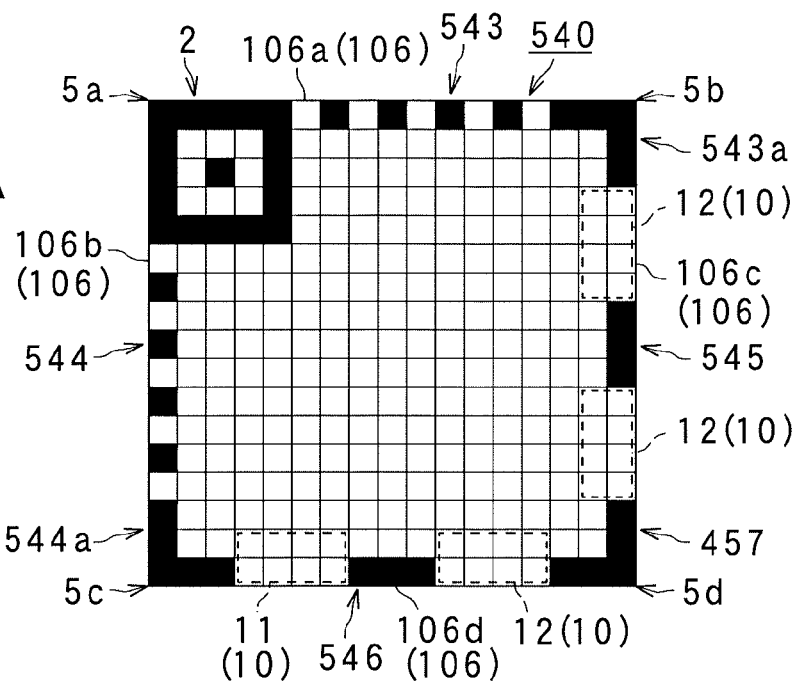
FIG. 47A is a schematic explanatory view illustrating a two-dimensional code, according to an eighteenth embodiment of the present invention.
Figure 47B:
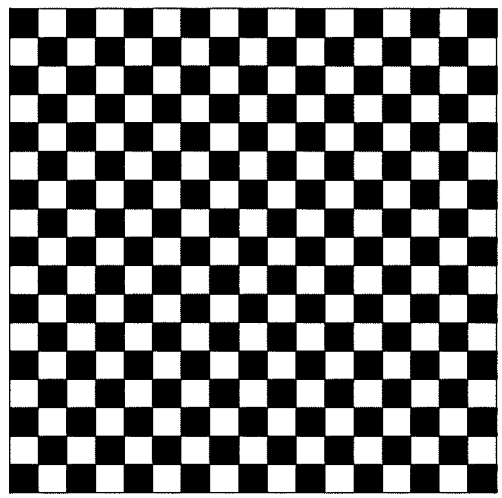
FIG. 47B is an explanatory view illustrating a mask pattern, according to the eighteenth embodiment.
Figure 47C:
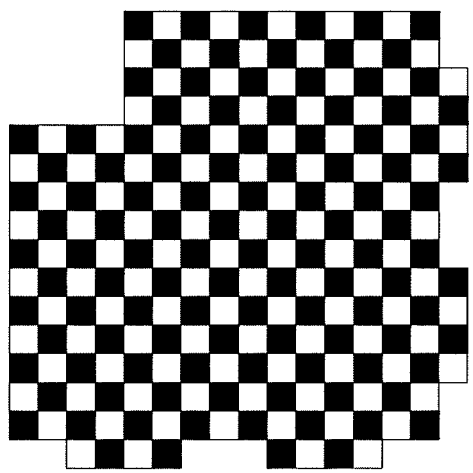
FIG. 47C is an explanatory view illustrating an area to which masking is applied, according to the eighteenth embodiment.

Hereinafter is described an eighteenth embodiment. FIG. 47A is a schematic explanatory view illustrating a 2D code 540, according to the eighteenth embodiment. FIG. 47B is an explanatory view illustrating a mask pattern. FIG. 47C is an explanatory view illustrating an area to which masking is applied.

The 2D code 540 of the present embodiment also includes the error-correction code blocks 12, as the code blocks 10, for correcting errors. Of the borders in the rectangular region, the second borders 106c, 106d other than the borders along which second specific patterns 543, 544 are arranged, are provided with the error-correction code blocks 12, being extended therealong.

The code blocks 10 of the 2D code 540 are applied with a masking process, using one type of mask pattern that has been specified in advance. FIG. 47B exemplifies one type of mask pattern. As shown in FIG. 47C, a masking process using this mask pattern is applied to the areas except for the areas of functional patterns (i.e. except for the areas of the first specific pattern 2, the second specific patterns 543, 544, third specific patterns 545, 546 and an end pattern 547).

In the art of 2D codes, such as QR codes, methods are well known for applying a masking process using a specific mask pattern, or for removing a mask from a 2D code formed by a masking process. Therefore, detailed explanation on these methods is omitted.

According to the present embodiment, it may be unlikely that cells having the same saturation, hue, or lightness as that of a background color (e.g., white cells) are consecutively arranged in data code blocks other than the error-correction code blocks 12. For example, with the configuration as shown in FIG. 47A, at the positions of the error-correction code blocks 12, the borders can be well defined, but at the positions of the data code blocks 11, the borders may not be well defined. However, masking may enable use of such data code blocks 11 as blocks for making a distinction from the background. Also, use of one type of mask pattern that has been specified in advance may eliminate the necessity of providing the code region with information (mask information) for specifying a mask to be used. Thus, the amount of stored data is not required to be reduced.

It should be appreciated that the same advantages can be expected in a configuration where the error-correction code blocks 12 arranged along the borders are replaced by the compressed data code blocks 13.

Nineteenth Embodiment

Hereinafter is described a nineteenth embodiment. FIGS. 48A to 48D and FIGS. 49A to 49E are explanatory views illustrating details of display given by a program according to the present embodiment.

The present embodiment is related to a computer-readable program for displaying the 2D codes described above. The program is configured in such a way that the details of display as shown in FIGS. 48A to 48D and FIGS. 49A to 49E can be given through a computer (e.g., personal computer) having, for example, a display device, a CPU and a memory (ROM, RAM, HDD or the like). In the present embodiment, the steps for giving the details of display of FIGS. 48A to 48D and FIGS. 49A to 49E correspond to an example of "displaying steps".

Figure 48A:
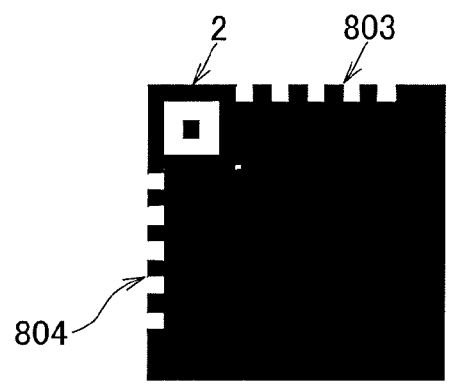
FIGS. 48A to 48D are explanatory views illustrating the contents which are displayed using a program, according to a nineteenth embodiment of the present invention.

In the displaying process executed by the program of the present embodiment, a step of displaying the details of display shown in FIG. 48A is carried out first. At this step, the first specific pattern 2 and second specific patterns 803, 804 of a 2D code 800, which will be described later, are displayed along with an indication by which the code region can be defined. Specifically, the area where the 2D code 800 is to be displayed is indicated, for example, by a color different from that of the background.

Figure 48B:
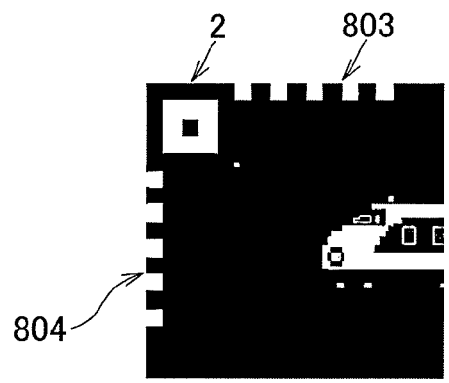
Figure 48C:
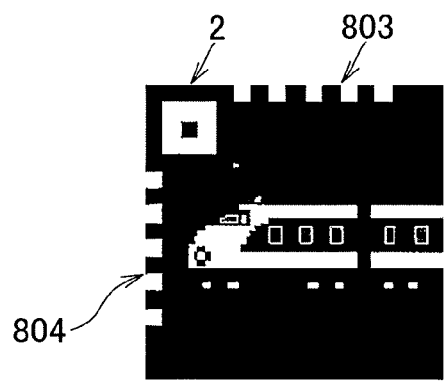
Figure 48D:
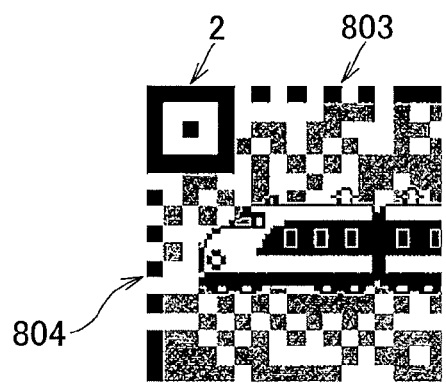

Then, as shown in FIGS. 48B and 48C, a step of displaying a dynamic image (the dynamic image of a moving bullet train, here) in the code region is carried out. This step corresponds to an example of a "dynamic pattern image displaying step", that is, a step of displaying a dynamic pattern image made up of a pattern different from the patterns of the cells, in a display area of the 2D code. Through this process, the dynamic pattern image is displayed in the display area of the 2D code, other than the specific pattern display areas for displaying the first specific pattern 2 and the second specific patterns 803, 804.

Figure 49A:
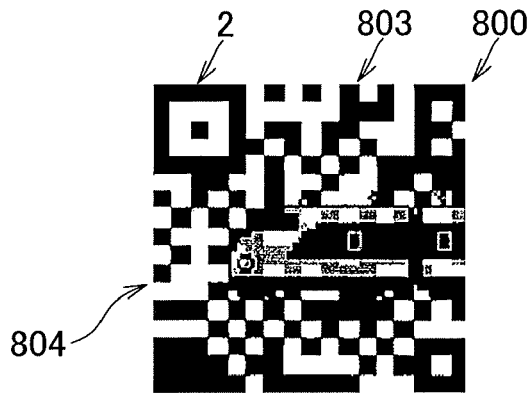
FIGS. 49A to 49E are explanatory views illustrating the contents of display continuing from the contents illustrated in FIGS. 48A to 48D.
Figure 49B:
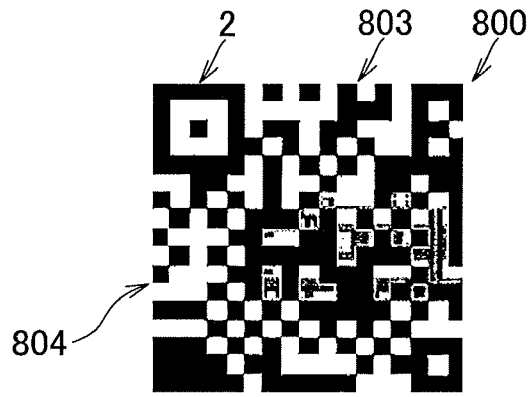
Figure 49C:
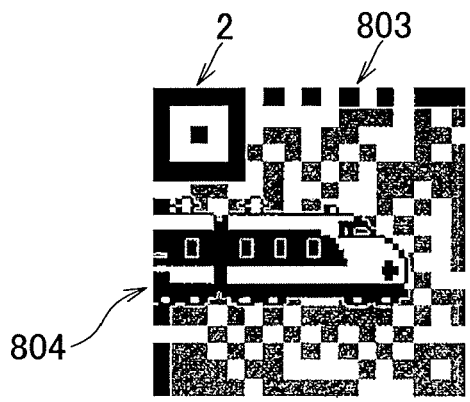
Figure 49D:
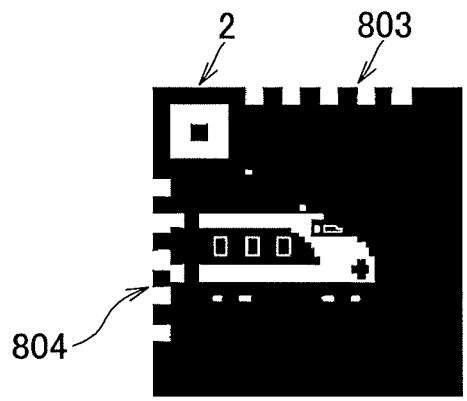
Figure 49E:
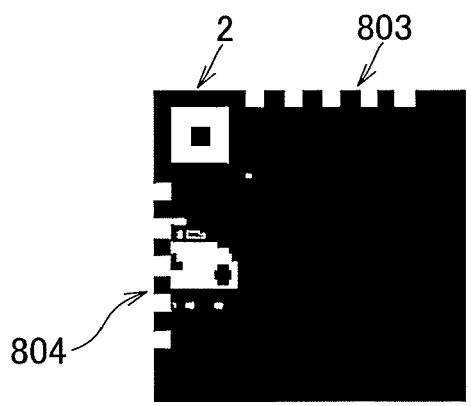

Then, as shown in FIGS. 48D and 49A to 49C, a step of gradually displaying the 2D code 800 is performed. This step corresponds to an example of a "dynamic code displaying step", that is, a step of displaying the 2D code 800 as a part of the dynamic image. In this process, after displaying the 2D code 800 as a part of the dynamic image, the state of displaying the image (display state) is maintained for at least a predetermined period of time. For example, the display state as shown in FIG. 49B is maintained for several seconds. After that as well, the dynamic pattern images as shown in FIGS. 49C to 49E are adapted to be displayed.

In any of the 2D codes described in the present text, a dynamic image can be displayed as in the 2D code 800. In any of such cases, the 2D code concerned includes the error-correction code blocks, as the code blocks, so as to correct errors, and the error-correction code blocks are arranged along the respective second borders of the rectangular region, other than the borders along which the second specific patterns are arranged. Alternatively, a 2D code (e.g., FIG. 5) may include the compressed data code blocks, as the code blocks, and the compressed data code blocks may be arranged along the respective second borders. A dynamic image may be displayed on such a 2D code in the same manner as in the 2D code 800.

As described above, the present embodiment has the "dynamic pattern image displaying step" by which a dynamic pattern image is displayed in the display area of the 2D code. With this step, a 2D code that enables recording of more amount of data and enables accurate definition of the rectangular region may be well displayed. Further, design flexibility of the 2D code may be more enhanced.

In the display area of the 2D code of the present embodiment, the dynamic pattern image is adapted to be displayed in the area other than the specific pattern displaying areas where the first and second specific patterns are displayed. Displaying such a dynamic image may enhance design flexibility, while the first and second specific patterns may be displayed in such a manner of facilitating correct definition of the shapes. As a result, deterioration in reading accuracy may be effectively prevented, which deterioration would have otherwise been caused by erroneous recognition of the first or second specific patterns.

In the present embodiment, after displaying the 2D code as a part of the dynamic image, the display state is maintained for at least a predetermined period of time. Displaying such a dynamic image in the 2D code may enhance decorativeness. In addition, since the display state of the dynamic image is maintained for a predetermined period of time, reading may be easily performed.

Twentieth Embodiment

Figure 50:
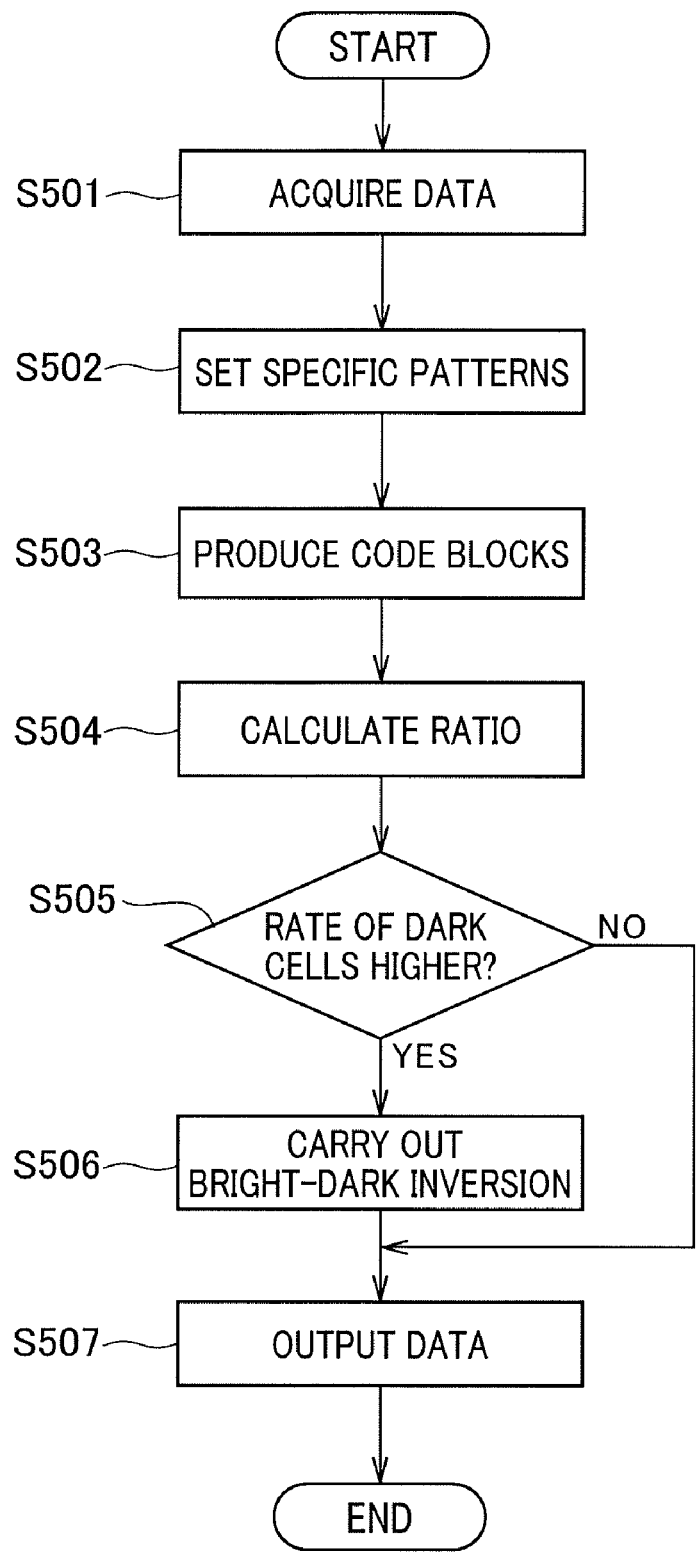
FIG. 50 is a flow diagram illustrating a procedure for producing a two-dimensional code to realize a production method, according to a twentieth embodiment of the present invention.
Figure 51A:
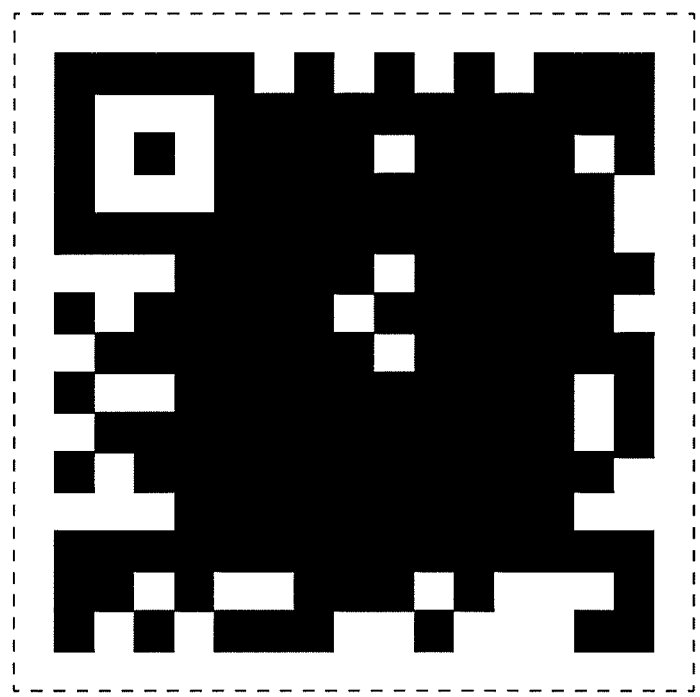
FIGS. 51A and 51B are explanatory views illustrating a two-dimensional code having a large number of dark cells.
Figure 51B:
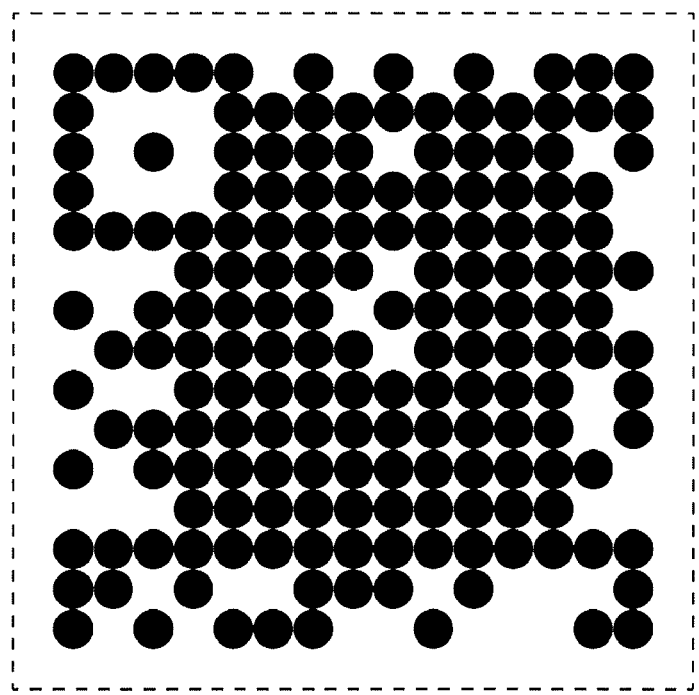
Figure 52A:
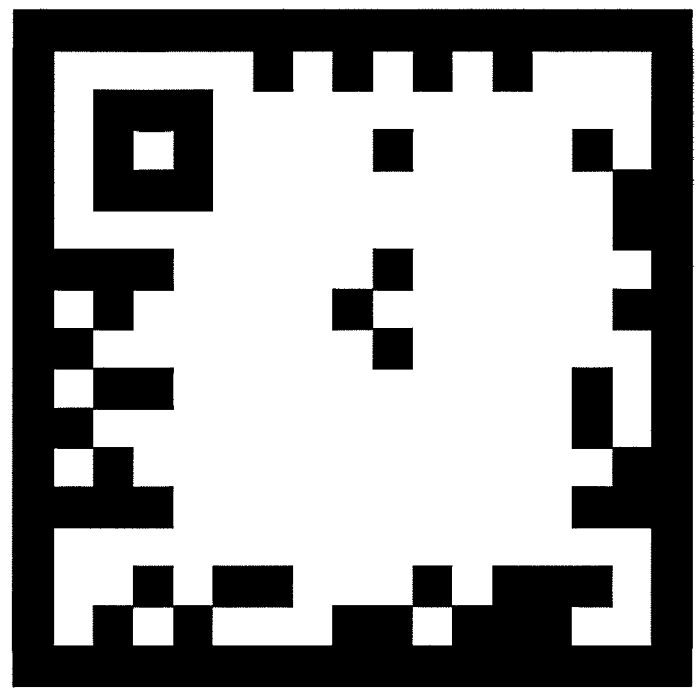
FIGS. 52A and 52B are explanatory views illustrating a two-dimensional code after bright-dark inversion.
Figure 52B:
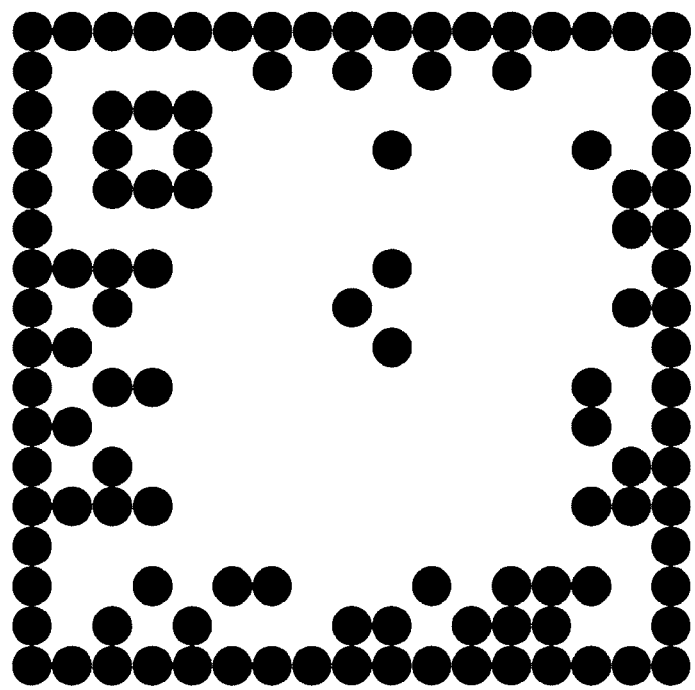

Hereinafter is described a twentieth embodiment. FIG. 50 is a flow diagram illustrating a procedure for producing a 2D code to realize a production method according to the twentieth embodiment. FIGS. 51A and 51B are explanatory views illustrating a 2D code having a large number of dark cells. FIGS. 52A and 52B are explanatory views illustrating a 2D code after bright-dark inversion.

The procedure shown in FIG. 50 is executed by an information processor (e.g., personal computer) provided, for example, with a CPU and storage means (ROM, RAM, HDD or the like). In the procedure, data to be decoded (hereinafter also referred to as "to-be-decoded data") which is to be encoded is acquired first (step S501). This acquiring process corresponds to an example of an "acquiring step". For example, to-be-decoded data (i.e. data to be encoded) is acquired by the information processor, in response to the inputting of data performed by the user by means of an inputting device, or in response to the inputting of data from an external device.

Then, a specific pattern is set (step S502). In this process, first and specific patterns are set. For example, a model number may be determined by designation of the user, or by automatic designation according to the amount of data, for example, to thereby set the first and the second specific patterns. The process of step S502 corresponds to a "specific pattern setting process". At this step, the structure and arrangement of the cells may be determined for the first and second specific patterns.

Then, code blocks are produced. In this process, the to-be-decoded data acquired at step S501 is converted into binary data, and the binary data may determine the structure and arrangement of the cells in the individual code blocks.

Further, a ratio between bright cells and dark cells in the rectangular region is calculated based on the first and second specific patterns and the code blocks obtained at steps S502 and S503 (step S504). This process corresponds to an example of a "ratio calculating step". In this process, a ratio between bright cells and dark cells is calculated, for the arrangement of the first and second specific patterns and the code blocks obtained at steps S502 and 503 in the rectangular region (code region).

Then, it is determined whether or not the ratio of dark cells is higher than that of the bright cells in the rectangular region, based on the results of calculation at step S504 (step S505). The process at step S505 corresponds to an example of a "determining step".

At the "determining step" of S505, if it is determined that the ratio of the dark cells is higher, control proceeds to "Yes" from step 505 to carry out bright-dark inversion for inversing brightness and darkness (step S506). The process at step S506 corresponds to an example of an "inverting step", where an inversion code having inverted bright and dark cells is produced in the rectangular region that has been obtained at the specific pattern producing step (step S502) and the code block producing step (step S503).

For example, let us assume a case where the rectangular region shown in FIG. 51A is configured with the first and second specific patterns and the code blocks obtained through the processes at steps S502 and S503. In this case, since the rate of dark cells is higher in the rectangular region, control proceeds to "Yes" from step S505, for inversion as shown in FIG. 52A. In the inversion process, the bright cells and the dark cells are inversed not only in the rectangular region but also in a marginal region adjacently surrounding the rectangular region. Specifically, a margin whose width corresponds to that of one cell is retained adjacently surrounding the rectangular region, so that the inversion may be conducted for both the rectangular region and this marginal region (see FIGS. 51A and 52A).

FIG. 51B exemplifies a 2D code which is formed using a direct marking process. In FIG. 51B, marking points (corresponding to dark cells) to be formed by the direct marking process in the rectangular region are indicated by black color. When such a 2D code has been configured through the processes at steps S501, S502 and S503, the dark cells may be determined as having a higher rate at steps S504 and S505. Thus, the marking points can then be reduced by the inversion as shown in FIG. 52B.

Subsequent to the inverting process (step S506), or if control proceeds to "Yes" from step S505, an outputting process is carried out (step S507). In this outputting process, image data of the 2D code as acquired is outputted to a display screen or an external device. It should be appreciated that the data after inversion may be stored in a memory, without performing such an outputting process.

According to the present embodiment, a 2D code can be easily produced, which enables recording of more amount of data and enables correct definition of the rectangular region. In particular, if the rate of dark cells is higher in the rectangular region, an inversion code having inverted bright cells and dark cells can be produced. Therefore, a 2D code having identical data contents can be produced, suppressing the rate of dark cells. Thus, time and processes for producing dark cells can be reduced. For example, in the case where the direct making process is used for forming a 2D code, time and processes for forming dark cells using a dot pin or laser beam can be reduced.

Also, in the inversing process, bright cells and dark cells in not only the rectangular region but also in the marginal region adjacently surrounding the rectangular region are inverted. Thus, the rectangular region after inversion can be well distinguished from the background, whether the configuration is for distinguishing dark cells from bright background, or whether the configuration is for distinguishing bright cells from dark background.

Twenty-First Embodiment

Figure 53:
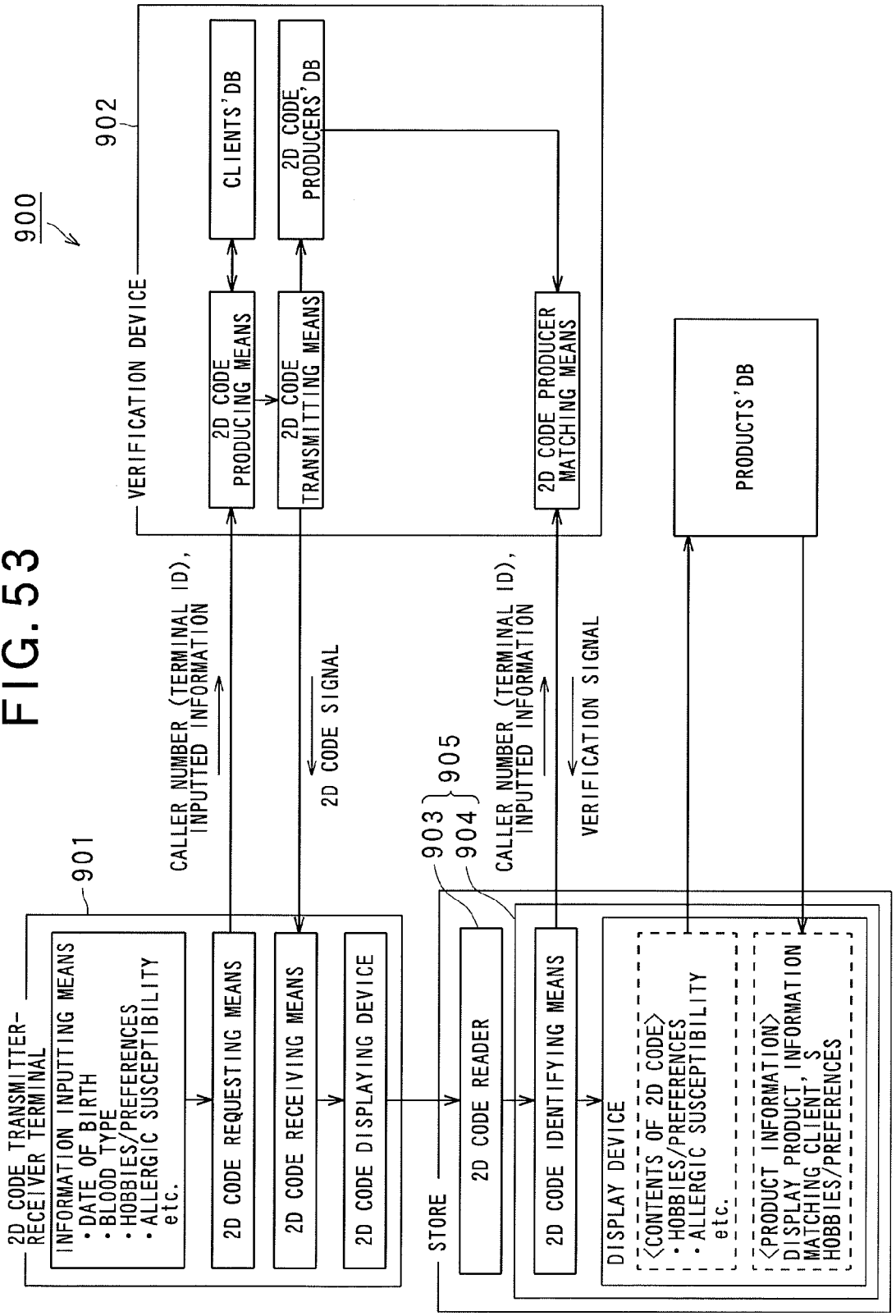
FIG. 53 is a schematic block diagram illustrating a verification system to realize a method, according to a twenty-first embodiment of the present invention.
Figure 54:
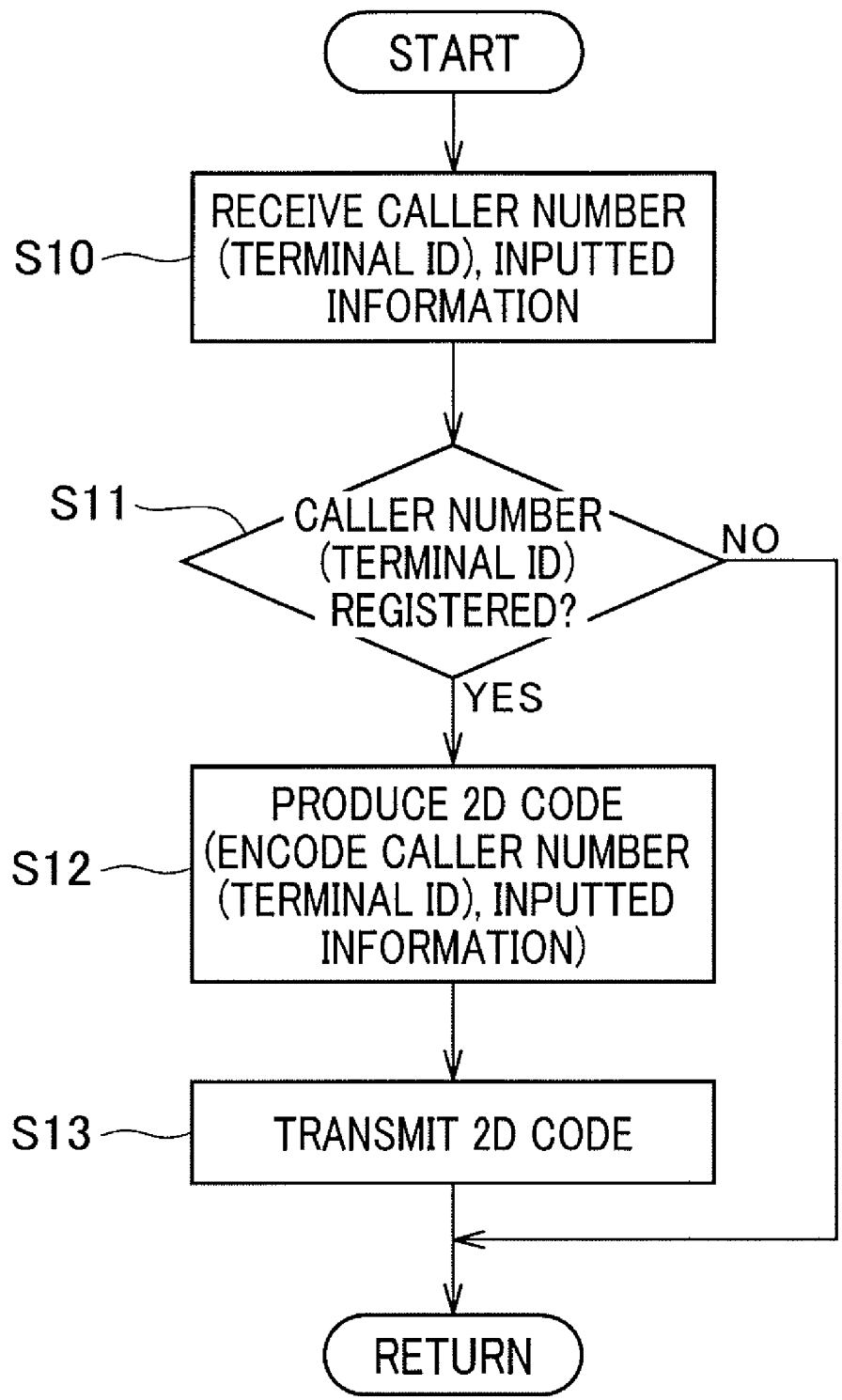
FIG. 54 is a flow diagram illustrating a flow of a procedure for producing and transmitting a two-dimensional code.
Figure 55:
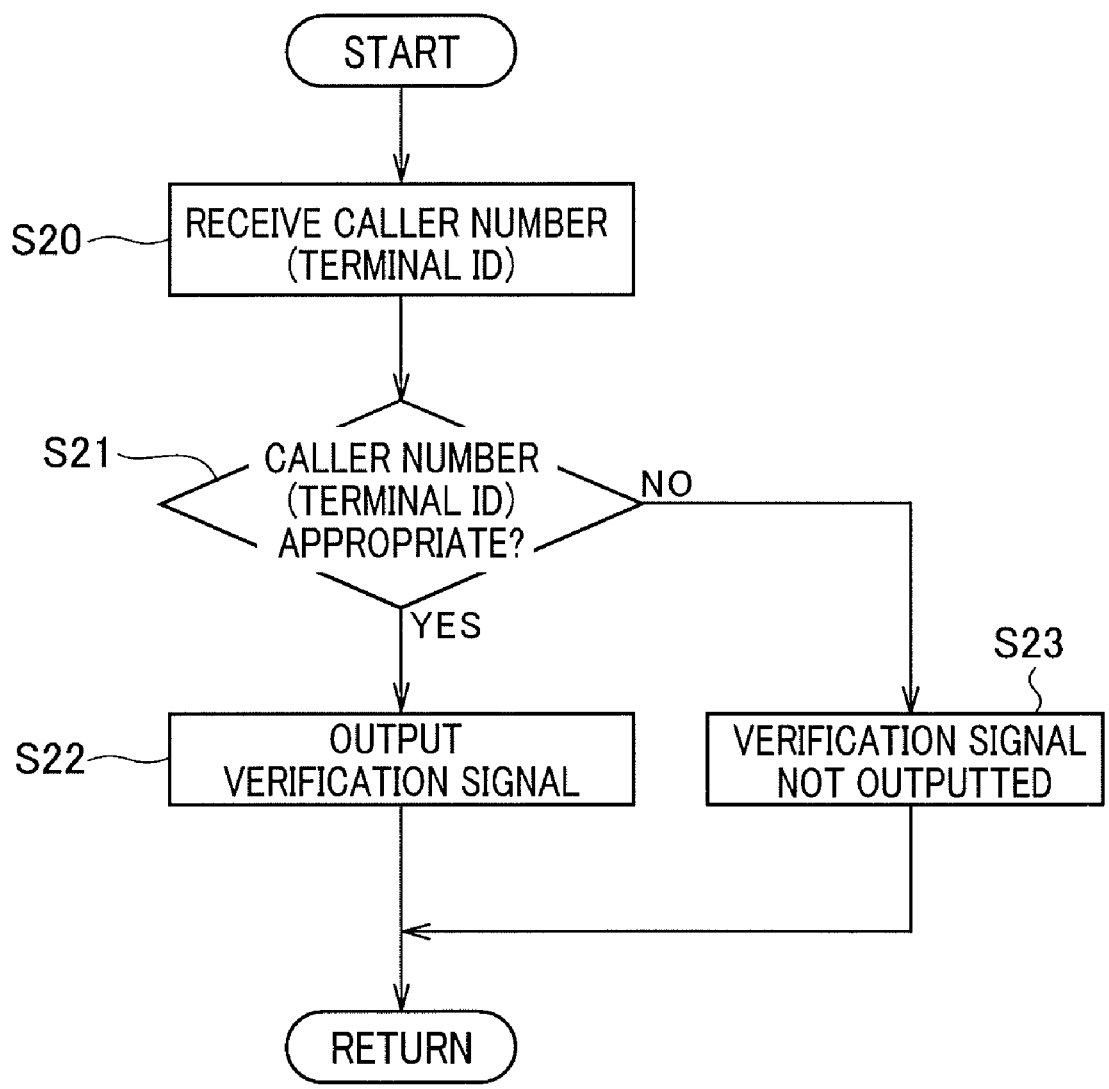
FIG. 55 is a flow diagram illustrating a flow of a verification procedure on the side of a verification device.

Hereinafter is described a twenty-first embodiment. FIG. 53 is a schematic block diagram illustrating a verification system to realize a method according to the twenty-first embodiment. FIG. 54 is a flow diagram illustrating a flow of a procedure for producing and transmitting a 2D code. FIG. 55 is a flow diagram illustrating a flow of a verification procedure.

A verification system 900 shown in FIG. 53 includes a transmitter-receiver terminal 901, a verification device 902 and an identification terminal 905. The system is configured to carry out verification of a person being verified by means of any of the 2D codes described in the above embodiments. The transmitter-receiver terminal 901 is configured as a mobile terminal, such as a cellular phone, and thus is provided with various keys as inputting means and a display device (e.g., liquid crystal display).

The verification device 902 is made up of a computer including storage means, such as a hard disk drive, and communicating means. The device is provided with a database and is adapted to be communicable with the mobile terminal 901.

The identification terminal 905 includes a 2D code reader 903 as code reading means, and a computer 904, and is adapted to be communicable with the verification device 902.

In the system 900, the person being verified may input, first, individual pieces of information (e.g., date of birth, blood type, hobbies, preferences and allergic susceptibility) through the inputting means (e.g., keyboard) of the transmitter-receiver terminal 901. In response, the transmitter-receiver terminal 901 transmits to the verification device 902, information of the person being verified (hereinafter referred to "personal information"), after having the individual pieces of information correlated to a terminal ID (caller number) of the transmitter-receiver terminal 901. This process carried out by the transmitter-receiver terminal 901 corresponds to an example of a "transmitting step".

Then, the verification device 902 performs the procedure shown in FIG. 54. In this procedure, the caller number (terminal ID) and the inputted information (individual pieces of information) are received first (step S10). Then, it is determined whether or not the caller number has already been registered (step S11). If the person related to the caller number has been registered at a clients' database as a formal client, control proceeds to "Yes" from step S11 to perform a process of producing a 2D code (step S12). In this process, a 2D code is produced which includes, as data, the caller number (terminal ID) and the inputted information (individual pieces of information) transmitted from the transmitter-receiver terminal 901. Then, the 2D code is transmitted to the transmitter-receiver terminal 901 (step S13).

The processes at steps S10 and S11 correspond to an example of an "identifying step". At these steps, the personal information transmitted at the transmitting step is received, and it is identified whether or not the personal being verified defined by the personal information has been registered at the data base.

The steps S12 and S13 correspond to an example of a "replying step". At these steps, if the personal being verified defined by the personal information has been registered at the data base, a 2D code including the personal information is produced, followed by transmitting, in reply, the 2D code to the transmitter-receiver terminal.

Upon receipt of the 2D code transmitted from the verification device 902, the transmitter-receiver terminal 901 stores the 2D code in a memory in the transmitter-receiver terminal 901. From this time onward, the 2D code may be read out any time. The process in which the mobile terminal 901 acquires the 2D code transmitted in reply and stores the same in the memory corresponds to an example of a "storing step".

On the other hand, in order that the personal being verified having the transmitter-receiver terminal 901 is verified at a store, the personal being verified first needs to carry out a predetermined identification operation for the inputting means of the transmitter-receiver terminal 901. For example, the personal being verified may carry out a predetermined key operation for the transmitter-receiver terminal 901, so that the 2D code that has been stored in the memory as described above may be indicated on the display device of the transmitter-receiver terminal 901. This process of displaying the 2D code on the display device of the transmitter-receiver terminal 901 by performing the predetermined key operation corresponds to an example of a "displaying step".

The 2D code displayed on the transmitter-receiver terminal 901 in this way is read out by the 2D code reader 903 (code reading means) set up in the store. This process of reading corresponds to an example of a "reading step".

The identification terminal 905 that has read out the 2D code of the transmitter-receiver terminal 901 queries the verification device 902. Specifically, the caller number (terminal ID) recorded on the read-out 2D code is outputted to the verification device 902 from the identification terminal 905. In response to the output, the verification device 902 carries out the verification procedure as shown in FIG. 55. In this procedure, the caller number (terminal ID) transmitted from the identification terminal 905 is received, first, (step S20) to determine whether or not the caller number (terminal ID) is appropriate (step S21). In the verification device 902 shown in FIG. 53, the client who has produced the 2D code is stored in a producers' database, and a determination is made whether or not the transmitted caller number has been registered at the database. If the caller number has been registered at the database, or is appropriate, control proceeds to "Yes" from step S21 to output a verification signal to the identification terminal 905 (step S22). On the other hand, if the caller number is not appropriate, control proceeds to "No" from step S21 to end the procedure without performing verification.

Figure 56:
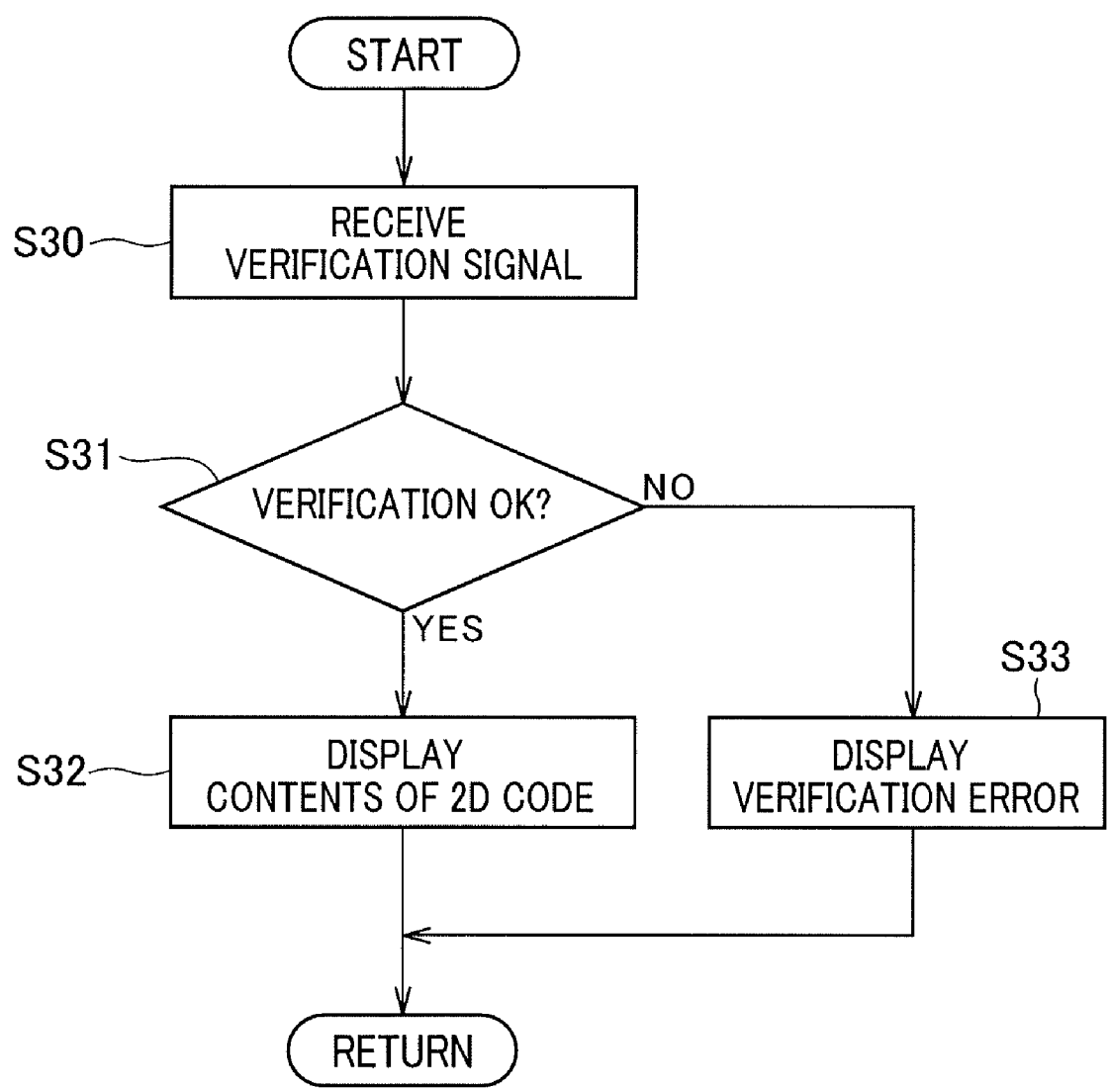
FIG. 56 is a flow diagram illustrating a flow of a verification and confirmation procedure on the side of an identification terminal.

After transmitting the caller number (terminal ID) to the verification device 902, the identification terminal 905 performs the procedure as shown in FIG. 56. In this procedure, the verification signal is received, first, (step S30) to determine whether or not verification has been normally conducted (step S31). If the verification has been normally conducted, control proceeds to "Yes" from step S31 to display the contents of the 2D code and product information. For example, the individual pieces of information (hobbies, preferences, allergic susceptibility, etc.) recorded on the 2D code are displayed, together with pieces of product information that match the hobbies or preferences. On the other hand, if the verification has not been normally conducted, control proceeds to "No" from step S31 to give error indication (step S33).

In the processes at steps S30 and 31, it is determined whether or not the 2D code read out at the reading step is a formal 2D code issued from the verification device 902. These processes correspond to an example of a "determining step". In the process at step S32, predetermined post-verification processing is performed if the 2D code has been determined as being formal. This process corresponds to an example of a "post-verification step". Here, the process of displaying the individual pieces of information and the product information matching the individual pieces of information corresponds to an example of "predetermined post-verification processing". It may be so configured that, if the 2D code has been determined as being verified, a verification signal may be transmitted to the personal being verified. In this case, this process may correspond to the "predetermined post-verification processing".

Figure 57:
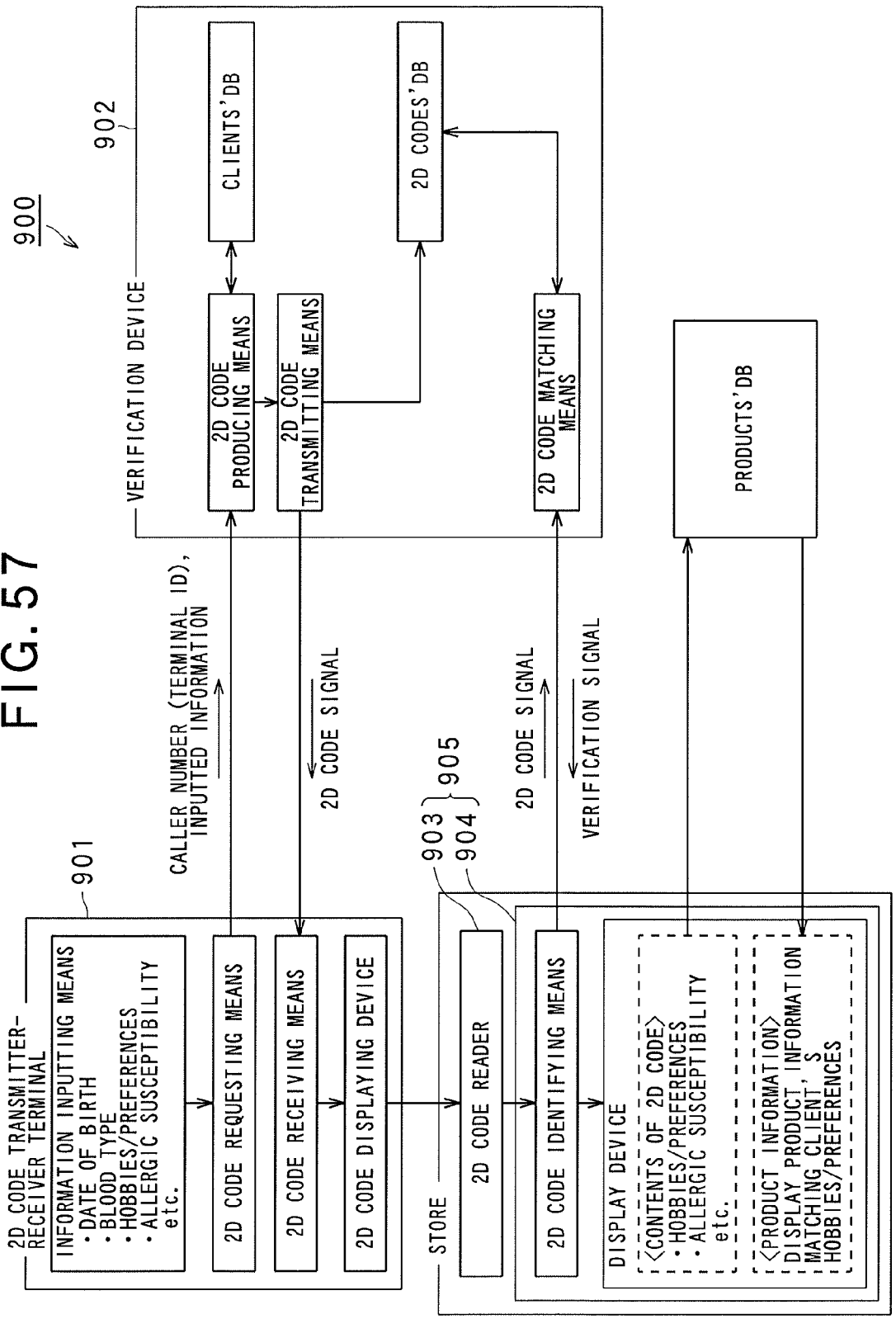
FIG. 57 is a block diagram illustrating another example of the system illustrated in FIG. 53.

The configuration shown in FIG. 53 may be modified as shown in FIG. 57. In FIG. 53, the database for 2D code producers (2D code producers' database) has been provided in the verification device 902, so that the identification terminal 905 can query the verification device 902 by transmitting the caller number. In FIG. 57, a database is provided for the 2D codes per se which have been produced and transmitted at steps S12 and S13. Thus, it is so configured that the identification terminal 905 can query the verification device 902 by transmitting a 2D code signal concerning the 2D code (e.g., specific information of 2D code) acquired from the transmitter-receiver terminal 901. In this case, if the 2D code concerning the query has been registered in the 2D codes' database, the verification device 902 determines the 2D code as being appropriate at step S21, and if not, determines as not being appropriate.

According to the present embodiment, a personal being verified may be verified using a 2D code which is able to record more data and enables correct definition of the rectangular region. In particular, use of a 2D code enabling recording of more data may enhance the degree of freedom of the personal information recorded on the 2D code. For example, more detailed personal information may be recorded on the 2D code to perform verification.

Twenty-second Embodiment

Figure 58:
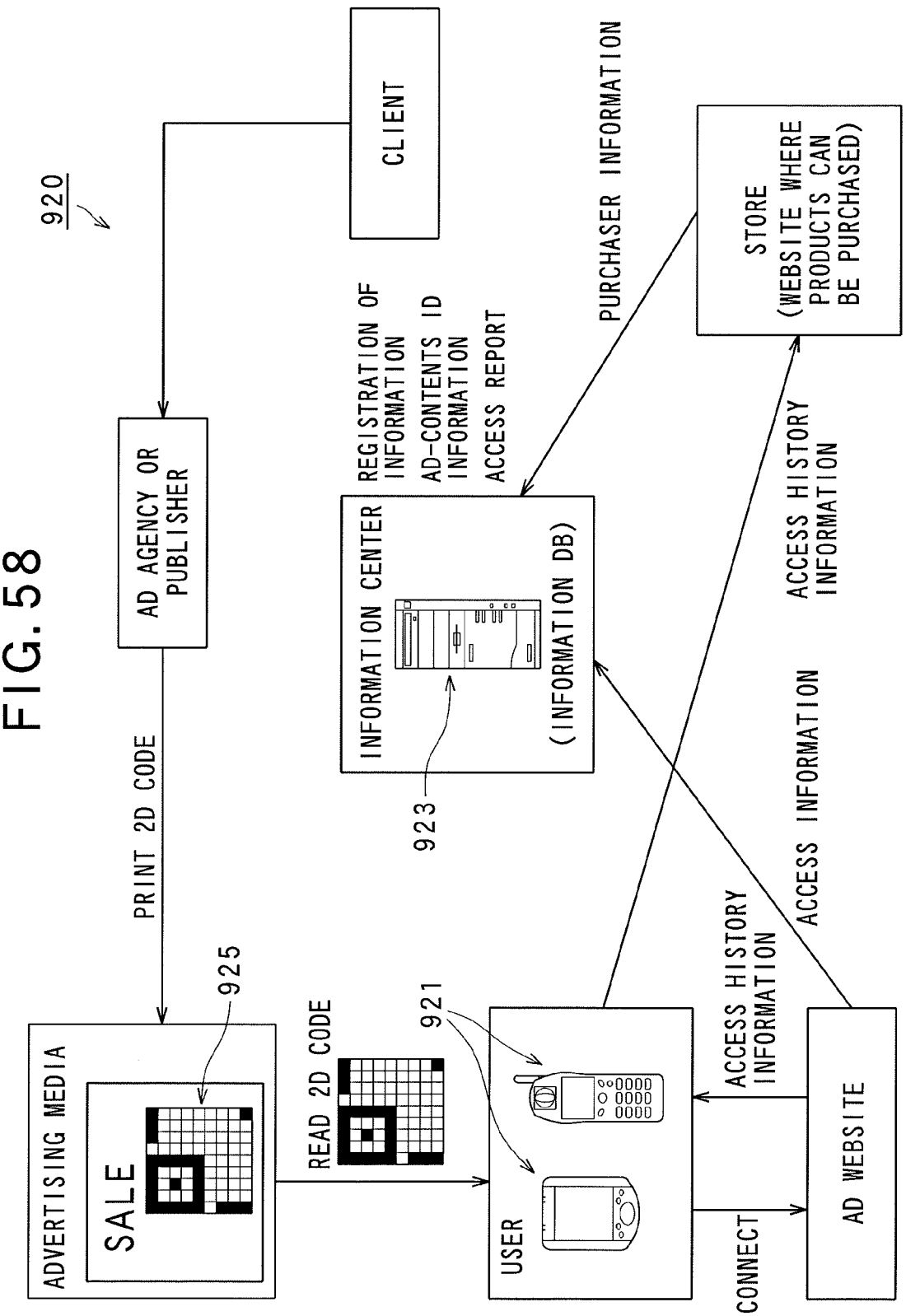
FIG. 58 is an explanatory view illustrating a mechanism of information distribution performed in an information distribution system to realize a method, according to a twenty-second embodiment of the present invention.
Figure 59:
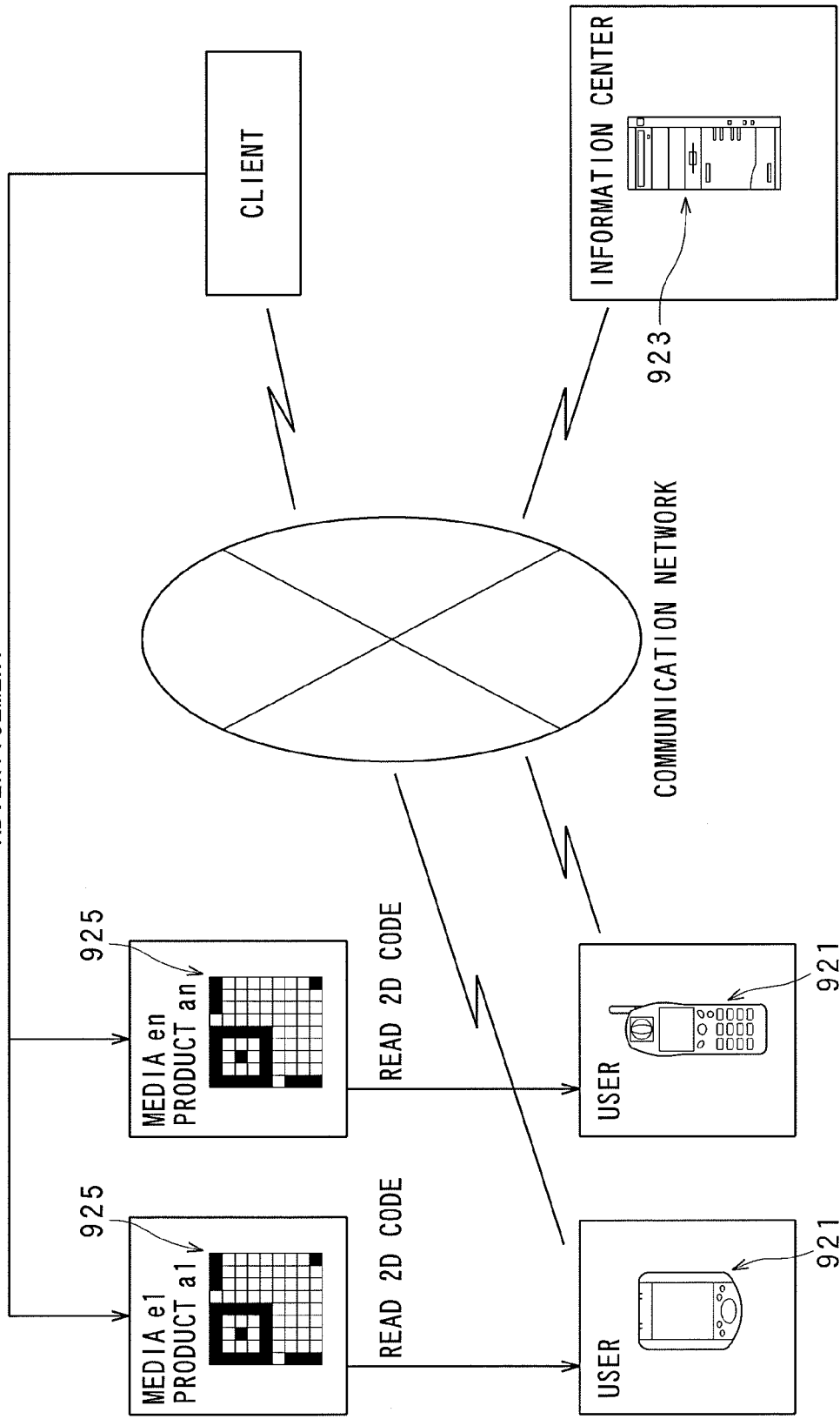
FIG. 59 is a schematic explanatory view illustrating the configuration of the information distribution system illustrated in FIG. 58.

Hereinafter is described a twenty-second embodiment. FIG. 58 is an explanatory view illustrating a mechanism of information distribution performed in an information distribution system 920 to realize a method according to the twenty-second embodiment. FIG. 59 is a schematic explanatory view illustrating the configuration of the information distribution system 920.

The information distribution system 920 is configured as a system for distribution information to users, using plural types of advertising media (e.g., magazines, leaflets and posters) on which the 2D codes of any of the above embodiments are stuck, and also using a mobile terminal 921 and a server 923.

The mobile terminal 921 includes displaying means, such as a liquid crystal display, and reading means, such as a 2D code reader, and is configured enabling connection to a communication network (internet, here). The present embodiment exemplifies a cellular phone or a PDA (personal digital assistance) as a mobile terminal 921.

The server 923 is configured as an information processor that can formulate a database. The server 923 is also connected to the communication network (internet, here).

Figure 62A:
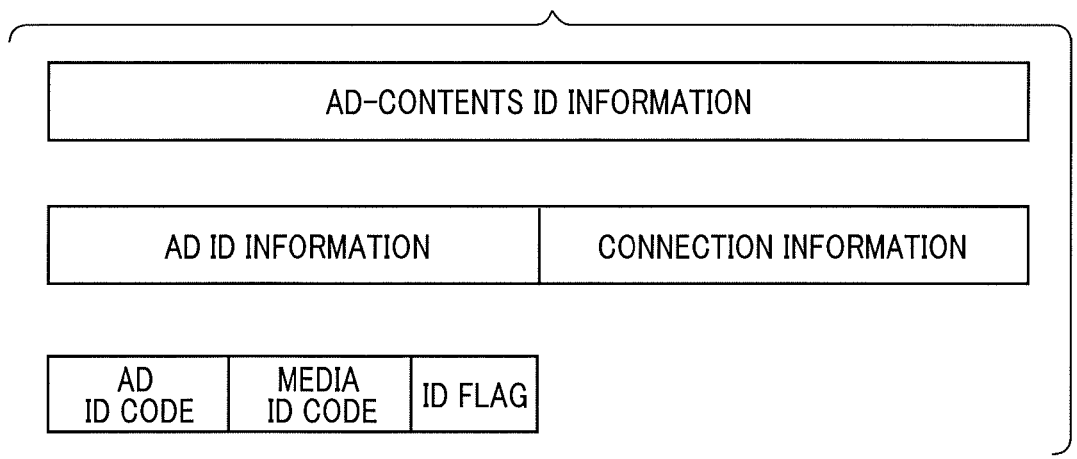
FIG. 62A is an explanatory view illustrating a data configuration of ad-contents ID information.

A client who wishes to use the system 920 may register in advance detailed information on a product to be advertised or services, at the server 923 (information center). When predetermined pieces of information (on a product to be advertised or services) are registered at the server 923 by the client, the information center gives information for identifying the contents of the advertisement (hereinafter referred to "ad-contents ID information") to the client. The ad-contents ID information is configured, for example, as shown in FIG. 62A, and includes information for identifying advertisement (hereinafter referred to "ad ID information") and connection information for establishing connection with the information center. The client may ask an advertiser, such as an advertisement agency or a publisher, to print the 2D code on advertising media, which 2D code is indicated by the ad-contents ID information given by the information center. Thus, the 2D code printed on the advertising media can be correlated to the contents registered at the server 923 of the information center.

Referring now to a procedure shown in FIG. 60, hereinafter is explained an operation of the mobile terminal. The procedure of FIG. 60 starts with satisfying predetermined requirements (e.g., powering on) in the mobile terminal 921. With the start, an OFF timer is actuated (step S101). If it is determined that a predetermined period, or when it is determined that the OFF timer has counted up the period (step S102), control proceeds to "Yes" to end the procedure (step S114). Alternatively, not necessarily when the period has been counted up, but when a stop operation is determined as having been performed (step S103), control proceeds to "Yes" to end the procedure (step S114).

When it is determined that a connection operation has been performed (step S104), control proceeds to "Yes" to perform the process at step S109 and the subsequent processes. On the other hand, if it is determined that no connection operation has been performed (step S104), control proceeds to "No" to determine whether or not an read-out operation has been conducted (step S105). The process at step S105 is for determining whether or not the data already decoded has been read out. If any one of the 2D codes has already been decoded and a command for reading out the decoded data has been issued, control proceeds to "Yes" from step S105 to read out the decoded data that has been stored (step S108).

If no data has been read out yet, it is determined whether or not a code-reading operation has been performed (step S106). If the code-reading operation has already been performed, control proceeds to "Yes" from step S106 to perform a code-reading process at step S107. If the code-reading operation has not yet been performed, control proceeds to "No" from step S106 to repeat the process at step S102 and the subsequent processes.

Figure 61:
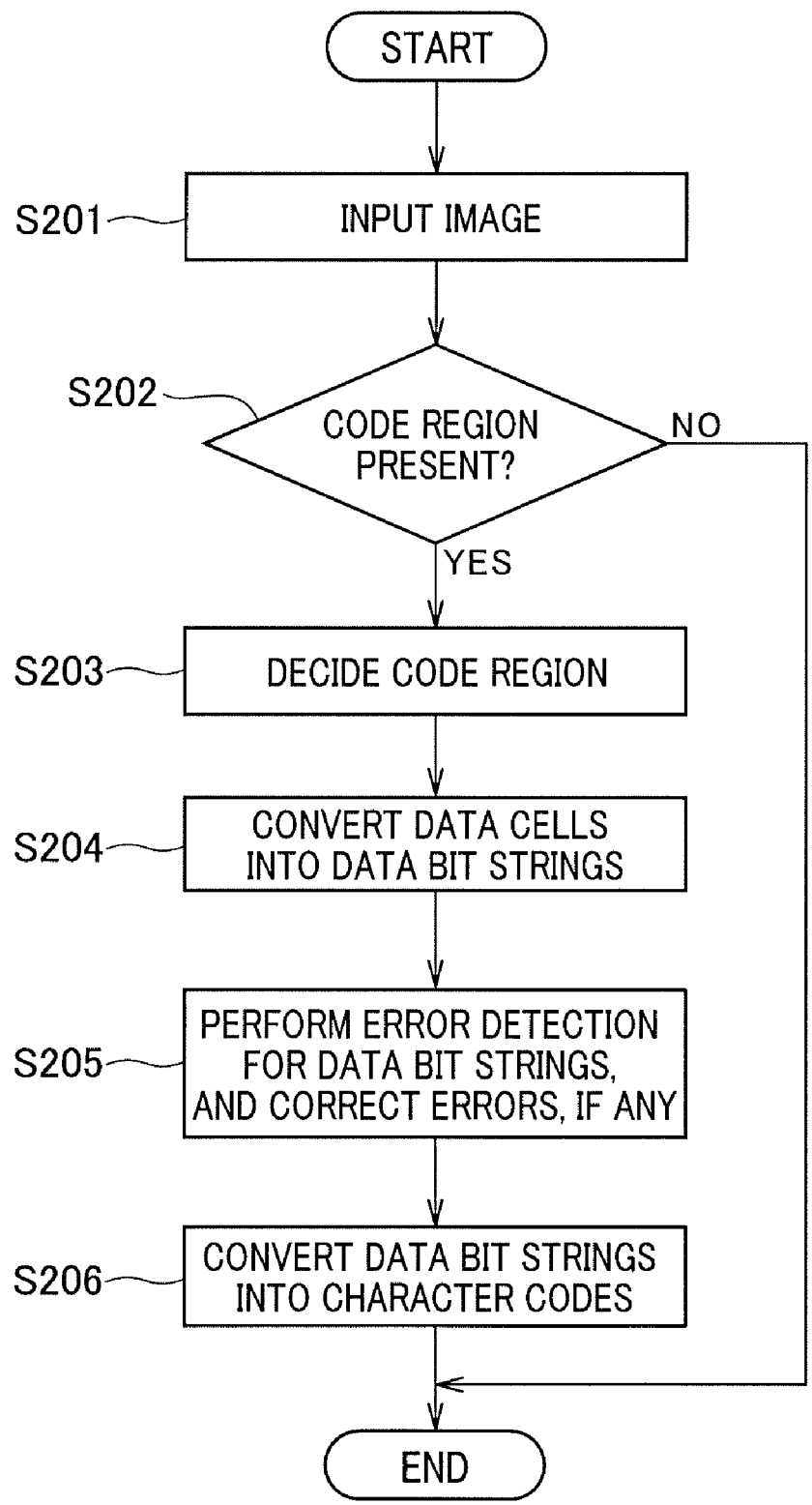
FIG. 61 is a flow diagram illustrating a flow of a procedure for acquiring code images in the flow illustrated in FIG. 60.

For example, after reading an advertising media, such as a magazine, if one wishes to obtain information on a certain product or services, the person may only have to read out the 2D code imparted to the advertising media by performing the operation of step S106. The code-reading process at step S107 is performed, for example, according to a flow shown in FIG. 61. Specifically, an image of the 2D code imparted to the advertisement is acquired (step S201) first. Then, it is determined whether or not a code region is present in the image (i.e. whether or not a code region can be recognized). If a code region is present, the code region is defined (step S203), followed by converting the data cells in the code region into data bit strings (step S204). Then, the data bit strings are subjected to error detection, and if an error has been detected, an error correction process is performed based on error-correction data (step S205). Then, the data bit strings are converted into character codes to obtain decoded data (step S206).

The process at step S107 corresponds to an example of a "reading step". At this step, when the advertisement user performs a reading operation for a 2D code 925 imparted to an advertising media using the mobile terminal 921, the 2D code imparted to the advertising media is read out by reading means of the mobile terminal 921.

Figure 60:
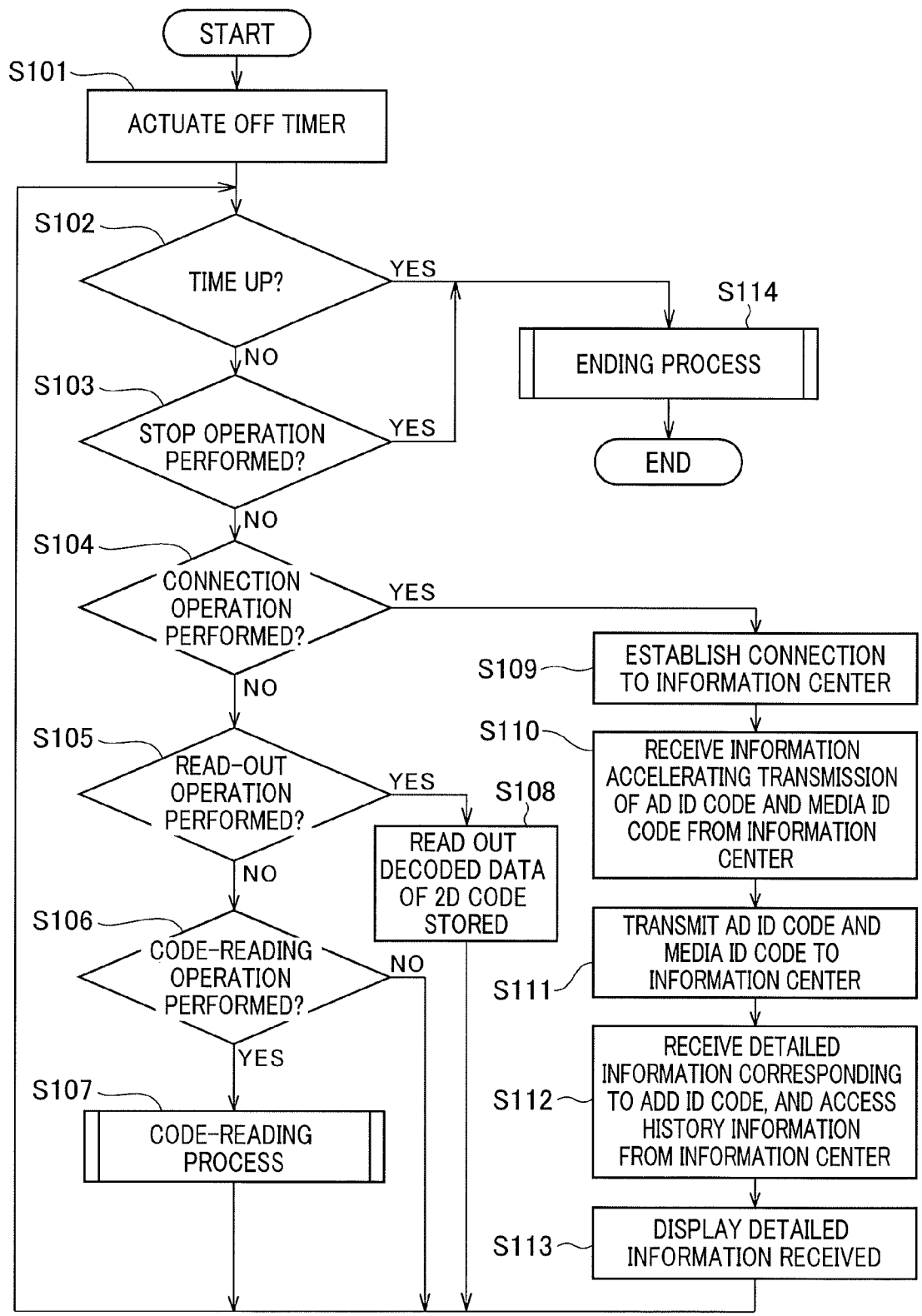
FIG. 60 is a flow diagram illustrating a flow of operation performed at a mobile terminal, in the system illustrated in FIG. 58.

On the other hand, if connection operation has been performed at step S104 of FIG. 60, control proceeds to "Yes" to establish connection with the server 923 (information center) (step S109). In the present embodiment, the ad-contents ID information recorded on the 2D code 925 includes connection information for establishing connection with an advertisement website (the website where advertisements are presented by the advertiser associated with the 2D code) administrated by the information center. Thus, connection can be established with the server 923 (information center) based on the connection information (step S109). The connection information includes a URL of the website set at the server 923, and the URL is accessed through the internet.

Further, information for accelerating transmission of an ad ID code and a media ID code is received from the server 923 (information center) (step S110). In the present embodiment, as shown in FIGS. 62A, the 2D code 925 is recorded with the ad ID code, the media ID code and an identification flag as the ad ID information. At step S111, the ad ID code and the media ID code are transmitted to the server 923 (information center). It should be appreciated that the ad ID code is used for identifying the type (information indicative of ad contents and ad areas) of an advertisement. The media ID code is used for identifying an advertising media, and corresponds to a code specific for the media concerned. The identification flag is used for distinguishing the ad ID information from the connection information.

The processes at steps S104 and S111 correspond to an example of a "connecting step". At these steps, a website is accessed according to the connection information of the 2D code read out at the reading step, and the ad-contents ID information contained in the 2D code is transmitted to the server 923.

Subsequently, detailed information corresponding to the ad ID code is acquired from the information center, for use as access history information. The detailed information concerns with specific advertisement and services corresponding to the ad ID code. Owing to the detailed information, a user (user of a mobile terminal) can obtain advantageous information. Also, the server 923 is ensured to record access history for every ID, based on the ID which is specific to the mobile terminal concerned, and thus, at step S112, also transmits such access history. After the process at step S112, the detailed information and access history received in this way are displayed on the display screen of the mobile terminal 921.

Figure 62B:
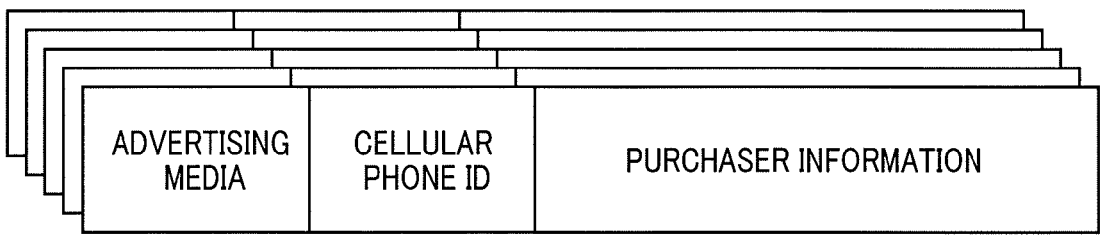
FIG. 62B is an explanatory view illustrating a configuration of access report.

Thus, every time an access is made from a mobile terminal, access information is collected in the server 923 (information center). The server 923 is adapted to accumulate the access information for every client. When a period for collecting such information has expired, the client is provided with access report. The access report is a round-up of the effects of the advertisement based on the number of accesses and the information indicating whether the product has been purchased by the users. The access report is presented for every product, or if the same product is advertised several times, the access report is presented for every advertising media, or if the same advertising media is used for several times, the access report is presented for every content item of the advertising media. FIG. 62B shows an example of such access report.

The accumulation processing of such access information corresponds to an example of a "statistical data producing step". That is, at this step, every time the connecting step is performed, the server 923 acquires the ad-contents ID information included in the 2D code used at the connecting step. Then, statistical data on the advertising media used for making an access to the website is produced based on the acquired ad-contents ID information. Also, the process of providing the access report corresponds to an example of an "outputting step". At this step, the client who asked for at least any type of advertising media is outputted with data on the status of use of the advertising media associated with the client, based on the statistical data produced at the statistical data producing step.

According to the present embodiment, information useful for users may be provided, using a 2D code which is able to record a larger amount of data and enables correct definition of the rectangular region. Also, according to the method related to the present invention, the connection information for identifying a connection destination, i.e. a website, is included in the 2D code. Thus, when a user has carried out a predetermined connection operation from a mobile terminal, the user can readily make an access to the website corresponding to the connection information. Further, in response to the predetermined connection operation, the ad-contents ID information included in the 2D code is transmitted to the server. The server thus acquires the ad-contents ID information included in the 2D code every time the connecting step is carried out. Then, statistical data on the advertising media used for making an access to the website is produced based on the acquired ad-contents ID information. In this way, advantageous statistical data can be produced, as to which of advertising media the website has been accessed through. Such statistical data may be utilized for marketing, for example.

Further, the client who asked for at least any type of advertising media is ensured to be outputted with data on the status of use of the advertising media associated with the client, based on the statistical data produced in this way. Thus, the client may be able to accurately grasp the status of use of the client's own advertising medium.

To explain in further detail, the client may readily determine the effects of the advertisement in question based on the presented access report. When the client has determined that the advertisement in question has exerted less effect, then the client may be able to readily take measures for the way of making an advertisement. Also, the client may be able to specifically acknowledge the effect of the advertisement in question, based on the ad ID information transmitted from the mobile terminal 921 and the access history information of the users. Thus, the information is highly reliable, so that the client can readily make an adequate determination based on the advantageous information.

In addition, since the mobile terminal 921 is able to accumulate the ad ID information, each user can access the webserver in the information center, as desired, to obtain the detailed information on the product concerned. In particular, the user can readily store the information associated with the product or services concerned so that the user can see the information any time.

Modifications

The present invention is not intended to be limited to the embodiments described above referring to the drawings. For example, the following modifications may also be regarded as falling within the technical scope of the present invention.

Figure 63:
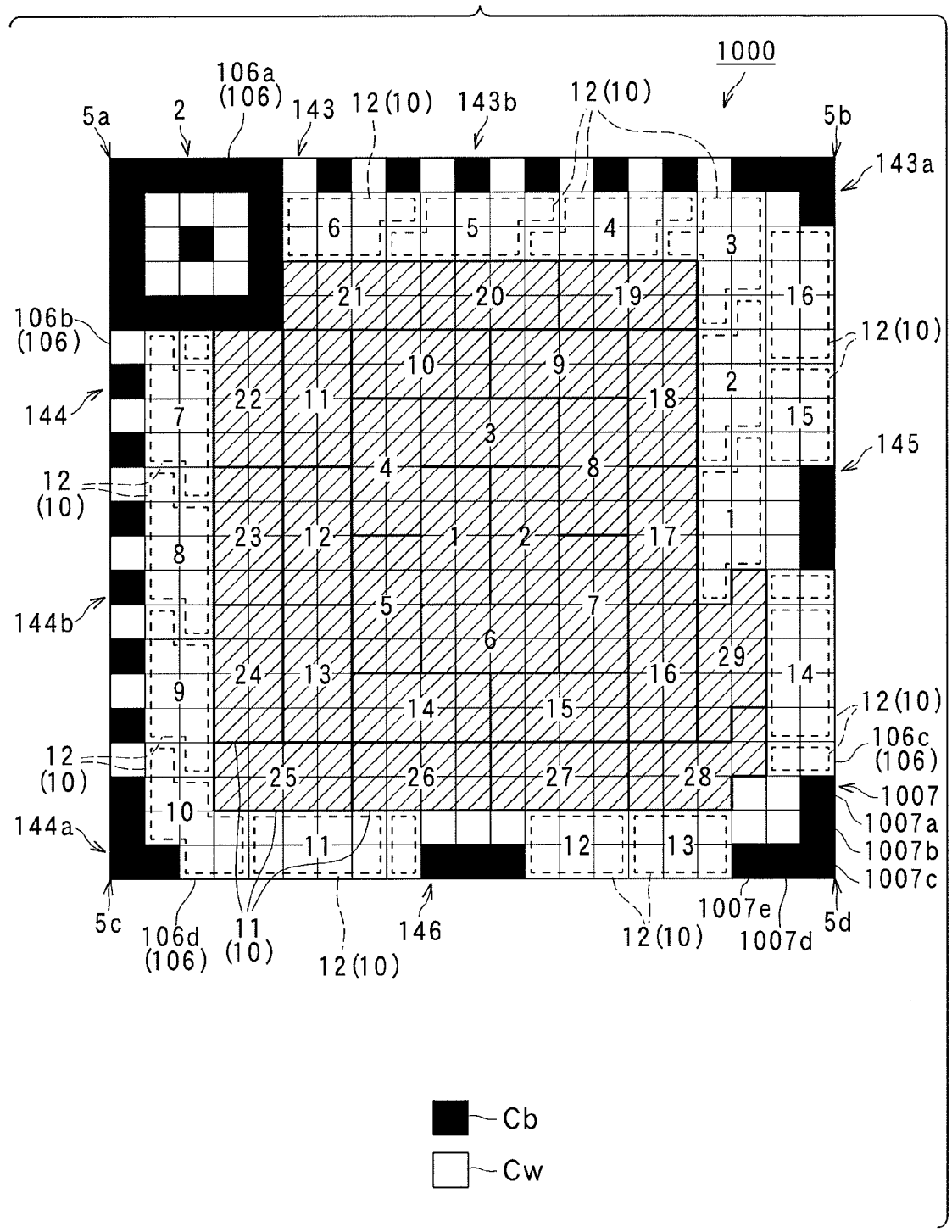
FIG. 63 is a schematic explanatory view illustrating a first example of a two-dimensional code, according to a modification of the present invention.

The configuration shown in FIG. 7 may be modified as shown in FIG. 63. A 2D code 1000 shown in FIG. 63 is different from the one shown in FIG. 7 only in the configuration of an end pattern 1007. Other portions are configured in the same manner as the 2D code of FIG. 7, and thus include all the features thereof.

In the example shown in FIG. 63, the end pattern has a configuration in which five black cells 1007a-1007e are arranged to form an "L" shape. Specifically, the end pattern 1007 is provided along the second border 106c so that three black cells 1007a, 1007b and 1007c are juxtaposed, with the cell 1007c at the end defining the position of an end portion. The end pattern 1007 also extends along the second border 106d so that the three black cells 1007c, 1007d and 1007e are juxtaposed, with the cell 1007c at the end defining the position of the end portion. The black cell 1007c configures the corner 5d, with the outer edge of the black cell 1007c defining the position of the corner 5d (i.e. position of the rectangular region).

Figure 64:
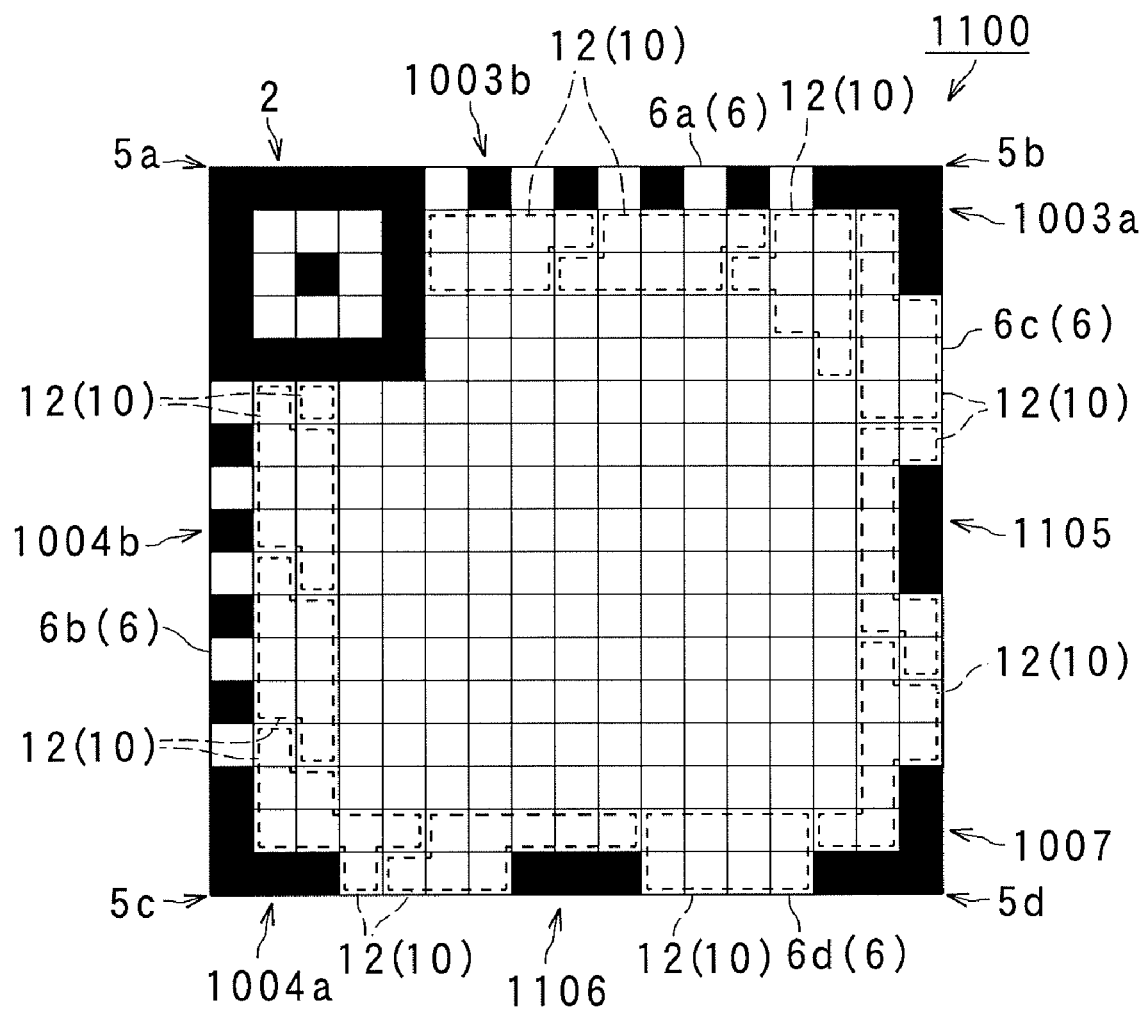
FIG. 64 is a schematic explanatory view illustrating a second example of a two-dimensional code, according to a modification of the present invention.

A 2D code may also be configured as shown in FIG. 64. In the example shown in FIG. 64, the 11×11 cell arrangement of FIG. 1 is enlarged to a 17×17 arrangement. Also, an intermediate specific pattern 1003b, which is longer than the intermediate specific pattern 3b of FIG. 1, is provided, while the end pattern 3a is replaced by an end pattern 1003a. Similarly, an intermediate specific pattern 1004b, which is longer than the intermediate specific pattern 4b of FIG. 1, is provided, while the end pattern 4a is replaced by an end pattern 1004a. Each of the end patterns 1003a, 1004a has an L-shaped configuration in which five black cells are arranged. The corners 5b, 5c are configured by the end patterns 1003a, 1004a, respectively. The end pattern 1007 identical with the one shown in FIG. 63 is arranged at the corner 5d.

Also, a third specific pattern 1105 is arranged between the end patterns 1003a and 1007 so as to extend along substantially an intermediate portion of the second border 6c. The third specific pattern 1105 is arranged along the second border 6c, forming a linear shape, with three black cells being juxtaposed. Similarly, a third specific pattern 1106 is arranged between the end patterns 1004a and 1007 so as to extend along substantially an intermediate portion of the second border 6d. The third specific pattern 1106 is arranged along the second border 6d, forming a linear shape, with three black cells being juxtaposed.

Figure 65:
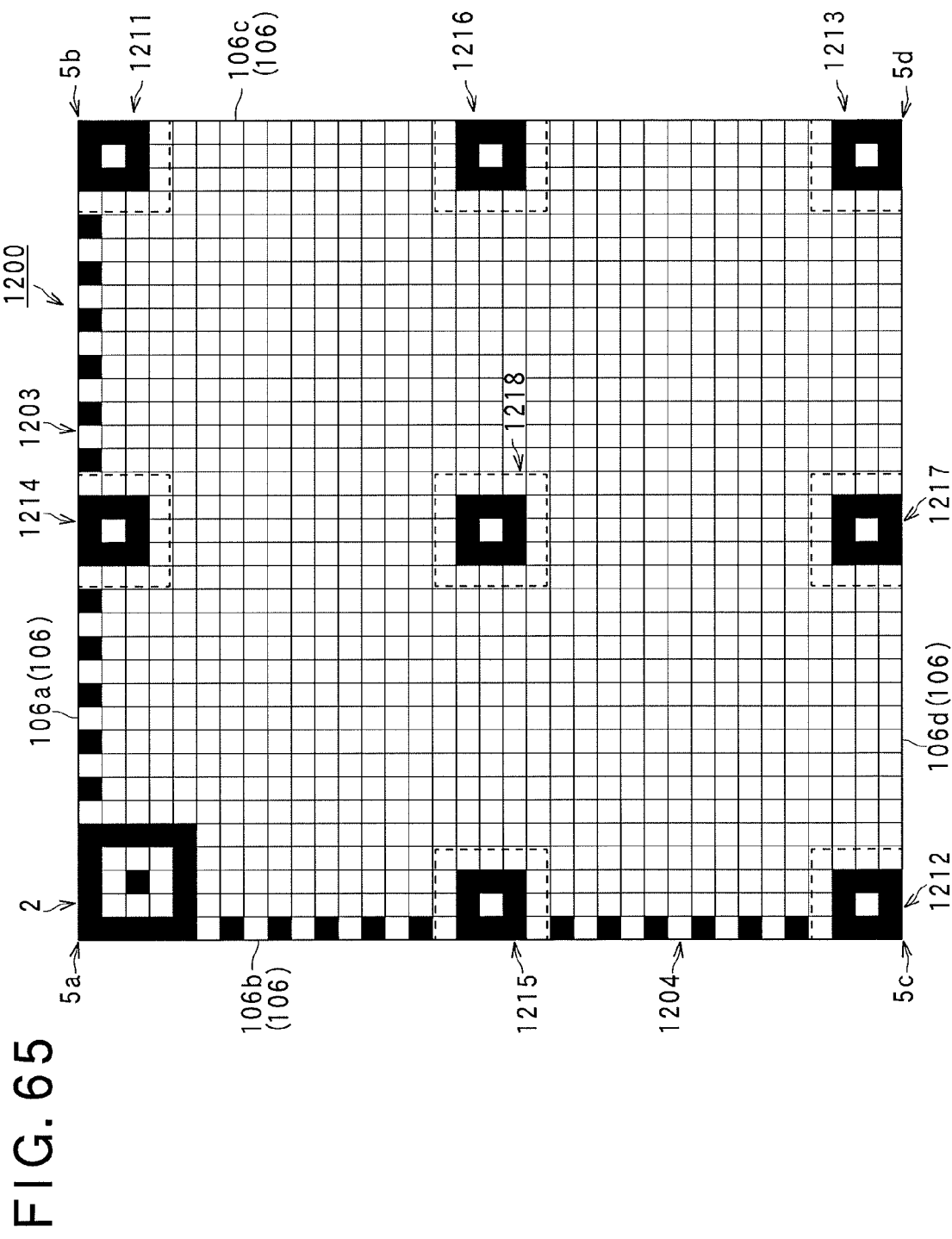
FIG. 65 is a schematic explanatory view illustrating a third example of a two-dimensional code, according to a modification of the present invention.

The 2D code may also have a configuration as shown in FIG. 65. A 2D code 1200 shown in FIG. 65 also includes the error-correction code blocks to perform error correction. Of the borders 106 in the rectangular region, the second borders 106c, 106d other than the borders along which second specific patterns 1203, 1204 are arranged, are provided with the error-correction code blocks 12, being extended therealong. In FIG. 65, detailed illustration of the error-correction code blocks and the data code blocks is omitted.

In the example of FIG. 65, an alignment pattern 1218 is arranged at the center portion of the code region. In the alignment pattern 1218, a single white cell is rectangularly surrounded by eight black cells, with sixteen white cells further surrounding the black cells. In FIG. 65, the area of the alignment pattern 1218 is indicated by a broken line. The 2D code shown in FIG. 65 also includes end patterns 1211, 1212, 1213 at the corners 5b, 5c, 5d, respectively, and specific patterns 1214, 1215, 1216, 1217 at the intermediate positions of the borders 106a, 106b, 106c, 106d, respectively. In each of these end patterns and specific patterns, a single white cell is rectangularly surrounded by eight black cells, with white cells further surrounding the black cells. The areas of these patterns are also indicated by broken lines.

In the case where a 2D code is configured into an oblong form, such a 2D code may have a configuration as shown in FIG. 66A or 66B, or FIG. 67A or FIG. 67B.

Figure 22A:
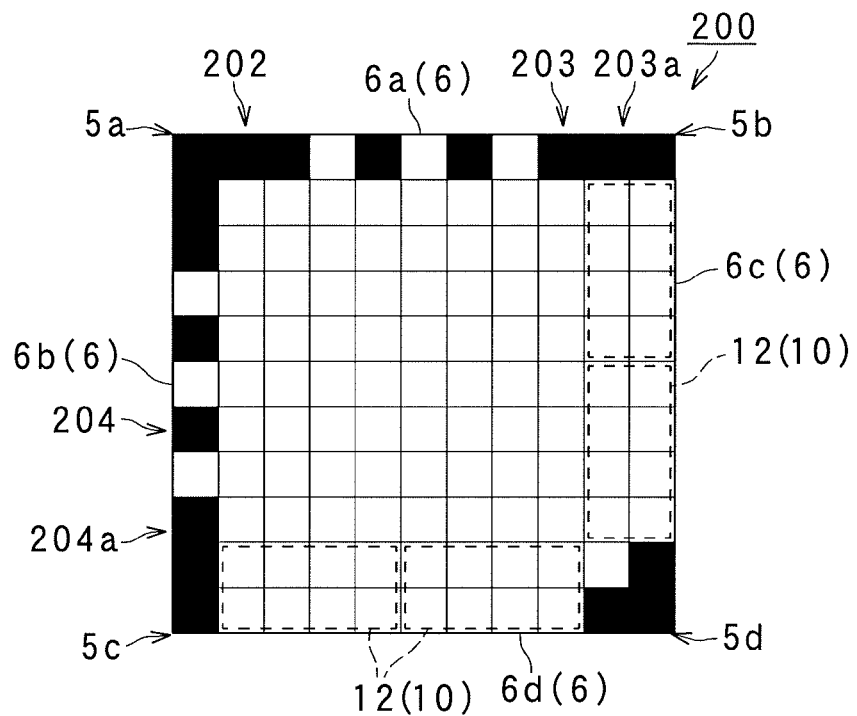
FIG. 22A is an explanatory view illustrating a third modification of the first embodiment illustrated in FIG. 1, having a configuration in which a first specific pattern has been changed.
Figure 22B:
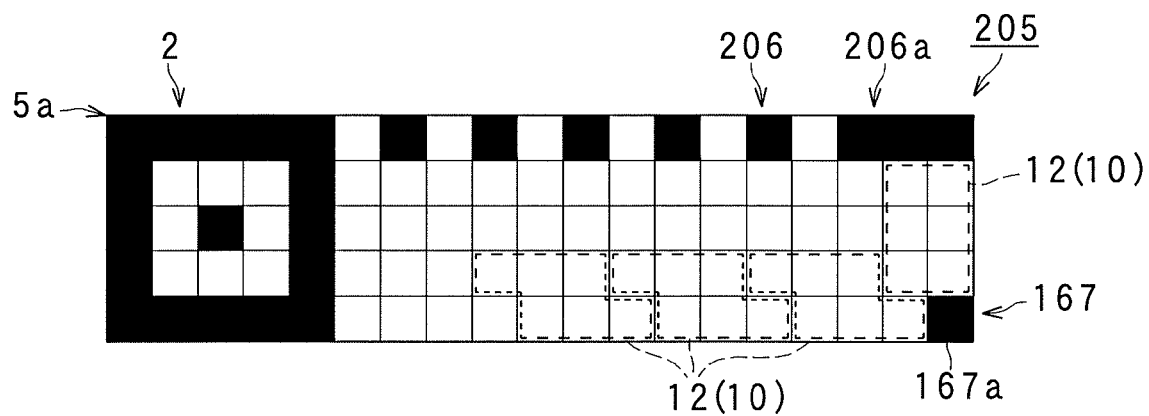
FIG. 22B is an explanatory view illustrating a fourth modification of the first embodiment illustrated in FIG. 1, having a configuration in which a rectangular region has an oblong shape.

A 2D code 1300 shown in FIG. 66A has a larger horizontal length (a second specific pattern 1303 has a larger length accordingly) than the one shown in FIG. 22B. The 2D code 1300 is different from the 2D code shown in FIG. 22B in that the end pattern 206a of FIG. 22B is replaced by an L-shaped end pattern 1305, and that a linear specific pattern 1308 that has been absent from FIG. 22B is provided. An end pattern 1306 consisting of a single black cell is provided at the corner 5d.

A 2D code 1310 shown in FIG. 66B includes an L-shaped end pattern 1315 at the corner 5b, an end pattern 1317 made up of a single black cell at the corner 5c, and an L-shaped end pattern 1316 at the corner 5d. The 2D code 1310 also includes a linearly shaped specific pattern 1318 in which black cells are juxtaposed. The specific pattern 1318 is arranged between the end patterns 1317 and 1316 so as to extend along an intermediate portion of the second border 106d. A second specific pattern 1313 is configured in the same manner as the second specific pattern 1303 of FIG. 66A.

A 2D code 1320 shown in FIG. 67A includes an L-shaped end pattern 1325 at the corner 5b, an L-shaped end pattern 1327 at the corner 5c, and an L-shaped end pattern 1326 at the corner 5d. The 2D code 1320 also includes two linearly shaped specific patterns 1328, 1329. The two specific patterns are arranged between the end patterns 1327 and 1326 with an interval therebetween, so as to extend along a border (the second border) which does not extend from the first specific pattern 2. A second specific pattern 1323 is configured to have a length larger than the second specific pattern 1303 shown in FIG. 66A.

A 2D code 1330 shown in FIG. 67B includes an L-shaped end pattern 1335 at the corner 5b, an L-shaped end pattern 1337 at the corner 5c, and an L-shaped end pattern 1336 at the corner 5d. The 2D code 1330 also includes two linearly shaped specific patterns 1338, 1339. The two specific patterns are arranged between the end patterns 1337 and 1336 with an interval therebetween, so as to extend along a border (the second border) which does not extend from the first specific pattern 2. A second specific pattern 1333 is configured to have a length larger than the second specific pattern 1303 shown in FIG. 66A. The 2D code 1330 also includes a second specific pattern 1334 along a border (the first border) extending from the first specific pattern 2.

In each of the above modifications, the color of the background (background color) of the code region has been white, with cells other than white cells having been exemplified as "cells having saturation, hue, or lightness different from the background". Alternative to this, the background color may be black, and cells other than black cells may be the "cells having saturation, hue, or lightness different from the background".

As examples 2D codes, FIGS. 1, 5, 7, 10, 12, 14, 15, 21A, 21B, 22A, 22B and 23, for example, have each shown a 2D code with a configuration in which black and white cells are arranged. Alternatively, one of the colors may be a dark color other than black, and the other may be a bright color other than white (a color brighter than the dark color). Also, the 2D codes shown in FIGS. 1, 5, 7, 10, 12, 14, 15, 21A, 21B, 22A, 22B and 23, for example, may have a configuration where three or more types of cells (e.g., eight types of cells as in the third embodiment).

As an example of using three or more types of cells, the description provided above has exemplified a configuration in which eight differently colored cells as in the third embodiment are used. However, the example is not intended to impose a limitation. For example, any 2D code configured by three or more types of cells may have more number of colors, e.g. four or twelve colors, than in the third embodiment. Also, the combination of colors may be differentiated from that used in the third embodiment.

Figure 21A:
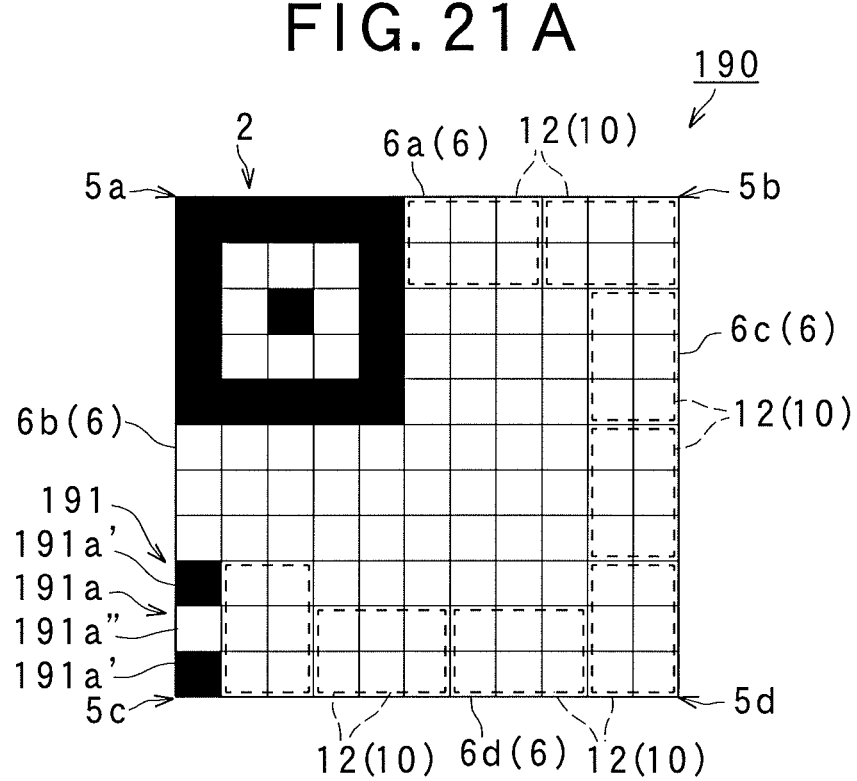
FIGS. 21A and 21B are explanatory views illustrating first and second modifications of the first embodiment illustrated in FIG. 1.

The embodiments described above each have exemplified a configuration in which the second specific patterns are arranged along the two respective first borders. Alternatively, as shown in FIG. 21A, one second specific pattern may be arranged along only either of the first borders. In FIG. 21A, a second specific pattern 191 is provided only along the first border 6*b*. The second specific pattern 191 is configured only by an end pattern 191*a*. The end pattern 191*a* is configured by alternately arranging black cells 191*a'* and white cells 191". The error-correction code blocks 12 are arranged along the first border 6*a* (in this case, the first border 6*a* also corresponds to an example of a second border) and the second borders 6*c*, 6*d*, other than the border (first border 6*b*) along which the second specific pattern 191 is arranged.

Figure 21B:
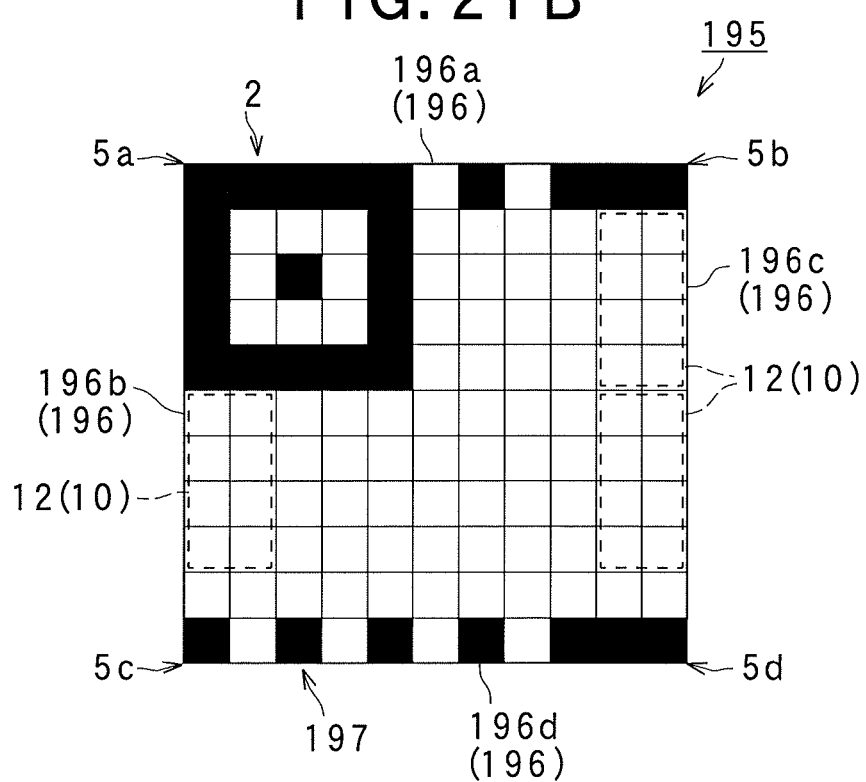

Alternatively, as shown in FIG. 21B, of the four borders 106, a border 196*d* may entirely be provided with a specific pattern 197 to extend therealong. In the configuration shown in FIG. 21B, the specific pattern 197 is also in contact with a first border 196*b*, so as to ensure function as the second specific pattern.

The above embodiments have each exemplified a configuration in which the first specific pattern has a rectangular outline. This however is not intended to impose a limitation. If only the configuration can specify the corner 5*a*, any shape, any cell arrangement and any type of cells may be used for the first specific pattern. For example, as in a first specific pattern 202 used for a 2D code 200 shown in FIG. 22A, the first specific pattern may have a shape of "L". In the configuration shown in FIG. 22A as well, second specific patterns 203, 204 are arranged along the first borders 6*a*, 6*b*, respectively, and the error-correction code blocks 12 are arranged along the second borders 6*c*, 6*d*. As shown in FIG. 22A, the second specific patterns 203, 204 have respective end portions (the end portions on the sides opposite to the first specific pattern 202) in which end patterns 203*a*, 204*a*, respectively, are provided. Each of the end patterns 203*a*, 204*a* is made up of three juxtaposed cells of the same type (black cells).

In each of the embodiments described above, the code region has been configured to have a square outline. This however is not intended to impose a limitation. For example, as shown in FIG. 22B, the code region may have an oblong outline. In the configuration shown in FIG. 22B, three first borders (the borders each partially or fully extending along an edge of the first specific pattern) are provided. One of the first borders (short border) fully extends along an edge of the first specific pattern 2. Along one of the remaining two borders (long borders), a second specific pattern 206 is arranged. The second specific pattern 206 has an end portion (the end portion opposite to the first specific pattern 2) provided with an end pattern 206*a* which is made up of three juxtaposed cells of the same type (black cells). In this configuration as well, the error-correction code blocks 12 are arranged along the border other than the border along which the second specific pattern 206 is provided.

Each of the embodiments described above has been provided with code blocks each made up of chiefly eight cells. However, each block may be structured otherwise, whether the block is the data code block 11, the error-correction code block 12 or the compressed data code block 13. For example, each block may be structured by less than eight (e.g., two, four or six) blocks, or by more than eight (e.g., ten or sixteen) cells.

In the first embodiment, as shown in FIG. 1, for example, each of the error correction code blocks 12 has been configured to have a rectangular shape of a 2×4 or 4×2 matrix. However, some of the code blocks may have a different configuration (e.g., the configuration shown in FIG. 2C).

The embodiments described above have used, as an error correction method, a method prescribed in JIS. However, other methods may be used if only the methods can correct errors of the data code blocks. In particular, known error-correction methods may be used if only the methods can correct errors by producing error-correction codes based on the contents of data to be decoded (specifically, data words configuring each data code block), and by correcting errors using the data words when errors are caused in a portion of each data code block. For example, a 2D code may be configured so that the data of each code block can be appropriately corrected, using LDPC (low density parity check codes) codes. In this case, the LDPC codes may be expressed by the above error-correction code blocks, and these error-correction code blocks may be arranged along the borders of the rectangular region.

Any of the 2D codes according to the embodiments described above may be configured being arranged with residual blocks. The residual blocks contain cells to which neither the error-correction code blocks 12 nor the data code blocks 11 are allocated. For example, the cells "Ca" of FIG. 14 may be configured as such a residual block. Also, such residual blocks may be arranged around the rectangular first end patterns of FIG. 20. Alternatively, such residual blocks may be arranged along each of the L-shaped first end patterns of FIG. 7. In this way, the residual blocks may be arranged for efficient utilization of the areas surrounding the first end patterns.

The embodiments described above have each exemplified a configuration in which each of the second specific patterns is configured as a group. However, each second specific pattern may be divided into a plurality of groups if only the groups are arranged along the first border.

The fourth embodiment has exemplified a configuration in which each third specific pattern is formed as a group. However, each third specific pattern may be divided into a plurality of groups if only the groups are arranged along the second border.

Figure 23:
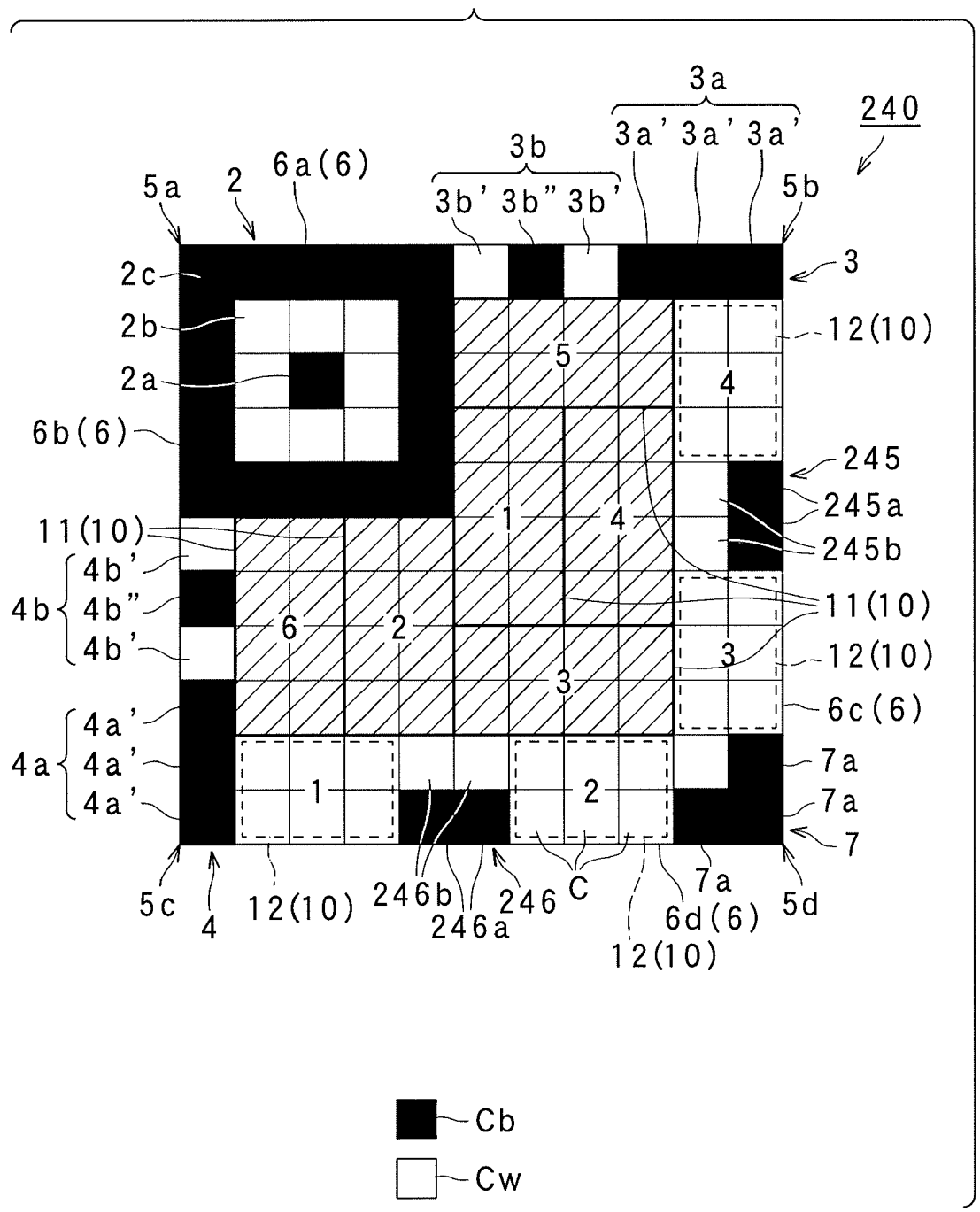
FIG. 23 is an explanatory view illustrating a fifth modification of the first embodiment illustrated in FIG. 1, in which third specific patterns have been provided, each of which having an 11×11 matrix configuration.

Also, the fourth embodiment has exemplified a configuration of a 21×21 matrix in which the third specific patterns are arranged. Alternatively, the third specific patterns may be arranged in an 11×11 matrix as shown in FIG. 1. FIG. 23 shows an example of such a configuration. A 2D code 240 shown in FIG. 23 is different from the 2D code shown in FIG. 1 in that third specific patterns 245, 246 are arranged along the second borders 6*c*, 6*d*, respectively, and that the error-correction blocks 12 have slightly been modified. The third specific pattern 245 is configured by black cells 245*a* juxtaposed along the second border 6*c* and white cells 245*b* juxtaposed along the inner side of the black cells 245*a*. The third specific pattern 246 is configured by black cells 246a juxtaposed along the second border 6d and white cells 246b juxtaposed along the inner side of the black cells 246a.

In the above description, some examples of the first specific pattern have been described (e.g., FIGS. 1, 22A and 22B). However, these examples are not intended to impose a limitation. For example, color, the number of cells, shape, the order of arrangement, and the like may be varied if only the configuration can define the specified corner 5a in the rectangular region by arranging cells at the corner 5a, which cells are different in saturation, hue, or lightness from the background.

In the above description, some examples of the second specific pattern have been described (e.g., FIGS. 1, 6, 7, 10 and 11). However, these examples are not intended to impose a limitation. For example, color, the number of cells, shape, the order of arrangement, and the like may be varied if only the cells in the specific pattern are arranged along the first border, which cells are different in saturation, hue, or lightness from the background.

In the above description, some examples of the end pattern have been described. However, these examples are not intended to impose a limitation.

For example, as to the second end pattern, color, the number of cells, shape, the order of arrangement, and the like may be varied if only the cells in the end pattern are arranged at the diagonal corner 5d, which cells are different in saturation, hue, or lightness from the background.

As to the first end pattern, L-shaped end patterns have been exemplified as shown, for example, in FIGS. 7, 12 and 16. In such an L-shaped end pattern, three cells are linearly arranged along the first border, while two cells are linearly arranged long the second border. The "L" shape may be varied. For example, each L-shaped end pattern may be made up of three cells linearly arranged along the first border and three cells linearly arranged along the second border.

The same applies to the case where the second end pattern is formed into a shape of an "L". The second end pattern is not limited to the L-shaped end pattern as shown in FIG. 1, in which two cells are linearly arranged along one second border and two cells are linearly arranged along the other second border. The second end pattern may also have various other "L" shapes.

In the above description, some examples of the third specific pattern have been described (e.g., FIGS. 7, 8, 20 and 23). However, these examples are not intended to impose a limitation. For example, color, the number of cells, shape, the order of arrangement, and the like may be varied if only the cells in the specific pattern are arranged along the second border, which cells have a color different from the background color.

In the above description, some examples of the second specific pattern have been described, in each of which plural types of cells having different saturation, hue, or lightness are arranged in a predetermined order. Such second specific patterns are shown, for example, in FIGS. 6, 11, 13, 18, 19 and 20. In the case where three or more differently colored cells are arranged in a predetermined order to form the second specific pattern, the pattern may be varied in color, the number of cells, shape, the order of arrangement, and the like, not being limited to those used in these examples.

In the above description, some examples of the first end pattern have been described, in each of which plural types of cells having different saturation, hue, or lightness are arranged in a predetermined order. Such first end patterns are shown, for example, in FIGS. 6, 11, 13, 18 and 20. In the case where three or more differently colored cells are arranged in a predetermined order to form the first end pattern, the pattern may be varied in color, the number of cells, shape, the order of arrangement, and the like, not being limited to those used in these examples.

In the above description, some examples of the second end pattern have been described, in each of which plural types of cells having different saturation, hue, or lightness are arranged in a predetermined order. Such a second end pattern is shown, for example, in FIGS. 16, 18 and 20. In the case where three or more differently colored cells are arranged in a predetermined order to form the second end pattern, the pattern may be varied in color, the number of cells, shape, the order of arrangement, and the like, not being limited to those used in these examples.

In the above description, some examples of the third end pattern have been described, in each of which plural types of cells having different saturation, hue, or lightness are arranged in a predetermined order. Such a third end pattern is shown, for example, in FIGS. 8 and 20. In the case where three or more differently colored cells are arranged in a predetermined order to form the third end pattern, the pattern may be varied in color, the number of cells, shape, the order of arrangement, and the like, not being limited to those used in these examples.

What is claimed is:

1. A two-dimensional code which is present on an object and formed to have a rectangular region delineated by a plurality of borders differentiated from a background on the object, comprising:

a plurality of code blocks including a plurality of data code blocks and a plurality of error-correction code blocks, the data code blocks being blocks in which data are coded, the error-correction code blocks being for correcting an error in the data code blocks, the data code blocks and the error-correction code blocks being composed of a plurality of cells which are aggregated;

a first specific pattern used to specify the positions of the cells; and a second specific pattern used to distinguish the code blocks from the background on the object, wherein the code blocks, the first specific pattern and the second specific pattern are arranged in the rectangular region, the first specific pattern is located at a specified corner of the rectangular region, the second specific pattern is located along one or more borders of two first borders along which the first specific pattern is located, the second specific pattern being adjacent to the first specific pattern, the first borders being part of the borders of the rectangular region, the error-correction code blocks are located along second borders which are different from the one or more borders of the two first borders, the second borders being part of the borders of the rectangular region, and one or more of the error-correction code blocks are arranged along each of the second borders.

2. The two-dimensional code of claim 1, wherein the code blocks include a first border block arranged between the first specific pattern and the second specific pattern along the first borders, and the first border block includes the error-correction code blocks.

3. A method of producing a two-dimensional code according to claim 2 using an image processor, comprising steps of:
acquiring object data to be encoded;
deciding cell configurations and arrangement positions of the first and second specific patterns so that the specific patterns are produced; and
deciding cell configurations and arrangement positions of the code blocks using the acquired object data so that the code blocks are produced, wherein the object data are divided into data having an information amount of binary N bits and each of the divided object data is added by error detection data having an information amount of binary M bits so that composite data are produced, and the cell configurations and the arrangement positions of each of the code blocks are decided such that the composite data are expressed by X types and Y pieces of cells that satisfy a relationship of $X^{Y-1}<2^N\times 2^M<X^Y$.

4. A method of producing a two-dimensional code according to claim 3, the method including steps of:
acquiring object data to be encoded;
deciding cell configurations and arrangement positions of the first and second specific patterns so that the specific patterns are produced; and
deciding cell configurations and arrangement positions of the code blocks using the acquired object data so that the code blocks are produced,
calculating ratios of both bright cells and dark cells to be arranged in the rectangular region using not only the produced first and second specific patterns but also the produced code blocks;
determining whether or not the ratio of the dark cells in the rectangular region is larger than the ratio of the bright cells in the rectangular region based on the calculated ratios; and
mutually inverting the bright cells and the dark cells in the rectangular region when the ratio of the dark cells is larger than the ratio of the bright cells.

5. The method of claim 4, wherein the inverting step also mutually inverts bright cells and dark cells arranged in a marginal region adjacently surrounding the rectangular region.

6. The two-dimensional code of claim 1, comprising a third specific pattern arranged along part of the second borders to distinguish the code blocks from the background,
wherein the error-correction code blocks and the third specific pattern are arranged along the second borders.

7. The two-dimensional code of claim 6, wherein the third specific pattern has a plurality of cells different in saturation, hue, or lightness from each other and arranged in a predetermined order.

8. The two-dimensional code of claim 6, wherein the third specific pattern and the second specific pattern are the same in shape.

9. The two-dimensional code of claim 1, wherein the rectangular region is a square region composed of a matrix whose one side is composed of odd-number L of cells so that a matrix size thereof is L×L,
the first specific pattern has a contour which is a square composed of a matrix whose one side is composed of odd-number M of cells M (M<L) so that a matrix size thereof is M×M,
the second specific pattern is a linear pattern composed of even-number N of cells satisfying N=L−M and being arranged linearly and
each of the code blocks is composed of a rectangular matrix having a matrix size of A×B, whose one side is composed of even-number A of cells lined up and whose the other side is composed of even-number B of cells arranged linearly.

10. The two-dimensional code of claim 1, wherein the rectangular region has a second corner positionally different from the first corner, and
the second specific pattern includes a first end pattern arranged at the second corner of the rectangular area.

11. The two-dimensional code of claim 10, wherein the second specific pattern is composed of the first end pattern.

12. The two-dimensional code of claim 10, wherein the first end pattern is composed of a single cell whose saturation, hue, or lightness is different from the background.

13. The two-dimensional code of claim 10, wherein the error-correction code blocks or a residual block is arranged around the first end pattern, the residual block storing therein a residual cell which is not allocated to the data code blocks storing data.

14. The two-dimensional code of claim 1, wherein
the code blocks include the error-correction code blocks for correcting an error, and
the error-correction code blocks are arranged adjacently to the second specific pattern arranged along the first borders.

15. The two-dimensional code of claim 1, wherein
the code blocks include the compressed data code blocks in which the compressed data are stored,
the second specific pattern arranged along the first borders has an inner side, and
the compressed data code blocks are arranged adjacently to the inner side of the second specific pattern.

16. The two-dimensional code of claim 1, comprising a second end pattern arranged at a corner of the rectangular region which is diagonally located to the first specific pattern in the rectangular region.

17. The two-dimensional code of claim 1, wherein the code blocks are expressed by the cells composed of X types and Y pieces of cells which are composed of composite data produced by adding, to data to be decoded having an information amount of N bits in binary number, error-detection data having an information amount of M bits in binary number, the composite data satisfying a relationship of $X^{Y-1}<2^N\times 2^M<X^Y$.

18. The two-dimensional code of claim 1, comprising an end pattern arranged at a corner of the rectangular region which positionally differs from the specified corner of the rectangular region,
wherein the end pattern is previously given inherent length ratios corresponding to every size of the two-dimensional code, the inherent length ratios each providing the end pattern with a ratio between a longitudinal length thereof and a lateral length thereof.

19. The two-dimensional code of claim 18, wherein the inherent length ratio for each size of the two-dimensional code is predetermined such that a sum of C1 and C2 becomes larger with an increase in the inherent length ratio, wherein C1 and C2 are natural numbers both changeable every size of the two-dimensional code.

20. The two-dimensional code of claim 18, wherein the end pattern is composed of cells arranged in an L shape along borders of the corner of the rectangular region which positionally differs from the specified corner thereof.

21. The two-dimensional code of claim 1, wherein the code blocks include data code blocks in which encoded data are stored, the data being expressed by a plurality of digits of symbols composed of a plurality of types of symbols, the encoded data satisfy a relationship of $2^{F-1} < D^E < 2^F$, wherein D denotes the number of types of the symbols and E and F are natural numbers, and the data code blocks express a string of bits which are binary-converted every E digits that provides a bit conversion rate F/E with a given value.

22. The two-dimensional code of claim 21, wherein the given value is set to allow the bit conversion rate F/E to have the lowest value thereof.

23. The two-dimensional code of claim 21, wherein
the data code blocks express the string of bits which are binary-converted every E1 digits and residual digits of less than the E1 digits in the string of bits are binary-converted every E2 digits, wherein E1 denotes a value of the number of digits, E, obtained when the bit conversion rate F/E is the smallest and E2 denotes a value of the number of digits, E, obtained when the bit conversion rate F/E is next in smallness to the value E1 (0<E2<E1).

24. The two-dimensional code of claim 1, wherein the cells composing the code blocks include a plurality of cells which are the same kind as each other and arranged into a rectangular form to produce a large basic cell unit whose size is larger than the size of each of the cells, and the first specific pattern is composed of a combination of a plurality of the large basic cell units.

25. The two-dimensional code of claim 24, wherein the second specific pattern is composed of a combination of a plurality of cells each of which is the large basic cell unit.

26. The two-dimensional code of claim 24, wherein the larger basic cell unit and the cells composing the code blocks are analogous in shape to each other.

27. The two-dimensional code of claim 24, comprising a format information block indicating format information of the two-dimensional code and being composed of a plurality of cells each of which is the large basic cell unit.

28. The two-dimensional code of claim 27, wherein the format information block is arranged adjacently to, at least, one of the first specific pattern or the second specific pattern.

29. The two-dimensional code of claim 24, wherein each of the first specific pattern and the second specific pattern is composed of a combination of a plurality of cells each of which is the large basic cell unit, and
all of the respective large basic cell units composing the first specific pattern, the second specific pattern, and the format information block are the same in their sizes.

30. The two-dimensional code of claim 1, wherein the data blocks include a first data code block expressing a first data of a predetermined type and a second data code block expressing a second data which is different in type from the first data, and
the first data code block is arranged in a first area arranged in the code and the second data code block is arranged in a second area arranged in the code, the second area being positionally farther than the first area from the first specific pattern.

31. The two-dimensional code of claim 30, wherein each of the first data and the second data is given an error correction level, the error correction level of the first data being higher than that of the second data.

32. The two-dimensional code of claim 30, wherein the first data indicates format information and the second data indicates information other than the format information.

33. A two-dimensional code which is present on an object and formed to have a rectangular region delineated by a plurality of borders differentiated from a background on the object, comprising:
a plurality of code blocks including a plurality of compressed data code blocks in each of which compressed data are stored, each of the code blocks being composed of a plurality of cells which are aggregated;
a first specific pattern used to specify the positions of the cells; and
a second specific pattern used to distinguish the code blocks from the background on the object,
wherein the code blocks, the first specific pattern and the second specific pattern are arranged in the rectangular region,
the first specific pattern is located at a specified corner of the rectangular region,
the second specific pattern is located along one or more borders of two first borders along which the first specific pattern is located, the second specific pattern being adjacent to the first specific pattern, the first borders being part of the borders of the rectangular region,
the compressed data code blocks are arranged along second borders which are different from the one or more borders of the two first borders, the second borders being part of the borders of the rectangular region, and
the compressed data code blocks include one or more compressed data code blocks arranged along each of the second borders.

34. The two-dimensional code of claim 33, wherein the code blocks include a first border block arranged between the first specific pattern and the second specific pattern along the first borders, and
the first border block includes the compressed data code blocks.

35. The two-dimensional code of claim 33, comprising a third specific pattern arranged along part of the second borders to distinguish the code blocks from the background,
wherein the compressed data code blocks arranged along the second borders are arranged to positionally avoid the third specific pattern.

36. A two-dimensional code which is present on an object and formed to have a rectangular region delineated by a plurality of borders differentiated from a background on the object, comprising:
a plurality of code blocks including a plurality of data code blocks and a plurality of error-correction code blocks, the data code blocks being blocks in which data are coded, the error-correction code blocks being for correcting an error in the data code blocks, the data code blocks and the error-correction code blocks being composed of a plurality of cells which are aggregated;
a first specific pattern used to specify the positions of the cells; and
a second specific pattern used to distinguish the code blocks from the background on the object,
wherein the code blocks, the first specific pattern and the second specific pattern are arranged in the rectangular region,
the first specific pattern is located at a specified corner of the rectangular region,
the second specific pattern is located along one or more borders of two first borders along which the first specific pattern is located, the second specific pattern being adjacent to the first specific pattern, the first borders being part of the borders of the rectangular region,
the error-correction code blocks are located along second borders which are different from the one or more borders of the two first borders, the second borders being part of the borders of the rectangular region, the data blocks include a first data code block expressing a first data of a predetermined type and a second data code block expressing a second data which is different in type from the first data, the first data code block is arranged in a first area arranged in the code and the second data code block is arranged in a second area arranged in the code, the second area being positionally farther than the first area from the first specific pattern, each of the first data and the second data is given an error correction level, the error correction level of the first data being higher than that of the second data, and the code blocks are subjected to a masking process performed using a prescribed one type of mask pattern.

* * * * *

UNITED STATES PATENT AND TRADEMARK OFFICE
CERTIFICATE OF CORRECTION

PATENT NO.         : 8,397,999 B2
APPLICATION NO.    : 13/368591
DATED              : March 19, 2013
INVENTOR(S)        : Hiroaki Mizukoshi et al.

Page 1 of 1

It is certified that error appears in the above-identified patent and that said Letters Patent is hereby corrected as shown below:

In the Claims:

Col. 67, claim 4, lines 19 - 20, change "according to claim 3" to -- according to claim 2 --

Signed and Sealed this
Third Day of September, 2013

Teresa Stanek Rea
*Acting Director of the United States Patent and Trademark Office*